(12) United States Patent
Ziebell et al.

(10) Patent No.: US 12,298,984 B2
(45) Date of Patent: May 13, 2025

(54) SYSTEMS, METHODS, AND MEDIA FOR IDENTIFICATION, DISAMBIGUATION, VERIFICATION AND FOR COMMUNICATING KNOWLEDGE

(71) Applicants: William J. Ziebell, Eagle, ID (US); Angela M. Ziebell, Eagle, ID (US)

(72) Inventors: William J. Ziebell, Eagle, ID (US); Angela M. Ziebell, Eagle, ID (US)

(*) Notice: Subject to any disclaimer, the term of this patent is extended or adjusted under 35 U.S.C. 154(b) by 0 days.

(21) Appl. No.: 17/110,107

(22) Filed: Dec. 2, 2020

(65) Prior Publication Data
US 2021/0173843 A1  Jun. 10, 2021

Related U.S. Application Data

(60) Provisional application No. 63/031,419, filed on May 28, 2020, provisional application No. 62/944,641, filed on Dec. 6, 2019.

(51) Int. Cl.
*G06F 16/00* (2019.01)
*G06F 16/22* (2019.01)
*G06F 16/2457* (2019.01)

(52) U.S. Cl.
CPC .... *G06F 16/24575* (2019.01); *G06F 16/2282* (2019.01); *G06F 16/2291* (2019.01); *G06F 16/24573* (2019.01)

(58) Field of Classification Search
CPC .......... G06F 16/24575; G06F 16/2282; G06F 16/2291; G06F 16/24573; G06F 21/64; H04L 9/3239; H04L 9/50
See application file for complete search history.

(56) References Cited

U.S. PATENT DOCUMENTS

| | | | |
|---|---|---|---|
| 10,754,502 B2* | 8/2020 | Rahman | G06F 9/542 |
| 2005/0114666 A1* | 5/2005 | Sudia | G06F 21/645 |
| | | | 713/175 |
| 2006/0085254 A1* | 4/2006 | Grim, III | G06Q 30/0217 |
| | | | 705/14.19 |
| 2016/0034642 A1* | 2/2016 | Ehrhart | G16H 10/60 |
| | | | 705/3 |
| 2017/0083493 A1* | 3/2017 | Kumhyr | H04L 51/10 |
| 2017/0185581 A1* | 6/2017 | Bojja | G06F 16/353 |
| 2018/0336184 A1* | 11/2018 | Bellegarda | G06F 40/30 |
| 2019/0050774 A1* | 2/2019 | Divine | G16H 50/20 |
| 2021/0192077 A1* | 6/2021 | Barcellos | G06F 21/6254 |

FOREIGN PATENT DOCUMENTS

WO  WO-2021113534 A1 *  6/2021  ......... G06F 16/2282

* cited by examiner

*Primary Examiner* — Syed H Hasan
(74) *Attorney, Agent, or Firm* — Loyal IP Law, PLLC; Travis Banta

(57) ABSTRACT

The present disclosure specifies a Context Identifier which enables users to define and utilize an identifier for a data set that is external to the data storage system. In another embodiment, a Context Identifier can be used for user identification, disambiguation, and verification. The present disclosure specifies a 4Emoji Mark which enables users to visually, audibly, or tactilely identify and disambiguate a fact, subject, object, individual, entity, or event. In another embodiment, a 4Emoji Mark can be themed, branded, and used to convey affiliation, sentiment, and language.

10 Claims, 62 Drawing Sheets

Emoji and 4Emoji Mark 300

Emoji 302

| Emoji Id 304 |
| Emoji Name 306 |
| Emoji Description 308 |
| Emoji Code 310 |
| Emoji Context Id 312 |
| Emoji Byte Array 314 |
| Emoji Byte Array Hash 316 |

4Emoji Mark 340

| First Emoji 342 | Second Emoji 344 | Third Emoji 346 | Fourth Emoji 348 |
|---|---|---|---|
| Emoji Mark Id 350 | | Emoji Mark Theme Id 352 | |
| Emoji Mark Brand Id 354 | | Emoji Mark Affiliation Id 356 | |
| Emoji Mark Sentiment Id 358 | | Emoji Mark Language Id 360 | |

FIGURE 3

| 4Emoji Signature Question Type Enumeration 900 |
|---|
| None = 0<br>902 |
| True False = 1<br>904 |
| Multiple Choice = 2<br>906 |
| Fill In the Blanks = 4<br>908 |
| Connect the Dots = 8<br>910 |
| Connect the Lines = 32<br>912 |
| Pick Your Favorite = 64<br>914 |
| Text Selection = 128<br>916 |
| Image Selection = 256<br>918 |
| Audio Selection = 512<br>920 |
| Video Selection = 1024<br>922 |
| Browse and Selection = 2048<br>924 |
| Number Of = 4096<br>926 |
| Build a Word = 8192<br>928 |

FIGURE 9

| Context Item 2700 ||
|---|---|
| Context Key 2702 | Context Value 2704 |

| Context Item 2710 ||
|---|---|
| Generated Context Key 2712 | Context Value 2704 |

| Context Item Dictionary 2720 |
|---|
| Context Key 2702 |
| Context Value 2704 |

| Context Item Dictionary 2730 |
|---|
| Generated Context Key 2712 |
| Context Value 2704 |

| Context Expression Enumeration 2740 ||
|---|---|
| None 2742 | User Template 2744 |
| Generated Template 2746 | Simple 2748 |
| Complex 2750 | Prefix 2752 |

FIGURE 27

| Context Expression 2800 |
|---|
| Context Expression Id 2802 |
| Context Item Dictionary 2720 |
| Context Item Key Collection 2806 |
| Context Expression Key Text 2808 |
| Context Expression Text 2810 |
| Context Expression Type 2812 |
| Context Item Value Collection 2814 |
| Context Expression Value Text 2816 |
| Context Expression Prefix Dictionary 2818 |

| Context Expression Collection 2840 |
|---|
| Context Expression 2800 |

| Context Expression Collections 2850 |
|---|
| Context Expression Collection 2840 |

FIGURE 28

| Pathway Enumeration 3400 ||
|---|---|
| None = 0<br>3402 | Pathway Complete = 1<br>3404 |
| Pathway Character Increment = 2<br>3406 | Pathway Key = 4<br>3408 |
| Pathway Key-Value Pair = 8<br>3410 | Pathway Locality = 16<br>3412 |
| Pathway Partition = 32<br>3414 | Pathway Taxonomy = 64<br>3416 |
| Pathway Temporality = 128<br>3418 | Pathway Value = 256<br>3420 |
| Pathway Prefix = 512<br>3422 | Pathway Word Increment = 1024<br>3424 |
| Pathway Word-Joined Increment = 2048<br>3426 ||
| Pathway Word-Joined Character Increment = 4096<br>3428 ||
| Pathway Text = 8192<br>3430 ||
| Pathway Key Text = 16384<br>3432 ||
| Pathway Value Text = 32768<br>3434 ||
| Pathway Character Increment = 65556<br>3436 ||

FIGURE 34

| |
|---|
| Content Enumeration 3500 |
| None 3502 |
| Content Domain Name 3504 |
| Content HTML 3506 |
| Content JSON 3508 |
| Content Lookup 3520 |
| Content Lookup Reference 3522 |
| Content Pathway 3530 |
| Content Pathway Reference 3532 |
| Content UNC 3540 |
| Content URL 3542 |
| Content URN 3544 |
| Content XML 3560 |
| Content XSLT 3562 |

FIGURE 35

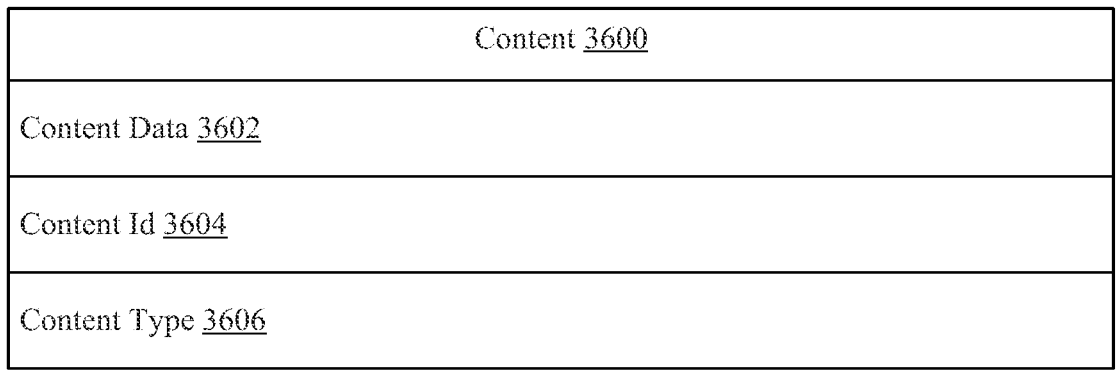
FIGURE 36

| Taxonomy Enumeration 3700 |
|---|
| None 3702 |
| Taxonomy Catalog 3704 |
| Taxonomy Classification 3706 |
| Taxonomy Crowd Sourced 3708 |
| Taxonomy Folk 3710 |
| Taxonomy Folksonomy 3712 |
| Taxonomy ISBN 3715 |
| Taxonomy Model Number 3716 |
| Taxonomy Serial Number 3718 |
| Taxonomy SKU 3720 |
| Taxonomy Subject Heading 3722 |
| Taxonomy Tag 3724 |
| Taxonomy Topic 3726 |

FIGURE 37

| Lookup Taxonomy 4600 |
| --- |
| Lookup Taxonomy Data 4602 |
| Lookup Taxonomy Id 4604 |
| Lookup Taxonomy Type 4606 |

| Lookup Taxonomy Collection 4640 |
| --- |
| Lookup Taxonomy 4600 |

FIGURE 46

| |
|---|
| Lookup Header 4700 |
| Context Expression Prefix Dictionary 2818 |
| Context Expression Collections 2850 |
| Lookup Header Copyright 4704 |
| Lookup Header Temporality 4706 |
| Lookup Header Temporality Id 4708 |
| Lookup Header Description 4710 |
| Lookup Header Expiration 4712 |
| Lookup Header Inception 4714 |
| Lookup Header Id 4716 |
| Lookup Header Locality 4718 |
| Lookup Header Locality Id 4720 |
| Lookup Header Name 4722 |
| Lookup Taxonomy Collection 4640 |
| Lookup Header Title 4724 |
| Pathway Collections 3950 |

FIGURE 47

| |
|---|
| Lookup Domain Name 5200 |
| Domain Name 5202 |
| Has Locality 5204 |
| Has Taxonomy 5206 |
| Has Temporality 5208 |
| Locality Context Index 5210 |
| Pathway Index 5212 |
| Taxonomy Context Index 5214 |
| Temporality Context Index 5216 |

FIGURE 52

| |
|---|
| Business Listing Placard 5700 |
| Business Address 5702 |
| Business App Collection 5704 |
| Business Attribution 5706 |
| Business Calendar Collection 5708 |
| Business Contact Collection 5710 |
| Business Coupon Collection 5712 |
| Business Description 5714 |
| Business Hours 5716 |
| Business Logo 5718 |
| Business Name 5720 |
| Business Offering Collection 5722 |
| Business Id 5724 |
| Business Profile Picture Collection 5726 |
| Business Specials Collection 5728 |

FIGURE 57

| Business Listing Summary Placard 5800 |
|---|
| Business Address 5702 |
| Business Attribution 5706 |
| Business Contact Collection 5710 |
| Business Description 5714 |
| Business Name 5720 |
| Business Id 5724 |

FIGURE 58

| Business Placards 5900 ||
|---|---|
| Business About Us Placard 5902 | Business Appointment Placard 5904 |
| Business Blog Placard 5906 | Business Call to Action Placard 5908 |
| Business Careers Placard 5910 | Business Cart Placard 5912 |
| Business Checkout Placard 5914 | Business Confirmation Placard 5916 |
| Business Contact Us Placard 5918 | Business Delivery Placard 5920 |
| Business Event Placard 5922 | Business Feature Placard 5924 |
| Business Feedback Placard 5926 | Business Form Placard 5928 |
| Business Gallery Placard 5930 | Business Inventory Placard 5932 |

FIGURE 59

| Business Placards 6000 ||
|---|---|
| Business Map Placard 6002 | Business Menu Placard 6004 |
| Business My Account Placard 6006 | Business Order Placard 6008 |
| Business Portfolio Placard 6010 | Business Purchase Placard 6012 |
| Business Q & A Placard 6014 | Business Reservation Placard 6016 |
| Business Scheduling Placard 6018 | Business Shop Placard 6020 |
| Business Store Locator Placard 6022 | Business Team Placard 6024 |
| Business Terms and Conditions Placard 6026 | Business Testimonials Placard 6028 |
| Business Timeline Placard 6030 | Business Tracking Placard 6032 |

FIGURE 60

SYSTEMS, METHODS, AND MEDIA FOR IDENTIFICATION, DISAMBIGUATION, VERIFICATION AND FOR COMMUNICATING KNOWLEDGE

CROSS REFERENCE TO RELATED APPLICATIONS

The present application claims the priority benefit of U.S. Provisional Patent Application Ser. No. 62/944,641 filed on Dec. 6, 2019 titled, "Systems, Methods, and Media for Identification, Disambiguation, and Verification," and the present application claims the priority benefit of U.S. Provisional patent Application Ser. No. 63/031,419 filed on May 28, 2020 titled, Systems, Methods and Media for Communicating Knowledge," all of which are hereby incorporated by reference in their entireties

SUMMARY

The present disclosure specifies a Context Identifier which enables users to define and utilize an identifier for a data set that is external to the data storage system. In another embodiment, a Context Identifier can be used for user identification, disambiguation, and verification.

The present disclosure specifies a Emoji Mark which enables users to visually, audibly, or tactilely identify and disambiguate a fact, subject, object, individual, entity, or event. In another embodiment, a Emoji Mark can be themed, branded, and used to convey affiliation, sentiment, and language.

The present disclosure provides a specification which makes it possible for all users to use their real first and last name as their username. It enables disambiguation for users who have the same first and last name and provides a unique and easily recognizable visual, audio, or tactile identification for a specific user. The present disclosure provides a specification which makes it possible for users to search for one another by Emoji Mark.

The present disclosure provides an Emoji Mark specification derived from the 4Emoji Mark with the improvement of utilizing a dynamic set of emoji where capacity is automatically increased or decreased as required. The exemplary enablement can be utilized with less or more permutations and combinations as required.

Examples of Emoji Mark utilization include part numbers, serial numbers, model numbers, and SKUs. More examples of Emoji Mark utilization include Emoji Mark for stickers or labels for business cards, windows, products, etc. The disclosure of optical emoji recognition enables Emoji Mark to provide information about the subject of Emoji Mark as well as opportunities for engagement.

In another embodiment of the Emoji Mark, the present disclosure specifies utilizing Emoji Mark for the local-part of an email address in whole or in part, enabling users to use their real name while being disambiguated from other users with the same name for a specific email domain.

BRIEF DESCRIPTION OF THE DRAWINGS

FIG. 3 shows an exemplary Emoji & 4Emoji Mark.
FIG. 9 shows an exemplary 4Emoji Signature Question Type.
FIG. 27 shows exemplary Context Item & Items.
FIG. 28 shows an exemplary Context Expression.
FIG. 34 shows an exemplary Pathway Enumeration.
FIG. 35 shows an exemplary Content Enumeration.
FIG. 36 shows an exemplary Content.
FIG. 37 shows an exemplary Taxonomy Enumeration.
FIG. 46 shows an exemplary Lookup Taxonomy.
FIG. 47 shows an exemplary Lookup Header.

FIG. 52 shows an exemplary Lookup Domain Name.

FIG. 57 shows an exemplary Business Listing Placard.

FIG. 58 shows an exemplary Business Listing Summary Placard.

FIG. 59 shows exemplary Business Placards.

FIG. 60 shows exemplary Business Placards.

DETAILED DESCRIPTION OF EXEMPLARY EMBODIMENTS

Figure 1:
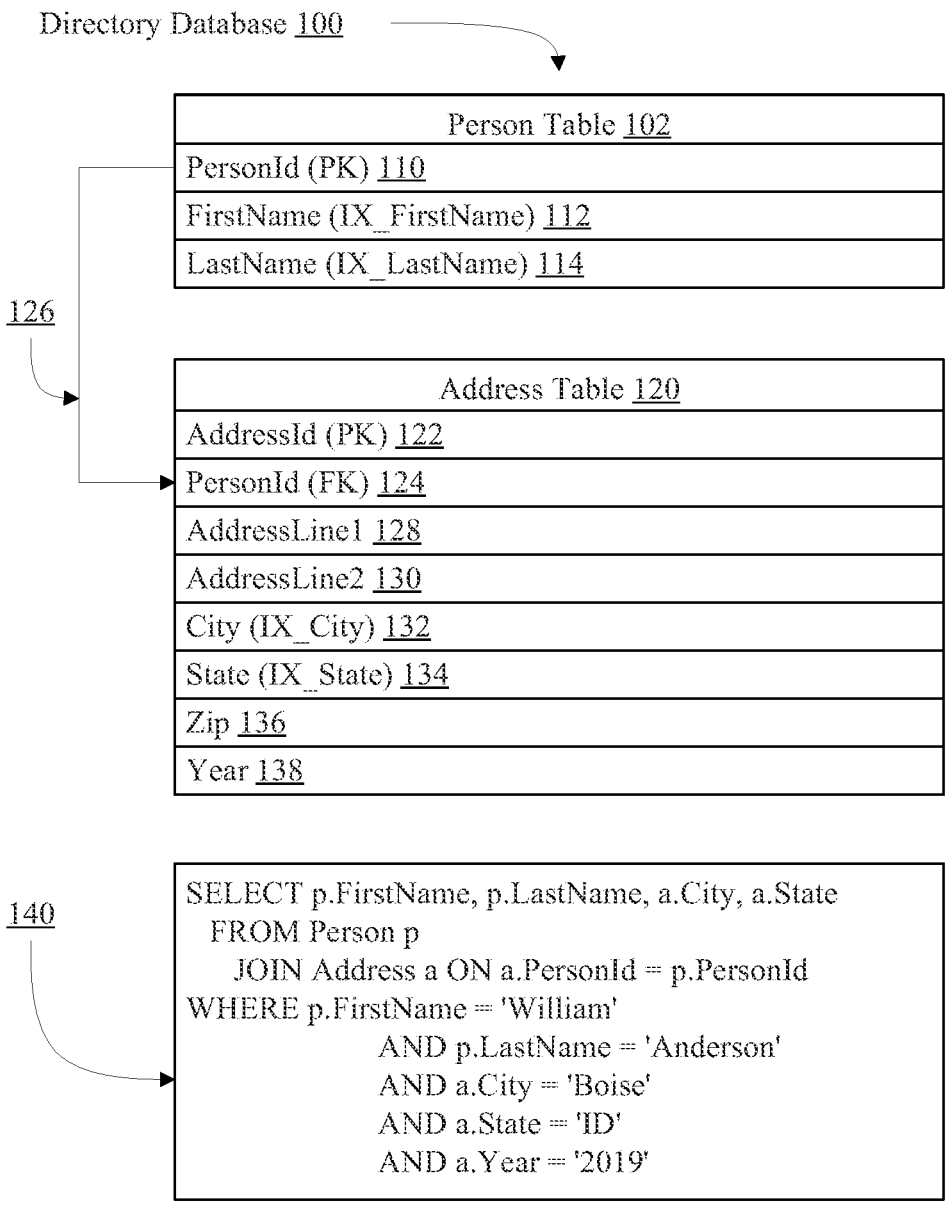
FIG. 1 shows an exemplary Directory Database.

FIG. 1 illustrates Directory Database 100 which is a relational database design. Directory Database 100 is comprised of Person Table 102 and Address Table 120. Person Table 102 contains PersonId (PK) 110, FirstName (IX_FirstName) 112, and LastName (IX_LastName) 114. Address Table 120 contains AddressId (PK) 122, PersonId (FK) 124, AddressLine1 128, AddressLine2 130, City (IX_City) 132, State (IX_State) 134, Zip 136, and Year 138. PersonId (PK) 110 is connected to PersonId (FK) 124 via Line Segment 126. Those skilled in the art will appreciated that the abbreviation PK represents a primary key, the abbreviation IX represents an index, and the abbreviation FK represents a foreign key.

Element 140 is comprised of a SELECT standard query language (SQL) statement: SELECT p.FirstName, p.LastName, a.City, a.State FROM Person p JOIN Address a ON a.PersonId=p.PersonId WHERE p.FirstName='William' AND p.LastName='Anderson' AND a.City='Boise' AND a.State='ID' AND a.Year='2019'.

Directory Database 100 illustrates a common approach to data storage and query which has been established for decades. It also illustrates, in some ways, the skillsets needed to Identify the data attributes in tables or across tables so that queries can be performed, usually by a database professional such as a database administrator (DBA) or a software engineer.

Typically, a DBA or software engineer would go through a specific domain of information stored in tables and identify attributes so that queries can be performed to fulfill specific use cases. So, while this structure may be used by various businesses, each business may have very specific use cases for their specific business needs and therefore may identify differing business-specific attributes in the data. As mentioned above, this would require someone of advanced technical skill to make an index that would optimize a search or searches for any given desired result.

Typically, the foreign key and the primary key are used to locate the data for queries, but upon removing the querying aspect to find specific data attributes that match specific data-attribute constraints, an index and foreign-key relationship would still be essential in a relational database to successfully locate specific records.

The same uses of primary keys, foreign keys, and index keys are not only applied by relational database management systems, but those skilled in the art will appreciate that these same keys and indexes are often utilized in document storage, object storage, and other data storage systems.

The present disclosure establishes an algorithm to enable the abstraction of indexes from data storage systems. It provides the functionality to give subject matter experts the ability to define indexes and apply them to the underlying data without having a specialized skill or access to administrative and development tools required to work with data storage systems.

Figure 2:
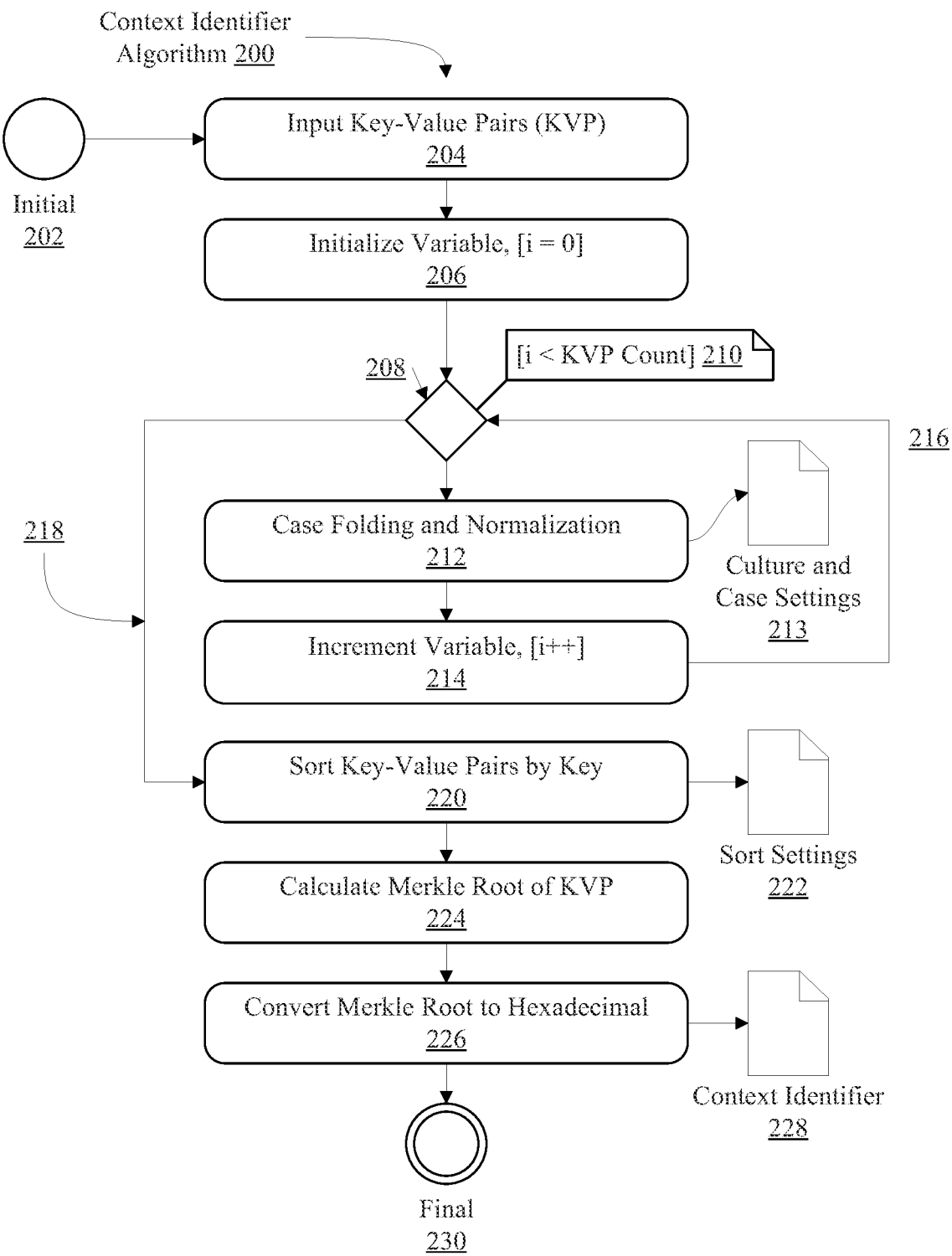
FIG. 2 shows an exemplary Context Identifier Algorithm.

FIG. 2 illustrates Context Identifier Algorithm 200. The algorithm starts with Initial 202 which is connected to Input Key-Value Pairs (KVP) 204. As an example, the algorithm could take a dictionary of one or more key-value pairs of strings, each consisting of a string key and a string value. Input Key-Value Pairs (KVP) 204 is connected to Initialize Variable, [i=0] 206. Initialize Variable, [i=0] 206 is connected to Decision 208.

Decision 208 is connected to the note [i<KVP Count] 210, which illustrates the looping criteria. While i<KVP Count, control proceeds to Case Folding and Normalization 212, then Increment Variable, [i++] 214, then back to Decision 208 via Line Segment 216 until i=KVP Count. This illustrates that each key-value pair goes through Case Folding and Normalization 212. When i=KVP Count, control proceeds to Sort Key-Value Pairs by Key 220 via Line Segment 218.

Case Folding and Normalization 212 is connected to Culture and Case Settings 213. Culture and Case Settings 213 illustrates that case folding and normalization can be configured for sorting and hashing requirements. Sort Key-Value Pairs by Key 220 is connected to Sort Settings 222. Sort Settings 222 illustrates that sort order can be configured for sort order requirements of key-value pairs. Sort Key-Value Pairs by Key 220 is also connected to Calculate Merkle Root of KVP 224 which is connected to Convert Merkle Root to Hexadecimal 226. Convert Merkle Root to Hexadecimal 226 produces Context Identifier 228. Convert Merkle Root to Hexadecimal 226 is connected to Final 230, illustrating the end of the algorithm.

In one embodiment, both the key and the value for each key-value pair undergoes Case Folding and Normalization 212. In another embodiment, only the value string of each key-value pair undergoes Case Folding and Normalization 212. In another embodiment, only the value string of each key-value pair undergoes Case Folding and Normalization 212, the value string is then hashed, and the resulting hash is converted to hexadecimal and used to replace the key in the key-value pair.

In one embodiment, the default value of Culture and Case Settings 213 is culture invariant and case insensitive. In another embodiment, other cultures and case sensitivity could be set. Those skilled in the art will appreciate that Culture and Case Settings 213 will impact hashing and sorting.

In one embodiment, the default value of Sort Settings 222 is ascending. In another embodiment, descending or none could be set. Those skilled in the art will appreciate that sorting will impact the Merkle Tree calculation.

Context Identifier Algorithm 200 is of benefit because it prepares key-value pairs of data and performs a Merkle Tree calculation with consistent results. One intention of Context Identifier Algorithm 200 is to create an identifier from contextual information about a specific data set. To illustrate, consider the following example where the data set is a person's contact information. The person's first name, last name, city, and state are passed into the algorithm. Each of these contextual values has associated keys such as first name, last name, city, and state. Context Identifier Algorithm 200 will produce a consistent identifier to uniquely represent the contact information.

In one embodiment, Context Identifier Algorithm 200 enables users to create a Context Identifier 228 based on context of a data set (e.g. database row or JSON object) that is equivalent to an index found in a data storage system. Those skilled in the art will appreciate that Context Identifier 228 would be required to be included in the data set (e.g. column or property) and that the data storage system may apply an index for Context Identifier 228.

This embodiment enables users to define and utilize Context Identifier 228 from their perspective (and individual use cases of the data set) without that knowledge being built into and maintained in the data storage system. Just as easily as users can create Context Identifier 228, they can make meaningful changes to Context Identifier 228 that are implemented as soon as the data is committed.

An index based on Context Identifier 228 in a data storage system would return only data sets that match the contextual data that was used to derive its composition. This approach has the benefit of reducing or eliminating costly index creation and management for the data set in the data storage system. It also reduces or eliminates costly cross indexing between databases, tables, documents, nodes, and edges to support query joins and/or linking.

Moreover, those skilled in the art will appreciate that Context Identifier 228 enables users to support more use cases for a single implementation of a data set in a data storage system since there is marginal decrease in efficiency as more and more indexes are added to a single implementation (the basic premise being that more indexes result in more processing and storage resource overhead to support added indexes). In another embodiment, Context Identifier 228 can be used in systems, methods and media for user identification, disambiguation, and verification.

FIG. 3 illustrates Emoji and 4Emoji Mark 300. Emoji 302 is comprised of Emoji Id 304, Emoji Name 306, Emoji Description 308, Emoji Code 310, Emoji Context Id 312, Emoji Byte Array 314, and Emoji Byte Array Hash 316. 4Emoji Mark 340 is comprised of First Emoji 342, Second Emoji 344, Third Emoji 346, Fourth Emoji 348, Emoji Mark Id 350, Emoji Mark Theme Id 352, Emoji Mark Brand Id 354, Emoji Mark Affiliation Id 356, Emoji Mark Sentiment Id 358, and Emoji Mark Language Id 360.

Emoji Id 304 is the unique identifier for Emoji 302. Emoji Name 306 is the name for Emoji 302. Emoji Description 308 is the description for Emoji 302. Emoji Code 310 is the code that associates a graphic, sound, or tactile pattern with Emoji 302. Emoji Context Id 312 is the Context Identifier 228 in FIG. 2 for Emoji 302. Emoji Byte Array 314 may contain the Emoji graphic, sound or tactile pattern for Emoji 302. Emoji Byte Array Hash 316 is the hash of Emoji Byte Array 314 for Emoji 302.

First Emoji 342 is the first Emoji 302 for 4Emoji Mark 340. Second Emoji 344 is the second Emoji 302 for 4Emoji Mark 340. Third Emoji 346 is the third Emoji 302 for 4Emoji Mark 340. Fourth Emoji 348 is the fourth Emoji 302 for 4Emoji Mark 340. Emoji Mark Id 350 is the unique identifier for 4Emoji Mark 340. It is comprised of Emoji Id 304 of each Emoji 302 in 4Emoji Mark 340 passed in as key-value pairs into Context Identifier Algorithm 200 in FIG. 2.

Emoji Mark Theme Id 352 is the identifier of the specific theme applied to 4Emoji Mark 340. Emoji Mark Brand Id 354 is the identifier of the specific brand applied to 4Emoji Mark 340. Emoji Mark Affiliation Id 356 is the identifier of the specific affiliation represented by 4Emoji Mark 340. Emoji Mark Sentiment Id 358 is the identifier of the specific sentiment conveyed by 4Emoji Mark 340. Emoji Mark Language Id 360 is the identifier of the specific language conveyed by 4Emoji Mark 340.

Emoji 302 encapsulates the commonly accepted definition of emoji (a small digital image or icon used to express an idea or emotion) and could include but is not limited to symbols, icons, pictograms, logos, brands, gestures, phonetics, sounds, punctuation, typography, letters, and numbers.

4Emoji Mark 340 provides the basis of an identifier that is visual (or may be audio or tactile) and is readily understood as a pattern for attribution. Furthermore, as the present disclosure makes clear, 4Emoji Mark 340 provides the basis for disambiguation when used as an attribute of an item within a collection of similar items.

The present disclosure generates 4Emoji Mark 340 utilizing combination mathematics where "a k-combination of a set S is a subset of k distinct elements of S."[1] Those skilled in the art will appreciate 4Emoji Mark 340 is a subset of k distinct elements of a set of Emoji 302. As an example, there are 416,416,712,497,500 4Emoji Mark 340 combinations in a set of 10,000 unique Emoji 302. In a set of 100,000 unique Emoji 302, there are 4,166,416,671,249,975,000 4Emoji Mark 340 combinations.

[1]Source: Combination—en.wikipedia.org/Combination

In another embodiment, 4Emoji Mark 340 generation utilizes permutation mathematics. As an example, there are 9,994,001,099,940,000 4Emoji Mark permutations in a set of 10,000 unique Emoji 302.

In one embodiment, users can visually identify and disambiguate a fact, subject, object, individual, entity, or event using 4Emoji Mark 340. In another embodiment, 4Emoji Mark 340 can be used to audibly identify and disambiguate a fact, subject, object, individual, entity, or event. In another embodiment, 4Emoji Mark 340 can be used to tactilely identify and disambiguate a fact, subject, object, individual, entity, or event.

In another embodiment, 4Emoji Mark 340 is themed (see Emoji Mark Theme Id 352). Users can apply themes such as Christmas, Fourth of July, Outdoors, et cetera to their 4Emoji Mark 340. Themes may incorporate color and shape variations for each specific Emoji 302 in 4Emoji Mark 340.

In another embodiment, 4Emoji Mark 340 is branded (see Emoji Mark Brand Id 354). Users can apply branded themes such as school or professional sports teams, corporate or non-profit imagery, et cetera.

In another embodiment, 4Emoji Mark 340 and Emoji 302 convey affiliation (see Emoji Mark Affiliation Id 356). Entities can approve users to affiliate with the entity and gain access to imagery embedded in 4Emoji Mark 340 and/or Emoji 302 that conveys the affiliation.

In another embodiment, 4Emoji Mark 340 conveys sentiment (see Emoji Mark Sentiment Id 358). 4Emjoi Mark 340 and Emoji 302 imagery contains sentiment which can be used as an attribution for a fact, subject, object, individual, entity, or event. Sentiment can be expressed by users to communicate and inform more complex emotional attributions, especially when presented with 4Emoji Mark 340. Such attribution is correlated with an associated sentiment identifier that can be used to infer the expression of sentiment and ultimately be utilized for measuring, communicating and optimizing sales, marketing and advertisement.

In another embodiment, 4Emoji Mark 340 conveys language (see Emoji Mark Language Id 360). Emoji 302 and 4Emoji Mark 340 can be utilized to express words, phrases, and concepts, creating the basis for a language.

Figure 4:
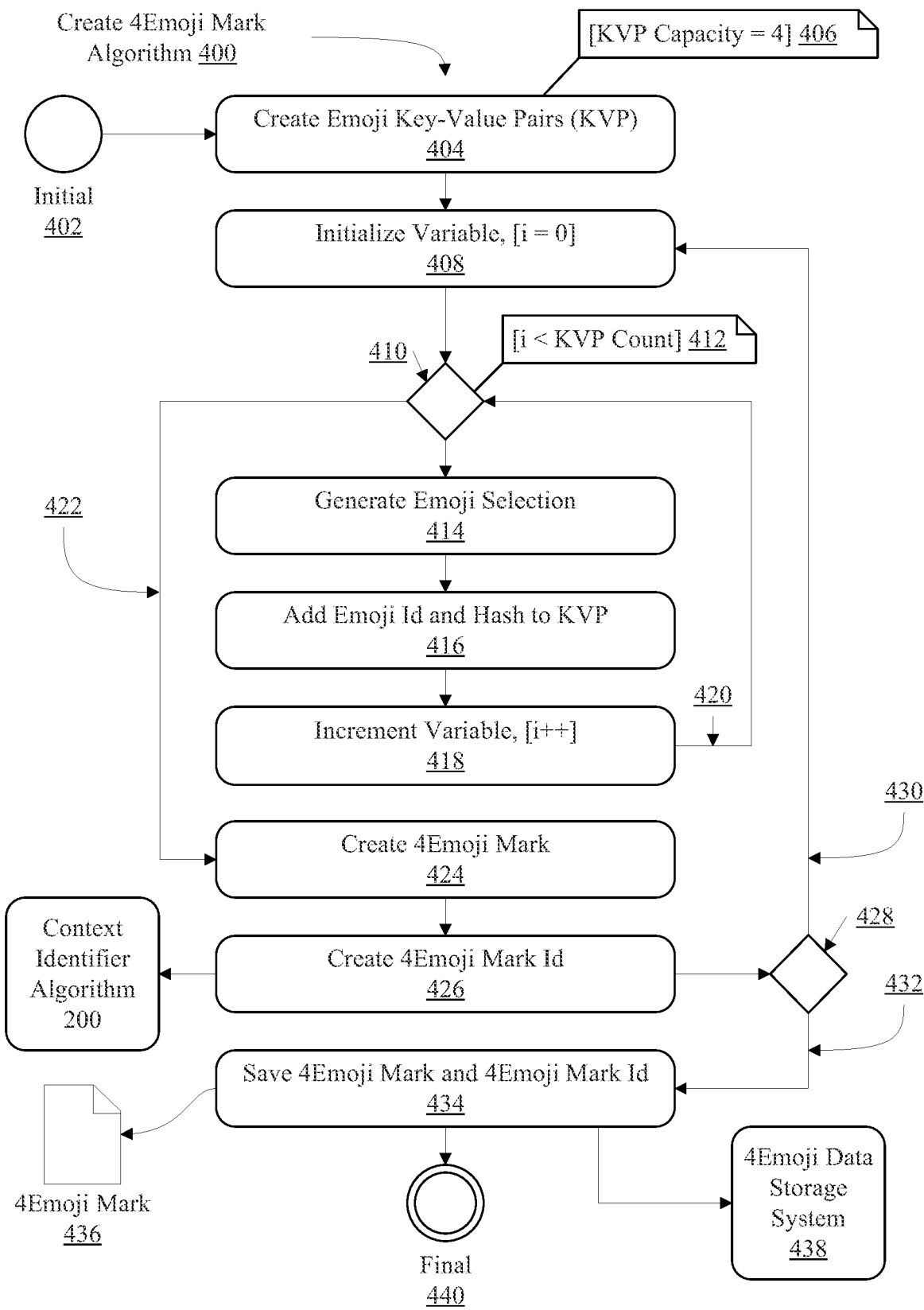
FIG. 4 shows an exemplary Create 4Emoji Mark Algorithm.

FIG. 4 illustrates Create 4Emoji Mark Algorithm 400. The algorithm starts at Initial 402 which is connected to Create Emoji Key-Value Pairs (KVP) 404. Create Emoji Key-Value Pairs (KVP) 404 is connected to note [KVP Capacity=4] 406 and Initialize Variable, [i=0] 408. Initialize Variable, [i=0] 408 is connected to Decision 410. Decision 410 is connected to note [i<KVP Count] 412, which illustrates the looping criteria. While i<KVP Count, control proceeds to Generate Emoji Selection 414, then Add Emoji Id and Hash to KVP 416, then Increment Variable, [i++] 418, then back to Decision 410 via Line Segment 420 until i=KVP Count. When I=KVP Count, control proceeds to Create 4Emoji Mark 424 via Line Segment 422.

Create 4Emoji Mark 424 is connected to Create 4Emoji Mark Id 426, which is connected to Context Identifier Algorithm 200 and links to Decision 428. Decision 428 illustrates that the algorithm determines if the 4Emoji Mark Id is available or not. If the 4Emoji Mark Id is not available, control proceeds from Decision 428 to Initialize Variable, [i=0] 408 via Line Segment 430. In addition to initializing the variable, the algorithm clears the KVP. If the 4Emoji Mark Id is available, control proceeds from Decision 428 to Save 4Emoji Mark and 4Emoji Mark Id 434 via Line Segment 432. Save 4Emoji Mark and 4Emoji Mark Id 434 is connected to 4Emoji Mark 436, 4Emoji Data Storage System 438, and Final 440, illustrating the end of the algorithm.

In one embodiment, Generate Emoji Selection 414 illustrates that an algorithm randomly generates and selects a single Emoji 302 in FIG. 3. In another embodiment, Generate Emoji Selection 414 illustrates a user interface is used to generate multiple emoji from which a user selects a single Emoji 302 in FIG. 3.

Create 4Emoji Mark 424 illustrates the creation of a 4Emoji Mark 340 in FIG. 3, specifically 4Emoji Mark 436. Create 4Emoji Mark Id 426 illustrates the creation of 4Emoji Mark Id 350 in FIG. 3, utilizing Context Identifier Algorithm 200. Save 4Emoji Mark and 4Emoji Mark Id 434 illustrates the saving of 4Emoji Mark 436 to 4Emoji Data Storage System 438.

Those skilled in the art will appreciate 4Emoji Mark 340 and the associated 4Emoji Mark Id 350 being utilized in systems and algorithms for identification and disambiguation.

Figure 5:
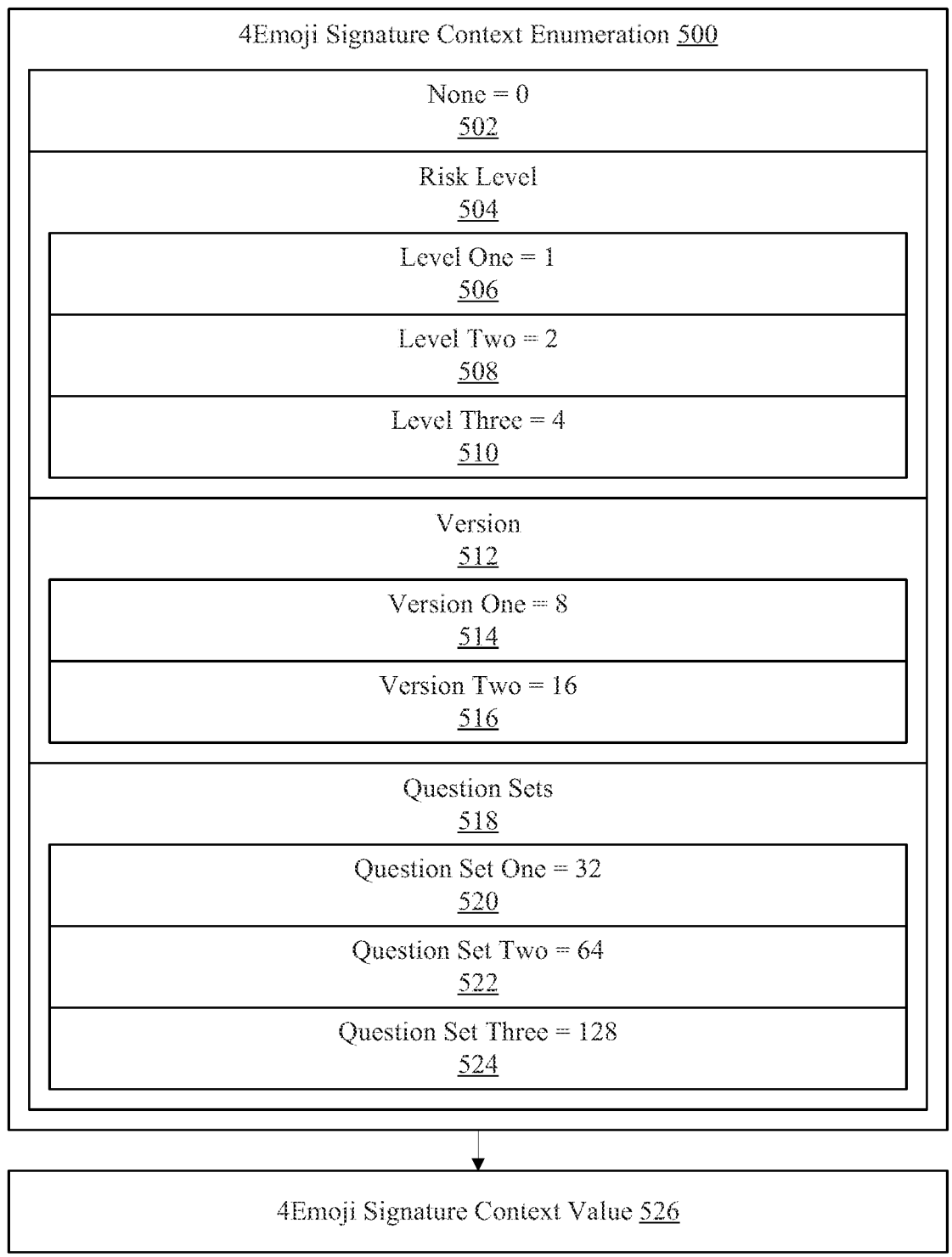
FIG. 5 shows an exemplary 4Emoji Signature Context Enumeration.

FIG. 5 illustrates 4Emoji Signature Context Enumeration 500 which is comprised of None=0 502, Risk Level 504, Version 512, and Question Sets 518. Risk Level 504 contains Level One=1 506, Level Two=2 508, and Level Three=4 510. Version 512 contains Version One=8 514 and Version Two=16 516. Question Sets 518 contains Question Set One=32 520, Question Set Two=64 522, and Question Set Three=128 524. 4Emoji Signature Context Enumeration 500 is connected to 4Emoji Signature Context Value 526. None=0 502 illustrates a flag value of zero, as an optimization, meaning that no flags are set.

Risk Level 504 illustrates that an instance of the enumeration can store three flags to indicate the level of risk. The flags at Risk Level 504 set the context of varying degrees of risk for the instance. For example, the lowest risk level being one and the highest risk level being seven out of the possible bitwise OR operations for Level One=1 506, Level Two=2 508, and Level Three=4 510.

Version 512 illustrates the version of an instance of the enumeration, where the bitwise OR operation of Version One=8 514 and Version Two=16 516 represent possible version flags.

Question Sets 518 illustrates the question sets of an instance of the enumeration, where the bitwise OR operation of Question Set One=32 520, Question Set Two=64 522 and Question Set Three=128 524 represent possible question set flags. 4Emoji Signature Context Value 526 represents the integer value of 4Emoji Signature Context Enumeration 500.

Those skilled in the art will appreciate that 4Emoji Signature Context Enumeration 500 is an enumeration type[2] that defines bit flags and enables an instance of the enumeration type to store any combination of the values that are defined in the enumerator list as well as support the bitwise operations of AND, OR, NOT and XOR.

[2] Source: Enumeration types (C# Programming Guide)—docs.microsoft.com/en-us/dotnet/csharp/programming-guide/enumeration-types 4Emoji Signature Context Enumeration 500 depicts the first 8 power of $2^3$ values 0 to 128 in the enumerator list of an 8-bit integer-based enumeration. Those skilled in the art will appreciate that 16-bit, 32-bit, or 64-bit based enumerations would provide 16, 32 or 64 values in their respective enumerator list; therefore, more values could be defined for Risk Level 504, Version 512, and Question Sets 518. As an example, consider a 16-bit based enumeration where Risk Level 504 and Version 512 are defined with the equivalent values of the current 8-bit enumeration illustrated in FIG. 5, whereby Question Sets 518 could be defined with power of 2 values 32 through 32,768 in the enumerator list of the 16-bit based enumeration to provide 11 total question sets.

[3] Source: Power of 2 Table—www.vaughns-1-pagers.com/computer/powers-of-2.htm

Those skilled in the art will also appreciate the bitwise AND operations that can be utilized with an instance of the enumeration to determine what flags are set to access risk level, version, and question sets present in the enumeration list.

Risk Level 504 illustrates a risk level that is associated with 4Emoji Signature Context Enumeration 500. In one embodiment, risk[4] is defined as a function of financial cost and probability of unauthorized transactions for which 4Emoji Signature Context Enumeration 500 is designed to mitigate through Question Sets 518. In another embodiment, risk is defined as a function of financial cost and probability of unauthorized access to personal information and assets for which 4Emoji Signature Context Enumeration 500 is designed to mitigate through Question Sets 518.

[4] Source: Risk assessment—en.wikipedia.org/wiki/Risk_assessment

Figure 6:
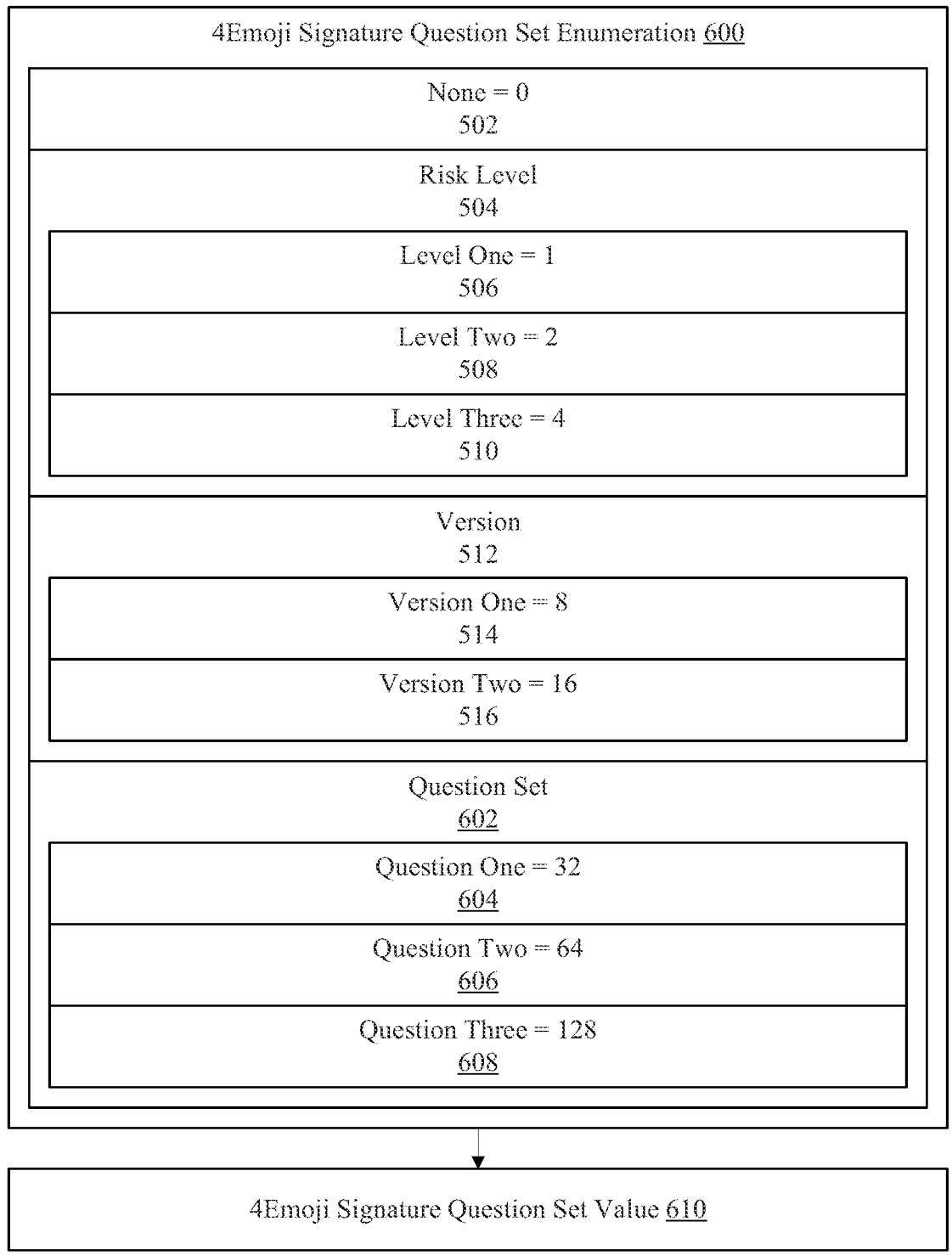
FIG. 6 shows an exemplary 4Emoji Signature Question Set Enumeration.

FIG. 6 illustrates 4Emoji Signature Question Set Enumeration 600 which is comprised of None=0 502, Risk Level 504, Version 512, and Question Set 602. Risk Level 504 contains Level One=1 506, Level Two=2 508, and Level Three=4 510. Version 512 contains Version One=8 514 and Version Two=16 516. Question Set 602 contains Question One=32 604, Question Two=64 606, and Question Three=128 608. 4Emoji Signature Question Set Enumeration 600 is connected to 4Emoji Signature Question Set Value 610.

Question Set 602 illustrates the questions of an instance of the enumeration, where the bitwise OR operation of Question One=32 604, Question Two=64 606 and Question Three=128 608 represent possible question set flags. 4Emoji Signature Set Value 610 represents the integer value of 4Emoji Signature Question Set Enumeration 600.

Those skilled in the art will appreciate that 4Emoji Signature Question Set Enumeration 600 is an enumeration type that defines bit flags and enables an instance of the enumeration type to store any combination of the values that are defined in the enumerator list as well as support the bitwise operations of AND, OR, NOT and XOR.

4Emoji Signature Question Set Enumeration 600 depicts the first 8 power of 2 values 0 to 128 in the enumerator list of an 8-bit integer-based enumeration. Those skilled in the art will appreciate that 16-bit, 32-bit, or 64-bit based enumerations would provide 16, 32 or 64 values in their respectively enumerator list; therefore, more values could be defined for Risk Level 504, Version 512, and Question Set 602. As an example, consider a 16-bit based enumeration where Risk Level 504 and Version 512 are defined with the equivalent values of the current 8-bit enumeration illustrated in FIG. 6, whereby Question Set 602 could be defined with power of 2 values 32 through 32,768 in the enumerator list of the 16-bit based enumeration to provide 11 total questions in the question set.

Those skilled in the art will also appreciate the bitwise AND operations that can be utilized with an instance of the enumeration to determine what flags are set to access risk level, version, and questions present in the enumeration list.

Risk Level 504 illustrates a risk level that is associated with 4Emoji Signature Question Set Enumeration 600. In one embodiment, risk is defined as a function of financial cost and probability of unauthorized transactions for which 4Emoji Signature Question Set Enumeration 600 is designed to mitigate through Question Set 602. In another embodiment, risk is defined as a function of financial cost and probability of unauthorized access to personal information and assets for which 4Emoji Signature Question Set Enumeration 600 is designed to mitigate through Question Set 602.

Figure 7:
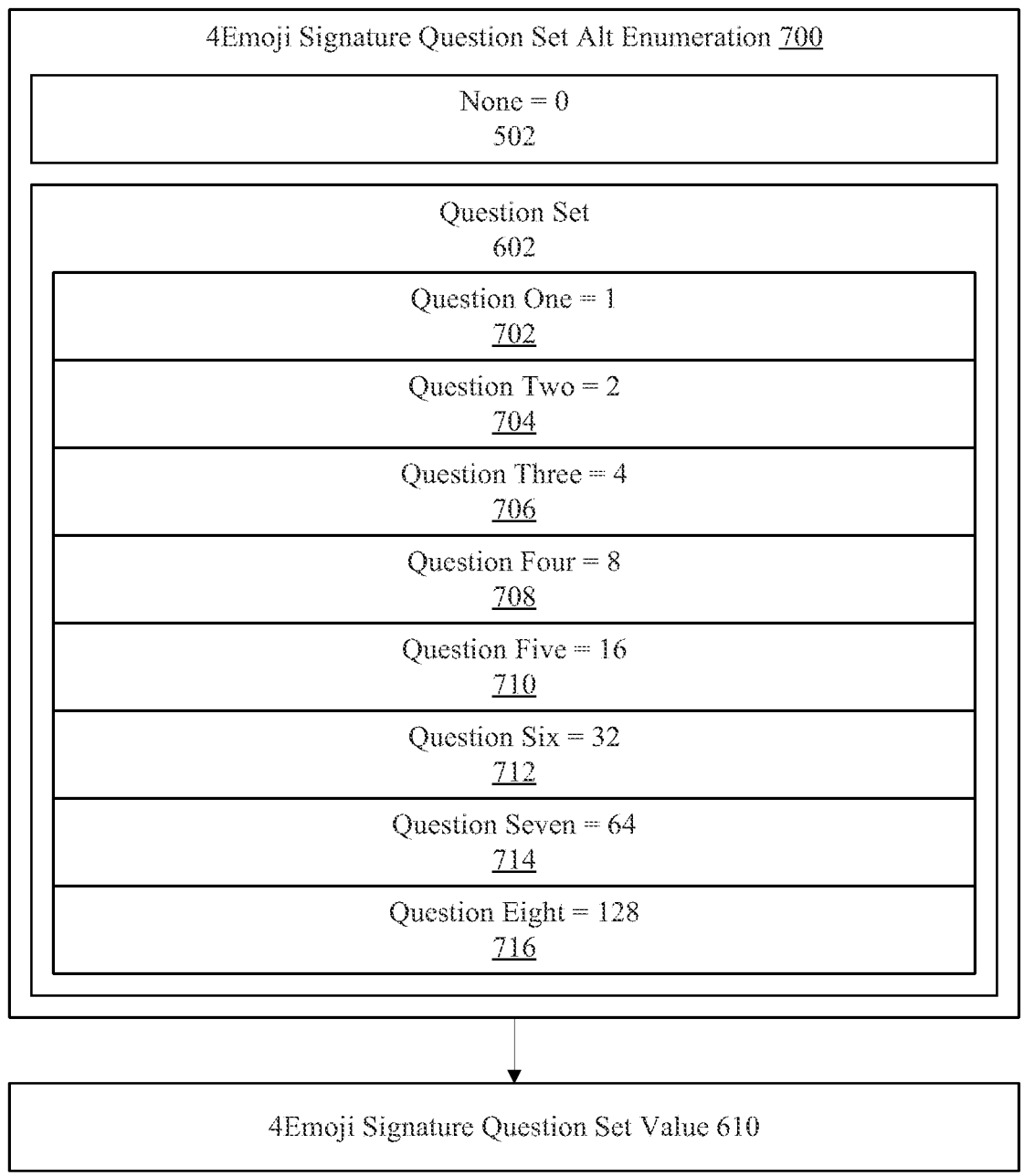
FIG. 7 shows an exemplary 4Emoji Signature Question Set Alt Enumeration.

FIG. 7 illustrates 4Emoji Signature Question Set Alt Enumeration 700 which is comprised of None=0 502 and Question Set 602. Question Set 602 contains Question One=1 702, Question Two=2 704, Question Three=4 706, Question Four=8 708, Question Five=16 710, Question Six=32 712, Question Seven=64 714, Question Eight=128 716. 4Emoji Signature Question Set Alt Enumeration 700 is connected to 4Emoji Signature Question Set Value 610.

4Emoji Signature Question Set Alt Enumeration 700 is similar to 4Emoji Signature Question Set Enumeration 600, except that it doesn't contain risk level or version flags. It illustrates eight questions for Question Set 602.

Figure 8:
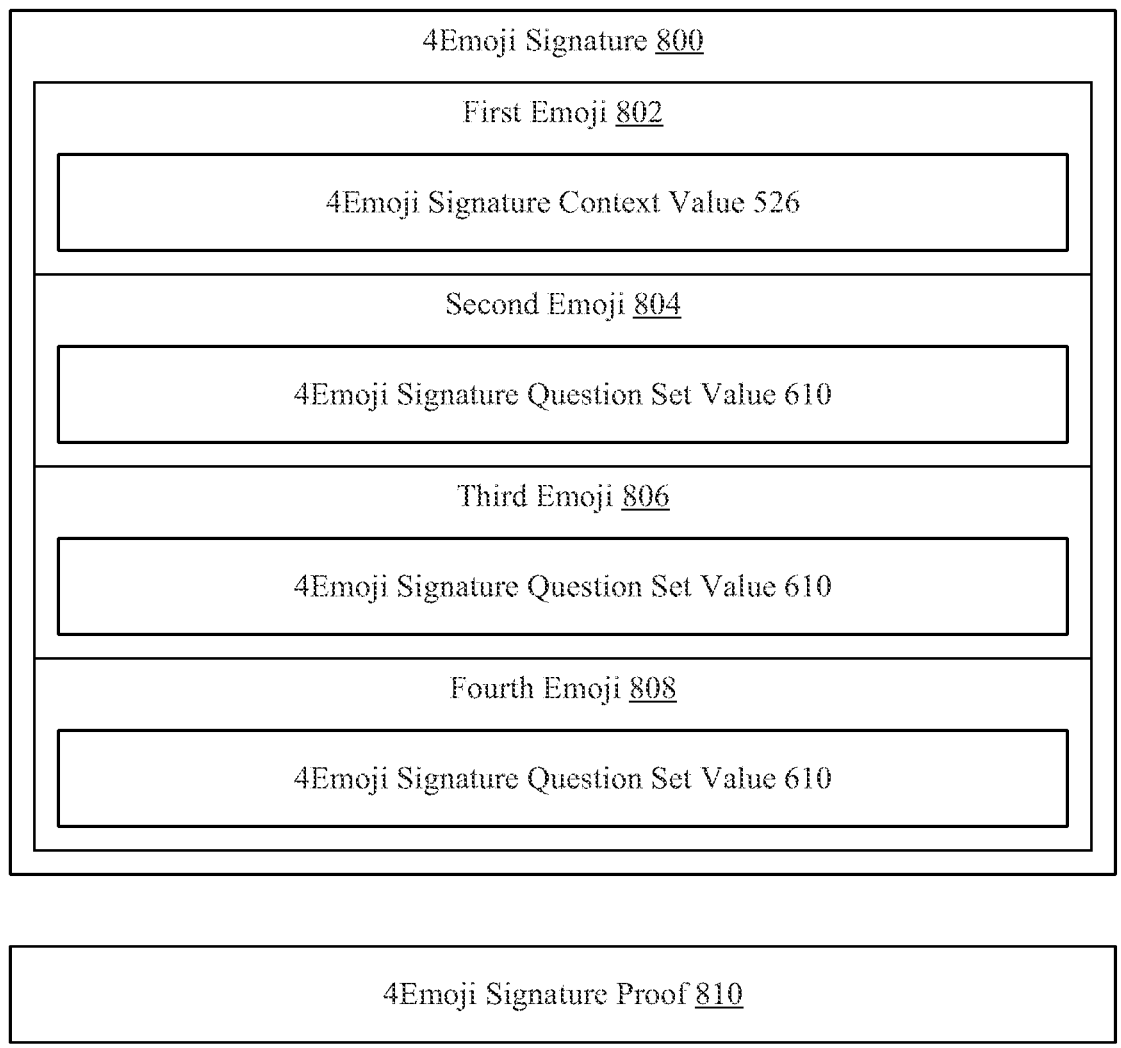
FIG. 8 shows an exemplary 4Emoji Signature.

FIG. 8 illustrates 4Emoji Signature 800 and 4Emoji Signature Proof 810. 4Emoji Signature 800 is comprised of First Emoji 802, which contains 4Emoji Signature Context Value 526; Second Emoji 804, which contains 4Emoji Signature Question Set Value 610; Third Emoji 806, which contains 4Emoji Signature Question Set Value 610; and Fourth Emoji 808, which contains 4Emoji Signature Question Set Value 610. 4Emoji Signature 800 contains four emoji. Each emoji has a corresponding integer that reflects four separate enumeration values.

Those skilled in the art will see that First Emoji 802 corresponds with 4Emoji Signature Context Value 526; Second Emoji 804 corresponds with 4Emoji Signature Question Set Value 610; Third Emoji 806 corresponds with 4Emoji Signature Question Set Value 610; and Fourth Emoji 808 corresponds with 4Emoji Signature Question Set Value 610. 4Emoji Signature Proof 810 is derived from Context Identifier Algorithm 200 in FIG. 2.

In one embodiment, individuals and entities can use 4Emoji Signature 800 as a pinxit (e.g., unique signature element) to signify knowledge, approval, acceptance, or obligation. In another embodiment, 4Emoji Signature 800 and 4Emoji Signature Proof 810 can be utilized to replace usernames and passwords for authentication.

FIG. 9 illustrates 4Emoji Signature Question Type Enumeration 900 which is comprised of None=0 902, True False=1904, Multiple Choice=2 906, Fill In the Blanks=4 908, Connect the Dots=8 910, Connect the Lines=32 912, Pick Your Favorite=64 914, Text Selection=128 916, Image Selection=256 918, Audio Selection=512 920, Video Selection=1024 922, Browse and Selection=2048 924, Number Of=4096 926, and Build a Word=8192 928.

4Emoji Signature Question Type Enumeration 900 is an enumeration list of question types that are attributed to questions. True or False=1 904 represents questions whose answers require selecting true or false. Multiple Choice=2 906 represents questions whose answers require selecting from multiple answers. Fill in the Blanks=4 908 represents questions whose answers require the completion of an incomplete phrase. Connect the Dots=8 910 represents questions whose answers require connecting selected dots within an array. Connect the Lines=32 912 represents questions whose answers require creating shapes by connecting lines within a grid with multiple rows of line segments separated by spaces. Pick Your Favorite=64 914 represents questions whose answers require picking one or more items out of a set of items favorited.

Text Selection=128 916 represents questions requiring selection of one or more letters or words from a sentence, paragraph, page, document, or book. In another embodiment, this question type may represent questions that provide a list of categories of documents, books, articles, and publications. Users select a category that lists available titles from which a user selects. Within the selected title, users select letters, words, or sentences.

Image Selection=256 918 represents questions requiring selection of one or more images. In another embodiment, this question type may represent questions that provide a list of categories for selection. Users choose a category, and that category provides a list of image sets, wherein a user selects an image set, then selects one or more images. In another embodiment, this question type may represent questions that provide a set of images wherein a user selects an image and then one or more objects within the image.

Audio Selection=512 represents questions requiring selection of one or more tracks from an audio file such as an album, a soundtrack, an audio book, or any such recording such that a user selects a section of the playback. In another embodiment, this question type may represent questions that provide one or more segments from an audio recording from which a user selects their answer, for example, John F. Kennedy's Inaugural Address, where he states, "Ask not what your country can do for you—ask what you can do for your country."

Video Selection=1024 922 represents questions requiring selection of one or more chapters or episodes from a video file such as a television show, movie, video series, or any such video that a user selects a section of the playback. In another embodiment, this question type may represent questions that provide two or more segments from a video from which a user selects their answer, for example, in the CBS broadcast of the first Moon landing wherein Neal Armstrong begins the statement, "That's one small step for man. One giant leap for Mankind."

Browse and Selection=2048 924 represents questions requiring the user to browse to a specific document, image, audio, or video resource on the Internet. Once the resource is loaded, the user selects text, image, audio, or video as their answer.

Number Of=4096 926 represents questions requiring a user to select a category of topics wherein the user is provided a list of questions that the user answers with the number of items or characteristics about a topic. Topics may include personally relevant questions, such as "How many grandchildren to you have?" In another embodiment, this question type may represent questions that provide a number of objects in an image from which a user selects their answer.

Build a Word=8192 928 represents questions requiring a user to use a grid whose composition is columns A through Z and rows A through Z to select letters to build a word. Users may begin building a word at any column. Each column-row letter is assigned a unique integer.

Those skilled in the art will see that question types do not only embody the common definition of a question to elicit information; they may also include puzzles and activities. The present disclosure is not limited to the question types listed here.

4Emoji Signature Question Type Enumeration 900 represents the inclusion of a wealth of content in text, image, video, or audio form as well as unique ways of selecting and/or inputting content to answer questions. It illustrates a capacity to inject randomness and individual-attributed knowledge and preferences to answers that make it highly improbable for computational and algorithmic attempts to impersonate a user's selection of questions and their answers.

One of the most difficult problems in designing systems for user verification has been the inclusion of randomness and depth in the realm of possible characteristics that may be used to attribute to a user for future verification. Furthermore, the storage of static characteristics is an easily exploitable feature in most user verification systems. The present disclosure provides for dynamic characteristic attribution determined by the user that is provided in real time without having been stored by the system. Simply said, most systems for user verification store data about the user; these static characteristics are narrow in scope (e.g., PINs) and are easily exploitable. The present disclosure illustrates how to define and abstract dynamic characteristics outside of the user verification system.

By enabling dynamic questions determined by the user, with those choices by the user not being stored by the system, the present disclosure injects user-injected randomness about what is being asked of the user to be verified. This user-injected randomness is illustrated by the user's vast choices in question set, question selection, and question types. In some embodiments, users are provided with hundreds, thousands, or tens-of-thousands of categories and topics of question sets, wherein each question set in turn lists hundreds, thousands, or tens-of-thousands of questions. These embodiments illustrate the magnitude of the user's choices in selecting questions. Additionally, the randomness and depth in the realm of possible characteristics is magnified by the user's answers.

Figure 10:
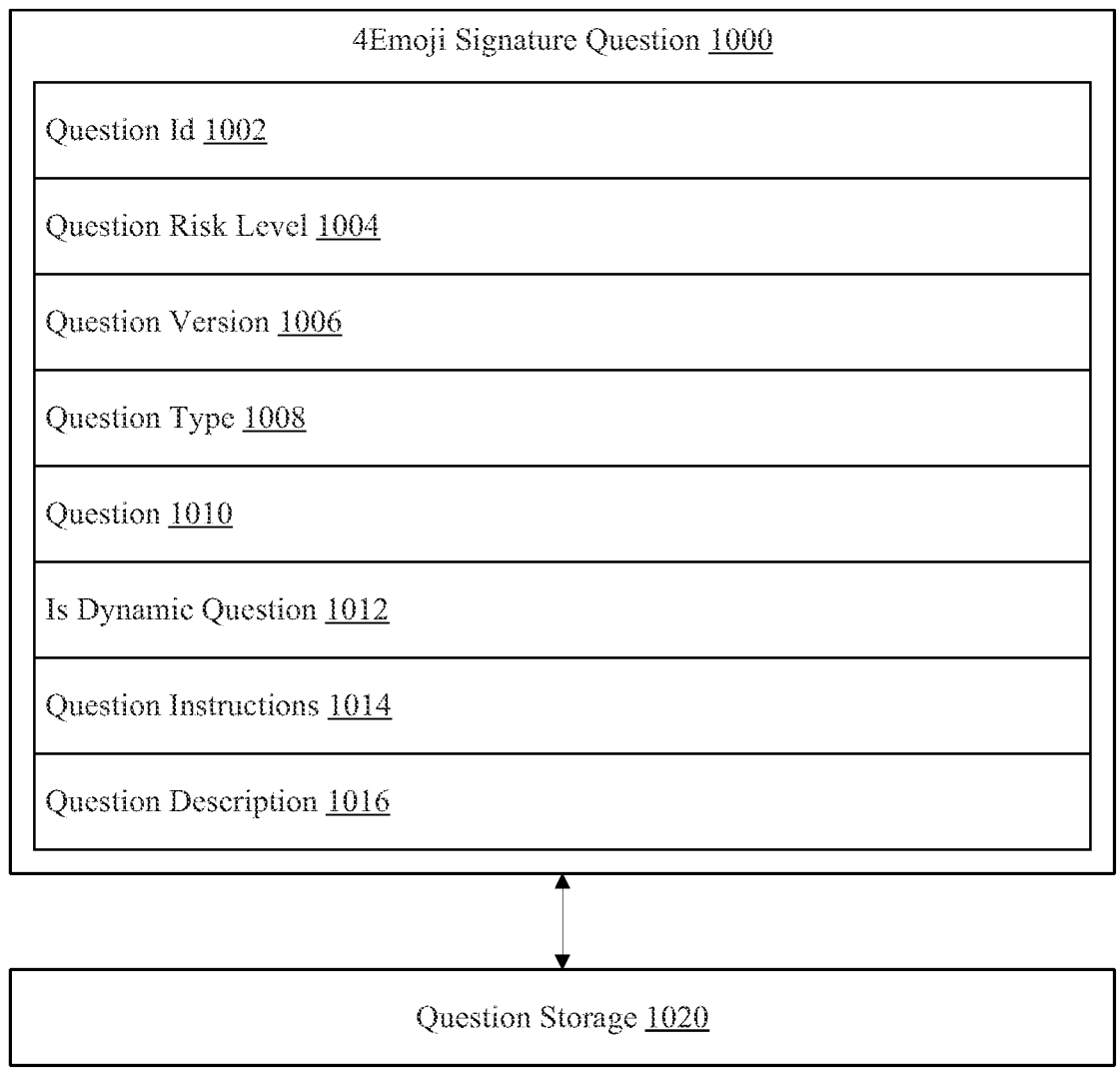
FIG. 10 shows an exemplary 4Emoji Signature Question.

FIG. 10 illustrates 4Emoji Signature Question 1000 which is comprised of Question Id 1002, Question Risk Level 1004, Question Version 1006, Question Type 1008, Question 1010, Is Dynamic Question 1012, Question Instructions 1014, and Question Description 1016. 4Emoji Signature Question 1000 is connected to Question Storage 1020. Question Id 1002 illustrates a unique identifier for 4Emoji Signature Question 1000. Question Risk Level 1004 illustrates Risk Level 504 in FIG. 5 associated with 4Emoji Signature Question 1000. Question Version 1006 illustrates the version for 4Emoji Signature Question 1000. Question Type 1008 illustrates 4Emoji Signature Question Type Enumeration 900 in FIG. 9 specifying the type of question for 4Emoji Signature Question 1000. Question 1010 illustrates the text, image, video, audio, puzzle, or activity for 4Emoji Signature Question 1000. It contains the question and may also include metadata. Is Dynamic Question 1012 illustrates a Boolean indicating whether or not 4Emoji Signature Question 1000 is dynamic. Question Instructions 1014 illustrates the text, image, video, or audio to convey the instructions of 4Emoji Signature Question 1000. Question Description 1016 illustrates a description of 4Emoji Signature Question 1000. Question Storage 1020 illustrates a data storage system such as a database. Those skilled in the art will see that 4Emoji Signature Question 1000 is a type whose instance is stored in Question Storage 1020.

Figure 11:
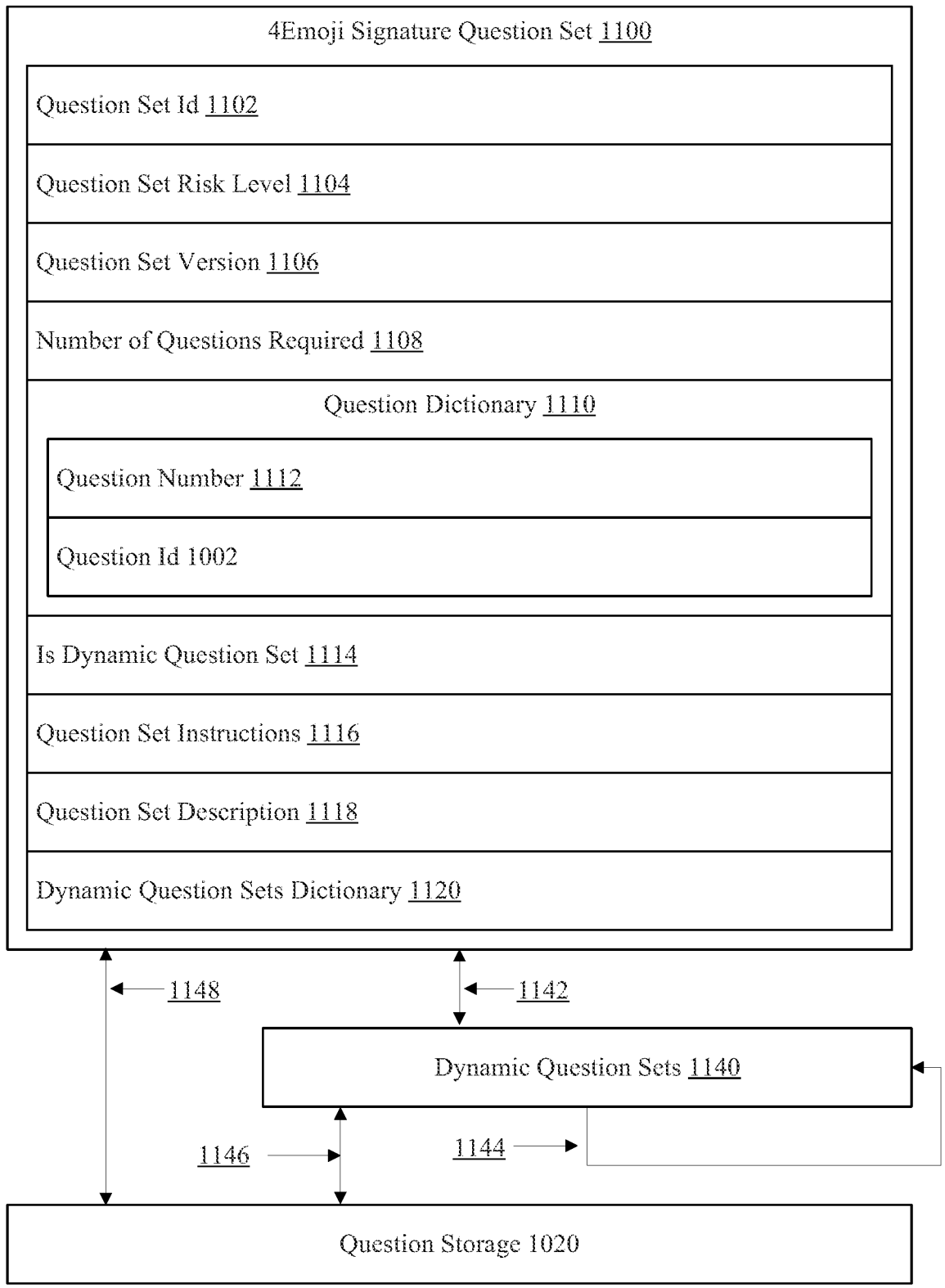
FIG. 11 shows an exemplary 4Emoji Signature Question Set.

FIG. 11 illustrates 4Emoji Signature Question Set 1100 which is comprised of Question Set Id 1102, Question Set Risk Level 1104, Question Set Version 1106, Number of Questions Required 1108, Question Dictionary 1110, Is Dynamic Question Set 1114, Question Set Instructions 1116, Question Set Description 1118, and Dynamic Question Sets Dictionary 1120. Question Dictionary 1110 contains Question Number 1112 and Question Id 1002.

4Emoji Signature Question Set 1100 is connected to Dynamic Question Sets 1140 via Line Segment 1142. Dynamic Question Sets 1140 is recursively connected to itself via Line Segment 1144, illustrating the recursive relationship of question sets, namely question sets can contain other question sets. Dynamic Question Sets 1140 is connected to Question Storage 1020 via Line Segment 1146. 4Emoji Signature Question Set 1100 is also connected to Question Storage 1020 via Line Segment 1148. Question Set Id 1102 illustrates a unique identifier for 4Emoji Signature Question Set 1100. Question Set Risk Level 1104 illustrates Risk Level 504 in FIG. 5 associated with 4Emoji Signature Question Set 1100. Question Set Version 1106 illustrates the version of 4Emoji Signature Question Set 1100. Number of Questions Required 1108 illustrates the number of questions or question sets required for 4Emoji Signature Question Set 1100. Question Dictionary 1110 illustrates the questions associated with 4Emoji Signature Question Set 1100. Each association includes Question Id 1002 and Question Number 1112, which enables assignment of an order number for each question in Question Dictionary 1110.

Is Dynamic Question Set 1114 illustrates a Boolean indicating whether or not 4Emoji Signature Question Set 1100 is dynamic. If true, Question Dictionary 1110 does not have associated questions; instead Dynamic Question Sets Dictionary 1120 has associated question sets. If false, Question Dictionary 1110 has associated questions; Dynamic Question Sets Dictionary 1120 does not have associated question sets. Dynamic Question Sets 1140 illustrates the recursive associations of question sets in Dynamic Question Sets Dictionary 1120. Question Set Instructions 1116 illustrates the specific instructions for how to use 4Emoji Signature Question Set 1100. Question Set Description 1118 illustrates the specific description of the nature of 4Emoji Signature Question Set 1100. Those skilled in the art will see that 4Emoji Signature Question Set 1100 is a type whose instance is stored in Question Storage 1020.

Figure 12:
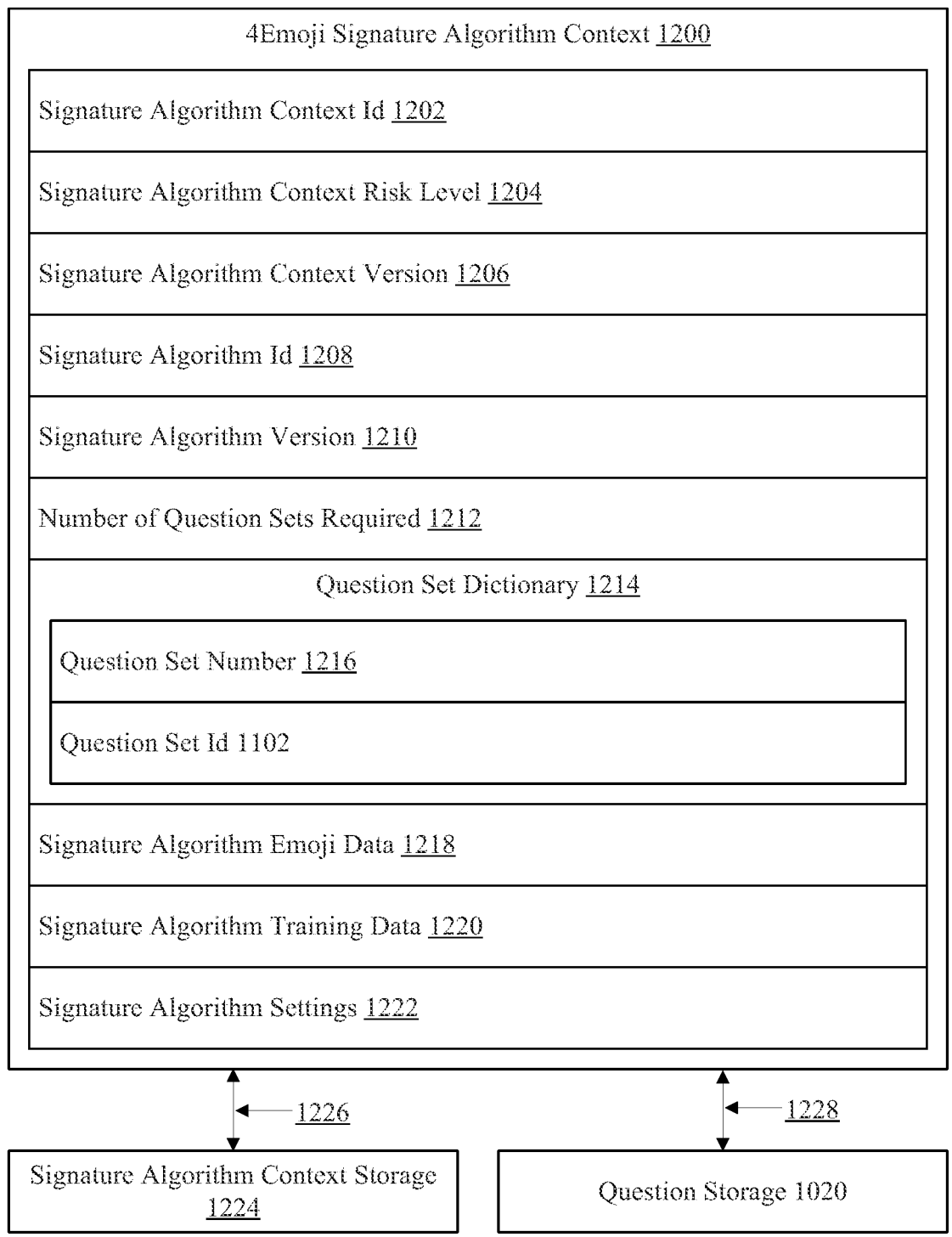
FIG. 12 shows an exemplary 4Emoji Signature Algorithm Context.

FIG. 12 illustrates 4Emoji Signature Algorithm Context 1200 which is comprised of Signature Algorithm Context Id 1202, Signature Algorithm Context Risk Level 1204, Signature Algorithm Context Version 1206, Signature Algorithm Id 1208, Signature Algorithm Version 1210, Number of Question Sets Required 1212, Question Set Dictionary 1214, Signature Algorithm Emoji Data 1218, Signature Algorithm Training Data 1220, and Signature Algorithm Settings 1222. Question Set Dictionary 1214 contains Question Set Number 1216 and Question Set Id 1102. 4Emoji Signature Algorithm Context 1200 is connected to Signature Algorithm Context Storage 1224 via Line Segment 1226 and Question Storage 1020 via Line Segment 1228. Signature Algorithm Context Id 1202 illustrates a unique identifier for 4Emoji Signature Algorithm Context 1200. Signature Algorithm Context Risk Level 1204 illustrates a risk level for 4Emoji Signature Algorithm Context 1200. Signature Algorithm Context Version 1206 illustrates the version assigned to 4Emoji Signature Algorithm Context 1200. Signature Algorithm Id 1208 illustrates a signature algorithm identifier for 4Emoji Signature Algorithm Context 1200. Signature Algorithm Version 1210 illustrates a signature algorithm version for 4Emoji Signature Algorithm Context 1200.

Number of Question Sets Required 1212 illustrates the number of question sets required for 4Emoji Signature Algorithm Context 1200. Question Set Dictionary 1214 illustrates the question sets associated with 4Emoji Signature Algorithm Context 1200. Each association includes Question Set Id 1102 and Question Set Number 1216, which enables assignment of an order number for each question set in Question Set Dictionary 1214. Signature Algorithm Emoji Data 1218 illustrates Emoji 302 in FIG. 3 associated with 4Emoji Signature Algorithm Context 1200. Signature Algorithm Training Data 1220 illustrates training data for machine learning used to train a signature algorithm associated with 4Emoji Signature Algorithm Context 1200. Signature Algorithm Settings 1222 illustrates settings for a signature algorithm associated with 4Emoji Signature Algorithm Context 1200. Signature Algorithm Context Storage 1224 illustrates a data storage system such as a database. Those skilled in the art will see that 4Emoji Signature Algorithm Context 1200 is a type whose instance is stored in Signature Algorithm Context Storage 1224. The question sets associated with Question Set Dictionary 1214 are stored in Question Storage 1020. 4Emoji Signature Algorithm Context 1200 provides the data and settings for a signature algorithm.

Figure 13:
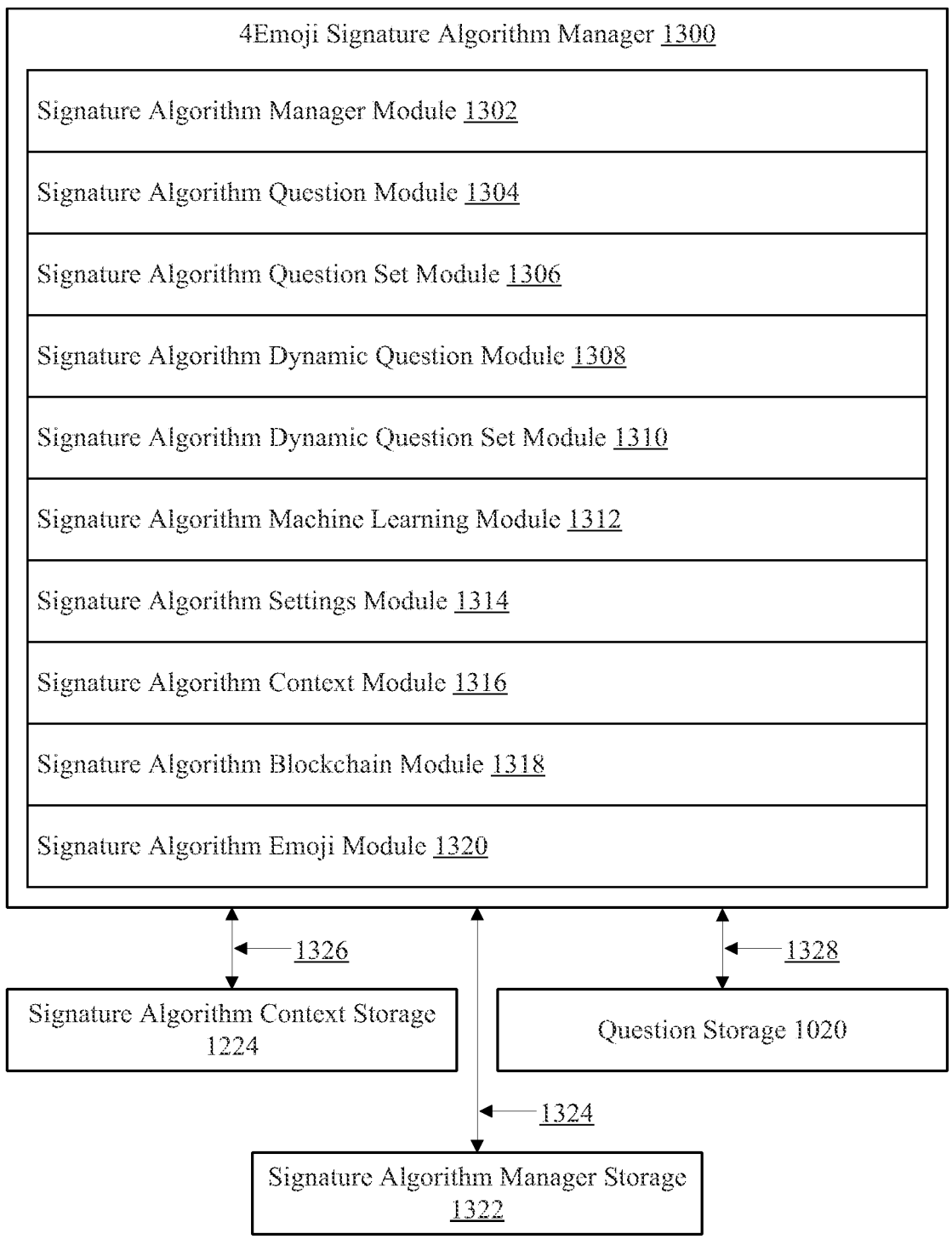
FIG. 13 shows an exemplary 4Emoji Signature Algorithm Manager.

FIG. 13 illustrates 4Emoji Signature Algorithm Manager 1300 which is comprised of Signature Algorithm Manager Module 1302, Signature Algorithm Question Module 1304, Signature Algorithm Question Set Module 1306, Signature Algorithm Dynamic Question Module 1308, Signature Algorithm Dynamic Question Set Module 1310, Signature Algorithm Machine Learning Module 1312, Signature Algorithm Settings Module 1314, Signature Algorithm Context Module 1316, Signature Algorithm Blockchain Module 1318, and Signature Algorithm Emoji Module 1320. 4Emoji Signature Algorithm Manager 1300 is connected to Signature Algorithm Context Storage 1224 via Line Segment 1326, Signature Algorithm Manager Storage 1322 via Line Segment 1324, and Question Storage 1020 via Line Segment 1328. Signature Algorithm Manager Module 1302 illustrates all the functionality necessary to manage and design the context of the modules and the signature algorithm; see Context Identifier Algorithm 200 in FIG. 2 and 4Emoji Signature Context Enumeration 500 in FIG. 5. It also illustrates the functionality to create, read, update, and delete signature algorithm management and design data, as well as all the business logic for the signature algorithm management and design.

Signature Algorithm Question Module 1304 illustrates all the functionality necessary to manage and design questions; see 4Emoji Signature Question 1000 in FIG. 10 and 4Emoji Signature Question Type Enumeration 900 in FIG. 9. It also illustrates the functionality to create, read, update and delete question data, as well as all the business logic for question management and design.

Signature Algorithm Question Set Module 1306 illustrates all the functionality necessary to manage and design question sets; see 4Emoji Signature Question Set 1100 in FIG. 11, 4Emoji Signature Question Set Enumeration 600 in FIG. 6, and 4Emoji Signature Question Set Alt Enumeration 700 in FIG. 7. It also illustrates the functionality to create, read, update and delete question set data, as well as all the business logic for question set management and design.

Signature Algorithm Dynamic Question Module 1308 illustrates all the functionality necessary to manage and design dynamic questions; see 4Emoji Signature Question 1000 in FIGS. 10 and 4Emoji Signature Question Type Enumeration 900 in FIG. 9. It also illustrates the functionality to create, read, update and delete dynamic question data, as well as all the business logic for dynamic question management and design.

Signature Algorithm Dynamic Question Set Module 1310 illustrates all the functionality necessary to manage and design dynamic question sets; see 4Emoji Signature Question Sets 1100 in FIG. 11, 4Emoji Signature Question Set Enumeration 600 in FIG. 6, and 4Emoji Signature Question Set Alt Enumeration 700 in FIG. 7. It also illustrates the functionality to create, read, update and delete dynamic question set data, as well as all the business logic for dynamic question set management and design.

Signature Algorithm Machine Learning Module 1312 illustrates all the functionality necessary to manage and design the training data for machine learning. It also illustrates the functionality to create, read, update and delete the training data for machine learning, as well as all the business logic for machine learning management and design.

Signature Algorithm Settings Module 1314 illustrates all the functionality necessary to manage module and algorithm settings. It also illustrates the functionality to create, read, update and delete algorithm settings data, as well as all the business logic for module and algorithm settings management.

Signature Algorithm Context Module 1316 illustrates all the functionality necessary to manage module and algorithm context; see 4Emoji Signature Algorithm Context 1200 in FIG. 12. It also illustrates the functionality to create, read, update and delete algorithm context data, as well as all the business logic for module and algorithm context management.

Signature Algorithm Blockchain Module 1318 illustrates all the functionality necessary to manage and design the blockchain for the algorithm. It also illustrates the functionality to create, read, update and delete blockchain data, as well as all the business logic for blockchain management and design.

Signature Algorithm Emoji Module 1320 illustrates all the functionality necessary to manage and design the emoji for the algorithm; see 4Emoji Signature 800 in FIG. 8. It also illustrates the functionality to create, read, update and delete emoji data, as well as all the business logic for emoji management and design.

Signature Algorithm Manager Storage 1322 illustrates a data storage system such as a database. Those skilled in the art will see that 4Emoji Signature Algorithm Manager 1300 is a type whose instance is stored in Signature Algorithm Manager Storage 1322. Signature Algorithm Context Module 1316 is stored in Signature Algorithm Context Storage 1224. The questions, question sets, dynamic questions, and dynamic question sets associated with Signature Algorithm Question Module 1304, Signature Algorithm Question Set Module 1306, Signature Algorithm Dynamic Question Module 1308, and Signature Algorithm Dynamic Question Set Module 1310 are stored in Question Storage 1020.

4Emoji Signature Algorithm Manager 1300 is used to design, develop, test and deploy the 4Emoji signature algorithm and data. Any 4Emoji Signature Algorithm Manager 1300 module may use the functionality of other modules. Those skilled in the art will appreciate as an example, the use of 4Emoji Signature Algorithm Manager 1300 to design and manage signature algorithm and data for kiosks, web, desktop, and mobile applications.

Figure 14:
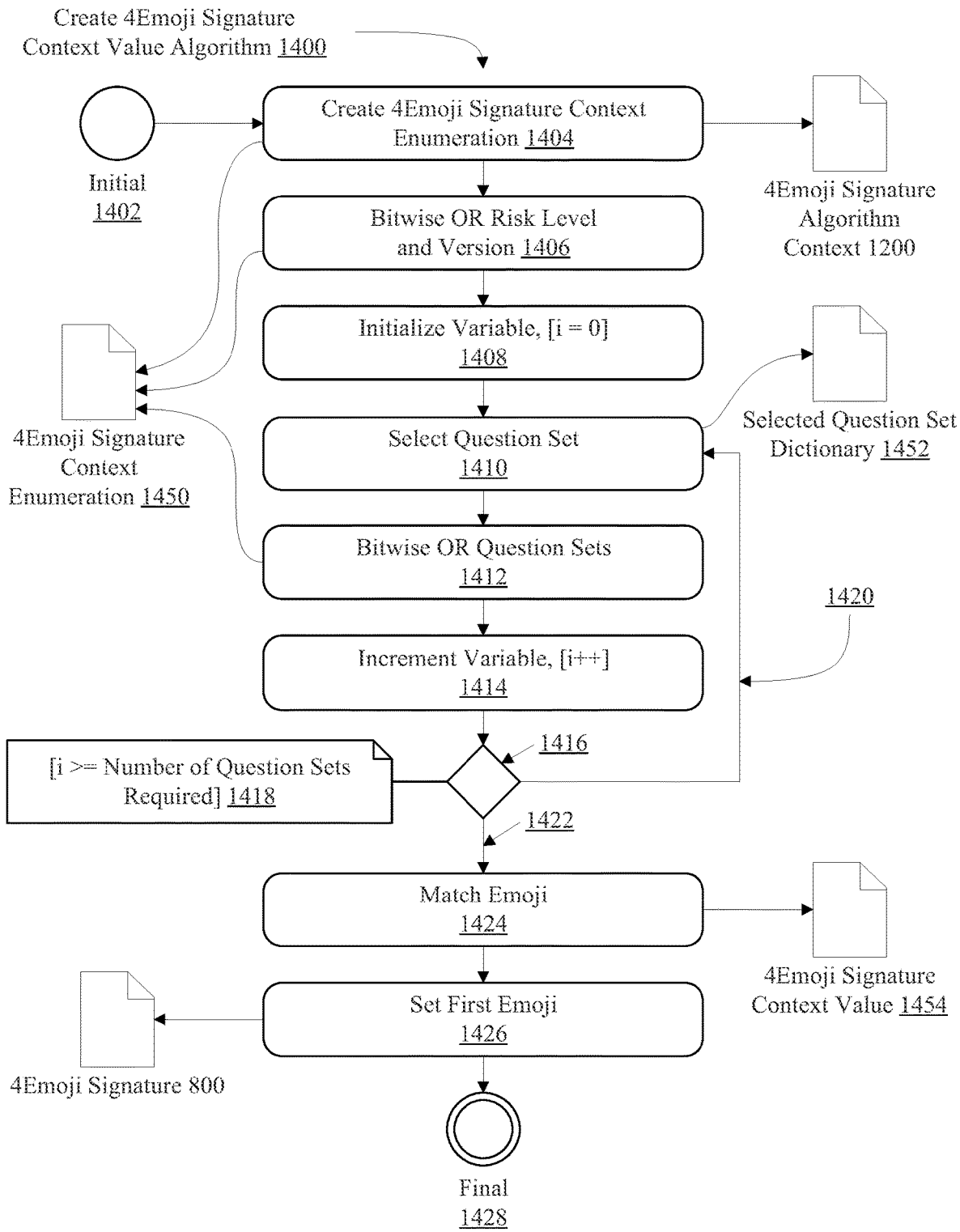
FIG. 14 shows an exemplary Create 4Emoji Signature Context Value Algorithm.

FIG. 14 illustrates Create 4Emoji Signature Context Value Algorithm 1400. The algorithm starts at Initial 1402 which is connected to Create 4Emoji Signature Context Enumeration 1404. Create 4Emoji Signature Context Enumeration 1404 is connected to 4Emoji Signature Algorithm Context 1200, 4Emoji Signature Context Enumeration 1450, and Bitwise OR Risk Level and Version 1406. Bitwise OR Risk Level and Version 1406 is connected to 4Emoji Signature Context Enumeration 1450 and Initialize Variable, [i=0] 1408. Initialize Variable, [i=0] 1408 is connected to Select Question Set 1410. Select Question Set 1410 is connected to Selected Question Set Dictionary 1452 and Bitwise OR Question Sets 1412. Bitwise OR Question Sets 1412 is connected to 4Emoji Signature Context Enumeration 1450 and Increment Variable, [i++] 1414. Increment Variable, [i++] 1414 is connected to Decision 1416.

Decision 1416 is connected to note [i>=Number of Question Sets Required] 1418, which illustrates the looping criteria. While i<Number of Question Sets Required, control proceeds to Select Question Set 1410 via Line Segment 1420. When i>=Number of Question Sets Required, control proceeds to Match Emoji 1424 via Line Segment 1422. Match Emoji 1424 is connected to 4Emoji Signature Context Value 1454 and Set First Emoji 1426. Set First Emoji 1426 is connected to 4Emoji Signature 800 as well as Final 1428, illustrating the end of the algorithm.

Create 4Emoji Signature Context Value Algorithm 1400 takes in 4Emoji Signature Algorithm Context 1200 and requires 4Emoji Signature 800. Create 4Emoji Signature Context Value Algorithm 1400 produces 4Emoji Signature Context Enumeration 1450 (see 4Emoji Signature Context Enumeration 500 in FIG. 5), Selected Question Set Dictionary 1452, and 4Emoji Signature Context Value 1454 (see 4Emoji Signature Context Value 526 in FIG. 5). Bitwise OR Question Sets 1412 refers to Question Sets 518 in FIG. 5. [i>=Number of Question Sets Required] 1418 refers to Number of Question Sets Required 1212 in FIG. 12. Match Emoji 1424 illustrates that 4Emoji Signature Context Value 1454 integer is matched with the corresponding First Emoji 802 in FIG. 8. First Emoji 802 thereby visually, audibly, or tactilely represents the risk level, version, and selected question sets defined by the user in Create 4Emoji Signature Context Value Algorithm 1400. This is further illustrated by Set First Emoji 1426; see First Emoji 802 in FIG. 8 and Emoji Signature Context Value 526 in FIG. 5 as illustrated in 4Emoji Signature 800 in FIG. 8.

Risk Level 504 in FIG. 5 determines the Number of Question Sets Required 1212 in FIG. 12. In another embodiment, Risk Level 504 may determine if Is Dynamic Question Set 1114 is true. Risk Level 504 also determines question sets, number, and degree of difficulty required to mitigate the associated risk implied by the risk level for a specific use case. The greater the complexity of question sets, the more difficult the questions are to answer and the longer it takes a user to navigate and answer associated questions. This is particularly true in the case of dynamic question sets where multiple levels of question sets (see Dynamic Question Sets Dictionary 1120 and Is Dynamic Question Set 1114 in FIG. 11) require a user to select and recall the path to the questions presented by the last question set, as only the first question set is stored in 4Emjoi Signature Context Enumeration 1450. The dynamic question sets' path creates greater randomness in the system.

Those skilled in the art will see that Create 4Emoji Signature Context Value Algorithm 1400 is used by a user to select question sets. The question sets, risk level, and version produce 4Emoji Signature Context Value 1454 as an integer which then is matched to produce First Emoji 802 in 4Emoji Signature 800.

Figure 15:
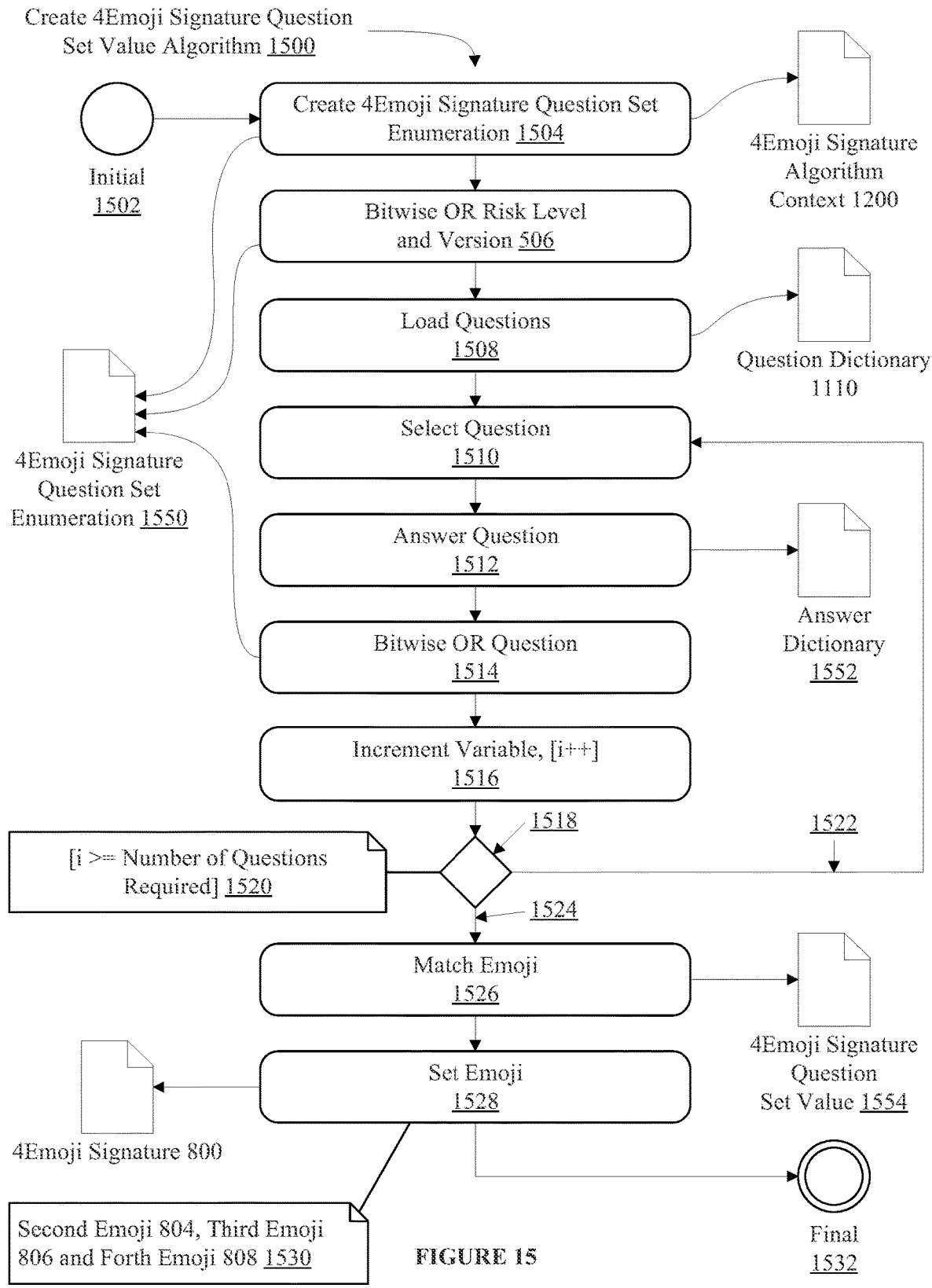
FIG. 15 shows an exemplary Create 4Emoji Signature Question Set Value Algorithm.

FIG. 15 illustrates Create 4Emoji Question Set Value Algorithm 1500. The algorithm starts at Initial 1502 which is connected to Create 4Emoji Signature Question Set Enumeration 1504. Create 4Emoji Signature Question Set Enumeration 1504 is connected to 4Emoji Signature Question Set Enumeration 1550, 4Emoji Signature Algorithm Context 1200, and Bitwise OR Risk Level and Version 1506. Bitwise OR Risk Level and Version 1506 is connected to 4Emoji Signature Question Set Enumeration 1550 and Load Questions 1508. Load Questions 1508 is connected to Question Dictionary 1110 and Select Question 1510. Select Question 1510 is connected to Answer Question 1512. Answer Question 1512 is connected to Answer Dictionary 1552 and Bitwise OR Question 1514. Bitwise OR Question 1514 is connected to 4Emoji Signature Question Set Enumeration 1550 and Increment Variable, [i++] 1516. Increment Variable, [i++] 1516 is connected to Decision 1518.

Decision 1518 is connected to note [i>=Number of Question Required] 1520, which illustrates the looping criteria. While i<Number of Question Required, control proceeds to Select Question 1510 via Line Segment 1522. When i>=Number of Question Required, control proceeds to Match Emoji 1526 via Line Segment 1524. Match Emoji 1526 is connected to 4Emoji Signature Question Set Value 1554 and Set Emoji 1528. Set Emoji 1528 is connected to 4Emoji Signature 800 and Final 1532, illustrating the end of the algorithm.

Set Emoji 1528 is also connected to note Second Emoji, Third Emoji and Fourth Emoji 1530, which illustrates that in addition to setting Second Emoji 804, Create 4Emoji Signature Question Set Value Algorithm 1500 and resulting Set Emoji 1528 are also used to set Third Emoji 806 and Fourth Emoji 808.

Create 4Emoji Signature Question Set Value Algorithm 1500 takes in 4Emoji Signature Algorithm Context 1200 and requires 4Emoji Signature 800. Create 4Emoji Signature Question Set Value Algorithm 1500 produces 4Emoji Signature Question Set Enumeration 1550 (see 4Emoji Signature Question Set Enumeration 600 in FIG. 6), Answer Dictionary 1552, and 4Emoji Signature Question Set Value 1554 (see 4Emoji Signature Question Set Value 610 in FIG. 6). Bitwise OR Question 1514 refers to Question Set 602 in FIG. 6. [i>=Number of Questions Required] 1520 refers to Number of Questions Required 1108 in FIG. 11. Match Emoji 1526 illustrates that 4Emoji Signature Question Set Value 1554 integer is matched with a corresponding Second Emoji 804, Third Emoji 806, or Fourth Emoji 808 in FIG. 8. These emoji thereby visually, audibly, or tactilely represent the risk level, version, and selected questions defined by the user in Create 4Emoji Signature Question Set Value Algorithm 1500. This is further illustrated by Set Emoji 1528; see Second Emoji 804, Third Emoji 806, Fourth Emoji 808 and 4Emoji Signature Question Set Value 610 as illustrated in 4Emoji Signature 800 in FIG. 8.

Risk Level 504 in FIG. 5 determines the Number of Questions Required 1108 in FIG. 11. In another embodiment, Risk Level 504 may determine if Is Dynamic Question 1012 is true. Risk Level 504 also determines question, number, and degree of difficulty required to mitigate the associated risk implied by the risk level for a specific use case. The greater the complexity of the question, the more difficult the question is to answer and the longer it takes a user to answer the question. This is particularly true in the case of a dynamic question where a user is expected to perform multiple time-consuming tasks (see 4Emoji Signature Question Type Enumeration 900 in FIG. 9).

Dynamic questions (see Is Dynamic Question 1012 on FIG. 10) include Text Selection=128 916, Image Selection=256 918, Audio Selection=512 920, Video Selection=1024 922 as well as the notable Browse and Selection=2048 924. These dynamic questions create greater randomness in the system, especially Browse and Selection=2048 924 where a user inputs a URL to a resource that only the user knows to perform the additional steps of selection.

Those skilled in the art will see that Create 4Emoji Signature Question Set Value Algorithm 1500 is used by a user to select questions. The questions, risk level, and version produce 4Emoji Signature Question Set Value 1554 as an integer which then is matched to produce Second Emoji 804, Third Emoji 806, and Fourth Emoji 808 of 4Emoji Signature 800.

Figure 16:
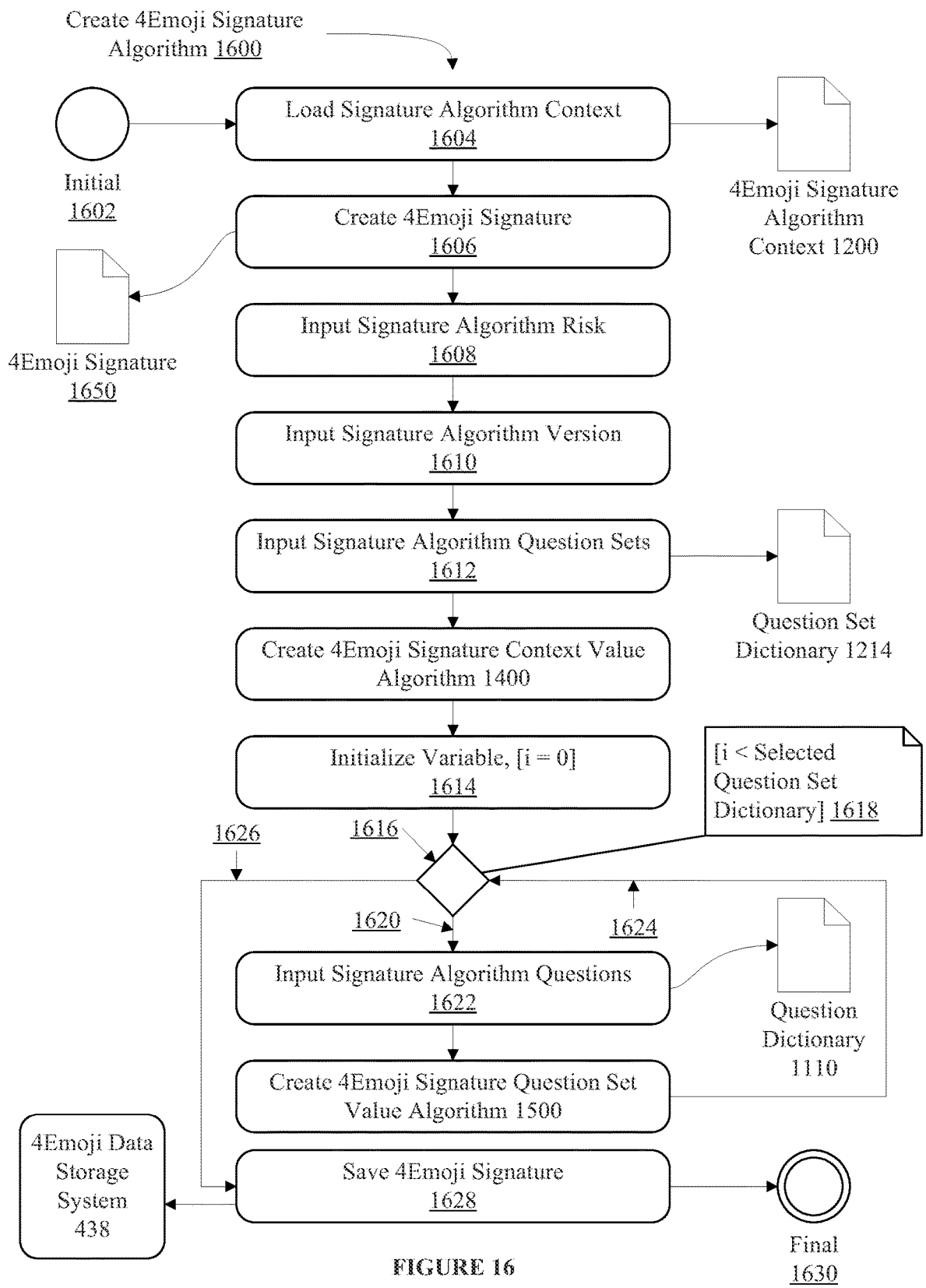
FIG. 16 shows an exemplary Create 4Emoji Signature Algorithm.

FIG. 16 illustrates Create 4Emoji Signature Algorithm 1600. The algorithm starts at Initial 1602 which is connected to Load Signature Algorithm Context 1604. Load Signature Algorithm Context 1604 requires 4Emoji Signature Algorithm Context 1200 and is connected to Create 4Emoji Signature 1606. Create 4Emoji Signature 1606 is connected to 4Emoji Signature 1650 and Input Signature Algorithm Risk Level 1608. Input Signature Algorithm Risk Level 1608 is connected to Input Signature Algorithm Version 1610. Input Signature Algorithm Version 1610 is connected to Input Signature Algorithm Question Sets 1612. Input Signature Algorithm Question Sets 1612 requires Question Set Dictionary 1214 and is connected to Create 4Emoji Signature Context Value Algorithm 1400. Create 4Emoji Signature Context Value Algorithm 1400 is connected to Initialize Variable, [i=0] 1614. Initialize Variable, [i=0] 1614 is connected to Decision 1616.

Decision 1616 is connected to note [i<Selected Question Set Dictionary] 1618, which illustrates the looping criteria. While i<Selected Question Set Dictionary, control proceeds to Input Signature Algorithm Questions 1622 via Line Segment 1620. Input Signature Algorithm Questions 1622 requires Question Dictionary 1110 and is connected to Create 4Emoji Signature Question Set Value Algorithm 1500. Create 4Emoji Signature Question Set Value Algorithm 1500 is connected to Decision 1616 via Line Segment 1624. When i=Selected Question Set Dictionary, control proceeds to Save 4Emoji Signature 1628 via Line Segment 1626. Save 4Emoji Signature 1628 is connected to 4Emoji Data Storage System 438 and Final 1630, illustrating the end of the algorithm.

Create 4Emoji Signature Algorithm 1600 is used to create a user's 4Emoji Signature 1650 (see 4Emoji Signature 800 in FIG. 8). Of note, Input Signature Algorithm Question Sets 1612 loads question sets by the order in Question Set Number 1216 in FIG. 12, and Input Signature Algorithm Questions 1622 loads questions by the order in Question Number 1112 in FIG. 11.

Save 4Emoji Signature 1628 illustrates the saving of 4Emoji Signature 1650 to 4Emoji Data Storage System 438. Those skilled in the art will appreciate that the present disclosure saves 4Emoji Signature 1650 for future verification.

Figure 17:
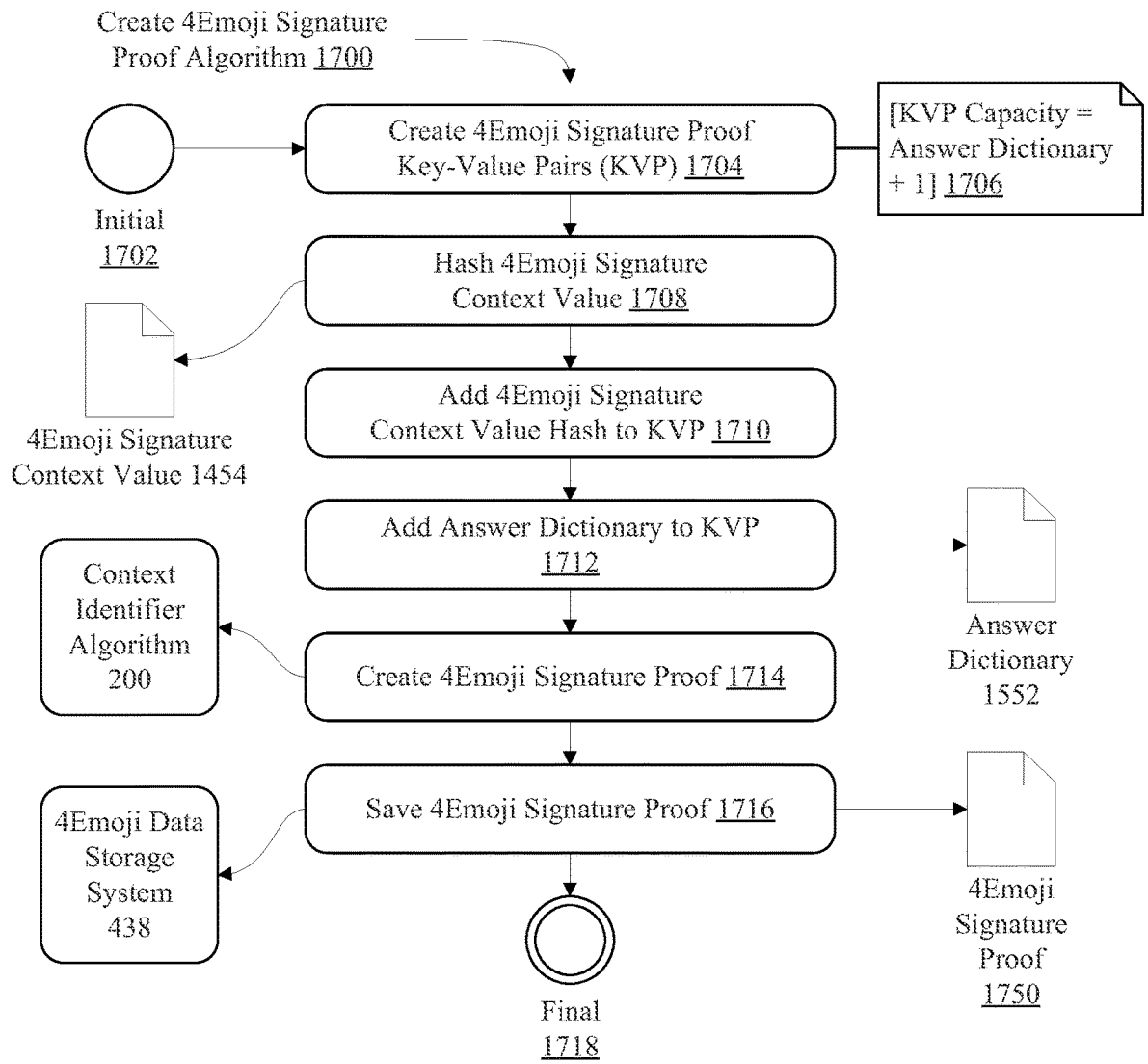
FIG. 17 shows an exemplary Create 4Emoji Signature Proof Algorithm.

FIG. 17 illustrates Create 4Emoji Signature Proof Algorithm 1700. The algorithm starts at Initial 1702 which is connected to Create 4Emoji Signature Proof Key-Value Pairs (KVP) 1704. Create 4Emoji Signature Proof Key-Value Pairs (KVP) 1704 is connected to note [KVP Capacity=Answer Dictionary+1] 1706 as well as Hash 4Emoji Signature Context Value 1708. Hash 4Emoji Signature Context Value 1708 requires 4Emoji Signature Context Value 1454 and is connected to Add 4Emoji Signature Context Value Hash to KVP 1710. Add 4Emoji Signature Context Value Hash to KVP 1710 is connected to Add Answer Dictionary to KVP 1712. Add Answer Dictionary to KVP 1712 requires Answer Dictionary 1552 and is connected to Create 4Emoji Signature Proof 1714. Create 4Emoji Signature Proof 1714 is connected to Context Identifier Algorithm 200 as well as Save 4Emoji Signature Proof 1716. Save 4Emoji Signature Proof 1716 generates 4Emoji Signature Proof 1750 and is connected to 4Emoji Data Storage System 438 and Final 1718, illustrating the end of the algorithm.

Create 4Emoji Signature Proof Algorithm 1700 is used to create an instance of a user's 4Emoji Signature Proof 810 in FIG. 8 as illustrated by Create 4Emoji Signature Proof 1714 in FIG. 17 which utilizes Context Identifier Algorithm 200 in FIG. 2 and the resulting 4Emoji Signature Proof 1750.

Save 4Emoji Signature Proof 1716 illustrates the saving of 4Emoji Signature Proof 1750 to 4Emoji Data Storage System 438. Those skilled in the art will appreciate that the present disclosure saves 4Emoji Signature Proof 1750 for future verification.

In one embodiment, individuals and entities can use 4Emoji Signature 800 as a pinxit to signify knowledge, approval, acceptance, or obligation, and then use 4Emoji Signature Proof 810 to verify their identity. As an example, consider the scenario where an individual or entity presents a signed check to a bank teller for deposit and is asked to present proof of identification to verify that they are the signee. With the present disclosure, the individual or entity uses their 4Emoji Signature 800 as the signature and their 4Emoji Signature Proof 810 as their identification, thereby eliminating the need for traditional signatures and identification. Furthermore, the current technologies for digital signatures are replaced with something that is far more tangible, easily accessible, low cost to replace, and arguably more secure. In some ways, the present disclosure returns transactions to the former state which required individuals and entities to participate in the signing and verification process, granting them more direct power and control.

The present disclosure could replace traditional credit cards and digital devices to perform financial transactions. A touch screen terminal in combination with 4Emoji Signature 800, 4Emoji Signature Proof 810 and associated algorithms could be used to facilitate all types of financial transactions with varying degrees of risk, e.g. purchasing $50 worth of gasoline (low risk), purchasing a $1000 smart phone (medium risk), and purchasing a $50,000 car (high risk). In each instance, the risk would be mitigated by the present disclosure.

The present disclosure is relatively less expensive than credit card and digital device payment infrastructure and offers other benefits such as an ability for individuals and entities to easily and quickly reset their 4Emoji Signature 800 and 4Emoji Signature Proof 810. No more lost or stolen credit cards. No more restricted access to funds or credit while waiting for new debit and credit cards to arrive in the mail. No more worrying about identity theft since users can now inject power and control over their identity that heretofore has not been possible. Using the present disclosure users can control access to their credit reports by requiring that access be granted only through their 4Emoji Signature 800 and 4Emoji Signature Proof 810.

Figure 18:
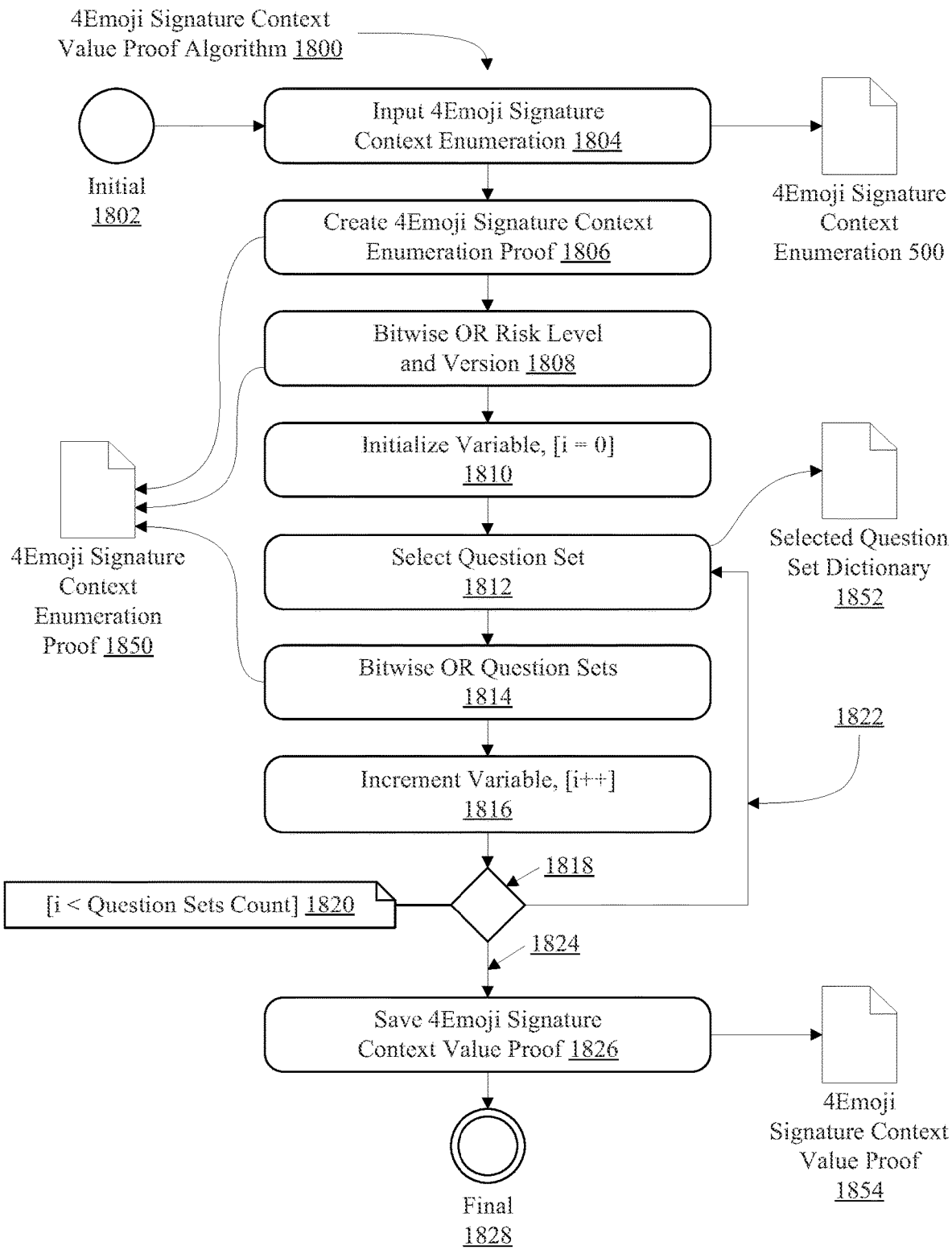
FIG. 18 shows an exemplary 4Emoji Signature Context Value Proof Algorithm.

FIG. 18 illustrates 4Emoji Signature Context Value Proof Algorithm 1800. The algorithm starts at Initial 1802 which is connected to Input 4Emoji Signature Context Enumeration 1804. Input 4Emoji Signature Context Enumeration 1804 requires 4Emoji Signature Context Enumeration 500 and is connected to Create 4Emoji Signature Context Enumeration Proof 1806. Create 4Emoji Signature Context Enumeration Proof 1806 is connected to 4Emoji Signature Context Enumeration Proof 1850 and Bitwise OR Risk Level and Version 1808. Bitwise OR Risk Level and Version 1808 is connected to 4Emoji Signature Context Enumeration Proof 1850 and Initialize Variable, [i=0] 1810. Initialize Variable, [i=0] 1810 is connected to Select Question Set 1812. Select Question Set 1812 is connected to Selected Question Set Dictionary 1852 and Bitwise OR Question Sets 1814. Bitwise OR Question Sets 1814 is connected to 4Emoji Signature Context Enumeration Proof 1850 and Increment Variable, [i++] 1816. Increment Variable, [i++] 1816 is connected to Decision 1818.

Decision 1818 is connected to note [i<Question Sets Count] 1820, which illustrates the looping criteria. While i<Question Sets Count, control proceeds to Select Question Set 1812 via Line Segment 1822. When i=Question Sets Count, control proceeds to Save 4Emoji Signature Context Value Proof 1826 via Line Segment 1824. Save 4Emoji Signature Context Value Proof 1826 is connected to 4Emoji Signature Context Value Proof 1854 and Final 1828, illustrating the end of the algorithm. 4Emoji Signature Context Value Proof Algorithm 1800 takes in 4Emoji Signature Algorithm Enumeration 500. 4Emoji Signature Context Value Proof Algorithm 1800 produces 4Emoji Signature Context Enumeration Proof 1850, Selected Question Set Dictionary 1852, and 4Emoji Signature Context Value Proof 1854. Bitwise OR Question Sets 1814 refers to Question Sets 518 in FIG. 5. [i<Question Sets Count] 1820 refers to Number of Question Sets Required 1212 in FIG. 12.

Those skilled in the art will see that 4Emoji Signature Context Value Proof Algorithm 1800 is used by a user to select question sets. Those question sets, risk level, and version produce a 4Emoji Signature Context Value Proof 1854 as an integer.

Figure 19:
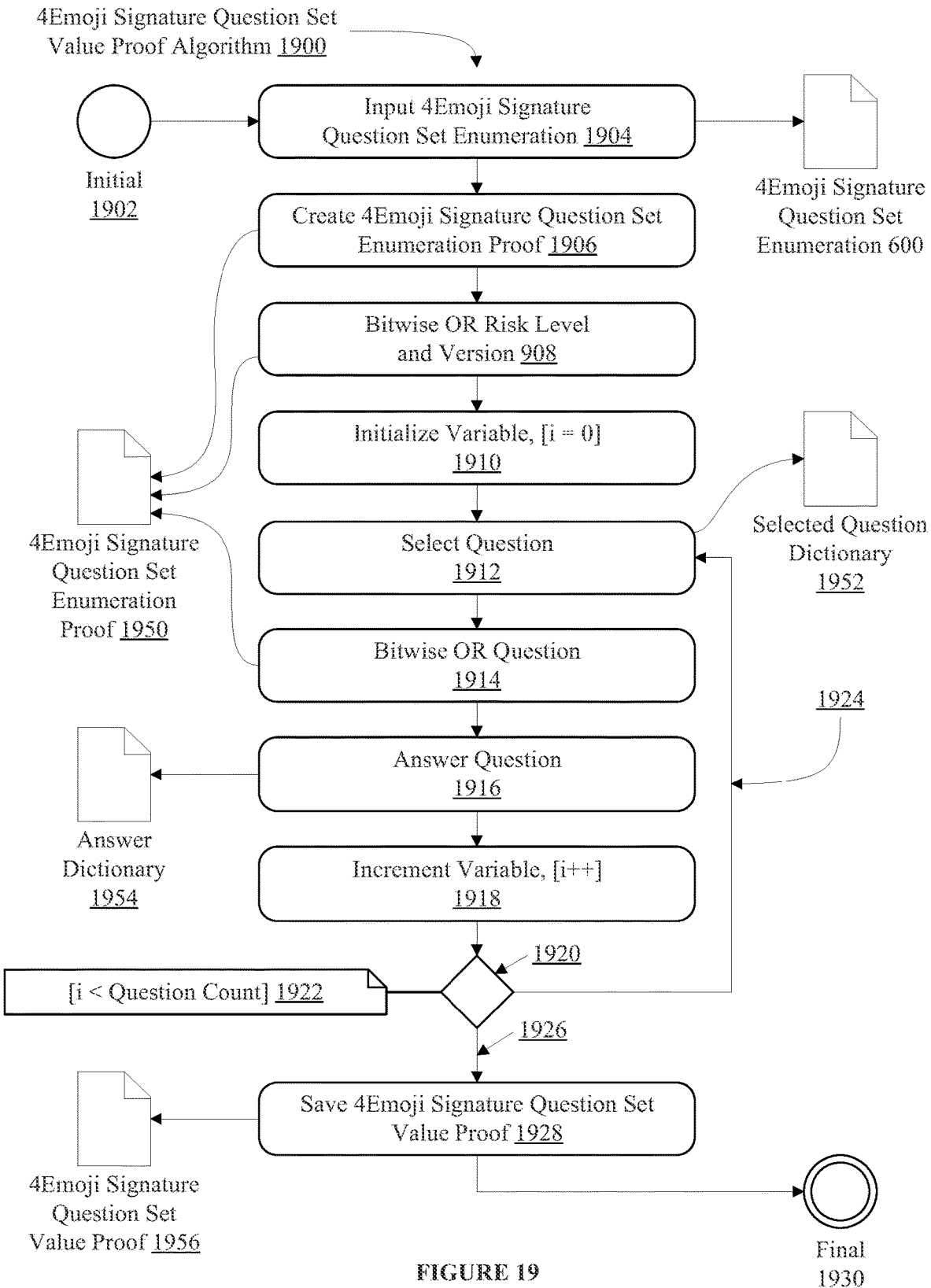
FIG. 19 shows an exemplary 4Emoji Signature Question Set Value Proof Algorithm.

FIG. 19 illustrates 4Emoji Signature Question Set Value Proof Algorithm 1900. The algorithm starts at Initial 1902 which is connected to Input 4Emoji Signature Question Set Enumeration 1904. Input 4Emoji Signature Question Set Enumeration 1904 requires 4Emoji Signature Question Set Enumeration 600 and is connected to Create 4Emoji Signature Question Set Enumeration Proof 1906. Create 4Emoji Signature Question Set Enumeration Proof 1906 is connected to 4Emoji Question Set Enumeration Proof 1950 and Bitwise OR Risk Level and Version 1908. Bitwise OR Risk Level and Version 1908 is connected to 4Emoji Question Set Enumeration Proof 1950 and Initialize Variable, [i=0] 1910. Initialize Variable, [i=0] 1910 is connected to Select Question 1912. Select Question 1912 is connected to Selected Question Dictionary 1952 and Bitwise OR Question 1914. Bitwise OR Question 1914 is connected to 4Emoji Question Set Enumeration Proof 1950 and Answer Question 1916. Answer Question 1916 is connected to Answer Dictionary 1954 and Increment Variable, [i++] 1918. Increment Variable, [i++] 1918 is connected to Decision 1920.

Decision 1920 is connected to note [i<Question Count] 1922, which illustrates the looping criteria. While i<Question Count, control proceeds to Select Question 1912 via Line Segment 1924. When i=Question Count, control proceeds to Save 4Emoji Signature Question Set Value Proof 1928 via Line Segment 1926. Save 4Emoji Signature Question Set Value Proof 1928 is connected to 4Emoji Signature Question Set Value Proof 1956 and Final 1930, illustrating the end of the algorithm.

4Emoji Signature Question Set Value Proof Algorithm 1900 takes in 4Emoji Signature Question Set Enumeration 600. 4Emoji Signature Question Set Value Algorithm 1900 produces 4Emoji Signature Question Set Enumeration Proof 1950, Selected Question Dictionary 1952, and 4Emoji Signature Question Set Value Proof 1956. Bitwise OR Question 1914 refers to Question Set 602 in FIG. 6. [i<Question Count] 1922 refers to Number of Questions Required 1108 in FIG. 11.

Those skilled in the art will see that 4Emoji Signature Question Set Value Proof Algorithm 1900 is used by a user to select questions. These questions, risk level, and version produce a 4Emoji Signature Question Set Value Proof 1928 as an integer.

Figure 20:
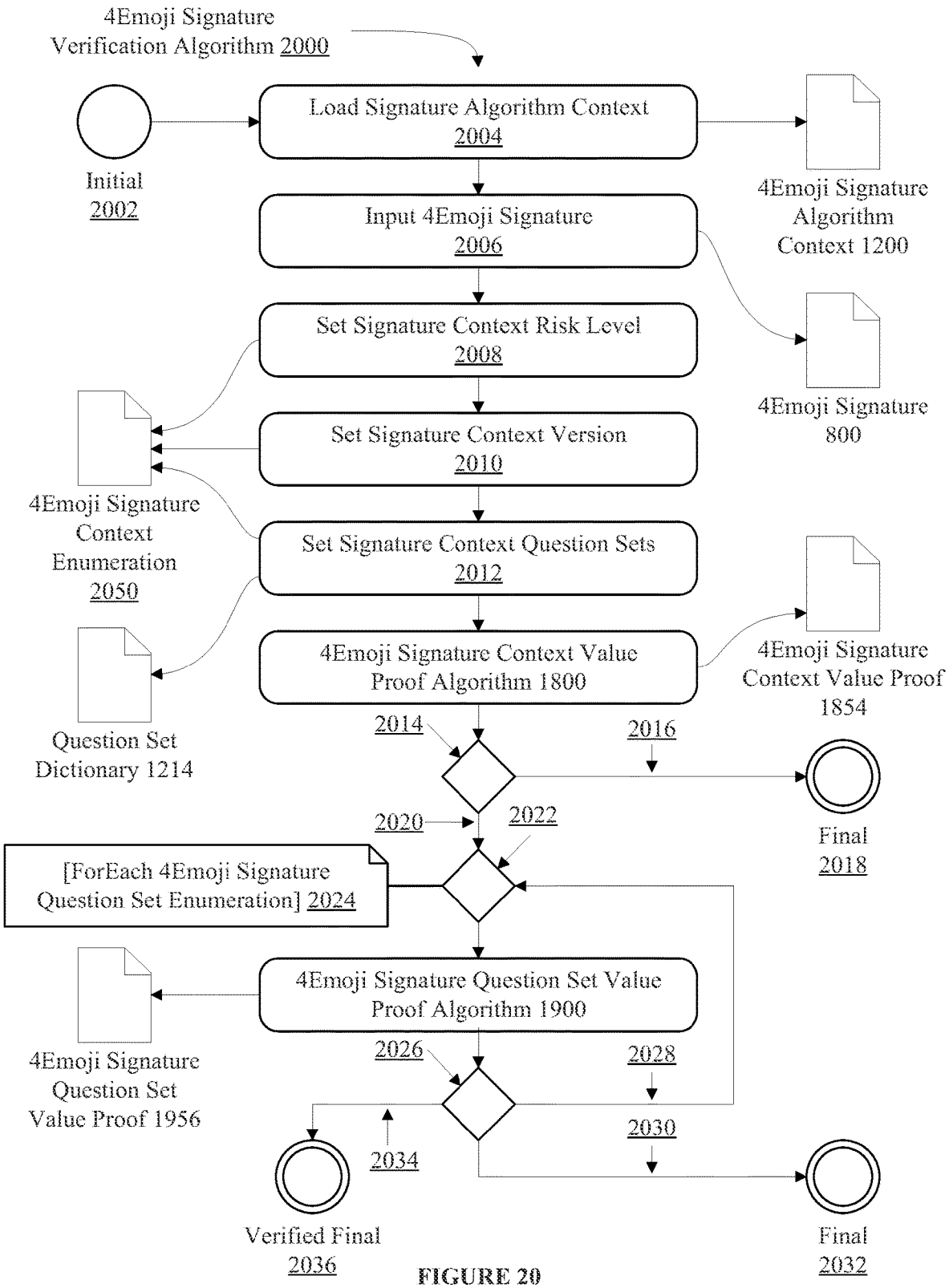
FIG. 20 shows an exemplary 4Emoji Signature Verification Algorithm.

FIG. 20 illustrates 4Emoji Signature Verification Algorithm 2000. The algorithm starts at Initial 2002 which is connected to Load Signature Algorithm Context 2004. Load Signature Algorithm Context 2004 requires 4Emoji Signature Algorithm Context 1200 and is connected to Input 4Emoji Signature 2006. Input 4Emoji Signature 2006 requires 4Emoji Signature 800 and is connected to Set Signature Context Risk Level 2008. Set Signature Context Risk Level 2008 is connected to 4Emoji Signature Context Enumeration 2050 and Set Signature Context Version 2010. Set Signature Context Version 2010 is connected to 4Emoji Signature Context Enumeration 2050 and Set Signature Context Question Sets 2012. Set Signature Context Question Sets 2012 is connected to 4Emoji Signature Context Enumeration 2050, Question Set Dictionary 1214, and 4Emoji Signature Context Value Proof Algorithm 1800. 4Emoji Signature Context Value Proof Algorithm 1800 is connected to 4Emoji Signature Context Proof 1854 and Decision 2014.

Decision 2014 is connected to Final 2018 via Line Segment 2016 and Decision 2022 via Line Segment 2020. Decision 2022 is connected to note [For Each 4Emoji Signature Question Set Enumeration] 2024 and 4Emoji Signature Question Set Value Proof Algorithm 1900. 4Emoji Signature Question Set Value Proof Algorithm 1900 is connected to 4Emoji Signature Question Set Value Proof 1956 and Decision 2026. Decision 2026 is connected to Decision 2022 via Line Segment 2028, Final 2032 via Line Segment 2030, and Verified Final 2036 via Line Segment 2034.

4Emoji Signature Verification Algorithm 2000 is used to verify a user's 4Emoji Signature. The algorithm takes 4Emoji Signature 800 to verify 4Emoji Signature Context Value 526 in FIG. 5 for First Emoji 802 and 4Emoji Signature Question Set Value 610 in FIG. 6 for Second Emoji 804, Third Emoji 806, and Fourth Emoji 808 in FIG. 8. 4Emoji Signature Context Proof Algorithm 1800 is utilized to generate 4Emoji Signature Context Proof 1854.

The expected 4Emoji Signature Context Value 526 is derived from 4Emoji Signature Context Enumeration 2050 (see 4Emoji Signature Context Enumeration 500 in FIG. 5). Decision 2014 determines if the expected 4Emoji Signature Context Value 526 is equal to 4Emoji Signature Context Value Proof 1854. If false, the 4Emoji Signature fails verification as illustrated by Final 2018.

Each of the expected 4Emoji Question Set Values (Second Emoji 804, Third Emoji 306, and Fourth Emoji 808) is derived from 4Emoji Signature Context Enumeration 2050. Decision 2022 determines if each expected 4Emoji Signature Question Set Value 610 is equal to 4Emoji Signature Question Set Value Proof 1956. If any are false, the 4Emoji Signature fails verification as illustrated by Final 2032. If all are true, the 4Emoji Signature passes verification as illustrated by Verified Final 2036.

Those skilled in the art will appreciate that 4Emoji Signature Verification Algorithm 2000 verifies a 4Emoji Signature by determining if the user's choice of question sets and questions matches the signature. A bad actor may acquire a user's 4Emoji Signature, however 4Emoji Signature Verification Algorithm 2000 will verify the signature against the bad actor's input.

Traditional signatures can be easily forged. 4Emoji Signatures significantly reduce the probability of forgery. The versioning of the algorithm, context, question sets, and questions introduces an intended randomness. Changing versions frequently further reduces the probability of a 4Emoji Signature being forged. Those skilled in the art will appreciate the advantage of 4Emoji Signatures over digital signatures as well.

Figure 21:
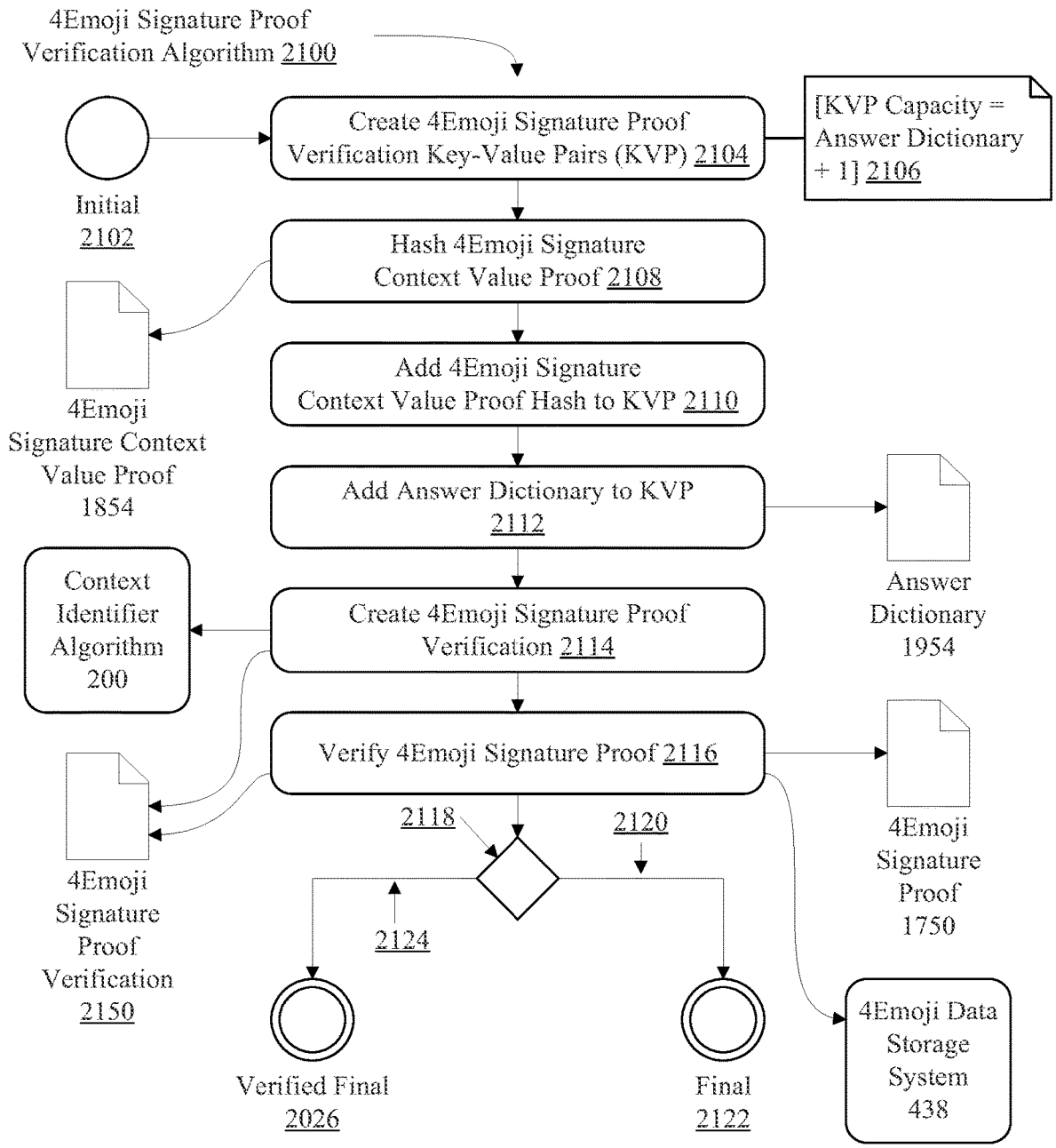
FIG. 21 shows an exemplary 4Emoji Signature Proof Verification Algorithm.

FIG. 21 illustrates 4Emoji Signature Proof Verification Algorithm 2100. The algorithm starts at Initial 2102 which is connected to Create 4Emoji Signature Proof Verification Key-Value Pairs (KVP) 2104. Create 4Emoji Signature Proof Verification Key-Value Pairs (KVP) 2104 is connected to note [KVP Capacity=Answer Dictionary+1] 2106 and Hash 4Emoji Signature Context Value Proof 2108. Hash 4Emoji Signature Context Value Proof 2108 requires 4Emoji Signature Context Value Proof 1854 and is connected to Add 4Emoji Signature Context Value Proof Hash to KVP 2110. Add 4Emoji Signature Context Value Proof Hash to KVP 2110 is connected to Add Answer Dictionary to KVP 2112. Add Answer Dictionary to KVP 2112 requires Answer Dictionary 1954 and is connected to Create 4Emoji Signature Proof Verification 2114. Create 4Emoji Signature Proof Verification 2114 is connected to Context Identifier Algorithm 200, 4Emoji Signature Proof Verification 2150, and Verify 4Emoji Signature Proof 2116. Verify 4Emoji Signature Proof 2116 requires 4Emoji Signature Proof 1750 and is connected to 4Emoji Signature Proof Verification 2150, 4Emoji Data Storage System 438, and Decision 2118. Decision 2118 is connected to Final 2122 via Line Segment 2120. Decision 2118 is also connected to Verified Final 2126 via Line Segment 2124.

4Emoji Signature Proof Verification Algorithm 2100 is used to verify a user's 4Emoji Signature Proof 1750. Those skilled in the art will appreciate that the algorithm utilizes the saved outputs of 4Emoji Signature Context Value Proof Algorithm 1800 in FIGS. 18 and 4Emoji Signature Question Set Value Proof Algorithm 1900 in FIG. 19 for a user's 4Emoji Signature 800 and their inputs in FIG. 8. Specifically, 4Emoji Signature Proof Verification Algorithm 2100 utilizes 4Emoji Signature Context Proof Value 1854, Answer Dictionary 1954, and Context Identifier Algorithm 200 to generate 4Emoji Signature Proof Verification 2150.

The algorithm then retrieves 4Emoji Signature Proof 1750 from 4Emoji Data Storage System 438 to determine if the values of 4Emoji Signature Proof 1750 and 4Emoji Signature Proof Verification 2150 are equal. If the values are equal, then the user's 4Emoji Signature 800 is verified, as illustrated by Verified Final 2026. If the values are not equal, then the user's 4Emoji Signature 800 is not verified, as illustrated by Final 2122.

Those skilled in the art will appreciate that 4Emoji Signature Proof Verification Algorithm 2100 verifies that a stored 4Emoji Signature Proof 1750 (derived by the "originating" user who created the 4Emoji Signature) equals 4Emoji Signature Proof Verification 2150 (derived by an "active" user's answers).

An "active" user as a bad actor may acquire a user's 4Emoji Signature, however the present disclosure, in addition to 4Emoji Signature 800 via 4Emoji Signature Verification Algorithm 2000 in FIG. 20, requires the "active" user to choose questions sets and questions as well as provide answers to the chosen questions to generate 4Emoji Signature Proof Verification 2150. Given the randomness of the version, question sets, questions, paths to questions through dynamic question sets, answers to questions, and answers and activities of dynamic questions, the resulting probability of bad actor's 4Emoji Signature Proof Verification 2150 matching a stored 4Emoji Signature Proof 1750 via 4Emoji Signature Proof Verification Algorithm 2100 is infinitesimal.

Those skilled in the art will appreciate the security advantages of 4Emoji Signature Verification and 4Emoji Signature Proof Verification over traditional usernames and passwords. Using 4Emoji Signature Verification enables verification of the username itself. This enablement, combined with 4Emoji Signature Proof Verification enablement, is revolutionary.

The present disclosure provides users with control and direction over their 4Emoji Signature and 4Emoji Signature Proof. Those skilled in the art will appreciate how engrained users' credentials (e.g., usernames and passwords) are in information systems. Usernames are generally unique and immutable, and for decades, usernames have been combined in directories with their contact details. Changing usernames is often not possible, and if it is possible, the change is a costly function.

In recent years, whole industries have adopted email addresses as usernames, essentially weakening username and password protocols by making the username easily discernable for bad actors. While the introduction of Two Factor Authentication (2FA) has increased security of the creation and use of credentials, it is costly to implement and maintain, difficult for most users to understand, and not foolproof. Furthermore, using email addresses as usernames does not change the current paradigm of limited user control and direction of credentials and credentials being collapsed with contact information.

The present disclosure disrupts the current paradigm. Credentials are now an abstraction where usernames (i.e. 4Emoji Signature) are ephemeral and non-unique while providing users with control and direction over their passwords (i.e. 4Emoji Signature Proof). The resulting benefits are low cost, more security, easy and quick re-credentialing, and the possibility of bifurcating credentials from contact information.

Figure 22:
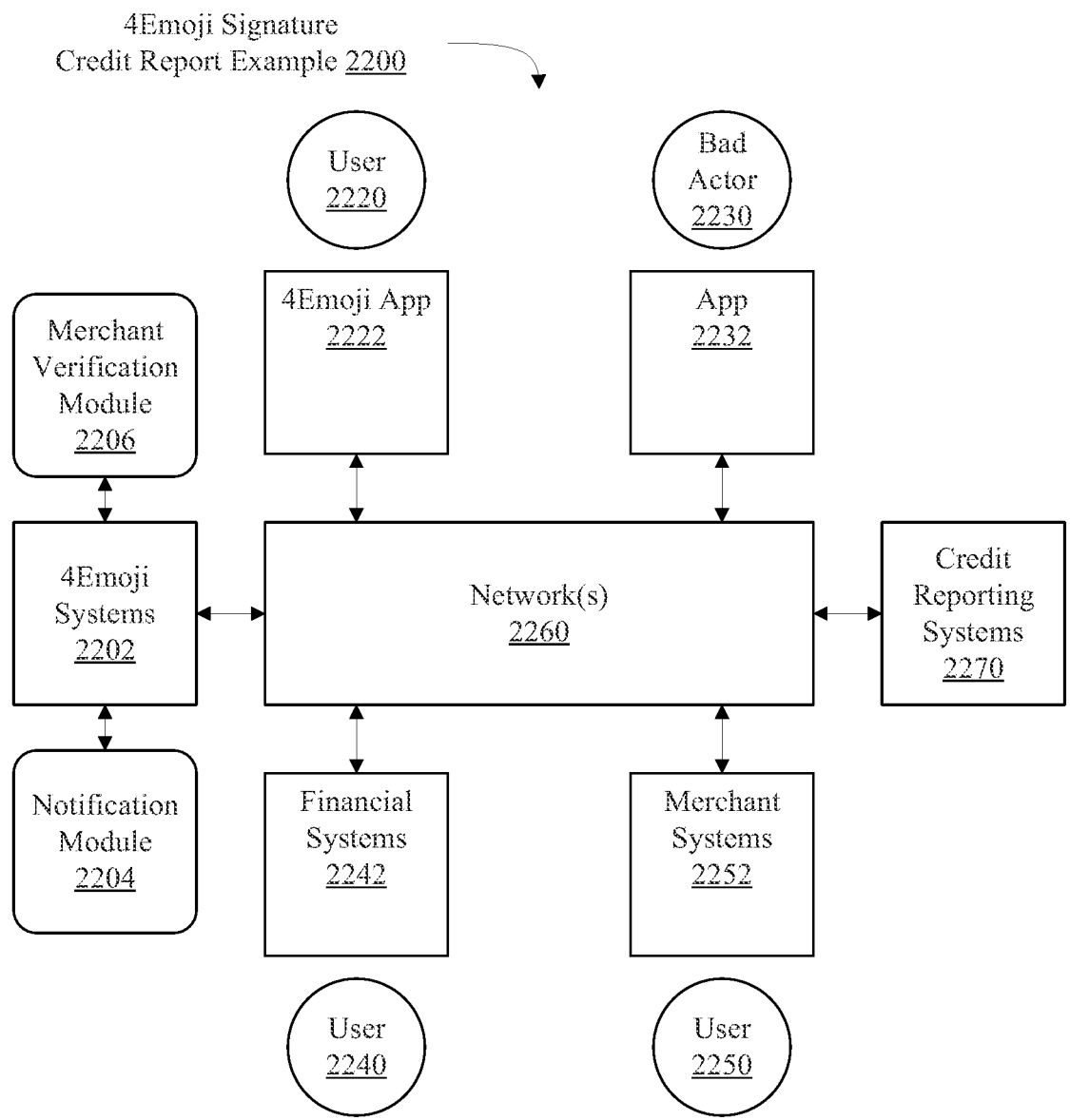
FIG. 22 shows an exemplary 4Emoji Signature Credit Report Example.

FIG. 22 illustrates 4Emoji Signature Credit Report Example 2200. 4Emoji Systems 2202 is connected to Notification Module 2204, Merchant Verification Module 2206, and Network(s) 2260. User 2220 utilizes 4Emoji App 2222 which is connected to Network(s) 2260. Bad Actor 2230 utilizes App 2232 which is connected to Network(s) 2260. User 2240 utilizes Financial Systems 2242 which is connected to Network(s) 2260. User 2250 utilizes Merchant Systems 2252 which is connected to Network(s) 2260. Credit Reporting Systems 2270 is connected to Network(s) 2260.

4Emoji Signature Credit Report Example 2200 also contains 4Emoji Signature Credit Report Example Data 2280 which is comprised of Credit Report Id 2282, 4Emoji Credit Report Verification URL 2284, Merchant Id 2286, Transaction Data 2288, 4Emoji Signature 2290, 4Emoji Signature Proof 2292, and 4Emoji Signature Verification Result 2294. 4Emoji Systems 2202 provides 4Emoji Signature 2290 and 4Emoji Signature Proof 2292 verification by 4Emoji Signature Verification Result 2294.

4Emoji Signature Credit Report Example 2200 illustrates Bad Actor 2230 trying to make a large, fraudulent purchase that requires the merchant (User 2250) to pull a credit report wherein 4Emoji Signature 2290 and 4Emoji Signature Proof 2292 thwart unauthorized use of User 2220's credit report.

User 2220 utilizes 4Emoji Systems 2202 via 4Emoji App 2222 and Network(s) 2260 to generate a credit report customer statement. The statement contains Credit Report Id 2282 which is comprised of Context Identifier 228 in FIGS. 2 and 4Emoji Credit Report Verification URL 2284. User 2220 then places that statement into their credit report(s).

Bad Actor 2230 uses App 2232 and Network(s) 2260 to purchase an automobile from User 2250 utilizing Merchant Systems 2252. Bad Actor 2230 provides Transaction Data 2288 to Merchant Systems 2252. Transaction Data 2288 contains personal identifiable information (PII) for User 2220.

User 2250 utilizes Merchant Systems 2252 to pull User 2220's credit report from Credit Reporting Systems 2270. Unknown to Bad Actor 2230, User 2250 follows the customer statement on User 2220's credit report by browsing to 4Emoji Credit Report Verification URL 2284. User 2250 views the web page on 4Emoji Systems 2202 and follows the instructions to enter in Credit Report Id 2282, Merchant Id 2286, and relevant Transaction Data 2288.

Note that Transaction Data 2288 includes User 2220's PII as well as data about the purchase. If User 2250 does not have Merchant Id 2286, Transaction Data 2288 would also include information about User 2250 so that a Merchant Id can be generated for User 2250. Using Merchant Verification Module 2206, Merchant Id 2286 is issued and verified.

After merchant verification, 4Emoji Systems 2202 sends User 2220 a transaction notification via Notification Module 2204. If User 2220's communications have not been compromised, User 2220 can contact User 2250 as well as authorities to report the fraudulent activity of Bad Actor 2230.

If Bad Actor 2230 has hacked User 2220's email to intercept email notifications or has User 2220's mobile device to intercept SMS notifications, Bad Actor 2230 is instructed to verify their identity via 4Emoji Signature 2290 and 4Emoji Signature Proof 2292. Even if Bad Actor 2230 has User 2220's 4Emoji Signature 2290, they would fail 4Emoji Signature Proof 2292 verification via 4Emoji Signature Verification Result 2294 in 4Emoji Systems 2202— especially since the risk level assigned to this type of purchase is so high.

Following verification failure, User 2220 and User 2250 are notified of the fraudulent activity by Bad Actor 2230. Since 4Emoji Systems 2202 provides real-time interaction for notification and required identity verification, there is no opportunity for Bad Actor 2230 to take advantage of User 2220's compromised communications. Moreover, since 4Emoji Systems 2202 captures all Transaction Data 2288, the fraudulent activity is documented and can be utilized by authorities to hold Bad Actor 2230 accountable for their crime.

The present disclosure can be utilized in similar scenarios where identity needs to be verified, such as employment verification, address verification, government agency verification, etc.—essentially anywhere that a user's identity needs to be verified.

The present disclosure has the potential to end identity theft by enabling individuals and entities to actively participate in transactions requiring identity and identity verification in a way that's not available to them now. Furthermore, 4Emoji Signature Credit Report Example 2200 requires no changes to laws or existing credit reporting processing systems to implement.

Figure 23:
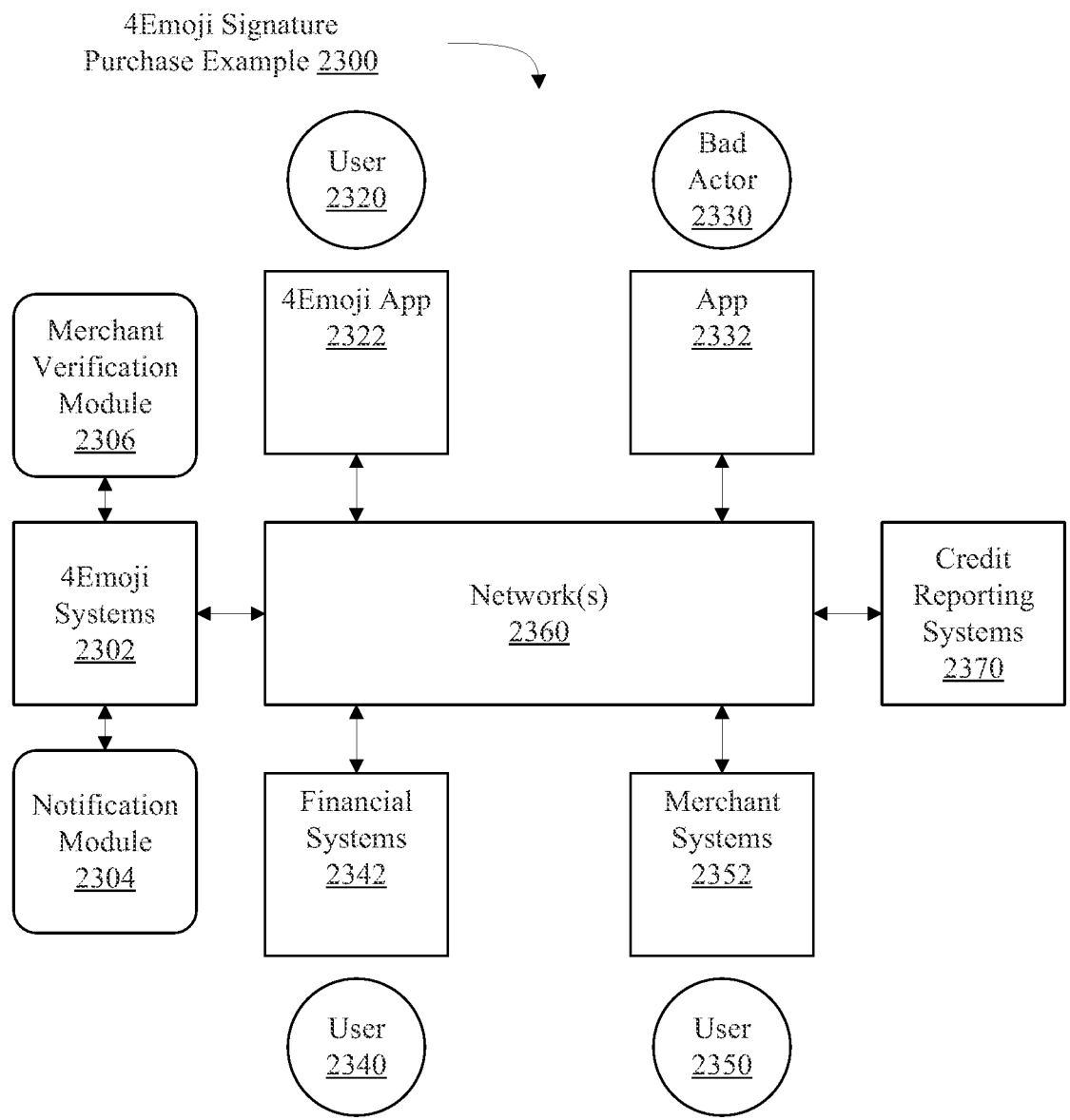
FIG. 23 shows an exemplary 4Emoji Signature Purchase Example.

FIG. 23 illustrates 4Emoji Signature Purchase Example 2300. 4Emoji Systems 2302 is connected to Notification Module 2304, Merchant Verification Module 2306, and Network(s) 2360. User 2320 utilizes 4Emoji App 2322 which is connected to Network(s) 2360. Bad Actor 2330 utilizes App 2332 which is connected to Network(s) 2360. User 2340 utilizes Financial Systems 2342 which is connected to Network(s) 2360. User 2350 utilizes Merchant Systems 2352 which is connected to Network(s) 2360. Credit Reporting Systems 2370 is connected to Network(s) 2360.

4Emoji Signature Purchase Example 2300 also contains 4Emoji Signature Purchase Example Data 2380 which is comprised of Merchant Id 2382, Transaction Data 2384, 4Emoji Signature 2386, 4Emoji Signature Proof 2388, and 4Emoji Signature Verification Result 2390. 4Emoji Systems 2302 provides 4Emoji Signature 2386 and 4Emoji Signature Proof 2388 verification by 4Emoji Signature Verification Result 2390.

4Emoji Signature Purchase Example 2300 illustrates how the present disclosure can be utilized to make any size purchase without a credit card, debit card, or digital device. Consider User 2320 pulls into a gas station to purchase gasoline for their vehicle. User 2320 accesses Merchant Systems 2352 and selects "Pay with 4Emoji" payment option. Merchant Systems 2352 connects to 4Emoji Systems 2302 via Network(s) 2360 and prompts User 2320 to enter in 4Emoji Signature 2386. 4Emoji Systems 2302 then requires User 2320 to generate 4Emoji Signature Proof 2388. Once User 2320 has completed answering their questions, 4Emoji Systems 2302 determines 4Emoji Signature Verification Result 2390. If false, then the transaction is denied. If true, the transaction is approved and the funds for the transaction are debited from User 2320's financial institution.

If Bad Actor 2330 tried to use User 2320's 4Emoji Signature 2386 to fill up their gas tank, it would be highly improbable that Bad Actor 2330 could generate the correct answers required for 4Emoji Signature Proof 2388 and a true 4Emoji Signature Verification Result 2390.

The present disclosure mitigates unauthorized financial transactions by utilizing risk levels as part of the 4Emoji Signature Proof. Note that as purchase price increases, risk level increases, and question and question set randomness increases.

Figure 24:
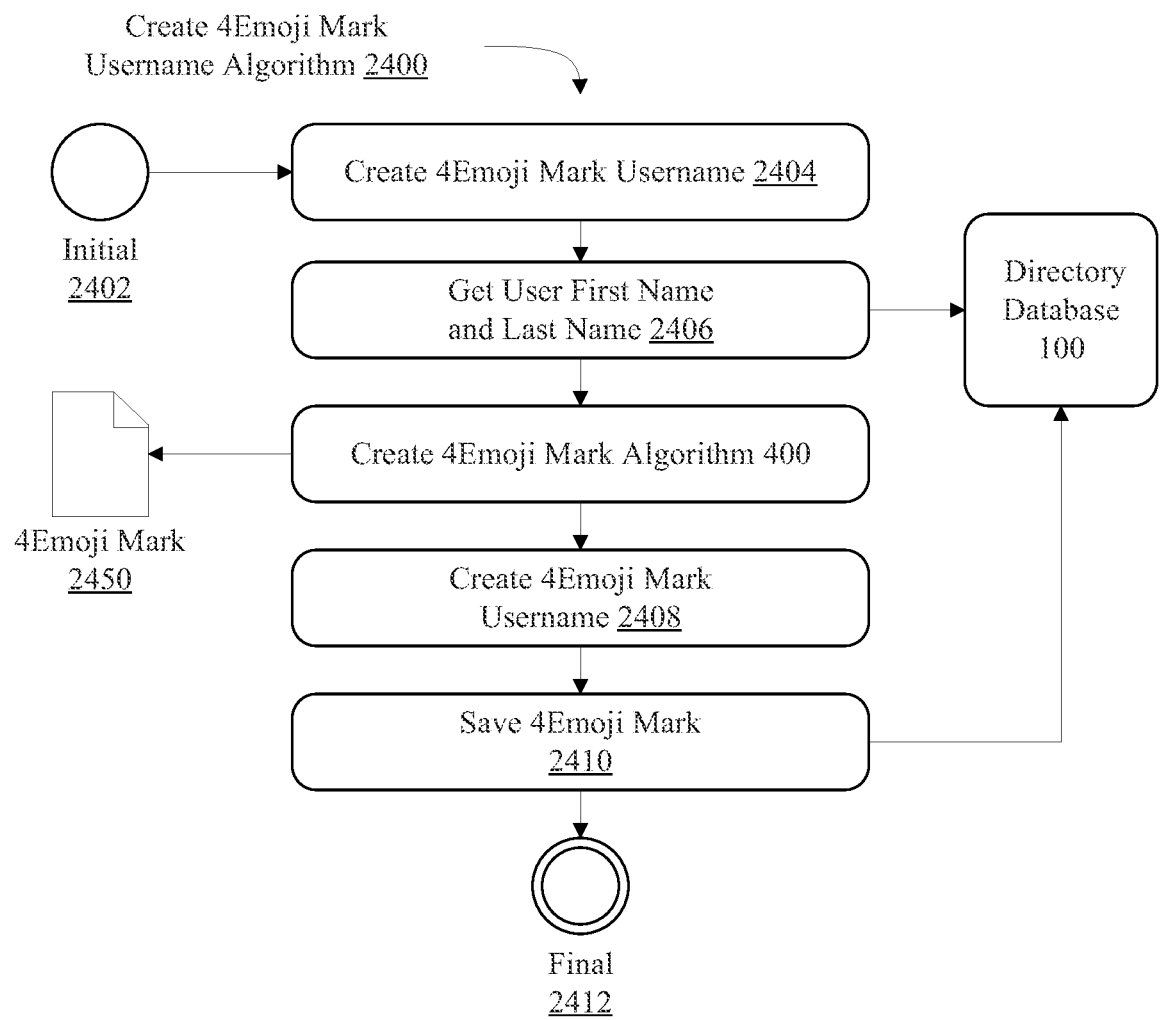
FIG. 24 shows an exemplary Create 4Emoji Mark Username Algorithm.

FIG. 24 illustrates Create 4Emoji Mark Username Algorithm 2400. The algorithm starts at Initial 2402 which is connected to Create 4Emoji Mark Username 2404. Create 4Emoji Mark Username 2404 is connected to Get User First Name and Last Name 2406. Get User First Name and Last Name 2406 is connected to Directory Database 100 and Create 4Emoji Mark Algorithm 400. Create 4Emoji Mark Algorithm 400 is connected to 4Emoji Mark 2450 and Create 4Emoji Mark Username 2408. Create 4Emoji Mark Username 2408 is connected to Save 4Emoji Mark 2410. Save 4Emoji Mark 2410 is connected to Directory Database 100 and Final 2412, illustrating the end of the algorithm. Those skilled in the art will appreciate that Directory Database 100 can be extended to include 4Emoji Mark 2450 (see 4Emoji Mark 340 in FIG. 3).

4Emoji Mark Username 2420 illustrates a user named William Anderson 2424 in combination with First Emoji 2426, Second Emoji 2428, Third Emoji 2430, and Fourth Emoji 2432. In another embodiment, 4Emoji Mark Username 2420 may be prepended with @ 2422.

The present disclosure makes it possible for all users to use their real first and last name as their username. System usernames are required to be unique. By appending 4Emoji Mark 2450 to a user's first name and last name, 4Emoji Mark Username 2420 becomes an immutable and unique username. 4Emoji Mark Username 2420 enables disambiguation for users who have the same first and last name and provides a unique and easily recognizable visual, audio, or tactile identification for a specific user. As such, viewers of usernames can now quickly identify and disambiguate users for attribution of content, credit, acknowledgement, et cetera.

Figure 25:
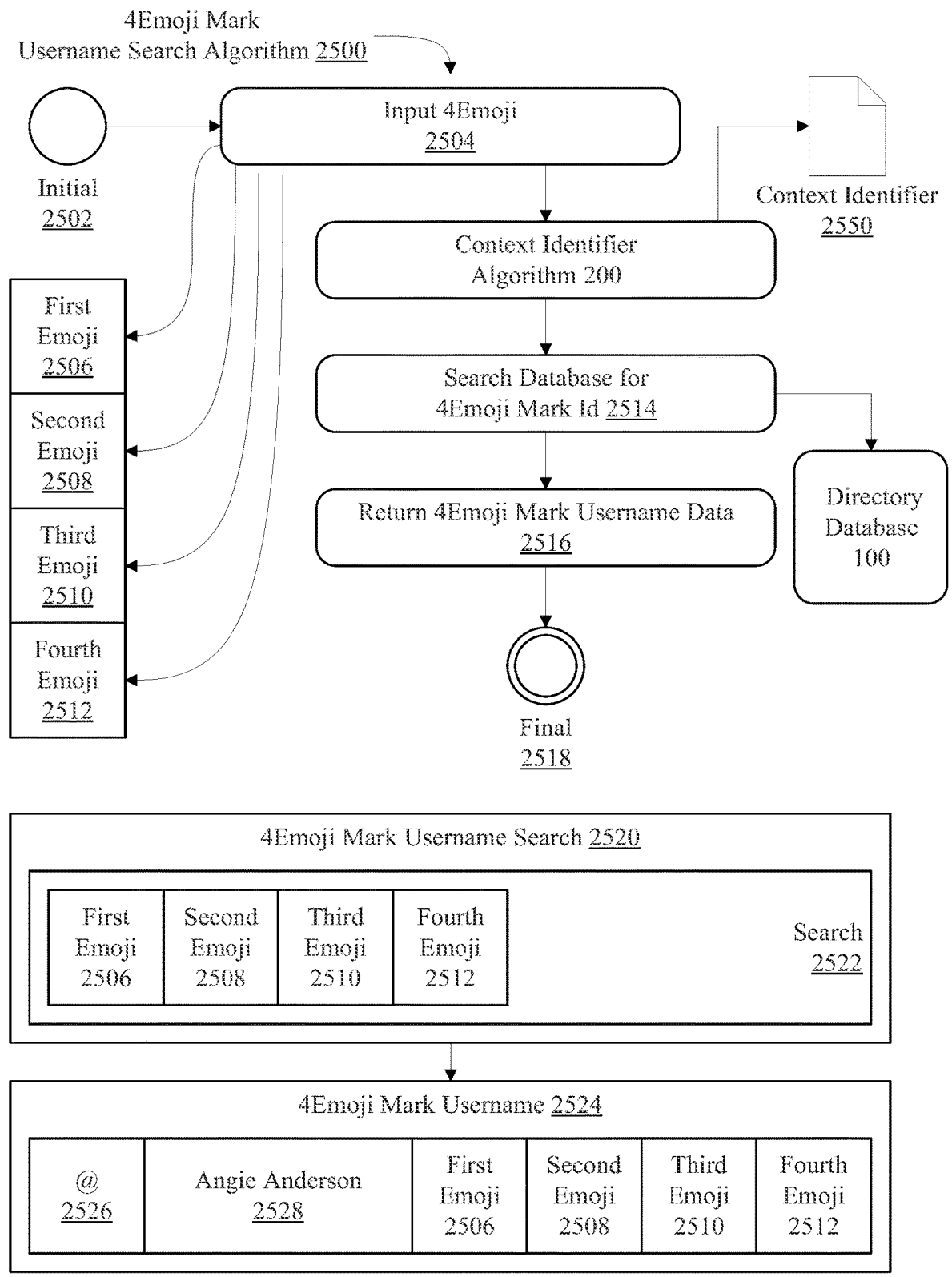
FIG. 25 shows an exemplary 4Emoji Mark Username Search Algorithm.

FIG. 25 illustrates 4Emoji Mark Username Search Algorithm 2500. The algorithm starts at Initial 2502 which is connected to Input 4Emoji 2504. Input 4Emoji 2504 is connected to First Emoji 2506, Second Emoji 2508, Third Emoji 2510, Fourth Emoji 2512 and Context Identifier Algorithm 200. Context Identifier Algorithm 200 is connected to Context Identifier 2550 and Search Database for 4Emoji Mark Id 2514. Search Database for 4Emoji Mark Id 2514 is connected to Directory Database 100 and Return 4Emoji Mark Username Data 2516. Return 4Emoji Mark Username Data 2516 is connected to Final 2518, illustrating the end of the algorithm. Those skilled in the art will appreciate that Directory Database 100 can be extended to include 4Emoji Mark 340 in FIG. 3.

4Emoji Mark Username Search 2520 contains Search 2522 with First Emoji 2506, Second Emoji 2508, Third Emoji 2510, and Fourth Emoji 2512. When Search 2522 is activated, if it has a result, 4Emoji Mark Username 2524 is returned. 4Emoji Mark Username 2524 illustrates a user named Angie Anderson 2528 in combination with First Emoji 2506, Second Emoji 2508, Third Emoji 2510, and Fourth Emoji 2512. In another embodiment, 4Emoji Mark Username 2524 may be prepended with @ 2526.

The present disclosure makes it possible for users to search for one another by 4Emoji. Said another way, 4Emoji are a concise, precise way to search for users in a directory database.

Figure 26:
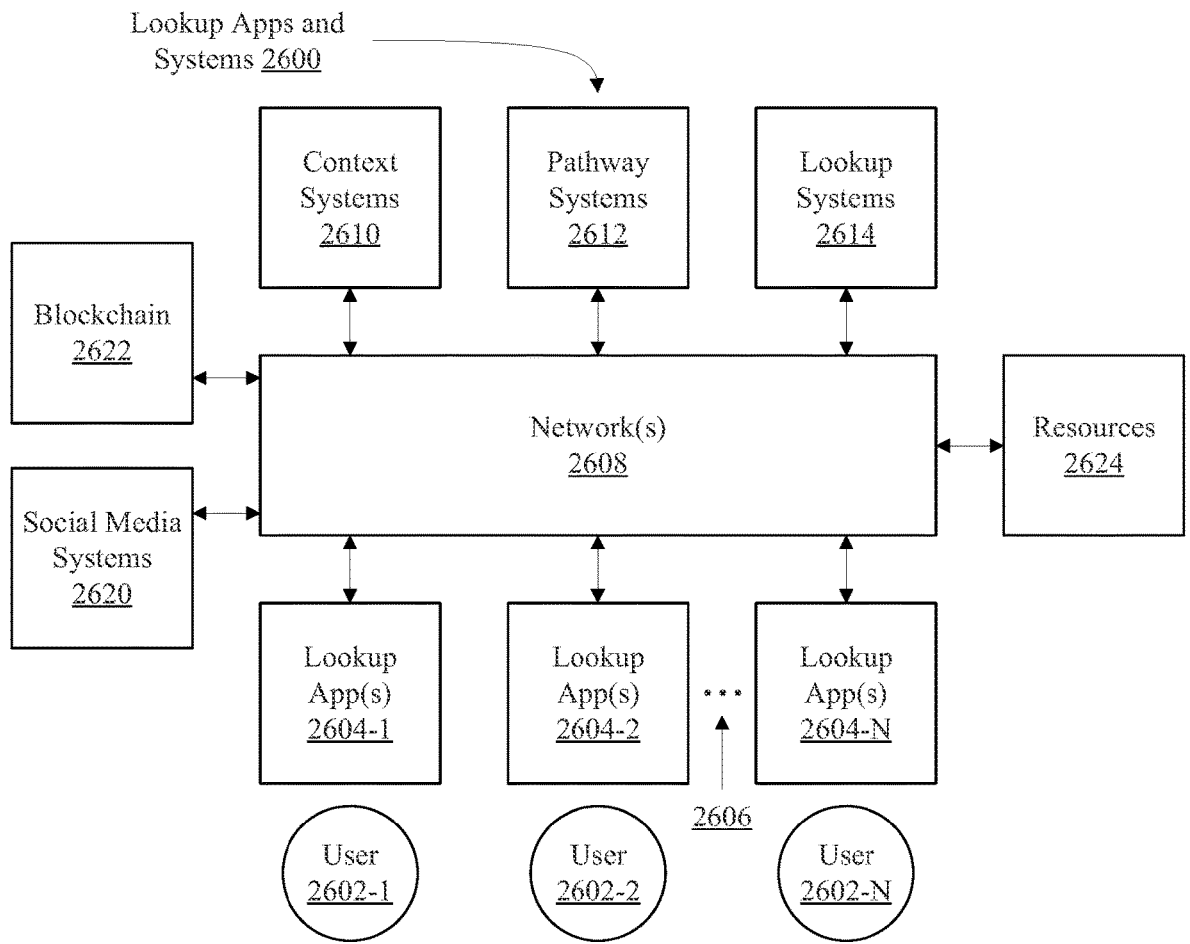
FIG. 26 shows an exemplary Lookup Apps and Systems.

FIG. 26 illustrates Lookup Apps and Systems 2600 where User 2602-1 has Lookup App(s) 2604-1 which connects via Network(s) 2608 to Context Systems 2610, Pathway Systems 2612, Lookup Systems 2614, Social Media Systems 2620, Blockchain 2622, and Resources 2624. User 2602-2 has Lookup App(s) 2604-2, and User 2602-N has Lookup App(s) 2604-N. The ellipse at 2606 between Lookup App(s) 2604-2 and Lookup App(s) 2604-N illustrates that there are N number of lookup apps for every user on the network. Every lookup app is connected via Network(s) 2608 to Context Systems 2610, Pathway Systems 2612, Lookup Systems 2614, Social Media Systems 2620, Blockchain 2622, and Resources 2624.

Lookup Apps and Systems 2600 is a systems architecture diagram comprised of various networks, apps and systems. Resources 2624 illustrates systems and resources such as web servers, APIs, CDNs, etc. available through Networks(s) 2608. User 2602-1, User 2602-2, and User 2602-N illustrate users interfacing with their respective Lookup App(s) 2604-1, Lookup App(s) 2604-2, and Lookup App(s) 2604-N. These apps interface with back office systems, namely Content Systems 2610, Pathway Systems 2612, and Lookup Systems 2614. In one embodiment, the apps and back office systems interact over Network(s) 2608. In another embodiment, the back-office systems are integrated in the app. Both embodiments interface with Social Media Systems 2620, Blockchain 2622, and Resources 2624 over Network(s) 2608.

FIG. 27 illustrates Context Item 2700, Context Item 2710, Context Item Dictionary 2720, Context Item Dictionary 2730, and Context Expression Enumeration 2740. Context Item 2700 contains Context Key 2702 and Context Value 2704. Context Item 2710 contains Generated Context Key 2712 and Context Value 2704. Context Item Dictionary[5] 2720 contains Context Key 2702 and Context Value 2704. Context Item Dictionary 2730 contains Generated Context Key 2712 and Context Value 2704. Context Expression Enumeration 2740 contains None 2742, User Template 2744, Generated Template 2746, Simple 2748, Complex 2750, and Prefix 2752.

[5] "Dictionary Class (System.Collections.Generic)." Technical Documentation, API, and Code Examples|Microsoft Docs, docs.microsoft.com/en-us/dotnet/api/system.collections.generic.dictionary-2.

In one embodiment, Context Key 2702 and Context Value 2704 illustrate a string[6] derived from one or more characters[7,8]. In another embodiment, Context Key 2702 and Context Value 2704 illustrate Emoji 302 in FIG. 3. Generated Context Key 2712 illustrates a generated string. Context Item 2700 and Context Item 2710 represent Key-Value Pairs.[9]

[6] "String Class (System)." Technical Documentation, API, and Code Examples|Microsoft Docs, docs.microsoft.com/en-us/dotnet/api/system.string.
[7] "Glossary of Unicode Terms." Unicode Consortium, unicode.org/glossary/#character.
[8] "Character encoding." Wikipedia, Wikimedia Foundation, 2019, en.wikipedia.org/wiki/Character_encoding.
[9] "KeyValuePair Struct (System.Collections.Generic)." Microsoft Docs, docs.microsoft.com/en-us/dotnet/api/system.collections.generic.keyvaluepair-2?view=netcore-3.1.

Context Item Dictionary 2720 is a dictionary of Context Key 2702 and Context Value 2704 KVP. Context Item Dictionary 2730 is a dictionary of Generated Context Key 2712 and Context Value 2704 KVP. Context items in Context Item Dictionary 2720 and Context Item Dictionary 2730 represent Input Key-Value Pairs (KVP) 204 as input into Context Identifier Algorithm 200 in FIG. 2; furthermore, when Emoji 302 in FIG. 3 is utilized for Context Key 2702 and Context Value 2704, Emoji Id 304, Emoji Code 310 or Emoji Context Id 312 from FIG. 3 may be used as values for KVP. Context Expression Enumeration 2740 illustrates an enumeration type[10] which could be extended and is not limited to the exemplified elements.

[10] "Enumeration Types—C# Reference." Technical Documentation, API, and Code Examples|Microsoft Docs, docs.microsoft.com/en-us/dotnet/csharp/language-reference/builtin-types/enum.

FIG. 28 illustrates Context Expression 2800, Context Expression Collection[11] 2840, and Context Expression Collections 2850. Context Expression 2800 contains Context Expression Id 2802, Context Item Dictionary 2720, Context Item Key Collection[12] 2806, Context Expression Key Text 2808, Context Expression Text 2810, Context Expression Type 2812, Context Item Value Collection[13] 2814, Context Expression Value Text 2816, and Context Expression Prefix Dictionary 2818. Context Expression Collection 2840 contains Context Expression 2800. Context Expression Collections 2850 contains Context Expression Collection 2840.

[11] "Collections (C#)." Technical Documentation, API, and Code Examples|Microsoft Docs, docs.microsoft.com/en-us/dotnet/csharp/programming-guide/concepts/collections.

[12] "Dictionary.KeyCollection Class (System.Collections.Generic)." docs.microsoft.com/en-us/dotnet/api/system.collections.generic.dictionary-2.keycollection.

[13] "Dictionary.ValueCollection Class (System.Collections.Generic)." docs.microsoft.com/en-us/dotnet/api/system.collections.generic.dictionary-2.valuecollection.

A "subject" is defined as "that which forms or is chosen as the matter of thought, consideration, or inquiry."[14] A "context expression" is defined as an expression[15] that conveys[16] attributive[17] context[18][19] for a subject. An "actionable context expression" is defined as an expression that conveys actionable[20] attributive context for a subject. When the phrase "context expression" is used, it refers to the context expression and actionable context expression definitions specified here in addition to Context Expression 2800, its constituent parts, and any derivatives thereof.

[14] "subject, n." OED Online, Oxford University Press, March 2020, www.oed.com/viewdictionaryentry/Entry/192686. Accessed 23 Apr. 2020.

[15] "expression, n." OED Online, Oxford University Press, December 2019, www.oed.com/view/Entry/66747. Accessed 18 Jan. 2020.

[16] "convey, v.1." OED Online, Oxford University Press, March 2020, www.oed.com/viewdictionaryentry/Entry/40805. Accessed 16 Apr. 2020.

[17] "attributive, adj. and n." OED Online, Oxford University Press, March 2020, www.oed.com/view/Entry/12939. Accessed 16 Apr. 2020.

[18] "context, n." OED Online, Oxford University Press, December 2019, www.oed.com/view/Entry/40207. Accessed 18 Jan. 2020.

[19] "Context." Literary Devices, 29 Dec. 2016, literarydevices.net/context. Accessed 18 Jan. 2020.

[20] "actionable, adj." OED Online, Oxford University Press, March 2020, www.oed.com/view/Entry/1941. Accessed 16 Apr. 2020.

Context Expression Id 2802 illustrates an identifier of Context Expression 2800. In one embodiment, Context Item Dictionary 2720 is a dictionary of Context Item 2700 in FIG. 27 that make up the constituent elements or parts of a context expression. In another embodiment, Context Item Dictionary 2730 in FIG. 27 is a dictionary of Context Item 2710 in FIG. 27 that make up the constituent elements or parts of a context expression and is used in place of Context Item Dictionary 2720. The phrase "context item dictionary" refers to both Context Item Dictionary 2720 and Context Item Dictionary 2730.

Context Item Key Collection 2806 is a collection of keys in a context item dictionary. Context Expression Key Text 2808 is a string representation of the keys in Context Expression Key Collection 2806. Context Expression Text 2810 is a string representation of the KVP in content item dictionary. Context Expression Type 2812 is the type of context expression (an instance of Context Expression Enumeration 2740 in FIG. 27). Context Item Value Collection 2814 is a collection of the values in content item dictionary. Context Expression Value Text 2816 is a string representation of the values in Context Item Value Collection 2814. Context Expression Prefix Dictionary 2818 is a dictionary that contains one or more Emoji 302 in FIG. 3 or its derived types. The key for each KVP in Context Expression Prefix Dictionary 2818 is auto generated using integers; the keys starting with one and incremented by one for each KVP added to the dictionary.

Context Expression Collection 2840 is a collection type used to work with one or more Context Expression 2800, and Context Expression Collections 2850 is a collection type used to work with one or more Context Expression Collection 2840.

Figure 29:
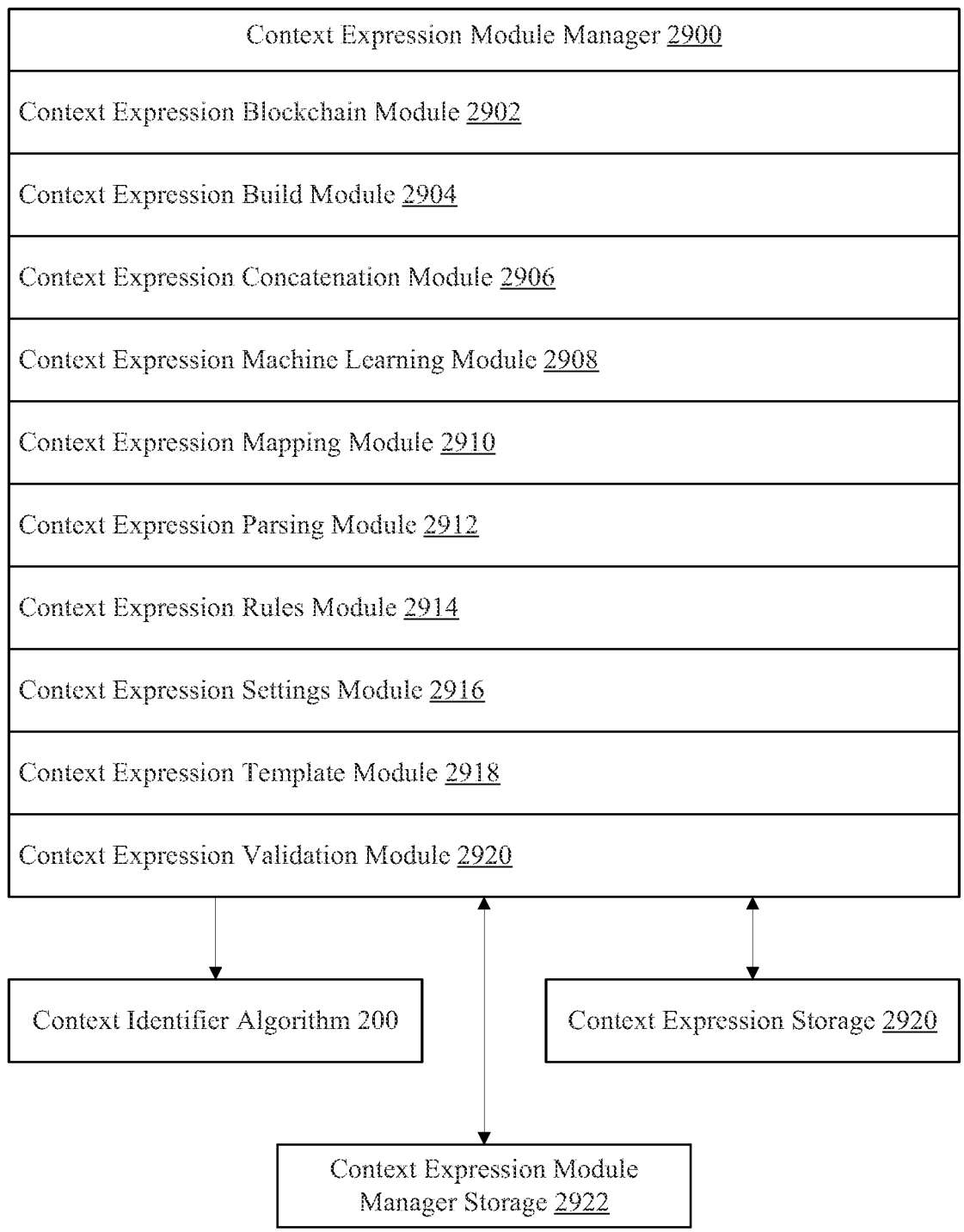
FIG. 29 shows an exemplary Context Expression Module Manager.

FIG. 29 illustrates Context Expression Module Manager 2900 which is composed of Context Expression Blockchain Module 2902, Context Expression Build Module 2904, Context Expression Concatenation Module 2906, Context Expression Machine Learning Module 2908, Context Expression Mapping Module 2910, Context Expression Parsing Module 2912, Context Expression Rules Module 2914, Context Expression Settings Module 2916, Context Expression Template Module 2918, and Context Expression Validation Module 2920. Context Expression Module Manager 2900 is connected to Context Identifier Algorithm 200, Context Expression Storage 2920, and Context Expression Module Manager Storage 2922.

Context Expression Module Manager 2900 illustrates the functionality and logic to manage context expressions, modules, and algorithms. It illustrates modular functionality to build, validate, parse, concatenate, and map context expressions. It exemplifies the modular functionality to create, read, update, and delete data of context expressions. It also illustrates modular functionality for context expression integration with blockchain and machine learning. Finally, it exemplifies that modules also have the functionality to manage context expressions, modules, and algorithm settings.

Context Expression Blockchain Module 2902 illustrates functionality and logic for context expression integration with blockchain. It exemplifies functionality to create, read, update, and delete context expression blockchain data as well as the logic for context expression blockchain management.

Context Expression Build Module 2904 illustrates functionality and logic to build context expressions. It exemplifies functionality to create, read, update, and delete context expression data as well as the logic for context expression build management. It illustrates context expression build integration functionality for blockchain and machine learning. Context Expression Build Module 2904 also contains all the functionality and logic to build emoji (see, Emoji 302 in FIG. 3) as a part of a context expression (see, Context Key 2702 and Context Value 2704 in FIG. 27). It exemplifies functionality to create, read, update, and delete emoji data as part of a context expression as well as the logic for emoji build management as part of a context expression.

Context Expression Concatenation Module 2906 illustrates concatenation functionality and logic for context expressions.

Context Expression Machine Learning Module 2908 illustrates functionality and logic for context expression integration with machine learning. It exemplifies functionality to create, read, update, and delete context expression machine learning data as well as the logic for context expression machine learning management.

Context Expression Mapping Module 2910 illustrates mapping functionality and logic for working with context expressions.

Context Expression Parsing Module 2912 illustrates parsing functionality and logic for working with context expressions. Furthermore, Context Expression Parsing Module 2912 illustrates functionality for parsing query and programming language in context expressions.

Context Expression Rules Module 2914 illustrates functionality and logic for business rule, decision definition, and predictive modeling creation as well as utilization, notification, reporting, and management for context expressions. It exemplifies functionality to create, read, update, and delete business rule, decision definition, and predictive modeling data for context expressions. Furthermore, Context Expression Rules Module 2914 illustrates functionality for defining business rules for language inclusion and exclusion in context expressions.

Context Expression Settings Module 2916 exemplifies functionality and logic to create, read, update, and delete context expression settings data as well as the logic for context expression settings management.

Context Expression Template Module 2918 illustrates functionality and logic for template creation, utilization, notification, reporting, and management for context expressions. It exemplifies functionality to create, read, update, and delete template data for context expressions.

Context Expression Validation Module 2920 illustrates validation functionality and logic for working with context expressions. Furthermore, Context Expression Validation Module 2920 illustrates functionality for validating language use in context expressions.

Context Identifier Algorithm 200 illustrates the Context Identifier Algorithm 200 in FIG. 2. Context Identifier Algorithm Context Expression Storage 2920 and Context Expression Module Manager Storage 2922 illustrate data storage systems such as a database. Context Expression Module Manager 2900 and its constituent parts, as well as any derivatives thereof, may access and utilize Context Identifier Algorithm 200, Context Expression Storage 2920 and Context Expression Module Manager Storage 2922.

Figure 30:
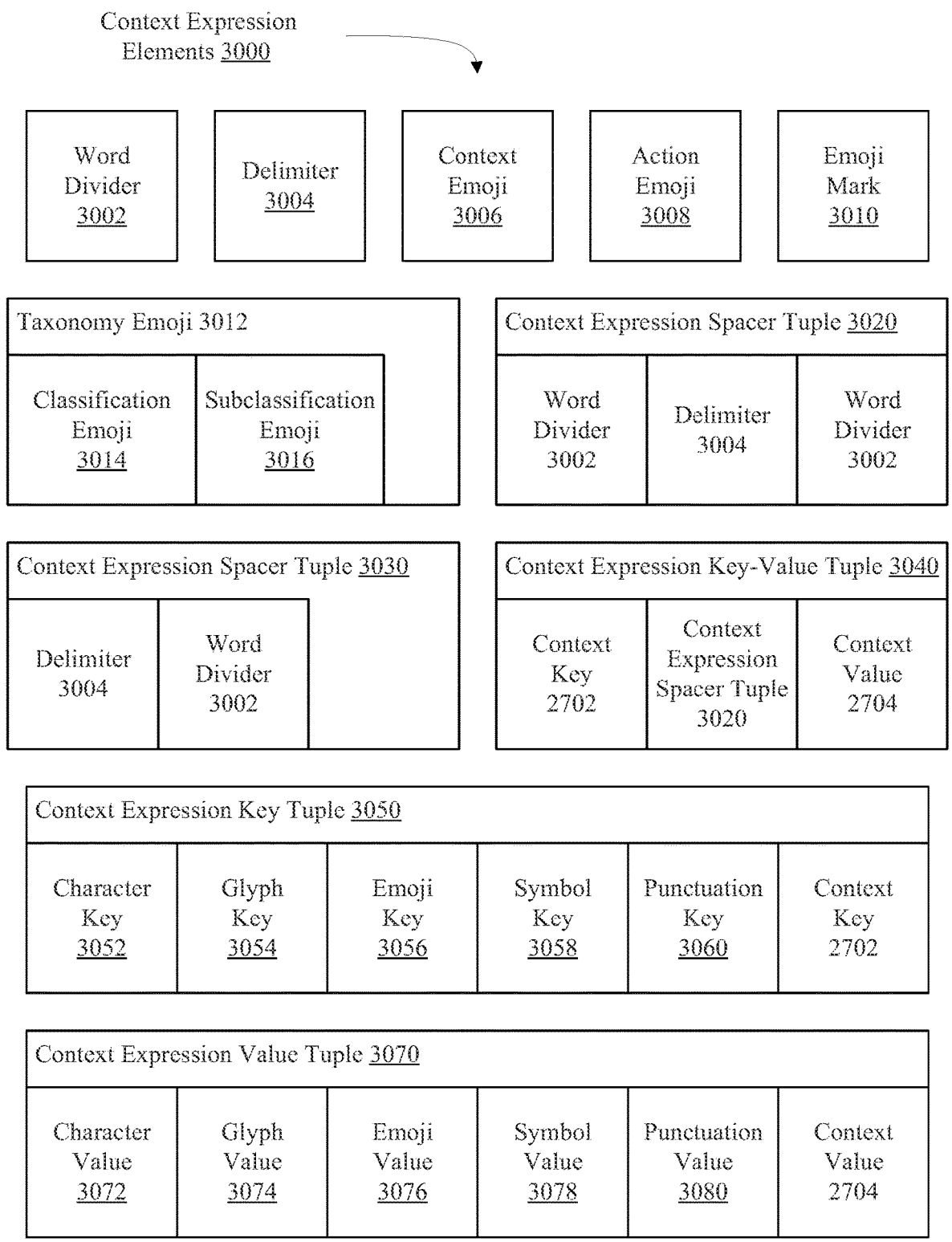
FIG. 30 shows exemplary Context Expression Elements.

FIG. 30 illustrates Context Expression Elements 3000 which is composed of Word Divider 3002, Delimiter 3004, Context Emoji 3006, Action Emoji 3008, Emoji Mark 3010, Taxonomy Emoji 3012, Context Expression Spacer Tuple 3020, Context Expression Spacer Tuple 3030, Context Expression Key-Value Tuple 3040, Context Expression Key Tuple 3050, and Context Expression Value Tuple 3070.

Taxonomy Emoji 3012 contains Classification Emoji 3014 and Subclassification Emoji 3016. Context Expression Spacer Tuple 3020 contains Word Divider 3002, Delimiter 3004, and Word Divider 3002. Context Expression Spacer Tuple 3030 contains Delimiter 3004 and Word Divider 3002. Context Expression Key-Value Tuple 3040 contains Context Key 2702, Context Expression Spacer Tuple 3020, and Context Value 2704. Context Expression Key Tuple 3050 contains Character Key 3052, Glyph Key 3054, Emoji Key 3056, Symbol Key 3058, Punctuation Key 3060, and Context Key 2702. Context Expression Value Tuple 3070 contains Character Value 3072, Glyph Value 3074, Emoji Value 3076, Symbol Value 3078, Punctuation Value 3080, and Context Value 2704.

Context Expression Elements 3000 illustrate the composition and combination of context expression elements. Word Divider 3002 illustrates a word divider[21] as an element that may be used in a context expression. In one embodiment, a word divider element may be denoted as a character such as, but not limited to, a space or interpunct. In another embodiment, a word divider may be denoted by an emoji (see, Emoji 302 in FIG. 3).

[21] "Word divider." Wikipedia, Wikimedia Foundation, 2019, en.wikipedia.org/Word_divider.

Delimiter 3004 illustrates a delimiter[22] as an element that may be used in a context expression. In one embodiment, a delimiter element may be denoted as a character such as, but not limited to, a comma, colon, right angle bracket, vertical bar, or forward slash used "for specifying the boundary between separate, independent regions in plain text."[23] In another embodiment, a delimiter may be denoted by an emoji (see, Emoji 302 in FIG. 3).

[22] "Delimiter." Wikipedia, Wikimedia Foundation, 2019, en.wikipedia.org/Delimiter.
[23] "Delimiter." Wikipedia, Wikimedia Foundation, 2019, en.wikipedia.org/Delimiter.

Emoji shortcodes[24] represent an emoji in text. For example, consider an "example" emoji that is a derived type of Emoji 302 in FIG. 3. The shortcode for "example" emoji would be ":example:". Each emoji that represents a count noun has both a singular and plural form. Hence, the count noun form of an "example" emoji is the "examples" emoji represented by the plural form shortcode of ":examples:".

[24] "Emoji Shortcodes." Emojipedia—Home of Emoji Meanings, emojipedia.org/shortcodes. Accessed 29 Apr. 2020.

Context Emoji 3006 illustrates a context emoji, derived from Emoji 302 in FIG. 3, that is used to convey attributive context for a context expression. The following examples illustrate derived types of Context Emoji 3006 which include, but are not limited to, advertisement, art, article, book, business, classified, culture, data, dining, directory[25], drinking, economy, editorial, education, energy, engineering, entertainment, entry, event, food, gardening, geography, government, happening, health, history, holiday, humanities, industry, international, job, knowledge, information, language, law, letter, life, listing, locality[26], media, math, meeting, mention, military, movie, music, nature, news, national, notice, opinion, organization, people, philosophy, Pinx, pinxit, policy, politics, property, reference, religion, research, review, result, science, showtime, society, sport, setting, social, taxonomy[27], technology, temporality[28], ticket, travel, variety, weather, website, wellbeing, world. Each of the context emoji illustrated here may also be represented by a shortcode (e.g. "humanities" as ":humanities:" and "book" as ":book:") and where applicable the plural shortcode (e.g., "books" as:books:"). Context emoji may convey a context that is broad or specific. For example, consider a context emoji that conveys business in general, versus one that conveys a type of business, such as landscapers, versus one that conveys a specific business, such as a specific restaurant.

[25] "directory, n." OED Online, Oxford University Press, March 2020, www.oed.com/viewdictionaryentry/Entry/53319. Accessed 21 Apr. 2020.
[26] "locality, n." OED Online, Oxford University Press, December 2019, www.oed.com/view/Entry/109556. Accessed 7 Feb. 2020.
[27] "taxonomy, n." OED Online, Oxford University Press, December 2019, www.oed.com/viewdictionaryentry/Entry/198305. Accessed 14 Feb. 2020.
[28] "temporality, n." OED Online, Oxford University Press, March 2020, www.oed.com/view/Entry/198948. Accessed 19 Apr. 2020.

Action Emoji 3008 illustrates an action emoji that may be used to convey actionable attributive context for a context expression. The following examples illustrate derived types of Action Emoji 3008 which include, but are not limited to, acknowledge, add, aloud, announce, accept, apply, associate, attribute, bid, block, book, bookmark, bridge, brighten, buy, call, cancel, change, check, cite, classify, close, configure, comment, compare, compile, copy, configure, count, create, cut, decline, delete, dim, disconnect, display, divide, do, draft, edit, end, execute, file, find, forward, get, give, go, group, highlight, hold, how, if, ignore, in, inform, insert, is, invite, last, link, locate, lookup, make, map, mark, markup, mask, mention, move, multiply, next, new, note, notify, off, on, open, options, order, out, page, page-down, page-up, pause, paste, ping, pinxit, pitstop, play, previous, prompt, print, purchase, query, rate, read, recall, recommend, redial, redo, reference, reject, remove, remind, rename, reply, restrict, review, route, run, save, schedule, screencap, scroll, sell, send, set, setup, share, shortcut, show, showtime, shuffle, shutdown, skip, sort, space, start, stop, subtract, sum, switch, tab, tag, take, takeout, tell, then, trace, track, translate, turn, turn-off, turn-on, undo, update, view, what, when, where, which, while, who, why, write, zoom. Each of the action emoji illustrated here may also be represented by a shortcode (e.g. "zoom" as ":zoom:") or where applicable by a plural shortcode (e.g., "sells" as ":sells:").

Context Emoji 3006 and Action Emoji 3008 may be used as a parent types to derive other types. As an example, an emoji may be derived from Context Emoji 3006 for each of the named constants in Expression Enumeration 2740 in FIG. 27.

An exemplary embodiment is a system that enables the creation and utilization of emoji for named constants in enumerated types.

Emoji Mark 3010 is derived from 4Emoji Mark 340 in FIG. 3 with the improvement of utilizing a dynamic set of emoji (see, Emoji 302 in FIG. 3) where the capacity is automatically increased or decreased as required.

An exemplary enablement is that Emoji Mark 3010 can be utilized with less or more permutations and combinations as required, making the various exemplary embodiments disclosed herein much more versatile. Emoji Mark 3010 could be utilized for part numbers, serial numbers, model numbers, and SKUs. Emoji Mark 3010 could be utilized to represent one or more of each Context Emoji 3006, Action Emoji 3008, and Taxonomy Emoji 3012, as well as Classification Emoji 3014 and Subclassification Emoji 3016. Emoji Mark 3010 could be utilized for stickers or labels for business cards, windows, products, etc. Optical emoji recognition could be used to locate Emoji Mark 3010 to provide information about the subject of Emoji Mark 3010 as well as opportunities for engagement. Each emoji recognized in Emoji Mark 3010 could be hashed to facilitate emoji recognition. Date and/or time could be added to Emoji Mark 3010 to ascribe a temporality context. This would assist in use cases where a temporality context would inform the use of the mark for industrial purposes (e.g. perishable food inventory).

Emoji Mark 3010 further extends the functionality of 4Emoji Mark 340 in FIG. 3 by providing "emoji sentiment," that is, the functionality providing users with the ability to convey sentiment as an attributive context for a context expression. Emoji Mark Sentiment Id 358 in FIG. 3 is the identifier of the specific sentiment conveyed by 4Emoji Mark 340.

In another embodiment, Emoji Mark 3010 can be used for email addresses. The present disclosure utilizes Unicode codepoints to represent the visual emoji in an email address. An exemplary enablement is that Emoji Mark 3010 could be appended to a user's name, allowing the user to use their real name while being disambiguated from other users with the same name and email domain. Emoji shortcodes and Unicode code points illustrate emoji in the local-part[29] of the following email addresses:

[29] "Email Address." Wikipedia, the Free Encyclopedia, Wikimedia Foundation, Inc, 12 Aug. 2003, en.wikipedia.org/wiki/Email_address#Local-part. Accessed 1 May 2020.

Emoji Mark 3010 Email Address Example 1:
"william.thomson.:grinning:.:cactus:.:rocket:.:milky_way:@some_domain.com"

Emoji Mark 3010 Email Address Example 2:
"william.thomson.U+1F600.U+1F335.U+1F680.U+1F30C@some_domain.com"

Emoji Mark 3010 Email Address Example 3:
"william.thomson#:grinning::cactus::rocket::milky_way:@some_domain.com"

Emoji Mark 3010 Email Address Example 4:
"william.thomson#U+1F600U+1F335U+1F680U+1F30C@some_domain.com"

Emoji Mark 3010 Email Address Example 5:
"U+1F600U+1F335U+1F680U+1F30C@some_domain.com"

Emoji Mark 3010 Email Address Example 1 illustrates a user's real first name and last separated by a period. The user's full name is followed by a period and then four emoji shortcodes, each separated by a period. Emoji Mark 3010 Email Address Example 2 replaces Emoji Mark 3010 Email Address Example 1 emoji shortcode with emoji Unicode codepoints. Emoji Mark 3010 Email Address Example 3 illustrates a user's real first name and last separated by a period. The user's full name is followed by a Number sign[30], specifically ASCII 35, and then four emoji shortcodes without separation characters. Emoji Mark 3010 Email Address Example 4 replaces Emoji Mark 3010 Email Address Example 3 emoji shortcode with emoji Unicode codepoints. Emoji Mark 3010 Email Address Example 5 illustrates an embodiment where the local-part is an Emoji Mark 3010 for an email address.

[30] Peter. "ASCII Code #, Number Sign." The Complete Table of ASCII Characters, Codes, Symbols and Signs, American Standard Code for Information Interchange, theasciicode.com.ar/ascii-printable-characters/number-sign-ascii-code-35.html.

An exemplary enablement is a system with the ability to utilize Emoji Mark 3010 for the local-part of an email address in whole or in part.

While these examples are technically valid, many email platforms and clients do not adhere to technical standards.[31] Hence, Emoji Mark 3010 Email Address Example 3 may be the only viable option.[32]

[31] "Email Address." Wikipedia, the Free Encyclopedia, Wikimedia Foundation, Inc, 12 Aug. 2003, en.wikipedia.org/wiki/Email_address#Local-part. Accessed 1 May 2020.
[32] Topf, Jochen. "Characters in the Local Part of an Email Address." Jochen Topf, www.jochentopf.com/email/chars.html.

Taxonomy Emoji 3012 is a derived type of Context Emoji 3006. It contains Classification Emoji 3014 and Subclassification Emoji 3016 which are also derived types of Context Emoji 3006. Taxonomy Emoji 3012 illustrates a taxonomy emoji (see, Emoji 302 in FIG. 3) that may be used to convey taxonomy as an attributive context for a context expression. In one embodiment, Taxonomy Emoji 3012 may represent one or more Classification Emoji 3014. In another embodiment, Taxonomy Emoji 3012 may represent one or more Classification Emoji 3014 and one or more Subclassification Emoji 3016. In another embodiment, Taxonomy Emoji 3012 may represent either one or more Classification Emoji 3014 or one or more Subclassification Emoji 3016.

Classification Emoji 3014 illustrates a classification[33] emoji (see, Emoji 302 in FIG. 3) that may be used to convey classification as an attributive context for a context expression. Subclassification Emoji 3016 illustrates a subclassification[34] emoji (see, Emoji 302 in FIG. 3) that may be used to convey subclassification as an attributive context for a context expression.

[33] "classification, n." OED Online, Oxford University Press, December 2019, www.oed.com/viewdictionaryentry/Entry/33896. Accessed 14 Feb. 2020.
[34] "sub-, prefix." OED Online, Oxford University Press, December 2019, www.oed.com/viewdictionaryentry/Entry/192418. Accessed 24 Feb. 2020.

Context Expression Spacer Tuple 3020, Context Expression Spacer Tuple 3030, Context Expression Key-Value Tuple 3040, Context Expression Key Tuple 3050, and Context Expression Value Tuple 3070 utilize tuples to illustrate "a data structure that contains a sequence of elements."[35]

[35] "Tuple Class (System)." Microsoft Docs, Microsoft Corporation, docs.microsoft.com/en-us/dotnet/api/system.tuple?view=netframework-4.8.

Context Expression Spacer Tuple 3020 and Context Expression Spacer Tuple 3030 illustrates tuple combinations of Delimiter 3004 and Word Divider 3002. Context Expression Key-Value Tuple 3040 illustrates a KVP in combination with Word Divider 3002, Delimiter 3004, and Word Divider 3002. In another embodiment, Context Key 2702 in Context Expression Key-Value Tuple 3040 may be replaced with Generated Context Key 2712 in FIG. 27.

Context Expression Key Tuple 3050 illustrates a tuple comprised of Character[36] Key 3052, Glyph Key 3054, Emoji Key 3056, Symbol Key 3058, Punctuation[37][38] Key 3060, and Context Key 2702. In one embodiment, Character Key 3052, Glyph Key 3054, Emoji Key 3056, Symbol Key 3058, and Punctuation Key 3060 are optional. In another embodiment, all or any of Character Key 3052, Glyph Key 3054, Emoji Key 3056, Symbol Key 3058, and Punctuation Key 3060 are required. In one embodiment, one of each of Character Key 3052, Glyph Key 3054, Emoji Key 3056, Symbol Key 3058, and Punctuation Key 3060 may be utilized. In another embodiment, more than one of Character Key 3052, Glyph Key 3054, Emoji Key 3056, Symbol Key 3058, and Punctuation Key 3060 may be utilized. In one embodiment, all or any of Character Key 3052, Glyph Key 3054, Emoji Key 3056, Symbol Key 3058, and Punctuation Key 3060 must precede Context Key 2702. In another embodiment, all or any of Character Key 3052, Glyph Key 3054, Emoji Key 3056, Symbol Key 3058, and Punctuation Key 3060 must follow Context Key 2702. In yet another embodiment, all or any of Character Key 3052, Glyph Key 3054, Emoji Key 3056, Symbol Key 3058, and Punctuation Key 3060 may precede or follow Context Key 2702.

[36] "Character (computing)." Wikipedia, Wikimedia Foundation, en.wikipedia.org/wiki/Character_(computing).
[37] "punctuation, n." OED Online, Oxford University Press, March 2020, www.oed.com/viewdictionaryentry/Entry/154629. Accessed 16 Apr. 2020.
[38] "Punctuation|Definition, History, & Facts." Encyclopedia Britannica, www.britannica.com/topic/punctuation. Accessed 16 Apr. 2020.

Glyphs are defined in one sense as, "an elemental symbol within an agreed set of symbols, intended to represent a readable character for the purposes of writing. Glyphs are considered to be unique marks that collectively add up to the spelling of a word or contribute to a specific meaning of what is written, with that meaning dependent on cultural and social usage."[39] In this sense, not all glyphs (e.g., ideograms, logograms, and pictograms) are available in Unicode.

[39] "Glyph." Wikipedia, Wikimedia Foundation, en.wikipedia.org/wiki/Glyph.

Symbols are defined in one sense as, "a written character or mark used to represent something; a letter, figure, or sign conventionally standing for some object, process, etc. e.g. the figures denoting the planets, signs of the zodiac, etc. in astronomy; the letters and other characters denoting elements, etc. in chemistry, quantities, operations, etc. in mathematics, the faces of a crystal in crystallography."[40] Other examples of symbols include but are not limited to typographical symbols[41] and orthographic ligatures.[42] The Wikipedia page for Category:Symbols states that a "category is for symbols in the sense of marks, signs, or words that indicate, signify, or are understood as representing an idea, object, or relationship."[43] It offers many other examples of symbols including seals of cities and towns or municipal heraldry or municipal coats of arms, armorial of the nations, professional symbols, ISO Standard for safety symbols, media control symbols, and mathematical symbols. In these senses, not all symbols are available in Unicode.

[40] "symbol, n.1." OED Online, Oxford University Press, March 2020, www.oed.com/view/Entry/196197. Accessed 16 Apr. 2020.
[41] "List of typographical symbols." Wikipedia, Wikimedia Foundation, en.wikipedia.org/wiki/List_of_typographical_symbols.
[42] "Orthographic ligature." Wikipedia, Wikimedia Foundation, en.wikipedia.org/wiki/Orthographic_ligature.
[43] "Category:Symbols." Wikipedia, Wikimedia Foundation, 2019, en.wikipedia.org/wiki/Category:Symbols.

At the time of this application, the Full Emoji List, v13.0[44], has a mere 3292[45] emoji based on their subtotal count that, "is the total without the typical dups or components, so it is a better reflection of what people would typically see on emoji keyboards or palettes."[46] As with glyphs and symbols, not all emoji are available in Unicode, especially when kaomoji—Japanese emoticons—are taken into consideration.

[44] "Full Emoji List, V13.0." Index, unicode.org/emoji/charts/full-emoji-list.html.
[45] "Emoji Counts, V13.0." Index, unicode.org/emoji/charts/emoji-counts.html.
[46] "Unicode Emoji Chart Format." Index, unicode.org/emoji/format.html#col-totals.

Context Expression Build Module 2904 in FIG. 29, in combination with Emoji 302 in FIG. 3, is used to create, store, manage, and utilize glyphs, symbols and emoji that are not part of Unicode and which are user generated, third party generated, crowd source generated, etc.

Context Expression Value Tuple 3070 illustrates a tuple comprised of Character Value 3072, Glyph Value 3074, Emoji Value 3076, Symbol Value 3078, Punctuation Value 3080, and Context Value 2704. In one embodiment, Character Value 3072, Glyph Value 3074, Emoji Value 3076, Symbol Value 3078, Punctuation Value 3080 are optional. In another embodiment, all or any of Character Value 3072, Glyph Value 3074, Emoji Value 3076, Symbol Value 3078, and Punctuation Value 3080 are required. In one embodiment, one of each of Character Value 3072, Glyph Value 3074, Emoji Value 3076, Symbol Value 3078, and Punctuation Value 3080 may be utilized. In another embodiment, more than one of each of Character Value 3072, Glyph Value 3074, Emoji Value 3076, Symbol Value 3078, and Punctuation Value 3080 may be utilized. In one embodiment, all or any of Character Value 3072, Glyph Value 3074, Emoji Value 3076, Symbol Value 3078, and Punctuation Value 3080 must precede Context Value 2704. In another embodiment, all or any of Character Value 3072, Glyph Value 3074, Emoji Value 3076, Symbol Value 3078, and Punctuation Value 3080 must follow Context Value 2704. In yet another embodiment, all or any of Character Value 3072, Glyph Value 3074, Emoji Value 3076, Symbol Value 3078, and Punctuation Value 3080 may precede or follow Context Value 2704.

In one embodiment, Context Key 2702 in Context Expression Key Tuple 3050 and Context Value 2704 in Context Expression Value Tuple 3070 illustrate strings. In another embodiment, Context Key 2702 in Context Expression Key Tuple 3050 and Context Value 2704 in Context Expression Value Tuple 3070 illustrate an Emoji 302 in FIG. 3; they do not illustrate the following emoji and any of their derivatives: Context Emoji 3006, Action Emoji 3008, Taxonomy Emoji 3012, Classification Emoji 3014, and Subclassification Emoji 3016.

Emoji Key 3056 in Context Expression Key Tuple 3050 and Emoji Value 3076 in Context Expression Value Tuple 3070 illustrate the following emoji and their derivatives:

Context Emoji 3006, Action Emoji 3008, Taxonomy Emoji 3012, Classification Emoji 3014, and Subclassification Emoji 3016.

An exemplary enablement is a system to fill the gap where glyphs, symbols, and emoji are not part of Unicode.

Another exemplary enablement is a system to create and utilize context expressions, especially the conveyance of attributions: context, action, taxonomy, etc.

Another exemplary enablement is a system to combine Unicode with newly created emoji based on glyphs, symbols, and emoji.

Another exemplary enablement is a system to create and utilize context expression key tuples and context expression value tuples based on graphemes.

Another exemplary enablement is a system to capture human generated context and transform it into a machine codable format for computing.

An aspect of the present disclosure's novelty lay in its ability to capture human context in a unified way for storage, computation, and algorithmic utilization.

Figure 31:
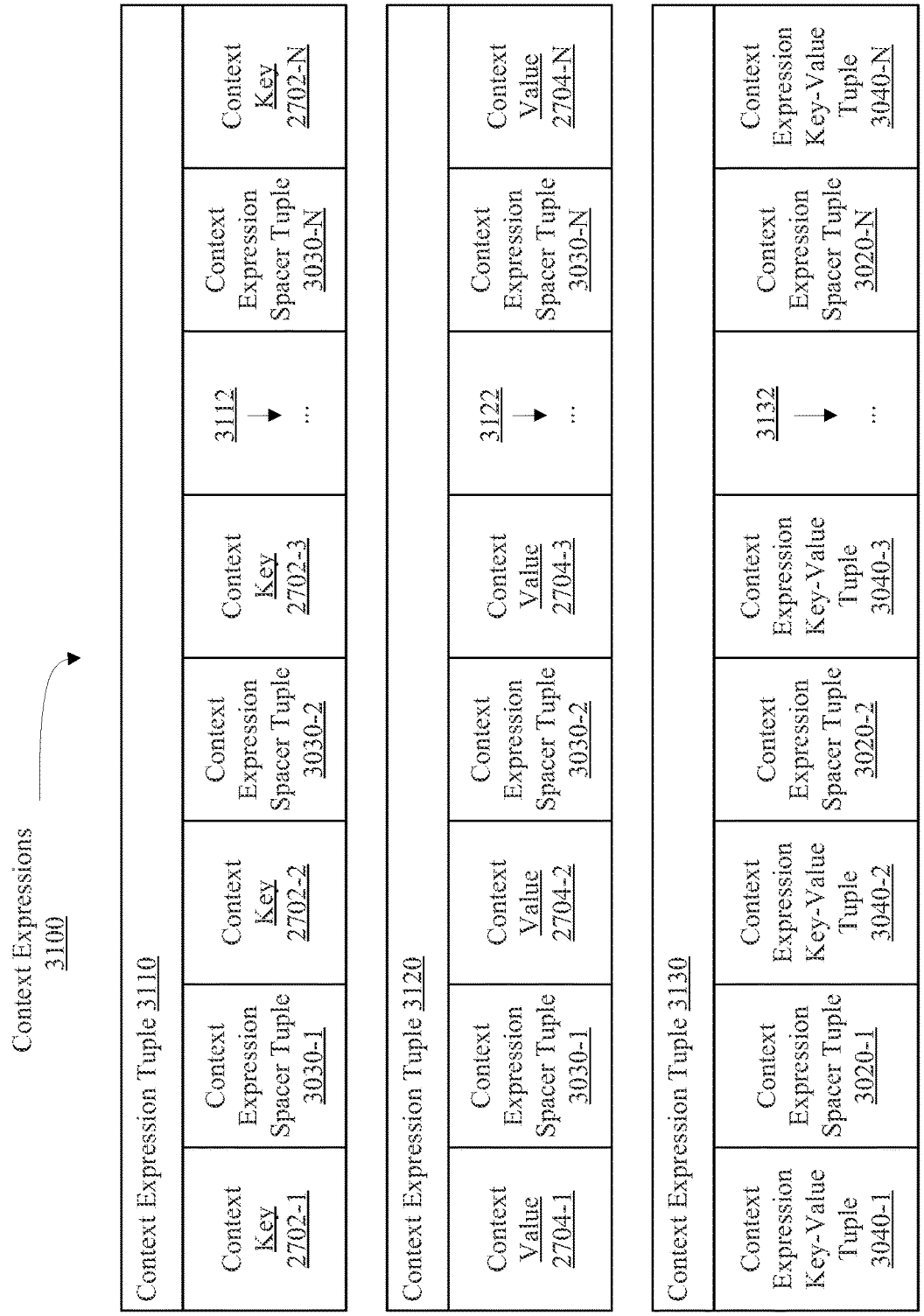
FIG. 31 shows exemplary Context Expressions.

FIG. 31 illustrates Context Expressions 3100 which is composed of Context Expression Tuple 3110, Context Expression Tuple 3120, and Context Expression Tuple 3130. Context Expression Tuple 3110 contains Context Key 2702-1, Context Expression Spacer Tuple 3030-1, Context Key 2702-2, Context Expression Spacer Tuple 3030-2, Context Key 2702-3, Context Expression Spacer Tuple 3030-N, and Context Key 2702-N. The ellipse at 3112 illustrates that there are N number of context keys and context expression spacer tuples in Context Expression Tuple 3110. Context Expression Tuple 3120 contains Context Value 2704-1, Context Expression Spacer Tuple 3030-1, Context Value 2704-2, Context Expression Spacer Tuple 3030-2, Context Value 2704-3, Context Expression Spacer Tuple 3030-N, and Context Value 2704-N. The ellipse at 3122 illustrates that there are N number of context values and context expression spacer tuples in Context Expression Tuple 3120. Context Expression Tuple 3130 contains Context Expression Key-Value Tuple 3040-1, Context Expression Spacer Tuple 3020-1, Context Expression Key-Value Tuple 3040-2, Context Expression Spacer Tuple 3020-2, Context Expression Key-Value Tuple 3040-3, Context Expression Spacer Tuple 3020-N, and Context Expression Key-Value Tuple 3040-N. The ellipse at 3132 illustrates that there are N number of context expression key-value tuples and context expression spacer tuples in Context Expression Tuple 3130.

In another embodiment of Context Expression Tuple 3110, Context Key 2702 may be replaced with Generated Context Key 2712 in FIG. 27. In yet another embodiment of Context Expression Tuple 3110, Context Expression Spacer Tuple 3030 may be replaced with Context Expression Spacer Tuple 3020 in FIG. 30. In another embodiment of Context Expression Tuple 3120, Context Expression Spacer Tuple 3030 may be replaced with Context Expression Spacer Tuple 3020 in FIG. 30. In another embodiment of Context Expression Tuple 3130, Context Expression Spacer Tuple 3020 may be replaced with Context Expression Spacer Tuple 3030 in FIG. 30.

Context Expression 3100 enables composition[47] and decomposition[48] of context expressions. "Composition" is defined as the due arrangement of context expression elements into context expressions. "Decomposition" is defined as the decomposing or separation of a context expression into its context expression elements. Context Expression Tuple 3110, Context Expression Tuple 3120, and Context Expression Tuple 3130 in combination with Context Expression Module Manager 2900, Context Expression Storage 2920, and Context Expression Module Manager Storage 2922 in FIG. 29, plus Context Identifier Algorithm 200 in FIG. 2, enable composition and decomposition.

[47] "composition, n." OED Online, Oxford University Press, March 2020, www.oed.com/viewdictionaryentry/Entry/37795. Accessed 27 Apr. 2020.
[48] "decomposition, n." OED Online, Oxford University Press, March 2020, www.oed.com/viewdictionaryentry/Entry/48355. Accessed 27 Apr. 2020.

In one embodiment, users provide a string to the system to compose context expressions utilizing Context Expression Tuple 3110. In this embodiment, the system utilizes Context Expression Build Module 2904 in FIG. 29 to create a Context Expression 2800 in FIG. 28, generate and add a unique identifier to Context Expression Id 2802 in FIG. 28, set the Context Expression Type 2812 in FIG. 28 to User Template 2744 in FIG. 27, and add the string to Context Expression Text 2810 in FIG. 28. Context Expression Build Module 2904 then utilizes Context Expression Rules Module 2914 and Context Expression Validation Module 2920 in FIG. 29 for context expression rule and definition validation. Context Expression Build Module 2904 then utilizes Context Expression Parsing Module 2912 and Context Expression Mapping Module 2910 in FIG. 29 to parse and map Context Expression Text 2810.

For each "key" in the set of Context Key 2702-1, Context Key 2702-2, Context Key 2702-3, to Context Key 2702-N, a new Context Item 2710 in FIG. 27 is created. Context Expression Build Module 2904 in FIG. 29 then generates an incremental integer which is assigned to Generated Context Key 2712 in Context Item 2710, and the "key" is assigned to the Context Value 2704 in Context Item 2710. Context Expression Build Module 2904 then adds Context Item 2710 to Context Item Dictionary 2730 in FIG. 28.

In another embodiment, users provide two or more strings to the system to compose context expressions in part utilizing Context Expression Tuple 3110. In this embodiment, the system utilizes Context Expression Build Module 2904 in FIG. 29 to create a Context Expression 2800 in FIG. 28, generate and add a unique identifier to Context Expression Id 2802 in FIG. 28, set the Context Expression Type 2812 in FIG. 28 to User Template 2744 in FIG. 27. For each string provided, Context Expression Build Module 2904 then utilizes Context Expression Concatenation Module 2906 in FIG. 29 to build a single string that it then adds to Context Expression Text 2810 in FIG. 28. Context Expression Build Module 2904 then utilizes Context Expression Rules Module 2914 and Context Expression Validation Module 2918 in FIG. 29 for context expression rule and definition validation. Context Expression Build Module 2904 then utilizes Context Expression Parsing Module 2912 and Context Expression Mapping Module 2910 in FIG. 29 to parse and map Context Expression Text 2810.

For each "key" in the set of Context Key 2702-1, Context Key 2702-2, Context Key 2702-3, to Context Key 2702-N, a new Context Item 2710 in FIG. 27 is created. Context Expression Build Module 2904 in FIG. 29 then generates an incremental integer which is assigned to Generated Context Key 2712 in Context Item 2710, and the "key" is assigned to the Context Value 2704 in Context Item 2710. Context Expression Build Module 2904 then adds the Context Item 2710 to Context Item Dictionary 2730 in FIG. 28.

As a point of clarity and disambiguation for both embodiments above, each Context Key 2702 in Content Expression Tuple 3110 is stored as a Context Value 2704 in each Context Item 2710 in Context Item Dictionary 2730 in FIG. 28. This enables the system to store the position of each Context Key 2702 in Context Expression Tuple 3110.

In one embodiment, users provide a string to the system to compose context expressions utilizing Context Expression Tuple 3120. In this embodiment, the system utilizes Context Expression Build Module 2904 in FIG. 29 to create a Context Expression 2800 in FIG. 28, generate and add a unique identifier to Context Expression Id 2802 in FIG. 28, set the Context Expression Type 2812 in FIG. 28 to Simple 2748 in FIG. 27, and add the string to Context Expression Text 2810 in FIG. 28. Context Expression Build Module 2904 then utilizes Context Expression Rules Module 2914 and Context Expression Validation Module 2918 in FIG. 29 for context expression rule and definition validation. Context Expression Build Module 2904 then utilizes Context Expression Parsing Module 2912 and Context Expression Mapping Module 2910 in FIG. 29 to parse and map Context Expression Text 2810.

For each "value" in the set of Context Value 2704-1, Context Value 2704-2, Context Value 2704-3, to Context Value 2704-N, a new Context Item 2710 in FIG. 27 is created. Context Expression Build Module 2904 in FIG. 29 then generates an incremental integer which is assigned to Generated Context Key 2712 in Context Item 2710, and the "value" is assigned to Context Value 2704 in Context Item 2710. Context Expression Build Module 2904 then adds the Context Item 2710 to Context Item Dictionary 2730 in FIG. 28.

In another embodiment, users provide two or more strings to the system to compose context expressions in part utilizing Context Expression Tuple 3120. In this embodiment, the system utilizes Context Expression Build Module 2904 in FIG. 29 to create a Context Expression 2800 in FIG. 28, generate and add a unique identifier to Context Expression Id 2802 in FIG. 28, set the Context Expression Type 2812 in FIG. 28 to Simple 2748 in FIG. 27. For each string provided, Context Expression Build Module 2904 then utilizes Context Expression Concatenation Module 2906 in FIG. 29 to build a single string that it then adds to Context Expression Text 2810 in FIG. 28. Context Expression Build Module 2904 then utilizes Context Expression Rules Module 2914 and Context Expression Validation Module 2918 in FIG. 29 for context expression rule and definition validation. Context Expression Build Module 2904 then utilizes Context Expression Parsing Module 2912 and Context Expression Mapping Module 2910 in FIG. 29 to parse and map Context Expression Text 2810.

For each "value" in the set of Context Value 2704-1, Context Value 2704-2, Context Value 2704-3, to Context Value 2704-N, a new Context Item 2710 in FIG. 27 is created. Context Expression Build Module 2904 in FIG. 29 then generates an incremental integer which is assigned to Generated Context Key 2712 in Context Item 2710, and the "value" is assigned to the Context Value 2704 in Context Item 2710. Context Expression Build Module 2904 then adds the Context Item 2710 to Context Item Dictionary 2730 in FIG. 28.

In another embodiment, users provide a string to the system to compose context expressions utilizing Context Expression Tuple 3130. In this embodiment, the system utilizes Context Expression Build Module 2904 in FIG. 29 to create a Context Expression 2800 in FIG. 28, generate and add a unique identifier to Context Expression Id 2802 in FIG. 28, set the Context Expression Type 2812 in FIG. 28 to Complex 2750 in FIG. 27, and add the string to Context Expression Text 2810 in FIG. 28. Context Expression Build Module 2904 then utilizes Context Expression Rules Module 2914 and Context Expression Validation Module 2918 in FIG. 29 for context expression rule and definition validation. Context Expression Build Module 2904 then utilizes Context Expression Parsing Module 2912 and Context Expression Mapping Module 2910 in FIG. 29 to parse and map Context Expression Text 2810.

For each KVP in the set of Context Expression Key-Value Tuple 3040-1, Context Expression Key-Value Tuple 3040-2, Context Expression Key-Value Tuple 3040-3, to Context Expression Key-Value Tuple 3040-N, a new Context Item 2700 in FIG. 27 is created. Context Expression Build Module 2904 in FIG. 29 then assigns the "key" in the KVP to the Context Key 2702 in Context Item 2700 and assigns the "value" in the KVP to the Context Value 2704 in Context Item 2700. Context Expression Build Module 2904 then adds the Context Item 2700 to Context Item Dictionary 2720 in FIG. 28.

In another embodiment, the system will auto-compose context expressions by utilizing Context Expression Template Module 2918 in FIG. 29 to generate Context Expression Tuple 3110 and Context Expression Tuple 3120 from Context Expression Tuple 3130. Context Expression Template Module 2918 then utilizes the embodiments detailed above to process Context Expression Tuple 3110 and Context Expression Tuple 3120 to compose their respective context expressions. When processing Context Expression Tuple 3110 however, the Context Expression Type 2812 in FIG. 28 is set to Generated Template 2746 in FIG. 27.

The context expressions composed utilizing Context Expression Tuple 3110, and with Context Expression Types 2812 in FIG. 28 of User Template 2744 or Generated Template 2746 in FIG. 27, can be used as context expression templates for composing Context Expression Tuple 3120 and Context Expression Tuple 3130. Utilizing context expression templates, a context key may be used as a "prompt" for context values in Context Expression Tuple 3120, and it may be used as a "key" in a Context Expression Key-Value Tuple 3040 in Context Expression Tuple 3130. "Prompt" is used here to mean that a system could use a "key" as a way to prompt a user to input a "value." Additionally, the Context Expression Validation Module 2918 in FIG. 29 checks for duplicates which may or may not be valid during composition.

An exemplary enablement is a system that enables users to provide a string to compose a context expression for any subject.

Another exemplary enablement is a system that enables users to provide two or more strings to compose a context expression for any subject.

Another exemplary enablement is a system that enables many users to compose many context expressions for any subject.

Another exemplary enablement is a system that enables users to create context expression templates.

Another exemplary enablement is a system that auto generates context expression templates.

Another exemplary enablement is a system that enables users to create context expressions from context expression templates.

In one embodiment, context expressions can be derived from "local colloquialisms." Local colloquialisms are defined as ordinary or familiar language conventions that convey inherent social knowledge derived from tacit experiential learning within a communal localization. These local colloquialisms are shared by all members of a community and reflect a particular local characteristic featured as a common reference point. Innate social knowledge serves as a social context connecting members. It is learned informally in the spoken and written word, through interaction with community members over time. In another embodiment, context expressions can be derived from any language convention.[49][50][51]

[49] "Convention (Stanford Encyclopedia of Philosophy)." Stanford Encyclopedia of Philosophy, plato.stanford.edu/entries/convention/#ConLan.
[50] "Standard English Conventions: The Craft of Language." The SAT Suite of Assessments—The College Board, collegereadiness.collegeboard.org/pdf/official-sat-study-guide-writing-language-standard-english-conventions.pdf.
[51] "Language Conventions." Home, education.nsw.gov.au/teaching-and-learning/student-assessment/smart-teaching-strategies/literacy/language-conventions.

An exemplary enablement is a system that enables users to compose, as well as update, delete, own, share, publish, manage, monetize, assign access rights to, and utilize one or more context expressions.

The following examples for Context Expressions 3100 illustrate context expression composition from one or more users for the subject Frank Pepe Pizza Napoletana at 157 Wooster Street, New Haven, CT 06511.

The following examples illustrate context expressions for Context Expression Tuple 910:
Context Expression Tuple 3110 Example 1:
 "Restaurant, Street, City, State"
Context Expression Tuple 3110 Example 2:
 "Restaurant, City, State"
Context Expression Tuple 3110 Example 3:
 "Restaurant, City"
Context Expression Tuple 3110 Example 4:
 "Restaurant, Neighborhood"
Context Expression Tuple 3110 Example 5:
 "Classification, City"
Context Expression Tuple 3110 Example 6:
 "Classification, Neighborhood"
Context Expression Tuple 3110 Example 7:
 "Classification, Subclassification, Neighborhood"
The following examples illustrate context expressions for Context Expression Tuple 920:
Context Expression Tuple 3120 Example 1:
 "Pepe's Pizza, Wooster St, New Haven, CT"
Context Expression Tuple 3120 Example 2:
 "Pepe's Pizza, New Haven, CT"
Context Expression Tuple 3120 Example 3:
 "Frank Pepe Pizzeria Napoletana, New Haven, CT"
Context Expression Tuple 3120 Example 4:
 "Coal Fired Pizza, New Haven, CT"
Context Expression Tuple 3120 Example 5:
 "Coal Fired Pizza, Wooster Square"
Context Expression Tuple 3120 Example 6:
 "Pizza, New Haven"
Context Expression Tuple 3120 Example 7:
 "Pizza, Wooster Square"
Context Expression Tuple 3120 Example 8:
 "Restaurant, New Haven"
Context Expression Tuple 3120 Example 9:
 "Restaurant, Wooster Square"
Context Expression Tuple 3120 Example 10:
 "Restaurant, Pizza, Wooster Square"
The following examples illustrate context expressions for Context Expression Tuple 930:
Context Expression Tuple 3130 Example 1:
 "Restaurant: Pepe's Pizza|Street: Wooster St|City: New Haven|State: CT"
Context Expression Tuple 3130 Example 2:
 "Restaurant: Pepe's Pizza|City: New Haven|State: CT"
Context Expression Tuple 3130 Example 3:
 "Restaurant: Frank Pepe Pizzeria Napoletana|City: New Haven|State: CT"
Context Expression Tuple 3130 Example 4:
 "Restaurant: Coal Fired Pizza|City: New Haven|State: CT"
Context Expression Tuple 3130 Example 5:
 "Restaurant: Coal Fired Pizza|Neighborhood: Wooster Square"
Context Expression Tuple 3130 Example 6:
 "Restaurant: Pizza|City: New Haven"
Context Expression Tuple 3130 Example 7:
 "Restaurant: Pizza|Neighborhood: Wooster Square"
Context Expression Tuple 3130 Example 8:
 "Classification: Restaurant|City: New Haven"
Context Expression Tuple 3130 Example 9:
 "Classification: Restaurant|Neighborhood: Wooster Square"
Context Expression Tuple 3130 Example 10:
 "Classification: Restaurant|Subclassification: Pizza|Neighborhood: Wooster Square"

The above examples illustrate twenty-seven context expressions composed by one or more users to convey attributive context for the subject, Pepe's Pizza. Several convey attributive contexts of an inferred taxonomy (e.g., Restaurant) combined with locality (e.g., Street, City, State, Neighborhood), while others, convey attributive contexts of classification (e.g., Restaurant), subclassification (e.g., Pizza) and locality (e.g., City, Neighborhood). Most examples did not convey the name of the restaurant (e.g., "Pepe's Pizza" or "Frank Pepe Pizzeria Napoletana"). However, every single one of these context expressions is a valid conveyance of attributive context for the subject.

An exemplary enablement is system that enables the conveyance of one or more attributive context for a subject.

Another exemplary enablement is system that enables the conveyance of one or more attributive actionable context for a subject.

Another exemplary enablement is system that enables the conveyance of one or more attributive taxonomy context for a subject.

Another exemplary enablement is a system that captures crowd sourced conveyance of attributive context for a context expression.

Another exemplary enablement is a system that enables users to attribute simple and complex taxonomies when composing context expressions.

Another exemplary enablement is a system that infers taxonomy where users utilize templates when creating context expressions.

Another exemplary enablement is a system that enables taxonomy aggregation from crowd sourced taxonomies for data analytics and machine learning.

Another exemplary enablement is a system that matches data analytics and machine learning results for taxonomies with user profile data to create a marketing profile.

Another exemplary enablement is a system that matches data analytics and machine learning results to suggest context expressions to users while they create or utilize context expressions.

Another exemplary enablement is a system that enables users to store their context expressions in a blockchain.

Another exemplary enablement is a system that enables users to monetize their context expressions through a blockchain.

In another embodiment, Context Expression Module Manager 2900 in FIG. 29 utilizes Context Identifier Algorithm 200 in FIG. 2 to create context identifiers from Context Expression 2800 in FIG. 28. Context Item Dictionary 2720, Context Item Key Collection 2806, and Context Item Value Collection 2814 in FIG. 28 can be used to generate key-value pairs for input into Context Identifier Algorithm 200 in FIG. 2 to create context identifiers.

An exemplary enablement is a system that produces a context identifier for context expressions.

Figure 32:
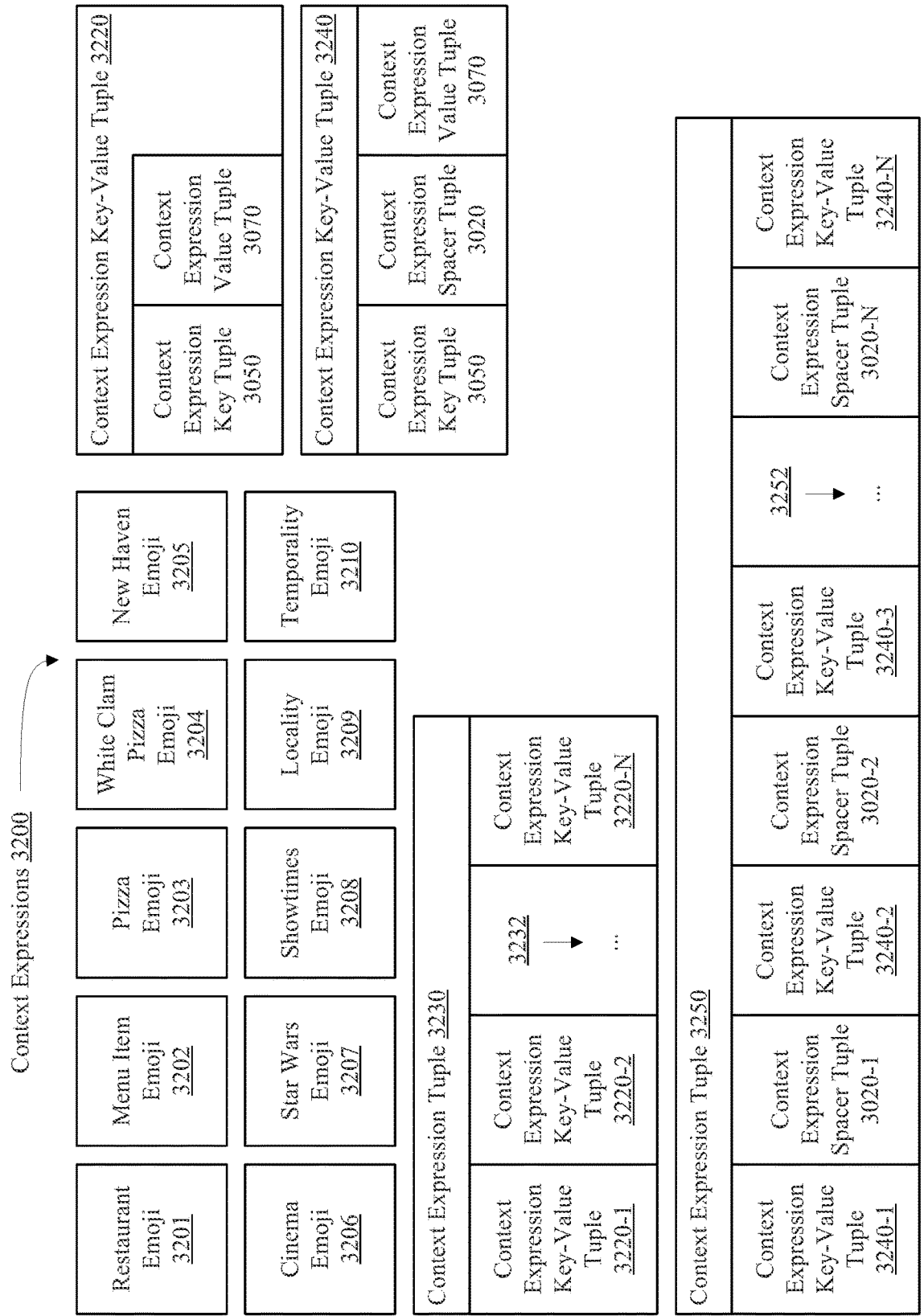
FIG. 32 shows exemplary Context Expressions.

FIG. 32 illustrates Context Expressions 3200 which is composed of Restaurant Emoji 3201, Menu Item Emoji 3202, Pizza Emoji 3203, White Clam Pizza Emoji 3204, New Haven Emoji 3205, Cinema Emoji 3206, Star Wars Emoji 3207, Showtimes Emoji 3208, Locality Emoji 3209, Temporality Emoji 3210, Context Expression Key-Value Tuple 3220, Context Expression Tuple 3230, Context Expression Key-Value Tuple 3240, and Context Expression Tuple 3250. Context Expression Key-Value Tuple 3220 contains Context Expression Key Tuple 3050 and Context Expression Value Tuple 3070. Context Expression Tuple 3230 contains Context Expression Key-Value Tuple 3220-1, Context Expression Key-Value Tuple 3220-2, and Context Expression Key-Value Tuple 3220-N. The ellipse at 3232 illustrates that there are N number of context expression key-value tuples in Context Expression Tuple 3230. Context Expression Key-Value Tuple 3240 contains Context Expression Key Tuple 3050, Context Expression Spacer Tuple 3020, and Context Expression Value Tuple 3070. Context Expression Tuple 3250 contains Context Expression Key-Value Tuple 3240-1, Context Expression Spacer Tuple 3020-1, Context Expression Key-Value Tuple 3240-2, Context Expression Spacer Tuple 3020-2, Context Expression Key-Value Tuple 3240-3, Context Expression Spacer Tuple 3020-N, and Context Expression Key Value Tuple 3240-N. The ellipse at 3252 illustrates that there are N number of context expression key-value tuples and context expression spacer tuples in Context Expression Tuple 3250.

Context Expression Tuple 3250 illustrates a tuple comprised of "N" Context Expression Key-Value Tuple 3240 and Context Expression Spacer Tuple 3020 in sequence. Context Expression Tuple 3250 utilizes Character Key 3052, Glyph Key 3054, Emoji Key 3056, Symbol Key 3058, Punctuation Key 3060, and Context Key 2702 in FIG. 30 to produce complex context keys as well as Character Value 3072, Glyph Value 3074, Emoji Value 3076, Symbol Value 3078, Punctuation Value 3080, and Context Value 2704 in FIG. 30 to produce complex context values. Context Expression Tuple 3230 illustrates a similar Context Expression Tuple 3250 sans Context Expression Spacer Tuple 3020. In another embodiment, Context Expression Tuple 3250 is composed of Context Expression Key-Value Tuple 3220 in place of Context Expression Key-Value Tuple 3240.

Context Expressions 3200 descends from Context Expressions 3100 in FIG. 31; therefore, it inherits all the attributes and functionality of Context Expressions 3100. Context Expressions 3200 extends Context Expressions 3100 by illustrating Context Expression Key-Value Tuple 3220, Context Expression Tuple 3230, Context Expression Key-Value Tuple 3240, and Context Expression Tuple 3250 which may be used to compose and decompose context expressions for additional use cases and requirements.

Context Expressions 3200 also extends Context Expressions 3100 whereby Restaurant Emoji 3201 illustrates a restaurant emoji and is represented by the emoji shortcode ":restaurant:", Menu Item Emoji 3202 illustrates a menu item emoji and is represented by the emoji shortcode ":menu_item:", Pizza Emoji 3203 illustrates a pizza emoji and is represented by the emoji shortcode ":pizza:", White Clam Pizza Emoji 3204 illustrates a white clam pizza emoji and is represented by the emoji shortcode ":white_clam_pizza:", New Haven Emoji 3205 illustrates a New Haven emoji and is represented by the emoji shortcode ":new_haven:", Cinema Emoji 3206 illustrates a cinema emoji and is represented by the emoji shortcode ":cinema:", Star Wars Emoji 3207 illustrates a Star Wars emoji and is represented by the emoji shortcode ":star_wars:", Showtimes Emoji 3208 illustrates a showtimes emoji and is represented by the emoji shortcode ":showtimes:", Locality Emoji 3209 illustrates a locality emoji and is represented by the emoji shortcode ":locality:", and Temporality Emoji 3210 illustrates a temporality emoji and is represented by the emoji shortcode ":temporality:". In several examples in the specification, Pepe's Pizza may be represented as a Pepe's Pizza emoji with the shortcode ":pepes_pizza:".

The following examples illustrate context expressions for Context Expression Tuple 3230:

Context Expression Tuple 3230 Example 1:
:restaurant:Pizza:menu_item:White Clam Pizza:locality: New Haven Context Expression Tuple 3230 Example 2:
:restaurant::pizza::menu_item::white_clam_pizza::locality::new_haven:

Context Expression Tuple 3230 Example 3:
:cinema:Star Wars:locality:New Haven:temporality: >7:00 PM Context Expression Tuple 3230 Example 4:
:cinema:The Rise of Skywalker:locality:New Haven:temporality: >7:00 PM Context Expression Tuple 3230 Example 5:
:cinema:Skywalker:locality:New Haven:temporality: >7:00 PM Context Expression Tuple 3230 Example 6:
:cinema::star_wars::locality::new_haven::showtimes:

Context Expression Tuple 3230 Example 7:
:cinema::locality::showtimes:

Context Expression Tuple 3230 Example 8:
:star_wars::new_haven::showtimes:

Context Expression Tuple 3230 Examples 1 through 6 illustrate an exemplary enablement of the system that utilizes character keys, glyph keys, emoji keys, symbol keys, punctuation keys, and context keys to compose context expressions. They also illustrate an exemplary enablement of the system that utilizes character keys, glyph keys, emoji keys, symbol keys, punctuation keys, and context keys to convey attributive context for a context expression.

Context Expression Tuple 3230 Examples 1 through 6 illustrate an exemplary enablement of the system that utilizes character values, glyph values, emoji values, symbol values, punctuation values, and context values to compose context expressions. They also illustrate an exemplary enablement of the system that utilizes character values, glyph values, emoji values, symbol values, punctuation values, and context values to convey attributive context for a context expression.

Context Expression Tuple 3230 Examples 3 through 5 illustrate an exemplary enablement of the system that enables composition of context expression with the conveyance of logical attributive context.

Context Expression Tuple 3230 Examples 2, 6, 7, and 8 illustrate an exemplary enablement of the system that utilizes only emoji to enable the composition of context expression.

Context Expression Tuple 3230 Examples 2, 6, 7, and 8 illustrate an exemplary enablement of the system that utilizes only emoji to enable the composition of context expression with the conveyance of attributive context.

Showtimes Emoji 3208 in Context Expression Tuple 3230 Examples 6, 7, and 8 illustrates a derived type of Context Emoji 3006 and Action Emoji 3008 in FIG. 30. As a derivative of Action Emoji 3008, it conveys a "Get" actionable attributive context for the context expression, and as a derivative of Context Emoji 3006, it conveys attributive context for the context expression of "Showtimes." In this use case, the Showtimes Emoji 3208 is both the "key," that is, Context Expression Key Tuple 3050 and the "value," that is, Context Expression Value Tuple 3070 in the Context Expression Key-Value Tuple 3220.

Context Expression Tuple 3230 Example 6 illustrates an exemplary enablement of the system that utilizes emoji to enable the composition of context expression with the conveyance of actionable attributive context.

Furthermore, Context Expression Tuple 3230 Example 6 illustrates an exemplary enablement of the system that utilizes emoji to enable the composition of context expression with the conveyance of two or more attributive contexts.

Furthermore, Context Expression Tuple 3230 Example 6 illustrates an exemplary enablement of the system that utilizes emoji to enable the composition of context expression where an emoji may represent and embody both a key and a value in a KVP.

Context Expression Tuple 3230 and Context Expression Tuple 3250 are analogous to Context Expression Tuple 3130 in FIG. 31 in terms of its utilization and relationship to Context Expression 2800 in FIG. 28 and Context Expression Module Manager 2900 in FIG. 29.

In another embodiment, Context Expression Key-Value 3220 is composed of only Context Expression Key Tuple 3050 in FIG. 30 (see, Context Expression Tuple 3360 in FIG. 33) whereby Context Expression Tuple 3230 is analogous to Context Expression Tuple 3110 in FIG. 31 in terms of its utilization and relationship to Context Expression 2800 in FIG. 28 and Context Expression Module Manager 2900 in FIG. 29.

Context Expression Tuple 3230 Example 7 illustrates an exemplary enablement of the system that utilizes emoji to enable the composition of context expression where an emoji may represent and embody a key.

In another embodiment, Context Expression Key-Value 3220 is composed of only Context Expression Value Tuple 3070 in FIG. 30 (see, Context Expression Tuple 3370 in FIG. 33) whereby Context Expression Tuple 3230 is analogous to Context Expression Tuple 3120 in FIG. 31 in terms of its utilization and relationship to Context Expression 2800 in FIG. 28 and Context Expression Module Manager 2900 in FIG. 29.

Context Expression Tuple 3230 Example 8 illustrates an exemplary enablement of the system that utilizes emoji to enable the composition of context expression where an emoji may represent and embody a value.

The following example illustrates sentiment context expression for Context Expression Tuple 3230:
Context Expression Tuple 3230 Example 9:
    :reviews::pepes_pizza::overall::joy::food:10:service:10

Context Expression Tuple 3230 Example 9 illustrates an exemplary enablement of the system that utilizes emoji to enable the composition of context expression with the conveyance of sentiment as an attributive context.

Figure 33:
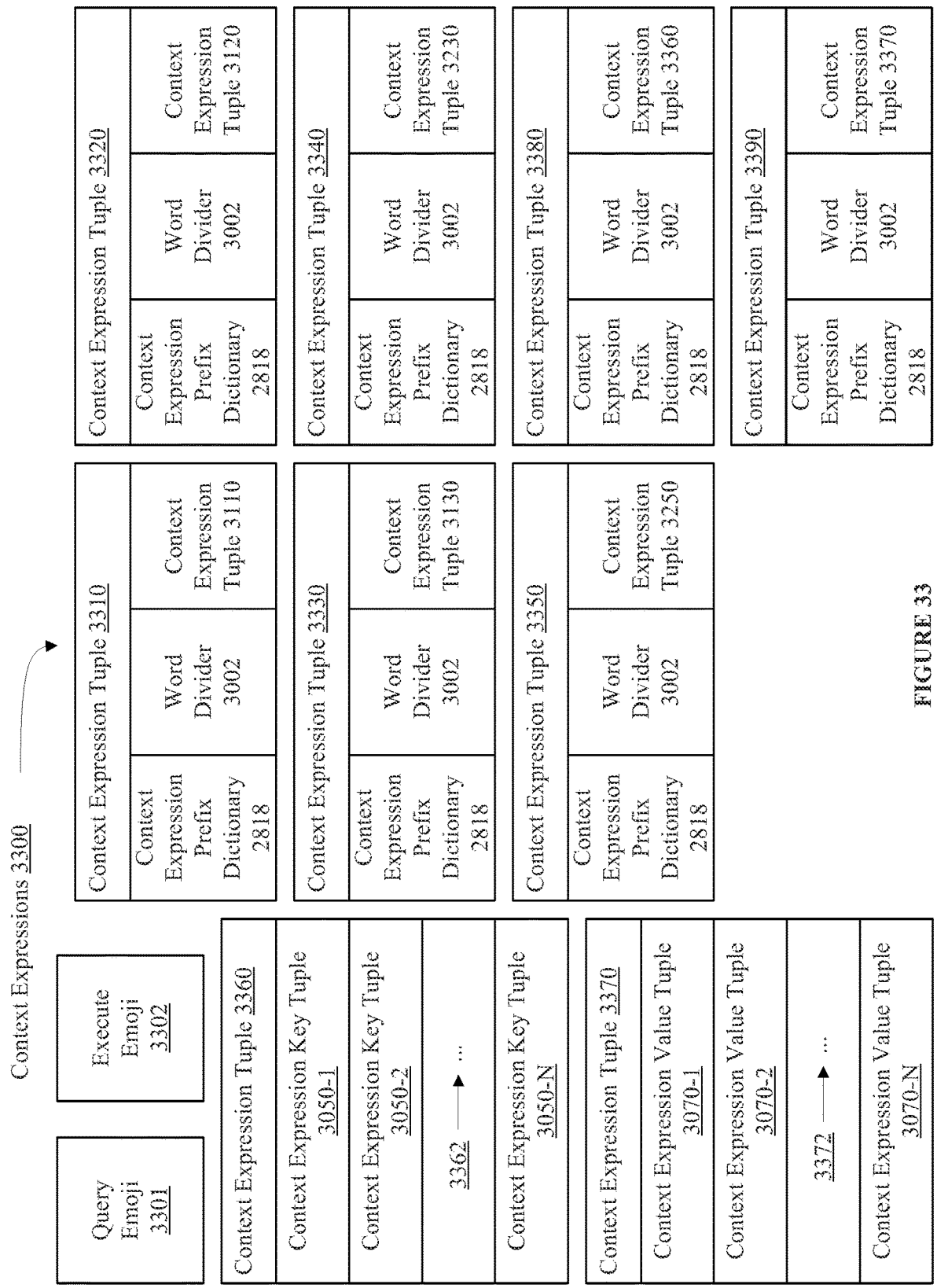
FIG. 33 shows exemplary Context Expressions.

FIG. 33 illustrates Context Expression 3300 which is composed of Query Emoji 3301, Execute Emoji 3302, Context Expression Tuple 3310, Context Expression Tuple 3320, Context Expression Tuple 3330, Context Expression Tuple 3340, Context Expression Tuple 3350, Context Expression Tuple 3360, Context Expression Tuple 3370, Context Expression Tuple 3380, and Context Expression Tuple 3390. Context Expression Tuple 3310 contains Context Expression Prefix Dictionary 2818, Word Divider 3002, and Context Expression Tuple 3110. Context Expression Tuple 3320 contains Context Expression Prefix Dictionary 2818, Word Divider 3002, and Context Expression Tuple 3120. Context Expression Tuple 3330 contains Context Expression Prefix Dictionary 2818, Word Divider 3002, and Context Expression Tuple 3130. Context Expression Tuple 3340 contains Context Expression Prefix Dictionary 2818, Word Divider 3002, and Context Expression Tuple 3230. Context Expression Tuple 3350 contains Context Expression Prefix Dictionary 2818, Word Divider 3002, and Context Expression Tuple 3250. Context Expression Tuple 3360 contains Context Expression Key Tuple 3050-1, Context Expression Key Tuple 3050-2 and Context Expression Key Tuple 3050-N. The ellipse at 3362 illustrates that there are N number of context expression key tuples in Context Expression Tuple 3360. Context Expression Tuple 3370 contains Context Expression Value Tuple 3070-1, Context Expression Value Tuple 3070-2, and Context Expression Value Tuple 3070-N. The ellipse at 3372 illustrates that there are N number of context expression value tuples in Context Expression Tuple 3370. Context Expression Tuple 3380 contains Context Expression Prefix Dictionary 2818, Word Divider 3002, and Context Expression Tuple 3360. Context Expression Tuple 3390 contains Context Expression Prefix Dictionary 2818, Word Divider 3002, and Context Expression Tuple 3370. In another embodiment, Delimiter 3004 in FIG. 30 replaces Word Divider 3002 where it is used in FIG. 33.

Context Expressions 3300 descends from Context Expressions 3200 in FIG. 32; therefore, it inherits all the attributes and functionality of Context Expressions 3200. Context Expressions 3300 extends Context Expressions 3200 by illustrating Context Expression Tuple 3310, Context Expression Tuple 3320, Context Expression Tuple 3330, Context Expression Tuple 3340, Context Expression Tuple 3350, Context Expression Tuple 3360, Context Expression Tuple 3370, Context Expression Tuple 3380, and Context Expression Tuple 3390 which may be used to compose and decompose context expressions for additional use cases and requirements.

Context Expressions 3300 extends previous embodiments of Context Expressions 3200 in FIG. 32 and Context Expressions 3100 in FIG. 31 by adding Query Emoji 3301 and Execute Emoji 3302 as well as prepending a Context Expression Prefix Dictionary 2818 followed by Word Divider 3002 (or Delimiter 3004 in FIG. 30) to Context Expression Tuple 3110, Context Expression Tuple 3120, Context Expression Tuple 3130, Context Expression Tuple 3230, Context Expression Tuple 3250, Context Expression Tuple 3360, and Context Expression Tuple 3370.

Context Expression Prefix Dictionary 2818 illustrates an emoji prefix[52] to Context Expression Tuple 3110, Context Expression Tuple 3120, Context Expression Tuple 3130, Context Expression Tuple 3230, Context Expression Tuple 3250, Context Expression Tuple 3360, and Context Expression Tuple 3370. Context Expression Prefix Dictionary 2818 contains one or more Context Emoji 3006 in FIG. 30 in combination with, and in any order, one or more Action Emoji 3008 in FIG. 30. In another embodiment, Context Expression Prefix Dictionary 2818 contains one or more Context Emoji 3006 in FIG. 30. In yet another embodiment, Context Expression Prefix Dictionary 2818 contains one or more Action Emoji 3008 in FIG. 30.

[52] "prefix, n." OED Online, Oxford University Press, March 2020, www.oed.com/view/Entry/150035. Accessed 3 May 2020.

An exemplary enablement is a system that enables the use of an emoji prefix which may be used to adjust or modify the conveyed attributive context for a context expression or to describe and distinguish the conveyed attributive context for a context expression.

Query Emoji 3301 illustrates a query derived Action Emoji 3008 (see, FIG. 30). Query Emoji 3301 may be used to convey a query attributive context for a context expression. Query represents query languages used to make queries in the applications and systems (see, FIG. 26). Execute Emoji 3302 illustrates an execute derived Action Emoji 3008 (see, FIG. 30). Execute Emoji 3302 may be used to convey an execute attributive context for a context expression. Execute represents the instructions of a computer program to be executed in the applications and systems (see, FIG. 26).

An exemplary enablement is a system that utilizes emoji to convey query context for a context expression.

Another exemplary enablement is a system that utilizes emoji to convey execute context for a context expression.

A query statement is composed of the initial Query Emoji 3301 followed by one or more Context Emoji 3006 in FIG. 30 in combination with, and in any order, one or more Action Emoji 3008 in FIG. 30 to the left of the first Word Divider 3002 (or Delimiter 3004 in FIG. 30) in Context Expression Tuple 3110, Context Expression Tuple 3120, Context Expression Tuple 3130, Context Expression Tuple 3230, and Context Expression Tuple 3250, Context Expression Tuple 3360, Context Expression Tuple 3370, Context Expression Tuple 3380, and Context Expression Tuple 3390. An execute statement is composed of the initial Execute Emoji 3302 followed by one or more Context Emoji 3006 in FIG. 30 in combination with, and in any order, one or more Action Emoji 3008 in FIG. 30 to the left of the first Word Divider 3002 (or Delimiter 3004 in FIG. 30) in Context Expression Tuple 3110, Context Expression Tuple 3120, Context Expression Tuple 3130, Context Expression Tuple 3230, and Context Expression Tuple 3250, Context Expression Tuple 3360, Context Expression Tuple 3370, Context Expression Tuple 3380, and Context Expression Tuple 3390. Query statements and execute statements represent emoji prefixes.

During composition, the system utilizes Context Expression Build Module 2904 or Context Expression Template Module 2918 in FIG. 29 to add the emoji prefix to Context Expression Prefix Dictionary 2818 whereby a new KVP is created for each emoji in the prefix.

The following examples illustrate context expressions for various context expression tuples:

Context Expression Tuple 3330 Example 1:
:website: :business:Pepe's Pizza
Context Expression Tuple 3390 Example 2:
:website: #Pepe's Pizza
Context Expression Tuple 3350 Example 3:
:address: :business:Pepe's Pizza
Context Expression Tuple 3390 Example 4:
:menu: #Pepe's Pizza
Context Expression Tuple 3390 Example 5:
:showtimes: #Star Wars
Context Expression Tuple 3390 Example 6:
:showtimes: #New Haven #>7:00 PM
Context Expression Tuple 3330 Example 7:
:movies::actors: name: Harrison Ford
Context Expression Tuple 3390 Example 8:
:buy::movie::tickets: #Star Wars
Context Expression Tuple 3340 Example 9:
:add::review: :restaurant::pepes_pizza::overall::joy::food:9:service:8
Context Expression Tuple 3340 Example 10:
:query::reviews: :restaurant::pepes_pizza:
Context Expression Tuple 3340 Example 11:
:reviews::results: :restaurant::pepes_pizza::overall::joy::food:9.1:service:8.75
Context Expression Tuple 3350 Example 12:
:execute::on::new::review::notify: :restaurant:—Pepe's|:email:—manager@ pepespizzeria.com|:message:—A new review was shared.|:subject:—New Review Notification An exemplary enablement is a system that enables the use of an emoji prefix which may be used to convey an attributive context for a context expression.

Another exemplary enablement is a system that enables the use of an emoji prefix which may be used to convey an actionable attributive context for a context expression.

Context Expression Tuple 3340 Example 9 illustrates an exemplary enablement of the system that enables the crowd sourcing of context expressions with the conveyance of sentiment as an attributive context.

Context Expression Tuple 3340 Example 10 illustrates an exemplary enablement of the system that utilizes emoji to compose query statements to convey query context for a context expression.

Context Expression Tuple 3340 Example 11 illustrates an exemplary enablement of the system that utilizes emoji to enable the composition of context expression as the result of a query.

Context Expression Tuple 3340 Example 11 illustrates an exemplary enablement of the system that utilizes emoji to enable the composition of context expression with the conveyance of aggregate sentiment as an attributive context.

Context Expression Tuple 3350 Example 12 illustrates an exemplary enablement of the system that utilizes emoji to compose execute statements to convey execute context for a context expression.

An exemplary enablement is a system that accepts visual, audio, or tactile input for a context expression.

Another exemplary enablement is a system whose output may be visual, audio, or tactile for a context expression.

Another enablement is a system that accepts visual, audio, or tactile input to convey attributive context for a context expression.

Another exemplary enablement is a system whose output may be visual, audio, or tactile to convey attributive context for a context expression.

Context Expression Build Module 2904 and Context Expression Rules Module 2914, as well as Context Expression Module Manager 2900 and its constituent parts in FIG. 29, enable composition of new context expression key-value tuples, context expression key tuples, and context expression value tuples. Context expression tuples can be created by removing and combining the constituent parts in Context Expression Elements 3000 in FIG. 30, Context Expressions 3100 in FIG. 31, Context Expressions 3200 in FIG. 32, and Context Expressions 3300 in FIG. 33. Context Expression Module Manager 2900 enables the storage of new context expression key-value tuples, context expression key tuples, context expression value tuples, and context expression tuples in Context Expression Module Manager Storage 2922 in FIG. 29.

An exemplary enablement is a system that enables composition of new context expression key-value tuples, context expression key tuples, context expression value tuples, and context expression tuples.

Another exemplary enablement is a system that enables storing of context expression key-value tuples, context expression key tuples, context expression value tuples, and context expression tuples.

For example, adding a Word Divider 3002 in FIG. 30 between Context Expression Key Tuple 3050 and Context Expression Value Tuple 3070 in Context Expression Key-Value Tuple 3220 in FIG. 32 would compose a new context expression key-value tuple, hereto referenced as Context Expression Key-Value Tuple Version 2. Continuing the example, Context Expression Key-Value Tuple Version 2 could then be used to compose a new version Context Expression Tuple 3230 in FIG. 32 to create Context Expression Tuple Version 2 which then could be used to compose a new version of Context Expression Tuple 3340 in FIG. 33, hereto referenced as Context Expression Tuple Version 2. The following examples illustrate context expressions for Context Expression Tuple Version 2:

Context Expression Tuple Version 2 Example 1:
:food: :article: Pizza
Context Expression Tuple Version 2 Example 2:
:food::pizza: :article: History of Pizza
Context Expression Tuple Version 2 Example 3:
:food::pizza::variety: :article: neapolitan pizza
Context Expression Tuple Version 2 Example 4:
:food::pizza::variety: :article: pizza napoletana
Context Expression Tuple Version 2 Example 5:
:food::pizza::variety: :article: New Haven Pizza
Context Expression Tuple Version 2 Example 6:
:food::pizza::variety: :article: apizza Context Expression Tuple Version 2 Examples 1-6 illustrate context expression composition.

An exemplary enablement is a system that enables the use of an emoji prefix which may be used to convey a classification attributive context for a context expression.

Another exemplary enablement is a system that enables the use of an emoji prefix which may be used to convey a subclassification attributive context for a context expression.

Another exemplary enablement is a system that enables the use of an emoji prefix which may be used to conveyed taxonomy attributive context for a context expression.

Context Systems 2610 in FIG. 26 encapsulates and utilizes context expressions as illustrated in FIGS. 2-3 as well as FIGS. 26-33 and the specifications that support the figures. In another embodiment, Lookup App(s) 2604-1 through Lookup App(s) 2604-N in FIG. 26 encapsulate and utilize context expressions.

An exemplary enablement is a system that makes context expressions available through an Application Programming Interface (API).

Another exemplary enablement is a system that makes context expressions available through a Software Development Kit (SDK).

FIG. 34 illustrates Pathway Enumeration 3400 which is composed of None=0 3402, Pathway Complete=1 3404, Pathway Character Increment=2 3406, Pathway Key=4 3408, Pathway Key-Value Pair=8 3410, Pathway Locality=16 3412, Pathway Partition=32 3414, Pathway Taxonomy=64 3416, Pathway Temporality=128 3418, Pathway Value=256 3420, Pathway Prefix=512 3422, Pathway Word Increment=1024 3424, Pathway Word-Joined Increment=2048 3426, Pathway Word-Joined Character Increment=4096 3428, Pathway Text=8192 3430, Pathway Key Text=16384 3432, Pathway Value Text=32768 3434, and Pathway Character Increment=65556 3436.

Pathway Enumeration 3400 illustrates an enumeration type with flags which could be extended and is not limited to the exemplified elements. None=0 3402 illustrates a flag value of zero as an optimization, meaning that no flags are set. Pathway Complete=1 3404 illustrates the pathway is complete. Pathway Character Increment=2 3406 illustrates the pathway is a character increment. Pathway Key=4 3408 illustrates the pathway is a key. Pathway Key-Value Pair=8 3410 illustrates the pathway is a key value pair. Pathway Locality=16 3412 illustrates the pathway is a locality. Pathway Partition=32 3414 illustrates the pathway is a partition. Pathway Taxonomy=64 3416 illustrates the pathway is a taxonomy. Pathway Temporality=128 3418 illustrates the pathway is a temporality. Pathway Value=256 illustrates the pathway is a value. Pathway Prefix=512 3422 illustrates the pathway is a prefix. Pathway Word Increment 1024 3424 illustrates the pathway is a word increment. Pathway Word-Joined Increment 2048 3426 illustrates the pathway is a word-joined increment. Pathway Word-Joined Character Increment 4096 3428 illustrates the pathway is a word-joined character increment. Pathway Text=8192 3430 illustrates the pathway is a text. Pathway Key Text=16384 3432 illustrates the pathway is a key text. Pathway Value Text=32768 3434 illustrates the pathway is a value text. Pathway Character Increment=65556 3436 illustrates the pathway is a character increment.

FIG. 35 illustrates Content Enumeration 3500 which is composed of None 3502, Content Domain Name 3504, Content HTML 3506, Content JSON 3508, Content Lookup 3520, Content Lookup Reference 3522, Content Pathway 3530, Content Pathway Reference 3532, Content UNC 3540, Content URL 3542, Content URN 3544, Content XML 3560, and Content XSLT 3562.

Content Enumeration 3500 illustrates an enumeration type which could be extended and is not limited to the exemplified elements. None 3502 illustrates an optimization indicating that the enumeration is not set. Content Domain Name 3504 illustrates that the content is a domain name. Content HTML 3506 illustrates that the content is HTML. Content JSON 3508 illustrates that the content is JSON. Content Lookup 3520 illustrates that the content is lookup. Content Lookup Reference 3522 illustrates that the content is one or more lookup references. Content Pathway 3530 illustrates that the content is pathway. Content Pathway Reference 3532 illustrates that the content is pathway references. Content UNC 3540 illustrates that the content is Universal Naming Convention (UNC). Content URL 3542 illustrates that the content is URL. Content URN 3544 illustrates that the content is Uniform Resource Name (URN). Content XML 3560 illustrates that the content is XML. Content XSLT 3562 illustrates that the content is XSLT.

Both common and uncommon acronyms are illustrated in Content Enumeration 3500. Uncommon acronyms have been specified to eliminate ambiguity.

FIG. 36 illustrates Content 3600 and Content Collection 3640. Content 3600 is composed of Content Data 3602, Content Id 3604, and Content Type 3606. Content Collection 3640 contains Content 3600.

Content 3600 illustrates the content composition. Content Data 3602 illustrates the content data for Content 3600. Content Id 3604 illustrates a unique content identifier for Content 3600. Content Type 3606 illustrates the content type for Content 3600 (see, Content Enumeration 3500 in FIG. 35). Collections are illustrated by Content Collection 3640.

The word "content" is defined as digital data. When the word "content" is used, it refers to the content definition specified here in addition to Content 3600, its constituent parts, and any derivatives thereof. The phrase "content item"

is defined as a single element of a content collection. When the phrase "content item" is used, it refers to the content item definition specified here in addition to single content element, Content 3600, in Content Collection 3640, its constituent parts, and any derivatives thereof.

An exemplary enablement is a system that supports but is not limited to the following types of content: domain name, HTML, JSON, lookup, pathway, pathway reference, UNC, URL, URN, XML, and XSLT.

FIG. 37 illustrates Taxonomy Enumeration 3700 which is composed of None 3702, Taxonomy Catalog 3704, Taxonomy Classification 3706, Taxonomy Crowd Sourced 3708, Taxonomy Folk 3710, Taxonomy Folksonomy 3712, Taxonomy ISBN 3714, Taxonomy Model Number 3716, Taxonomy Serial Number 3718, Taxonomy SKU 3720, Taxonomy Subject Heading 3722, Taxonomy Tag 3724, and Taxonomy Topic 3726.

Taxonomy Enumeration 3700 illustrates an enumeration type which could be extended and is not limited to the exemplified elements. None 3702 illustrates an optimization indicating that the enumeration is not set. Taxonomy Catalog 3704 illustrates that the taxonomy is catalog. Taxonomy Classification 3706 illustrates that the taxonomy is classification. Taxonomy Crowd Sourced 3708 illustrates that the taxonomy is crowd sourced. Taxonomy Folk 3710 illustrates that the taxonomy is folk taxonomy. Taxonomy Folksonomy 3712 illustrates that the taxonomy is folksonomy. Taxonomy ISBN 3714 illustrates that the taxonomy is ISBN. Taxonomy Model Number 3716 illustrates that the taxonomy is model number. Taxonomy Serial Number 3718 illustrates that the taxonomy is serial number. Taxonomy SKU 3720 illustrates that the taxonomy is SKU. Taxonomy Subject Heading 3722 illustrates that the taxonomy is subject heading. Taxonomy Tag 3724 illustrates that the taxonomy is tag. Taxonomy Topic 3726 illustrates that the taxonomy is topic. An emoji may be derived from Taxonomy Emoji 3012 in FIG. 30 for each of the named constants in Expression Enumeration 2740 in FIG. 27.

"A folk taxonomy is a vernacular naming system, as distinct from scientific taxonomy," and "are generated from social knowledge and are used in everyday speech."[53] A "folksonomy is the system in which users apply public tags to online items, typically to make those items easier for themselves or others to find later."[54] A crowd sourced taxonomy is the result of taxonomy aggregation and data analytics.

[53] "Folk Taxonomy." Wikipedia, the Free Encyclopedia, Wikimedia Foundation, Inc, 2 Feb. 2005, en.wikipedia.org/wiki/Folk_taxonomy. Accessed 28 Apr. 2020.
[54] "Folksonomy." Wikipedia, the Free Encyclopedia, Wikimedia Foundation, Inc, 8 Nov. 2004, en.wikipedia.org/wiki/Folksonomy. Accessed 28 Apr. 2020.

An exemplary enablement is a system that supports but is not limited to the following types of taxonomies: catalog, classification, crowd sourced, folk, folksonomy, ISBN, model number, serial number, SKU, subject heading, tag, and topic.

Another exemplary enablement is a system where taxonomies support the use of emoji.

Another exemplary enablement is a system that supports both formal and informal taxonomy systems.

Another exemplary enablement is a system that integrates into existing taxonomy systems.

Another exemplary enablement is a system where tag taxonomies support the use of ASCII 35 number sign[55].

[55] Peter. "ASCII Code #." The Complete Table of ASCII Characters, Codes, Symbols and Signs, American Standard Code for Information Interchange, theasciicode.com.ar/ascii-printable-characters/number-sign-ascii-code-35.html.

Another exemplary enablement is a system where tag taxonomies support the use of a word divider (e.g., the number sign followed by any number of words separated by spaces).

Another exemplary enablement is a system where tag taxonomies may be case sensitive or case insensitive.

Another exemplary enablement is a system where tag taxonomies support the use of special characters.

Figure 38:
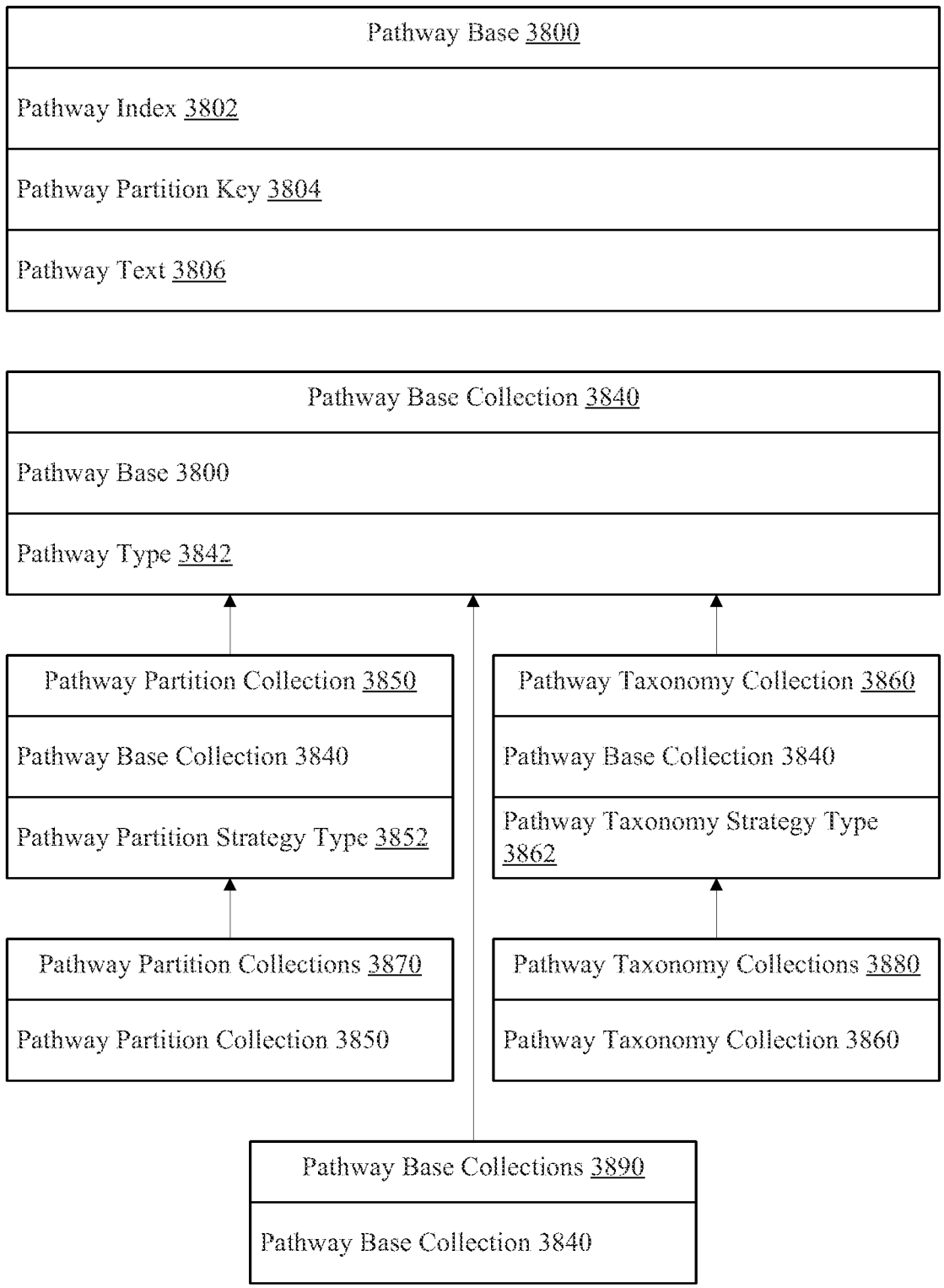
FIG. 38 shows an exemplary Pathway Base.

FIG. 38 illustrates Pathway Base 3800, Pathway Base Collection 3840, Pathway Partition Collection 3850, Pathway Taxonomy Collection 3860, Pathway Partition Collections 3870, Pathway Taxonomy Collections 3880, and Pathway Base Collections 3890. Pathway Base 3800 contains Pathway Index 3802, Pathway Partition Key 3804, and Pathway Text 3806. Pathway Base Collection 3840 contains Pathway Base 3800 and Pathway Type 3842. Pathway Partition Collection 3850 contains Pathway Base Collection 3840 and Pathway Partition Strategy Type 3852. Pathway Taxonomy Collection 3860 contains Pathway Base Collection 3840 and Pathway Taxonomy Strategy Type 3862. Pathway Partition Collections 3870 contains Pathway Partition Collection 3850. Pathway Taxonomy Collections 3880 contains Pathway Taxonomy Collection 3860. Pathway Base Collections 3890 contains Pathway Base Collection 3840.

Pathway Base Collection 3840 is the parent type of Pathway Partition Collection 3850, Pathway Taxonomy Collection 3860, and Pathway Base Collections 3890. Pathway Partition Collection 3850 is the parent type of Pathway Partition Collections 3870. Pathway Taxonomy Collection 3860 is the parent type of Pathway Taxonomy Collections 3880. Parent type hierarchy illustrates the Object Oriented Design (OOD) principle of inheritance where each child type may inherit characteristics of the parent type such as attributes and functions.

Pathway Index 3802 and Pathway Partition Key 3804 are context indexes. Pathway Text 3806 is the text used to derive Pathway Index 3802 and may be used to derive Pathway Partition Key 3804. Pathway Type 3842 in Pathway Base Collection 3840 is a type of Pathway Enumeration 3400 in FIG. 34. Pathway Partition Strategy Type 3852 in Pathway Partition Collection 3850 may be utilized to indicate a partition strategy. Pathway Enumeration 3400 in FIG. 34 may be used for Pathway Partition Strategy Type 3852. Pathway Taxonomy Strategy Type 3862 in Pathway Taxonomy Collection 3860 may be utilized to indicate a taxonomy strategy. Taxonomy Enumeration 3700 in FIG. 37 may be used for Pathway Taxonomy Strategy Type 3862. Collections are illustrated by Pathway Base Collection 3840, Pathway Partition Collection 3850, Pathway Taxonomy Collection 3860, Pathway Partition Collections 3870, Pathway Taxonomy Collections 3880, and Pathway Base Collections 3890.

Figure 39:
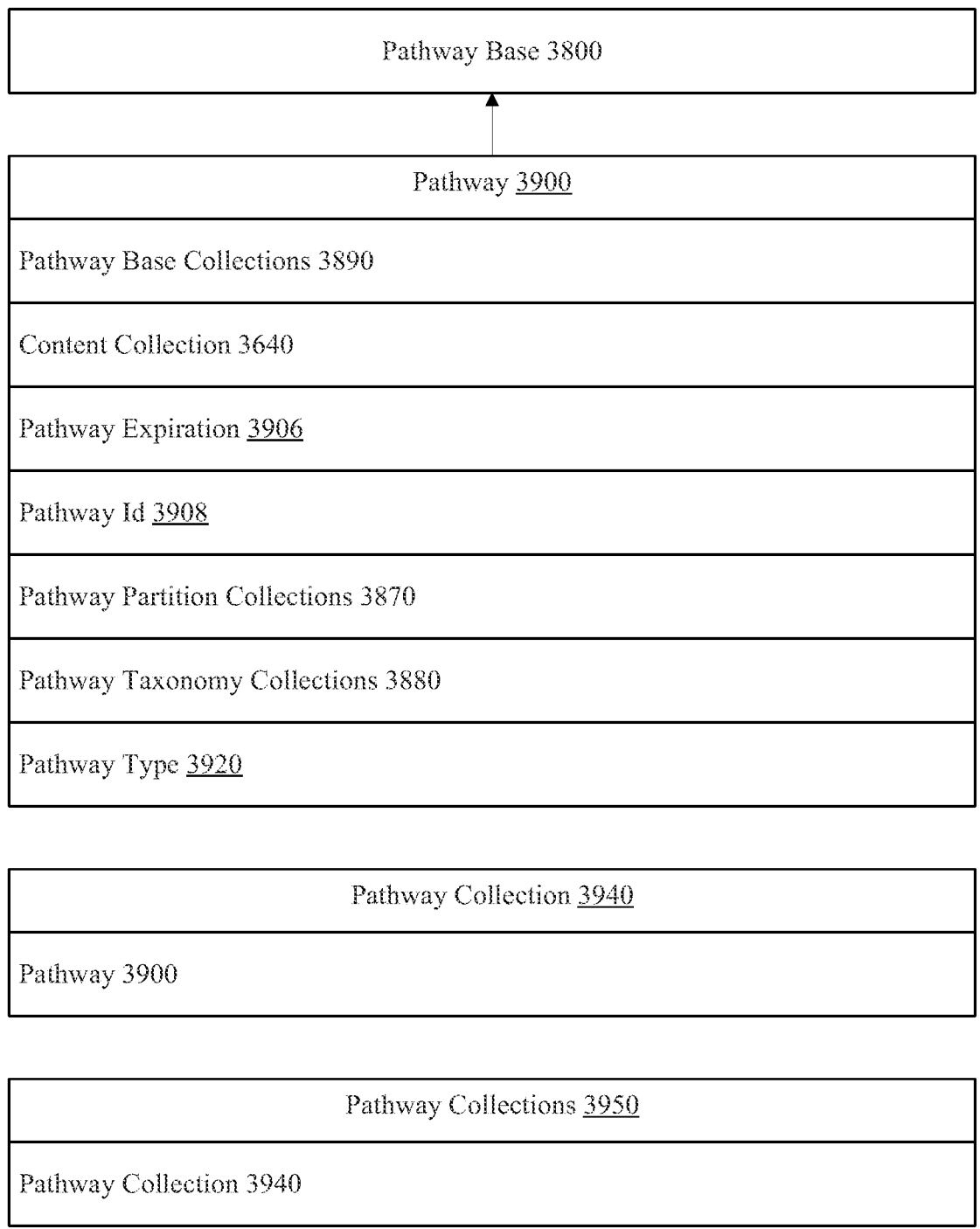
FIG. 39 shows an exemplary Pathway.

FIG. 39 illustrates Pathway Base 3800, Pathway 3900, Pathway Collection 3940, and Pathway Collections 3950. Pathway 3900 contains Pathway Base Collections 3890, Content Collection 3640, Pathway Expiration 3906, Pathway Id 3908, Pathway Partition Collections 3870, Pathway Taxonomy Collections 3880, and Pathway Type 3920. Pathway Collection 3940 contains Pathway 3900. Pathway Collections 3950 contains Pathway Collection 3940. Pathway Base 3800 is the parent type of Pathway 3900. Pathway 3900 descends from Pathway Base 3800. Collections are illustrated by Pathway Collection 3940 and Pathway Collections 3950.

Pathway Base Collections 3890 illustrates the Pathway Base Collections 3890 in FIG. 38 for Pathway 3900. Content Collection 3640 illustrates the Content Collection 3640 in FIG. 36 for Pathway 3900. Pathway Expiration 3906 illustrates a DateTime[56] which is an expiration for Pathway 3900. If a valid DateTime is specified, it illustrates that Pathway 3900 has expired and is removed from the system. Pathway Id 3908 illustrates a unique identifier for Pathway 3900. Pathway Partition Collections 3870 illustrates the Pathway Partition Collections 3870 in FIG. 38 for Pathway 3900. Pathway Taxonomy Collections 3880 illustrates the Pathway Taxonomy Collections 3880 in FIG. 38 for Pathway 3900. Pathway Type 3920 illustrates the Pathway Enumeration 3400 in FIG. 34 for Pathway 3900.

[56] "DateTime Struct (System)." Technical Documentation, API, and Code Examples|Microsoft Docs, docs.microsoft.com/en-us/dotnet/api/system.datetime.

During Pathway 3900 construction, a unique identifier is generated for the pathway and assigned to Pathway Id 3908 and Pathway=1 3404 is assigned to the pathway's Pathway Type 3820. A default DateTime is assigned to the pathway's Pathway Expiration 3906—by default all pathways expire.

In another embodiment, pathways can be permanent wherein Pathway Expiration 3906 is set to a constant that is equivalent to 23:59:59.9999999 UTC, Dec. 31, 9999. In yet another embodiment, users specify a DateTime that is assigned to Pathway Expiration 3906. Upon expiration, a pathway is purged automatically from all systems. In yet another embodiment, the pathway at expiration, is anonymized and retained for machine learning, data analytics, and reporting.

An exemplary enablement is a system capable of automatically expiring and removing pathways.

Another exemplary enablement is a system that enables users to set pathway expiration.

Another exemplary enablement is a system that enables users to create permanent pathways.

As stated above, "A 'context expression' is defined as an expression that conveys one or more attributive contexts for a subject," and an "'actionable context expression' is defined as an expression that conveys actionable attributive context for a subject." The phrases "context information" and "contextual information" are used to refer to both context and actionable context information. The context expression by virtue of its conveyances, captures the distinct context information about a subject. The process of deriving a context identifier from a context expression is called a "contextual transformation," wherein the resulting context identifier is a distinct digital signature that uniquely represents the captured contextual information about a subject.

A context identifier may be referenced as a "context index" when it is utilized for its captured contextual information that serves as an index to direct or point to one or more subjects in a system. A context identifier may be referenced as a "context key" when its serves as a key in a data system (e.g., Primary, Partition, Shard, Row); it may be referenced as a "context address" when it serves as an address, in whole or in part, in a resource system. The term "context index" may be used in general to include the "context index," "context key," and "context address" senses illustrated above. The term, context index may also refer to contextual information that is actionable (e.g., query and execute) in which case the context identifier may reference processing functionality (e.g., an API address). A "pathway" is defined as a location or route as specified by one or more context indexes. When the word "pathway" is used, it refers to the pathway definition specified here in addition to Pathway 3900, its constituent parts, and any derivatives thereof.

The term "context expression string" is defined, in the first sense, as the string representation of a context expression text members: Context Expression Key Text 2808, Context Expression Text 2810, and Context Expression Value Text 2816 (see, FIG. 28 respectively).

The term "context expression string" is defined, in the second sense, as the string representation of the text derived from a Context Key 2702 or Context Value 2704 in Context Item 2700 or Context Item 2710 (see, FIG. 27 respectively). The term "context expression string collection" is defined as the one or more context expression strings in each Context Item 2700 or Context Item 2710 contained in the context expression members: Context Item Dictionary 2720, Context Item Key Collection 2806, Context Item Value Collection 2814, and Context Expression Prefix Dictionary 2818 (see, FIG. 28 respectively).

One or more context expressions and one or more content items, as well as the content type (see, Content Type 3606 in FIG. 36) relative to each content item, are used to create pathways. The one or more content items are assigned to Content Collection 3640.

An exemplary enablement is a system that enables one or more content items to be add to a pathway.

Another exemplary enablement is a system that enables one or more content items in a pathway to reference one or more lookups.

Another exemplary enablement is a system that enables one or more content items in a pathway to reference one or more pathways.

The context expression strings in the one or more context expressions are used to create context indexes for inclusion into the Pathway Base Collections 3890, Pathway Partition Collections 3870, and Pathway Taxonomy Collections 3880 of a pathway.

An exemplary enablement is a system that derives a context index that uniquely represents the captured contextual information about a subject.

Another exemplary enablement is a system that enables the utilization of a context index to direct or point to a particular context expression.

Another exemplary enablement is a system that enables the utilization of a context index as a key in a data system.

Another exemplary enablement is a system that enables the utilization of a context index as an address, in whole or in part, in a resource system.

Another exemplary enablement is a system that derives pathways as one or more locations or routes as specified by one or more context indexes.

Another exemplary enablement is a system that enables the utilization of pathways as one or more locations or routes as specified by one or more context indexes.

An exemplary enablement is a system that utilizes pathways as the one or more locations of content.

Another exemplary enablement is a system that utilizes pathways as one or more routes to content.

Another exemplary enablement is a system that utilizes pathways as the one or more locations of lookup content.

Another exemplary enablement is a system that utilizes pathways as one or more routes to lookup content.

Another exemplary enablement is a system that utilizes pathways as the one or more locations of lookup reference content.

Another exemplary enablement is a system that utilizes pathways as one or more routes to lookup reference content.

Another exemplary enablement is a system that utilizes pathways as the one or more locations of pathway content.

Another exemplary enablement is a system that utilizes pathways as one or more routes to pathway content.

Another exemplary enablement is a system that utilizes pathways as the one or more locations of pathway reference content.

Another exemplary enablement is a system that utilizes pathways as one or more routes to pathway reference content.

Figure 40:
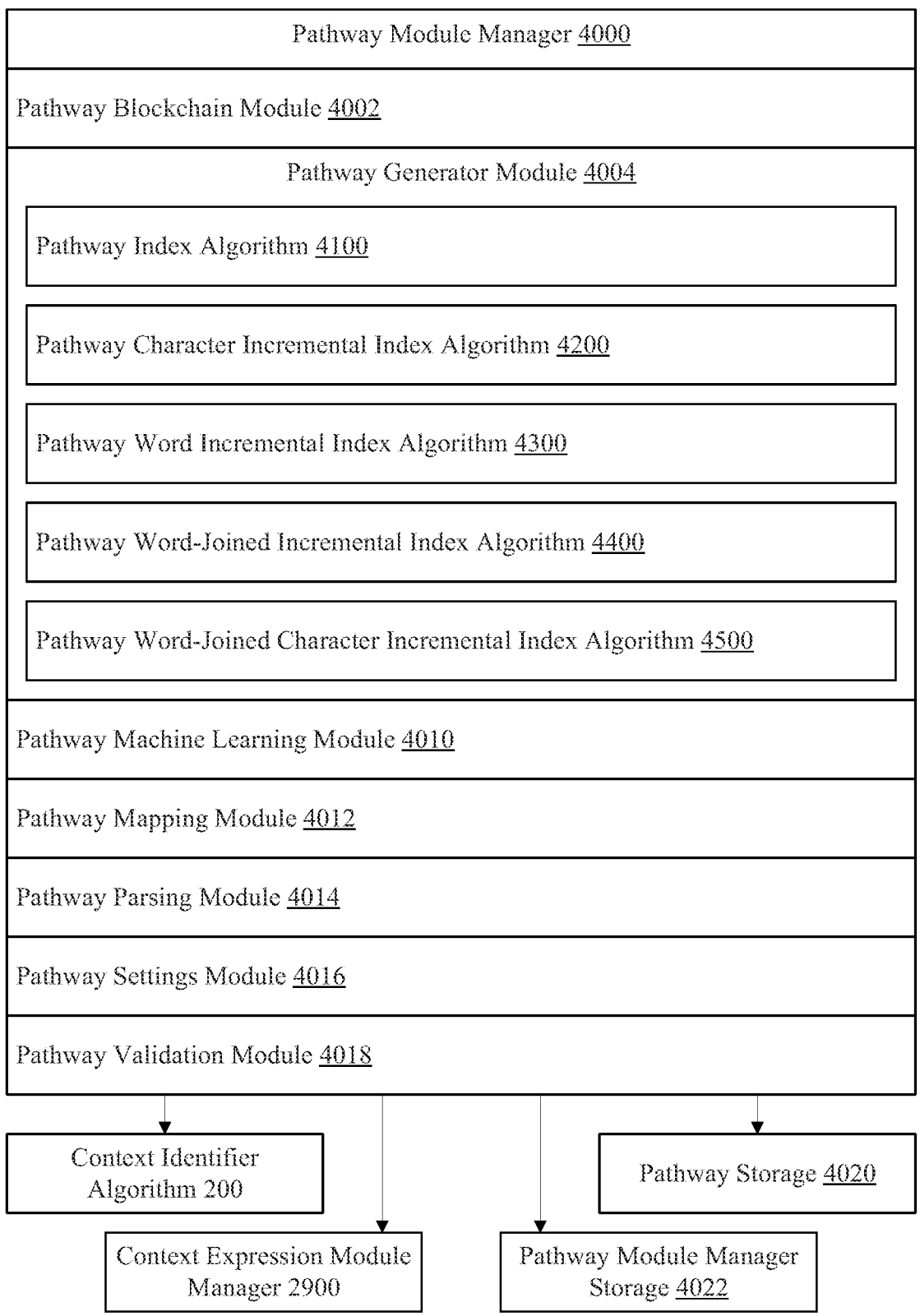
FIG. 40 shows an exemplary Pathway Module Manager.

FIG. 40 illustrates Pathway Module Manager 4000 which is composed of Pathway Blockchain Module 4002, Pathway Generator Module 4004, Pathway Machine Learning Module 4010, Pathway Mapping Module 4012, Pathway Parsing Module 4014, Pathway Settings Module 4016, and Pathway Validation Module 4018. Pathway Generator Module 4004 contains Pathway Index Algorithm 4100, Pathway Character Incremental Index Algorithm 4200, Pathway Word Incremental Index Algorithm 4300, Pathway Word-Joined Incremental Index Algorithm 4400, and Pathway Word-Joined Character Incremental Index Algorithm 4500. Pathway Module Manager 4000 utilizes Context Identifier Algorithm 200, Context Expression Module Manager 2900, Pathway Storage 4020, and Pathway Module Manager Storage 4022.

Pathway Module Manager 4000 illustrates the functionality and logic to manage pathways, modules, and algorithms. It illustrates modular functionality to generate, validate, parse, and map pathways. It exemplifies the modular functionality to create, read, update, and delete pathway data. It also illustrates modular functionality for pathway integration with blockchain and machine learning. Finally, it exemplifies that modules also have the functionality to manage pathways, modules, and algorithm settings.

Pathway Blockchain Module 4002 illustrates functionality and logic for pathway integration with blockchain. It exemplifies functionality to create, read, update, and delete pathway blockchain data as well as the logic for pathway blockchain management.

Pathway Generator Module 4004 illustrates functionality and logic to generate pathways. It exemplifies functionality to create, read, update, and delete pathway data as well as the logic for pathway generation management. It illustrates pathway generation integration functionality for blockchain and machine learning. Pathway Generator Module 4004 utilizes Pathway Index Algorithm 4100 (see, Pathway Index Algorithm 4100 in FIG. 41), Pathway Character Incremental Index Algorithm 4200 (see, Pathway Character Incremental Index Algorithm 4200 in FIG. 42), Pathway Word Incremental Index Algorithm 4300 (see, Pathway Word Incremental Index Algorithm 4300 in FIG. 43), Pathway Word-Joined Incremental Index Algorithm 4400 (see, Pathway Word-Joined Incremental Index Algorithm 4400 in FIG. 44), and Pathway Word-Joined Character Incremental Index Algorithm 4500 (see, Pathway Word-Joined Character Incremental Index Algorithm 4500 in FIG. 45).

Pathway Machine Learning Module 4010 illustrates functionality and logic for pathway integration with machine learning. It exemplifies functionality to create, read, update, and delete pathway machine learning data as well as the logic for pathway machine learning management.

Pathway Mapping Module 4012 illustrates mapping functionality and logic for working with pathways.

Pathway Parsing Module 4014 illustrates parsing functionality and logic for working with pathways. Furthermore, Pathway Parsing Module 4014 illustrates functionality for parsing query and programming language in context expressions for pathways.

Pathway Settings Module 4016 exemplifies functionality and logic to create, read, update, and delete pathway settings data as well as the logic for pathway settings management.

Pathway Validation Module 4018 illustrates validation functionality and logic for working with pathways. Furthermore, Pathway Validation Module 4018 illustrates functionality for validating context expression language use in generating pathways.

Context Identifier Algorithm 200 illustrates Context Identifier Algorithm 200 in FIG. 2. Context Expression Module Manager 2900 illustrates Context Expression Module Manager 2900 in FIG. 29. Pathway Storage 4020 and Pathway Module Manager Storage 4022 illustrate data storage systems such as a database. Pathway Module Manager 4000 and its constituent parts, as well as any derivatives thereof, may access and utilize Context Identifier Algorithm 200, Context Expression Module Manager 2900, Context Expression Storage 2920 and Context Expression Module Manager Storage 2922.

Pathway Module Manager 4000 utilizes Pathway Generator Module 4004 to generate pathways from, as stated above, "one or more context expressions and one or more content items." When Pathway Generator Module 4004 generates pathways, it creates Pathway 3900 (see, Pathway 3900 FIG. 39) as well as Pathway 3900 members: Pathway Base Collections 3890, Pathway Partition Collections 3870 and Pathway Taxonomy Collections 3880 (see, FIG. 39 respectively).

For each of the one or more context expressions, Pathway Generator Module 4004 inputs the context expression and a Context Expression Type 2812 (see, FIG. 28) into Pathway Index Algorithm 4100 to create context indexes. If the context expression's Context Expression Type 2812 is equal to User Template 2744, Generated Template 2746, Simple 2748, or Prefix 2752 (see, FIG. 27 respectively), then the context expression's Context Expression Type 2810 is used; if, the context expression's Context Expression Type 2810 is equal to Complex 2750 (see, FIG. 27) then Pathway Generator Module 4004 utilizes Pathway Index Algorithm 4100 three times, inputting the context expression each time as well as one each of: Generated Template 2746, Simple 2748 and Complex 2750. Pathway Generator Module 4004 adds the resulting Pathway Base Collection 3840 generated from Pathway Index Algorithm 4100 to Pathway Base Collections 3890 in Pathway 3900.

In an alternative embodiment, if the context expression's Context Expression Type 2812 is equal to Prefix 2752, Pathway Generator Module 4004 creates a new Pathway Partition Collection 3850 (see, FIG. 38) and uses Pathway Index Algorithm 4100 to derive Pathway Base Collection 3840; wherein the value from a bitwise OR operation of Pathway Partition=32 3414 and Pathway Prefix=512 3422 (see, FIG. 34) is assigned to the Pathway Partition Strategy Type 3852 (see, FIG. 38) in the returned Pathway Base Collection 3840. Pathway Base Collection 3840 is added to the Pathway Partition Collection 3850 instance which is then added to the Pathway Partition Collections 3870 in Pathway 3900. This embodiment enables processing of a context expression when its Context Expression Type 2810 is equal to User Template 2744 or Generated Template 2746, the Pathway Generator Module 4004 creates a new Pathway Partition Collection 3850 and uses the Pathway Index Algorithm 4100 to derive a Pathway Base Collection 3840; wherein the value from a bitwise OR operation of Pathway Partition=32 3414 and Pathway Key=4 3408 is assigned to the Pathway Partition Strategy Type 3852 (see, FIG. 38) in the returned Pathway Base Collection 3840. Pathway Base Collection 3840 is added to the Pathway Partition Collection 3850 instance which is then added to the Pathway Partition Collections 3870 in Pathway 3900.

As stated above, "A context identifier may be referenced as a 'context index' when it is utilized for its captured contextual information that serves as an index to direct or point to one or more subjects in a system. A context identifier may be referenced as a 'context key' when its serves as a key in a data system (e.g., Primary, Partition, Shard, Row); it may be referenced as a 'context address' when it serves as an address, in whole or in part, in a resource system. The term 'context index' may be used in general to include the 'context index,' context key,' and 'context address' senses illustrated above. A 'pathway' is defined as a location or route as specified by one or more context indexes. When the word 'pathway' is used, it refers to the pathway definition specified here in addition to Pathway 3900, its constituent parts, and any derivatives thereof."

A "pathway index" is defined as the location or route as specified by a context index and used as a context address. When the phrase "pathway index" is used, it refers to the pathway index definition specified here in addition to Pathway Index 3802 in FIG. 38 and any derivatives thereof.

A "pathway partition key" is defined as the location or route as specified by a context index and used as context key. When the phrase "pathway partition key" is used, it refers to the pathway partition key definition specified here in addition to Pathway Partition Key 3804 in FIG. 38 and any derivatives thereof.

An exemplary enablement is a system that utilizes one or more context expressions to create one or more pathway indexes.

An exemplary enablement is a system that utilizes one or more context expressions to create one or more pathway key indexes.

Another exemplary enablement is a system that utilizes one or more context expressions to create one or more pathway value indexes.

Another exemplary enablement is a system that utilizes one or more context expressions to create one or more pathway prefix indexes.

Another exemplary enablement is a system that utilizes one or more context expressions to create one or more pathway key-value pair indexes, one or more pathway key indexes, and one or more pathway value indexes.

An exemplary enablement is a system that utilizes one or more context expressions to create one or more pathway partition keys.

Another exemplary enablement is a system that utilizes one or more context expressions to create a one or more pathway prefix partition keys.

As illustrated, Pathway Generator Module 4004 utilizes Pathway Index Algorithm 4100 to create instances of Pathway Base Collection 3840 that may be utilized as pathway indexes and pathway partition keys. Pathway Generator Module 4004 may utilize Pathway Mapping Module 4012 to map Context Expression Type 2812 in context expressions to Pathway Type 3842 in Pathway Base Collection 3840 during pathway index generation. Moreover, Pathway Mapping Module 4012 may be utilized to map Pathway Type 3842 in Pathway Base Collection 3840 to Pathway Partition Strategy Type 3852 in Pathway Partition Collection 3850 during pathway partition key generation. In another embodiment, Pathway Index Algorithm 4100 may be used to generate pathway taxonomy key generation for inclusion in Pathway Taxonomy Collection 3860 and Pathway Taxonomy Collections 3880 (see, FIG. 38); moreover, Pathway Mapping Module 4012 may be utilized to map Pathway Type 3842 in Pathway Base Collection 3840 to Pathway Taxonomy Strategy Type 3862 in Pathway Taxonomy Collection 3860.

An exemplary enablement is a system that maps one or more context expression types to one or more pathway types to create one or more pathway indexes.

Another exemplary enablement is a system that maps one or more context expression types to one or more pathway types to create one or more pathway partition keys.

Pathway Generator Module 4004 utilizes Pathway Word Incremental Index Algorithm 4300 to create pathway word incremental indexes. For each of one or more context expressions, each key item text in Context Item Key Collection 2806 (see, Context Item Key Collection 2806 in FIG. 28), Context Item Key Text 2808 (see, Context Item Key Text 2808 in FIG. 28), each value item text in the Context Item Value Collection 2814 (see, Context Item Value Collection 2814 in FIG. 28), Context Item Value Text 2816 (see, Context Item Value Text 2816 in FIG. 28), Context Expression Text 2810 (see, Context Expression Text 2810 in FIG. 28), the string representation of each KVP in Context Item Dictionary 2720 (see, Context Item Dictionary 2720 in FIG. 28 and Context Expression Key-Value Tuple 3040 in FIG. 30), and the string representation of context expression created from each KVP in Context Expression Prefix Dictionary 2818 (see, Context Expression Prefix Dictionary 2818 in FIG. 28 and Context Expression Key-Value Tuple 3040 in FIG. 30) are utilized as Pathway Text 4308 (see, Pathway Text 4308 in FIG. 43) input.

Pathway Generator Module 4004 may utilize a context expression composition use mapping value from Pathway Mapping Module 4012, where the context expression's composition is mapped to its use to locate a specific Primary Partition Key 3804 in Pathway Base 3800 in Pathway Base Collection 3840 in Pathway Base Collections 3890 of Pathway 3900, as Pathway Partition Key 4306 (see, Pathway Partition Key 4306 in FIG. 43) input.

Figure 43:
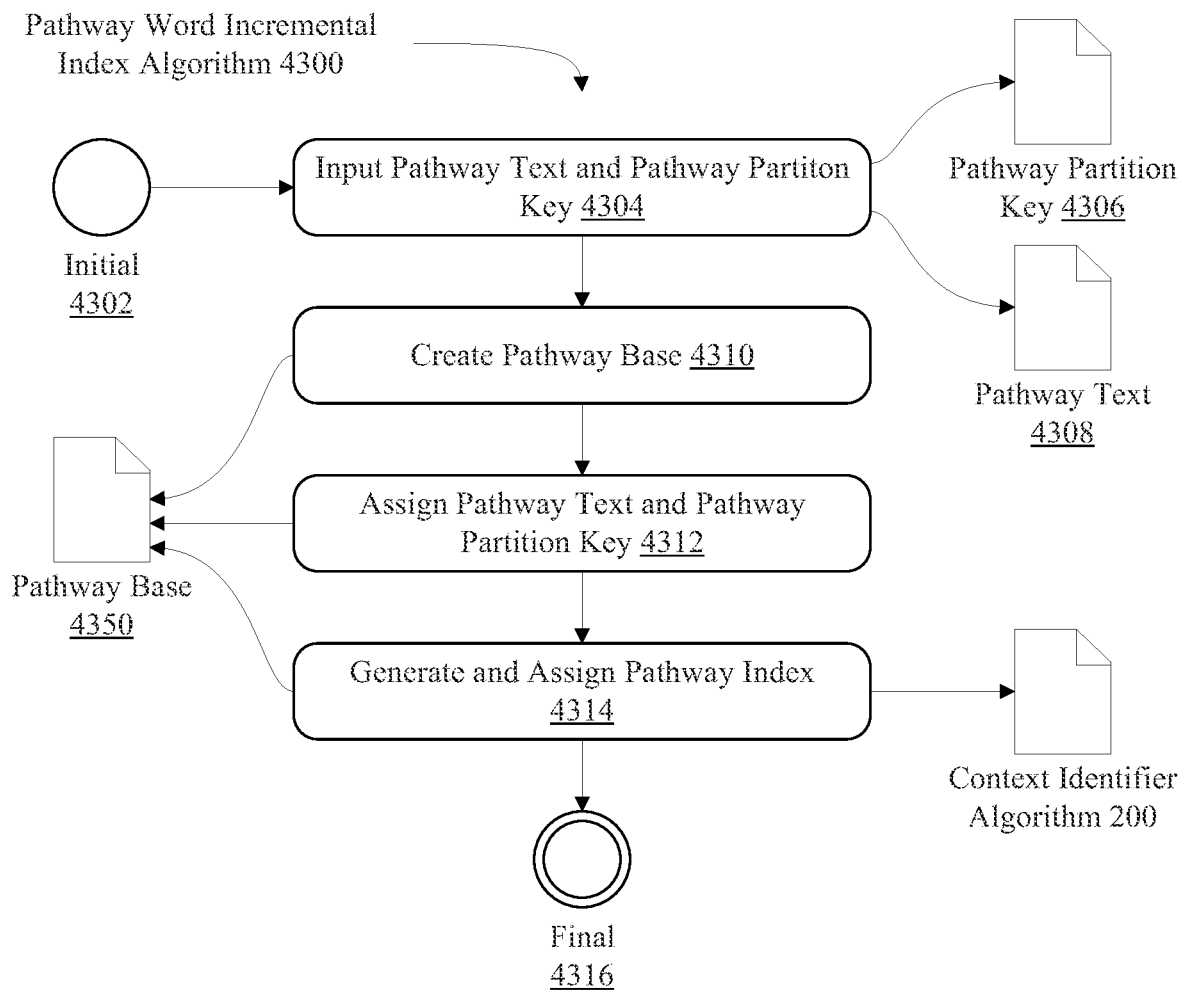
FIG. 43 shows an exemplary Pathway Word Incremental Index Algorithm.

Pathway Generator Module 4004 inputs Pathway Text 4308 and Pathway Partition Key 4306 into Pathway Word Incremental Index Algorithm 4300 resulting in Pathway Base 4350 (see, Pathway Base 4350 in FIG. 43).

Pathway Generator Module 4004 may utilize a context expression composition index use mapping value from Pathway Mapping Module 4012, wherein the indexing algorithm, or indexer, used (e.g., Pathway Word Incremental Index Algorithm 4300) is mapped to a Pathway Enumeration 3400 (e.g., Pathway Word Increment=1024 3424 in FIG. 34) and the source context expression composition used as input into indexing algorithm is mapped to a Pathway Enumeration 3400 (i.e., Pathway Text=8192 3430 in FIG. 34); Pathway Mapping Module 4012 performs a bitwise OR operation of the mappings to derive the value assigned to Pathway Type 3842 in Pathway Base Collection 3840. Hence, resulting Pathway Base 4350 (see, Pathway Base 4350 in FIG. 43) are collected into new instances of Pathway Base Collection 3840 based on context expression composition index use mapping.

For example, Pathway Generator Module 4004 may utilize a context expression's Context Expression Text 2810 as the Pathway Text 4308 input and the context expression composition use mapping value from Pathway Mapping Module 4012 as the Pathway Partition Key 4306 input for Pathway Word Incremental Index Algorithm 4300. Pathway Generator Module 4004 creates a new Pathway Base Collection 3840 instance, to which it assigns context expression composition index use mapping value to the Pathway Type 3842 member, and adds the resulting Pathway Base 4350, or pathway word incremental index, to the instance.

An exemplary enablement is a system that utilizes context expression composition use mapping values to create one or more pathway word incremental indexes.

Another exemplary enablement is a system that utilizes context expression composition index use mapping values to create one or more pathway word incremental indexes.

Pathway Character Incremental Index Algorithm 4200 is utilized by Pathway Generator Module 4004 to derive pathway character incremental indexes.

Figure 42:
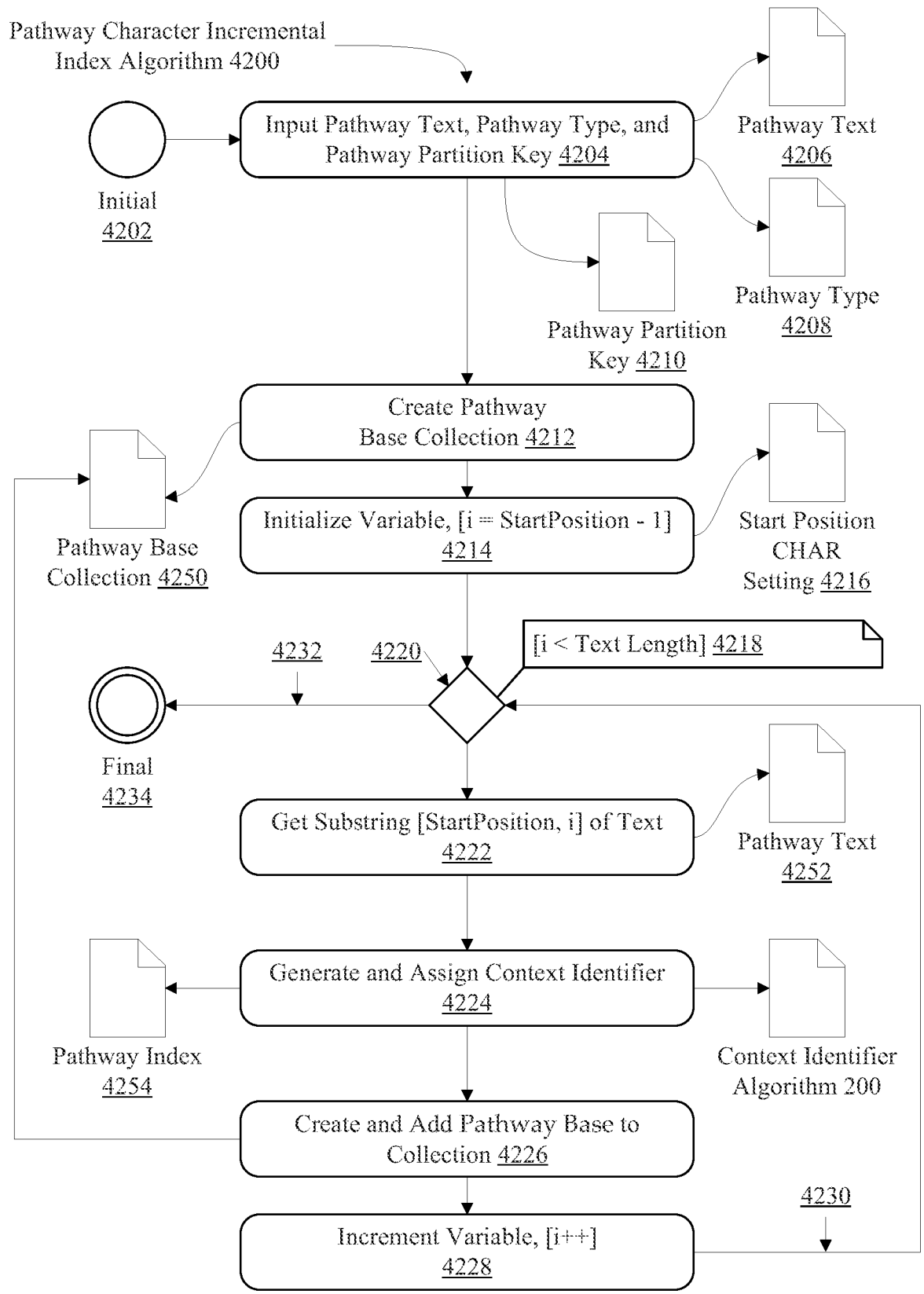
FIG. 42 shows an exemplary Pathway Character Incremental Index Algorithm.

In one embodiment, Pathway Generator Module 4004 utilizes Pathway Text 4206 and Pathway Partition Key 4210 as inputs (see, Pathway Text 4206 and Pathway Partition Key 4210 respectively in FIG. 42) from one or more Pathway Base 3800 in one or more Pathway Base Collection 3840, and each Pathway Base Collection 3840 its Pathway Type 3842 as input of Pathway Type 4208 (see, Pathway Type 4208 in FIG. 42) derived from Pathway Word Incremental Index Algorithm 4300 for Pathway Character Incremental Index Algorithm 4200 to derive Pathway Base Collection 4250 (see, Pathway Base Collection 4250 in FIG. 42), or pathway character incremental indexes. The resulting Pathway Base Collection 4250 is added to Pathway Base Collections 3890 in Pathway 3900.

In another embodiment, Pathway Generator Module 4004 utilizes one or more context expressions, each key item text in Context Item Key Collection 2806, Context Item Key Text 2808, each value item text in Context Item Value Collection 2814, Context Item Value Text 2816, Context Expression Text 2810, the string representation of each KVP in the Context Item Dictionary 2720, and the string representation of context expression created from each KVP in Context Expression Prefix Dictionary 2818 are utilized as Pathway Text 4206 (see, Pathway Text 4206 in FIG. 42) input.

Pathway Generator Module 4004 may utilize a context expression composition use mapping value from Pathway Mapping Module 4012, where the context expression's composition is mapped to its use to locate a specific Primary Partition Key 3804 in Pathway Base 3800 in Pathway Base Collection 3660 in Pathway Base Collections 3890 of Pathway 3900, as Pathway Partition Key 4210 (see, Pathway Partition Key 4210 in FIG. 42) input.

Pathway Generator Module 4004 may utilize a context expression composition index use mapping value from Pathway Mapping Module 4012, wherein the indexing algorithm, or indexer, used (e.g., Pathway Character Incremental Index Algorithm 4200 in FIG. 42) is mapped to a Pathway Enumeration 3400 (e.g., Pathway Character Increment=65556 3436 in FIG. 34), and the source context expression composition used as input into the indexer is mapped to a Pathway Enumeration 3400 (i.e., Pathway Text=8192 3430 in FIG. 34); Pathway Mapping Module 4012 performs a bitwise OR operation of the mappings to derive the value utilized as Pathway Type 4208 (see, Pathway Type 4208 in FIG. 42) input.

Pathway Generator Module 4004 sources Pathway Text 4206 input, Pathway Partition Key 4210 input, and Pathway Type 4208 input, as illustrated above, for input into Pathway Character Incremental Index Algorithm 4200 to derive Pathway Base Collection 4250, or pathway character incremental indexes. The resulting Pathway Base Collection 4250 is added to Pathway Base Collections 3890 in Pathway 3900.

An exemplary enablement is a system that utilizes context expression composition use mapping values to create one or more pathway character incremental indexes.

Another exemplary enablement is a system that utilizes context expression composition index use mapping values to create one or more pathway character incremental indexes.

Pathway Word-Joined Incremental Index Algorithm 4400 is utilized by Pathway Generator Module 4004 to derive pathway word-joined incremental indexes.

Pathway Generator Module 4004 utilizes one or more context expressions, where a context expression's Context Item Key Collection 2806, Context Item Value Collection 2814, Context Item Dictionary 2720, and Context Expression Prefix Dictionary 2818 may be converted to string arrays to utilize as Word Array 4406 (see, Word Array 4406 in FIG. 44) input.

Pathway Generator Module 4004 may utilize a context expression composition use mapping value from Pathway Mapping Module 4012, where the context expression's composition is mapped to its use to locate a specific Primary Partition Key 3804 in the Pathway Base 3800 in Pathway Base Collection 3660 in Pathway Base Collections 3890 of Pathway 3900, as Pathway Partition Key 4405 (see, Pathway Partition Key 4405 in FIG. 44) input. In an alternative embodiment, Pathway Partition Key 4405 may be specified as an override by Pathway Generator Module 4004; in another alternative embodiment, Pathway Partition Key 4405 may be null.

Figure 44:
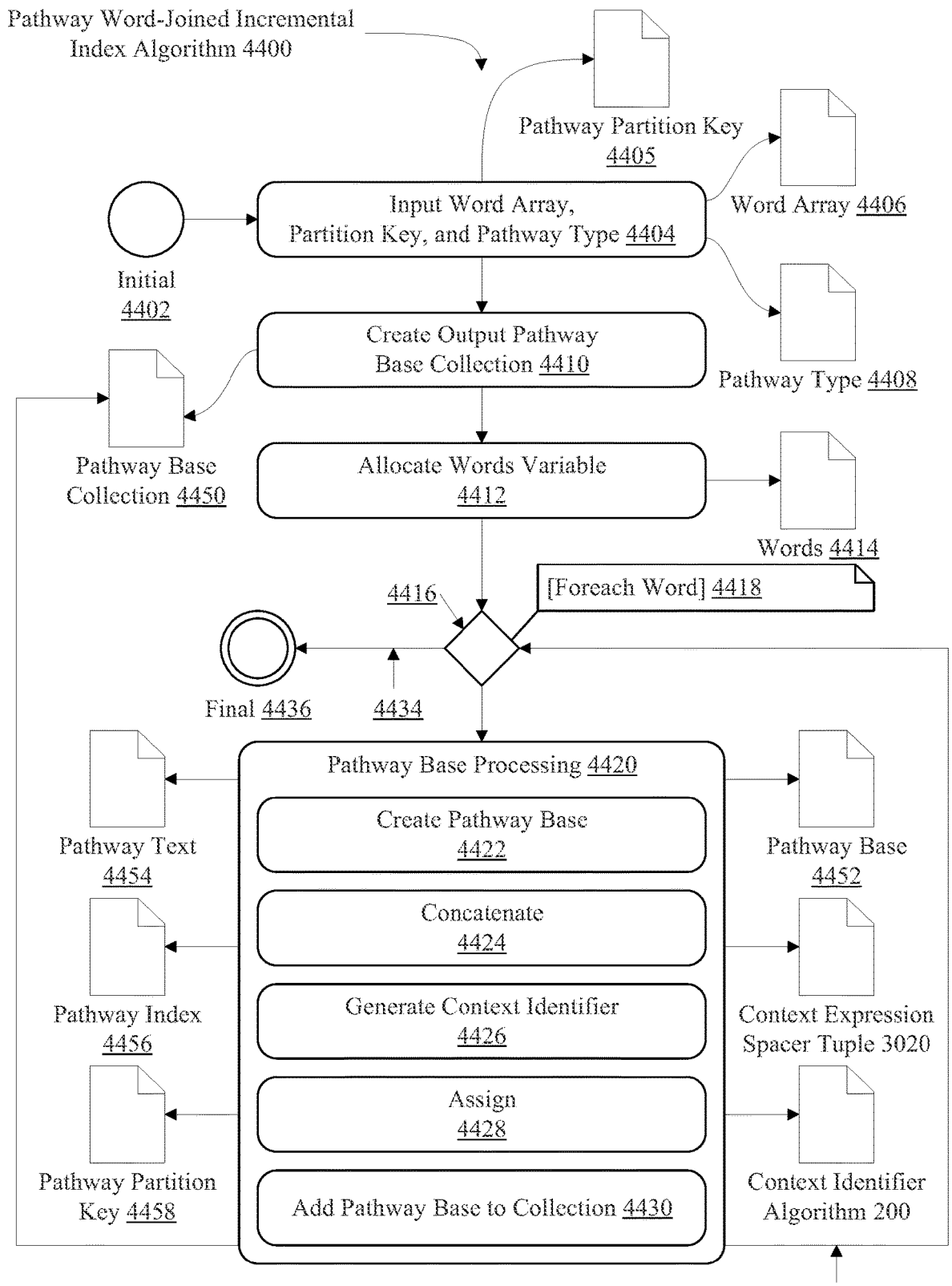
FIG. 44 shows an exemplary Pathway Word-Joined Incremental Index Algorithm.

Pathway Generator Module 4004 may utilize a context expression composition index use mapping value from Pathway Mapping Module 4012, wherein the indexing algorithm, or indexer, used (e.g., Pathway Word-Joined Incremental Index Algorithm 4400 in FIG. 44) is mapped to a Pathway Enumeration 3400 (e.g., Pathway Word-Joined Increment=2048 3426 in FIG. 34), and the source context expression composition used as input into the indexer is mapped to a Pathway Enumeration 3400 (i.e., Pathway Key=4 3408, Pathway Value=256 3420, Pathway Key-Value Pair=8 3410, or Pathway Prefix=512 3422 in FIG. 34); Pathway Mapping Module 4012 performs a bitwise OR operation of the mappings to derive the value utilized as Pathway Type 4408 (see, Pathway Type 4408 in FIG. 44) input.

Pathway Generator Module 4004 sources Word Array 4406 input, Pathway Partition Key 4405 input, and Pathway Type 4408 input, as illustrated above, for input into Pathway Word-Joined Incremental Index Algorithm 4400 to derive Pathway Base Collection 4450, or pathway word-joined incremental indexes. Resulting Pathway Base Collection 4450 are added to Pathway Base Collections 3890 in Pathway 3900.

An exemplary enablement is a system that utilizes context expression composition use mapping values to create one or more pathway word-joined incremental indexes.

An exemplary enablement is a system that utilizes context expression composition index use mapping values to create one or more pathway word-joined incremental indexes.

Pathway Word-Joined Character Incremental Index Algorithm 4500 is utilized by Pathway Generator Module 4004 to derive word-joined character incremental indexes.

Pathway Generator Module 4004 utilizes Pathway Base Collection 4450 from Pathway Word-Joined Character Incremental Index Algorithm 4500 as Pathway Base Collection 4508 (see, Pathway Base Collection 4508 in FIG. 45) input. Pathway Partition Key 3842 in Pathway Base Collection 4450 may be used as Pathway Partition Key 4506 (see, Pathway Partition Key 4506 in FIG. 45) input. In an alternative embodiment, Pathway Partition Key 4506 may be specified as an override by Pathway Generator Module 4004; in another alternative embodiment, Pathway Partition Key 4506 may be null. Pathway Type 3842 in Pathway Base Collection 4450 may be used as Pathway Type 4510 (see, Pathway Type 4510 in FIG. 45) input. In an alternative embodiment, Pathway Partition Type 4510 may be specified as an override by Pathway Generator Module 4004; in another alternative embodiment, Pathway Generator Module 4004 sources Pathway Base Collection 4508 input, Pathway Partition Key 4506 input, Pathway Type 4510 input, as illustrated above, for input into Pathway Word-Joined Character Incremental Index Algorithm 4500 to derive Pathway Base Collection 4550, or word-joined character incremental indexes. Resulting Pathway Base Collection 4550 are added to Pathway Base Collections 3890 in Pathway 3900.

An exemplary enablement is a system that utilizes context expression composition use mapping values to create one or more pathway word-joined character incremental indexes.

Another exemplary enablement is a system that utilizes context expression composition index use mapping values to create one or more pathway word-joined character incremental indexes.

In an alternative embodiment, Pathway Generator Module 4004 utilizing Context Expression Module Manager 2900 in FIG. 29 provides functionality for extractions of partition and taxonomy, in whole or in part, from one or more context expressions to generate additional partition and taxonomy pathway indexes and pathway partition keys. Resulting pathways may be utilized for inclusion into Pathway Base Collections 3890, Pathway Partition Collections 3870, and Pathway Taxonomy Collections 3880 in Pathway 3900.

An exemplary enablement is a system that utilizes extractions of partition and taxonomy, in whole or in part, from one or more context expressions to create one or more pathway indexes.

An exemplary enablement is a system that utilizes extractions of partition and taxonomy, in whole or in part, from one or more context expressions to create one or more pathway key indexes.

Another exemplary enablement is a system that utilizes extractions of partition and taxonomy, in whole or in part, from one or more context expressions to create one or more pathway value indexes.

Another exemplary enablement is a system that utilizes extractions of partition and taxonomy, in whole or in part, from one or more context expressions to create one or more pathway prefix indexes.

Another exemplary enablement is a system that utilizes extractions of partition and taxonomy, in whole or in part, from one or more context expressions to create one or more pathway key-value pair indexes, one or more pathway key indexes, and one or more pathway value indexes.

An exemplary enablement is a system that utilizes extractions of partition and taxonomy, in whole or in part, from one or more context expressions to create one or more pathway partition keys.

Another exemplary enablement is a system that utilizes extractions of partition and taxonomy, in whole or in part, from one or more context expressions to create a one or more pathway prefix partition keys.

In another alternative embodiment, Pathway Generator Module 4004 utilizing Context Expression Module Manager 2900 in FIG. 29 provides functionality for extractions of context, action context, taxonomy context, locality context, and temporality context, in whole or in part, from one or more context expressions to generate additional pathway indexes and pathway partition keys. Resulting pathways may be utilized for inclusion into Pathway Base Collections 3890, Pathway Partition Collections 3870, and Pathway Taxonomy Collections 3880 in Pathway 3900.

An exemplary enablement is a system that utilizes extractions of context, action context, taxonomy context, locality context, and temporality context, in whole or in part, from one or more context expressions to create one or more pathway indexes.

An exemplary enablement is a system that utilize extractions of context, action context, taxonomy context, locality context, and temporality context, in whole or in part, from one or more context expressions to create one or more pathway key indexes.

Another exemplary enablement is a system that utilize extractions of context, action context, taxonomy context, locality context, and temporality context, in whole or in part, from one or more context expressions to create one or more pathway value indexes.

Another exemplary enablement is a system that utilize extractions of context, action context, taxonomy context, locality context, and temporality context, in whole or in part, from one or more context expressions to create one or more pathway prefix indexes.

Another exemplary enablement is a system that utilize extractions of context, action context, taxonomy context, locality context, and temporality context, in whole or in part, from one or more context expressions to create one or more pathway key-value pair indexes, one or more pathway key indexes, and one or more pathway value indexes.

An exemplary enablement is a system that utilize extractions of context, action context, taxonomy context, locality context, and temporality context, in whole or in part, from one or more context expressions to create one or more pathway partition keys.

Another exemplary enablement is a system that utilize extractions of context, action context, taxonomy context, locality context, and temporality context, in whole or in part, from one or more context expressions to create a one or more pathway prefix partition keys.

Pathway Module Manager 4000 utilizes Pathway Generator Module 4004 to generate several types of pathway incremental indexes: character incremental indexes, word incremental indexes, word-joined incremental indexes, and word-joined character incremental indexes. These pathway incremental indexes may be utilized by the system to provide context expression suggestions.

Context expression suggestions may be used as data for user interface drop-down such as the HTML <select> and <option> elements used to create drop-down lists. Drop-downs may offer existing pathway suggestions for user pathways during context expression composition or when users enter context expressions into the system to locate pathways. Context expression suggestions may also be used as data for user interface input masks for edit fields providing for the application of rule and validation logic in combination with pathway incremental index driven data to suggest context expressions for composition or pathway location. For example, word-joined incremental indexes may provide a user several emoji suggestions while composing a context expression.

An exemplary enablement is a system that enables the utilization of pathway incremental indexes to provide one or more context expressions, in whole or in part, as suggestions for context expression composition.

Another exemplary enablement is a system that enables the utilization of pathway incremental indexes to provide one or more context expressions, in whole or in part, as suggestions to locate one or more pathways.

Combining pathway incremental indexes with streaming analytics and machine learning enables system generated context expression predictive intelligence for context expression composition and pathway location suggestions. Moreover, combining prefix, context, action context, taxonomy context, locality context, and temporality context with context expression predictive intelligence enables context expression predictive intelligence context, utilized to suggest context expressions for composition and pathway location. Context intelligence (CI) suggestions enable context driven suggestions that guide with precision, pertinence, locality, and temporality.

An exemplary enablement is a system that enables the combination of pathway incremental indexes with streaming analytics and machine learning to generate context intelligence for context expression composition and pathway location suggestions.

Context intelligence may also be used to create context expressions and derived pathway index and pathway partition keys to be utilized for context sharding. Data center, host, system, service, and storage sharding extend beyond the horizontal and vertical in the physical or virtual (i.e., IaaS, CaaS, PaaS, FaaS, SaaS) to become a multi-dimension context intelligence abstraction layer. Wherein, context intelligence may be utilized to create routes based on pathway index and pathway partition keys derived from context that incorporate data center, host, system, service, and storage designations as well as prefix and extractions of context (i.e., directory, media, politics, social, etc.), action context (i.e., announce, play, purchase, tag, etc.), taxonomy context, locality context, and temporality context. These context graph routes become the edges to content nodes incorporating both the physical and logical implementation layers through the context intelligence abstraction layer to create distributed context graphs.

An exemplary enablement is a system that enables context intelligence generation of pathway index and pathway partition keys for context sharding.

Figure 41:
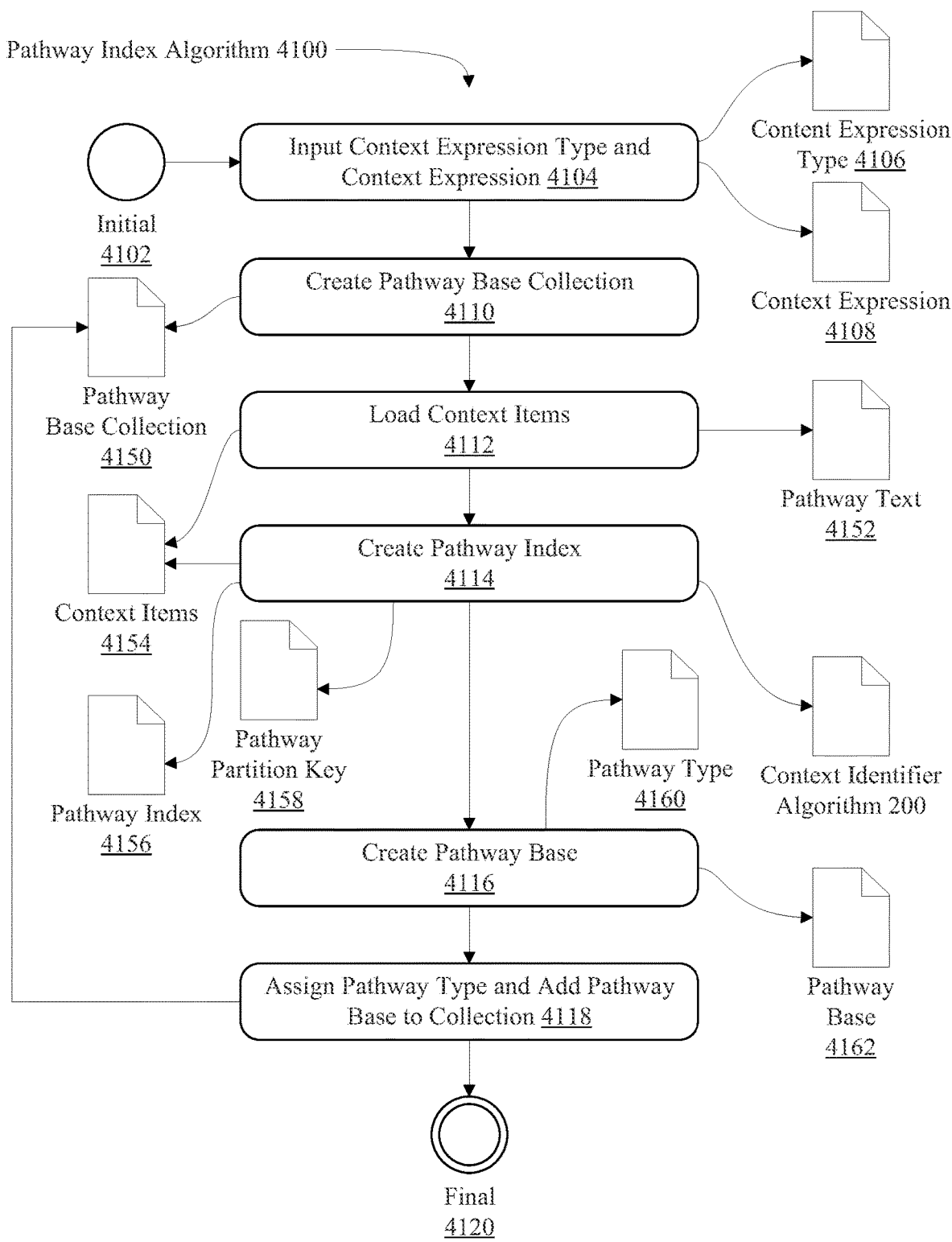
FIG. 41 shows an exemplary Pathway Index Algorithm.

FIG. 41 illustrates Pathway Index Algorithm 4100. The algorithm starts with Initial 4102 which is connected to Input Context Expression Type and Context Expression 4104. Input Context Expression Type and Context Expression 4104 is connected to Context Expression Type 4106, Context Expression 4108 and Create Pathway Base Collection 4110. Create Pathway Base Collection 4110 is connected to Pathway Base Collection 4150 and Load Context Items 4112. Load Context Items 4112 is connected to Pathway Text 4152, Context Items 4154, and Create Pathway Index 4114. Create Pathway Index 4114 is connected to Context Items 4154, Pathway Index 4156, Pathway Partition Key 4158, Context Identifier Algorithm 200, and Create Pathway Base 4116. Create Pathway Base 4116 is connected to Pathway Type 4160, Pathway Base 4162, and Add Pathway Base and Pathway Type to Collection 4118. Add Pathway Base and Pathway Type to Collection 4118 is connected to Pathway Base Collection 4150 and Final 4120 illustrating the end of the algorithm.

Pathway Index Algorithm 4100 generates context indexes for pathways and returns Pathway Base Collection 4150. Input Context Expression Type and Context Expression 4104 inputs a Context Expression Type 4106 (see, Context Expression Enumeration 2740 in FIG. 27) and Context Expression 4108 (see Context Expression 2800 in FIG. 28) for processing. Create Pathway Base Collection 4110 creates Pathway Base Collection 4150. Load Context Items 4112 creates Context Items 4154 as a dictionary.

If Context Expression Type 4106 is equal to User Template 2744 or Generated Template 2746 (see, FIG. 27 respectively), then Load Context Items 4112 assigns the context expression key text (see, Context Expression Key Text 2808 in FIG. 28) from Context Expression 4108 to Pathway Text 4152, and Load Context Items 4112 loads the Context Item Key Collection 2806 (see, Context Item Key Collection 2806 in FIG. 28) from Context Expression 4108 into Context Items 4154 (see, Context Items Dictionary 2730 in FIG. 27). In alternative embodiment, Context Expression Text 2810 and Context Item Dictionary 2720 are used respectively (see, Context Item Dictionary 2720 and Context Expression Text 2810 in FIG. 28).

If Context Expression Type 4106 is equal to Simple 2748 (see, FIG. 27), then Load Context Items 4112 assigns the context expression value text (see, Context Expression Value Text 2816 in FIG. 28) from Context Expression 4108 to Pathway Text 4152, and Load Context Items 4112 loads context item value collection (see, Context Item Value Collection 2814 in FIG. 28) from Context Expression 4108 into Context Items 4154 (see, Context Items Dictionary 2730 in FIG. 27). In alternative embodiment, Context Expression Text 2810 and Context Item Dictionary 2720 in FIG. 28 are used respectively If Context Expression Type 4106 is equal to Complex 2750 (see, FIG. 27), then Load Context Items 4112 assigns the context expression text from Context Expression 4108 to Pathway Text 4152, and Load Context Items 4112 loads context item dictionary from Context Expression 4108 into Context Items 4154 (see, Context Items Dictionary 2720 in FIG. 27).

If Context Expression Type 4106 is equal to Prefix 2752 (see, FIG. 27), then Load Context Items 4112 constructs a prefix string from the prefix values in the context expression prefix dictionary (see, Context Expression Prefix Dictionary 2818 in FIG. 28) in Context Expression 4108 and assigns the prefix string to Pathway Text 4152. Load Context Items 4112 then loads context expression prefix dictionary from Context Expression 4108 into Context Items 4154 (see, Context Items Dictionary 2730 in FIG. 27).

Create Pathway Index 4114 utilizes Context Items 4154 for input into Context Identifier Algorithm 200; the resulting context identifier (see, Context Identifier 228 in FIG. 2) is assigned to Pathway Index 4156 and Pathway Partition Key 4158. Create Pathway Base 4116 creates Pathway Base 4162. If Context Expression Type 4106 is equal to User Template 2744 or Generated Template 2746 (see, FIG. 27), then Pathway Type 4160 is assigned to Pathway Key=4 3408 (see, FIG. 34). If Context Expression Type 4106 is equal to Simple 2748 (see, FIG. 27), then Pathway Type 4160 is assigned to Pathway Value=256 3420 (see, FIG. 34). If Context Expression Type 4106 is equal to Complex 2750 (see, FIG. 27), then Pathway Type 4160 is assigned to Pathway Key-Value Pair=8 3412 (see, FIG. 34). If Context Expression Type 4106 is equal to Prefix 2752, then Pathway Type 4160 is assigned to Pathway Prefix=512 3422 (see, FIG. 34). Create Pathway Base 4116 assigns Pathway Index 4156, Pathway Partition Key 4158, and Pathway Text 4152 to the equivalent members in the Pathway Base 4162 instance.

Assign Pathway Type and Add Pathway Base to Collection 4118 assigns Pathway Type 4160 to the equivalent member in the Pathway Base 4162 instance and adds Pathway Base 4162 to Pathway Base Collection 4150. Final 4120 returns Pathway Base Collection 4150 and the algorithm concludes. In alternative embodiments of Pathway Index Algorithm 4100, overloads specify settings for Context Identifier Algorithm 200 (e.g., Culture and Case Settings 213 and Sort Settings 222 in FIG. 2).

An exemplary enablement is a system that enables context index generation utilizing context identifiers.

Another exemplary enablement is a system that enables context index generation from context expressions keys.

Another exemplary enablement is a system that enables context index generation from context expressions values.

Another exemplary enablement is a system that enables context index generation from context expressions.

Another exemplary enablement is a system that enables context index generation from context expression prefixes.

Another exemplary enablement is a system that enables context index generation from attributive context in context expressions.

Another exemplary enablement is a system that enables context index generation from actionable attributive context in context expressions.

Another exemplary enablement is a system that enables context index generation from taxonomy attributive context in context expressions.

Another exemplary enablement is a system that enables context index generation from temporality attributive context in context expressions.

Another exemplary enablement is a system that enables context index generation from locality attributive context in context expressions.

FIG. 42 illustrates Pathway Character Incremental Index Algorithm 4200. The algorithm starts with Initial 4202 which is connected to Input Pathway Text, Pathway Type, and Pathway Partition Key 4204. Input Pathway Text, Pathway Type, and Pathway Partition Key 4204 is connected to Pathway Text 4206, Pathway Type 4208 (see, Pathway Enumeration 3400 in FIG. 34), Partway Partition Key 4210, and Create Pathway Base Collection 4212. Create Pathway Base Collection 4212 is connected to Pathway Base Collection 4250 (see, Pathway Base Collection 3840 in FIG. 38) and Initialize Variable, [i=StartPosition-1] 4214. Initialize Variable, [i=StartPosition-1] 4214 is connected to Start Position CHAR Setting 4216 and Decision 4220. Decision 4220 is connected to note [i<Text Length] 4218, which illustrates the looping criteria where the Start Position CHAR Setting 4216 sets the start position of the loop.

While i<Text Length, control proceeds to Get Substring [StartPosition, i] of Text 4222. Get Substring [StartPosition, i] of Text 4222 is connected to Pathway Text 4252 (see, Pathway Text 3806 in FIG. 38) and Generate and Assign Context Identifier 4224. Generate and Assign Context Identifier 4224 is connected to Context Identifier Algorithm 200, Pathway Index 4254 (see, Pathway Index 3802 in FIG. 38), and Create and Add Pathway Base to Collection 4226. Create and Add Pathway Base to Collection 4226 is connected to Pathway Base Collection 4250 and Increment Variable, [i++] 4228 which is connected back to Decision 4220 via Line Segment 4230. When i=Text Length, control proceeds to Final 4234 via Line Segment 4232, illustrating the end of the algorithm.

Pathway Character Incremental Index Algorithm 4200 generates character incremental context indexes for pathways and returns Pathway Base Collection 4250. Input Pathway Text, Pathway Type, and Pathway Partition Key 4204 inputs a context expression string as illustrated by Pathway Text 4206 and a pathway type as illustrated by Pathway Type 4208 for processing. Create Pathway Base Collection 4212 creates Pathway Base Collection 4250 and sets Pathway Type 3842 in FIG. 38 to Pathway Type 4208. Initialize Variable, [i=StartPosition-1] 4214 initializes the variable utilizing Start Position CHAR Setting 4216. Get Substring [StartPosition, i] of Text 4222 gets the substring of Pathway Text 4206 which is then assigned to Pathway Text 4252. Generate and Assign Context Identifier 4224 utilizes Context Identifier Algorithm 200 to generate a context identifier from Pathway Text 4252 and assigns the context identifier to Pathway Index 4254. Create and Add Pathway Base to Collection 4226 creates a new Pathway Base 3800 instance (see, Pathway Base 3800 in FIG. 38) and assigns Pathway Text 4252, Pathway Partition Key 4210, and Pathway Index 4254 to the equivalent members in the Pathway Base 3800 instance whereupon it is added to Pathway Base Collection 4250. Increment Variable, [i++] 4228 increments the variable and passes control to Decision 4220 to continue or conclude processing.

In an alternative embodiment an incremental increase for Increment Variable, [i++] 4228 may be configured by an "increment" variable such that "i++" is replaced by "i+increment" for the algorithm configured by setting or parameter in an overload of the algorithm method signature. In another alternative embodiment, the Start Position CHAR Setting 4216 may be configured by a parameter in an overload of the algorithm method signature. Alternative embodiments of Pathway Character Incremental Index Algorithm 4200 provide method overloads to take parameters of Context Expression 2800 members and settings for Context Identifier Algorithm 200 (e.g., Culture and Case Settings 213 and Sort Settings 222 in FIG. 2).

An exemplary enablement is a system that enables pathway character incremental index generation utilizing context identifiers.

Another exemplary enablement is a system that enables pathway character incremental index generation from context expressions keys.

Another exemplary enablement is a system that enables pathway character incremental index generation from context expressions values.

Another exemplary enablement is a system that enables pathway character incremental index generation from context expressions.

Another exemplary enablement is a system that enables pathway character incremental index generation from context expression prefixes.

Another exemplary enablement is a system that enables pathway character incremental index generation from attributive context in context expressions.

Another exemplary enablement is a system that enables pathway character incremental index generation from actionable attributive context in context expressions.

Another exemplary enablement is a system that enables pathway character incremental index generation from taxonomy attributive context in context expressions.

Another exemplary enablement is a system that enables pathway character incremental index generation from temporality attributive context in context expressions.

Another exemplary enablement is a system that enables pathway character incremental index generation from locality attributive context in context expressions.

FIG. 43 illustrates Pathway Word Incremental Index Algorithm 4300. The algorithm starts with Initial 4302 which is connected to Input Pathway Text and Pathway Partition Key 4304. Input Pathway Text and Pathway Partition Key 4304 is connected to Pathway Partition Key 4306, Pathway Text 4308, and Create Pathway Base 4310. Create Pathway Base 4310 is connected to Pathway Base 4350 and Assign Pathway Text and Pathway Partition Key 4312. Assign Pathway Text and Pathway Partition Key 4312 is connected to Pathway Base 4350 and Generate and Assign Pathway Index 4314. Generate and Assign Pathway Index 4314 is connected to Context Identifier Algorithm 200, Pathway Base 4350, and Final 4316 illustrating the end of the algorithm.

Pathway Word Incremental Index Algorithm 4300 generates word incremental context indexes for pathways and returns Pathway Base 4350. Input Pathway Text and Pathway Partition Key 4304 inputs Pathway Text 3806 (see, Pathway Text 3806 in FIG. 38) and Pathway Partition Key 3804 (see, Pathway Partition Key 3804 in FIG. 38) which are assigned to Pathway Text 4308 and Pathway Partition Key 4306 respectively for processing. Create Pathway Base 4310 creates Pathway Base 4350 (see, Pathway Base 3800 in FIG. 38). Assign Pathway Text and Pathway Partition Key 4312 assigns Pathway Text 4308 and Pathway Partition Key 4306 to the equivalent members in the Pathway Base 4350 instance.

Generate and Assign Pathway Index 4314 creates Generated Context Key 2712 (see, Generated Context Key 2712 in FIG. 27) which is utilized to create Context Item 2710 (see, Context Item 2710 in FIG. 27) wherein Generate and Assign Pathway Index 4314 assigns Pathway Text 4308 to Context Value 2704 (see, Context Value 2704 in FIG. 27) in Context Item 2710. Generate and Assign Pathway Index 4314 creates Context Item Dictionary 2730 (see, Context Item Dictionary 2730 in FIG. 27) to which Generate and Assign Pathway Index 4314 adds Context Item 2710. Generate and Assign Pathway Index 4314 inputs Context Item Dictionary 2730 into Context Identifier Algorithm 200 to generate Context Identifier 228 (see, Context Identifier 228 in FIG. 2). The resulting Context Identifier 228 is assigned to the Pathway Index 3802 in the Pathway Base 4350 instance. Control flows to Final 4314 which returns Pathway Base 4350. Alternative embodiments of Pathway Word Incremental Index Algorithm 4300 provide method overloads to take parameters settings for Context Identifier Algorithm 200 (e.g., Culture and Case Settings 213 and Sort Settings 222 in FIG. 2).

An exemplary enablement is a system that enables pathway word incremental index generation utilizing context identifiers.

Another exemplary enablement is a system that enables pathway word incremental index generation from context expressions keys.

Another exemplary enablement is a system that enables pathway word incremental index generation from context expressions values.

Another exemplary enablement is a system that enables pathway word incremental index generation from context expressions.

Another exemplary enablement is a system that enables pathway word incremental index generation from context expression prefixes.

Another exemplary enablement is a system that enables pathway word incremental index generation from attributive context in context expressions.

Another exemplary enablement is a system that enables pathway word incremental index generation from actionable attributive context in context expressions.

Another exemplary enablement is a system that enables pathway word incremental index generation from taxonomy attributive context in context expressions.

Another exemplary enablement is a system that enables pathway word incremental index generation from temporality attributive context in context expressions.

Another exemplary enablement is a system that enables pathway word incremental index generation from locality attributive context in context expressions.

FIG. 44 illustrates Pathway Word-Joined Incremental Index Algorithm 4400. The algorithm starts with Initial 4402 which is connected to Input Word Array, Partition Key, and Pathway Type 4404. Input Word Array, Partition Key, and Pathway Type 4404 is connected to Pathway Partition Key 4405, Word Array 4406, Pathway Type 4408, and Create Output Pathway Base Collection 4410. Create Output Pathway Base Collection 4410 is connected to Pathway Base Collection 4450 and Allocate Words Variable 4412. Allocate Words Variable 4412 is connected to Words 4414 and Decision 4416. Decision 4416 is connected to note [Foreach Word] 4418, Pathway Base Processing 4420, and Final 4436 via Line Segment 4434. Pathway Base Processing 4420 contains Create Pathway Base 4422, Concatenate 4424, Generate Context Identifier 4426, Assign 4428, and Add Pathway Base to Collection 4430. Pathway Base Processing 4420 connects to Pathway Base 4452, Context Expression Spacer Tuple 3020, Context Identifier Algorithm 200, Pathway Text 4454, Pathway Index 4456, Pathway Partition Key 4458, Pathway Base Collection 4450, and Decision 4416 via Line Segment 4432.

Pathway Word-Joined Incremental Index Algorithm 4400 generates word-joined incremental context indexes for pathways and returns Pathway Base Collection 4450. Algorithm control flow starts with Initial 4402 and proceeds to Input Word Array, Partition Key, and Pathway Type 4404 which inputs Word Array 4406, Pathway Partition Key 4405 (see, Pathway Partition Key 3804 in FIG. 38) and Pathway Type 4408 (see, Pathway Type 3842 in FIG. 38). Pathway Partition Key 4405 is a nullable value type[57]. Control proceeds to Create Output Pathway Base Collection 4410 which creates Pathway Base Collection 4450 (see, Pathway Base Collection 3840 in FIG. 38) and then proceeds to Allocate Words Variable 4412 which allocates the Words 4414 variable as an empty string. At Decision 4416, control proceeds to a for each loop, illustrated by the note [Foreach Word] 4418, where each word in Word Array 4406 undergoes processing in Pathway Base Processing 4420. Following Pathway Base Processing 4420, control passes to Decision 4416, illustrated by Line Segment 4432, until the iteration of the for each loop concludes at Decision 4416 which terminates the algorithm at Final 4436, illustrated by Line Segment 4434.

[57] "Nullable Value Types—C# Reference." Technical Documentation, API, and Code Examples|Microsoft Docs, docs.microsoft.com/en-us/dotnet/csharp/language-reference/builtin-types/nullable-value-types.

Create Pathway Base 4422 is used by Pathway Base Processing 4420 to create a new Pathway Base 4452 for each iteration of Word Array 4406 and sets the pathway type member of the new instance to Pathway Type 4408.

Concatenate 4424 is used by Pathway Base Processing 4420 to concatenate Words 4414, Context Expression Spacer Tuple 3020, and the word for a specific iteration of Word Array 4406.

Generate Context Identifier 4426 is used by Pathway Base Processing 4420 to input Pathway Text 4454 into Context Identifier Algorithm 200 and returns a context identifier (see, Context Identifier 228 in FIG. 2).

Assign 4428 is used by Pathway Base Processing 4420 to assign values to the instance members of Pathway Base 4452: Pathway Text 4454 (see, Pathway Text 3806 in FIG. 38), Pathway Index 4456 (see, Pathway Index 3802 in FIG. 38), and Pathway Partition Key 4458 (see, Pathway Partition Key 3804 in FIG. 38).

Pathway Base Processing 4420 provides the following functionality for each word in Word Array 2206:

If Words 4414 is equal to an empty string, then Create Pathway Base 4422 is processed and Assign 4428 assigns the pathway text of the current pathway base item to Pathway Text 4454 and Words 4414. Processing proceeds to Generate Context Identifier 4426, where upon Assign 4428 assigns the resulting context identifier to Pathway Index 4456. If Pathway Partition Key 4405 is not null, then Assign 4428 assigns Pathway Partition Key 4405 to Pathway Partition Key 4458. If Pathway Partition Key 4405 is null, then Assign 4428 assigns Pathway Index 4456 to Pathway Partition Key 4458. Processing continues to Add Pathway Base to Collection 4430.

If Words 4414 is not equal to an empty string, then Create Pathway Base 4422 is processed followed by Concatenate 4424 processing where upon Assign 4428 assigns the resulting concatenated string to Pathway Text 4454 and Words 4414. Processing proceeds to Generate Context Identifier 4426, where upon Assign 4428 assigns the resulting context identifier to Pathway Index 4456. If Pathway Partition Key 4405 is null, then Assign 4428 assigns to Pathway Partition Key 4458 the value from Pathway Index 4456 in the last item (Pathway Base 4452) added to Pathway Base Collection 4450. If Pathway Partition Key 4405 is not null, then Assign 4428 assigns Pathway Partition Key 4405 to Pathway Partition Key 4458. Processing continues to Add Pathway Base to Collection 4430.

Alternative embodiments of Pathway Word-Joined Incremental Index Algorithm 4400 provide method overloads to take parameters of settings for Context Identifier Algorithm 200 (e.g., Culture and Case Settings 213 and Sort Settings 222 in FIG. 2) and settings for Context Expression Spacer Tuple 3020 (e.g., Word Divider 3002 and Delimiter 3004).

An exemplary enablement is a system that enables word-joined incremental index generation wherein words are joined iteratively; each iteration generates a unique index as a location in the word-joined aggregate; the unique index associated with a string representation of the word-joined iterative aggregate; the unique index associated with the previous iteration's unique index as a partition key or a provided partition key.

Another exemplary enablement is a system that enables a word-joined incremental index for context expression prediction.

Another exemplary enablement is a system that enables word-joined incremental index generation utilizing context identifiers.

Another exemplary enablement is a system that enables word-joined incremental index generation from context expressions.

Another exemplary enablement is a system that enables word-joined incremental index generation from context expression prefixes.

Another exemplary enablement is a system that enables word-joined incremental index generation from attributive context in context expressions.

Another exemplary enablement is a system that enables word-joined incremental index generation from actionable attributive context in context expressions.

Another exemplary enablement is a system that enables word-joined incremental index generation from taxonomy attributive context in context expressions.

Another exemplary enablement is a system that enables word-joined incremental index generation from temporality attributive context in context expressions.

Another exemplary enablement is a system that enables word-joined incremental index generation from locality attributive context in context expressions.

Another exemplary enablement is a system that enables word-joined incremental index generation utilizing context identifiers for pathway partition key generation.

Another exemplary enablement is a system that enables word-joined incremental index generation from context expressions for pathway partition key generation.

Another exemplary enablement is a system that enables word-joined incremental index generation from context expression prefixes for pathway partition key generation.

Another exemplary enablement is a system that enables word-joined incremental index generation from attributive context in context expressions for pathway partition key generation.

Another exemplary enablement is a system that enables word-joined incremental index generation from actionable attributive context in context expressions for pathway partition key generation.

Another exemplary enablement is a system that enables word-joined incremental index generation from taxonomy attributive context in context expressions for pathway partition key generation.

Another exemplary enablement is a system that enables word-joined incremental index generation from temporality attributive context in context expressions for pathway partition key generation.

Another exemplary enablement is a system that enables word-joined incremental index generation from locality attributive context in context expressions for pathway partition key generation.

Another exemplary enablement is a system that enables word-joined incremental index generation utilizing context identifiers for pathway partition text generation.

Another exemplary enablement is a system that enables word-joined incremental index generation from context expressions for pathway partition text generation.

Another exemplary enablement is a system that enables word-joined incremental index generation from context expression prefixes for pathway partition text generation.

Another exemplary enablement is a system that enables word-joined incremental index generation from attributive context in context expressions for pathway partition text generation.

Another exemplary enablement is a system that enables word-joined incremental index generation from actionable attributive context in context expressions for pathway partition text generation.

Another exemplary enablement is a system that enables word-joined incremental index generation from taxonomy attributive context in context expressions for pathway partition text generation.

Another exemplary enablement is a system that enables word-joined incremental index generation from temporality attributive context in context expressions for pathway partition text generation.

Another exemplary enablement is a system that enables word-joined incremental index generation from locality attributive context in context expressions for pathway partition text generation.

Figure 45:
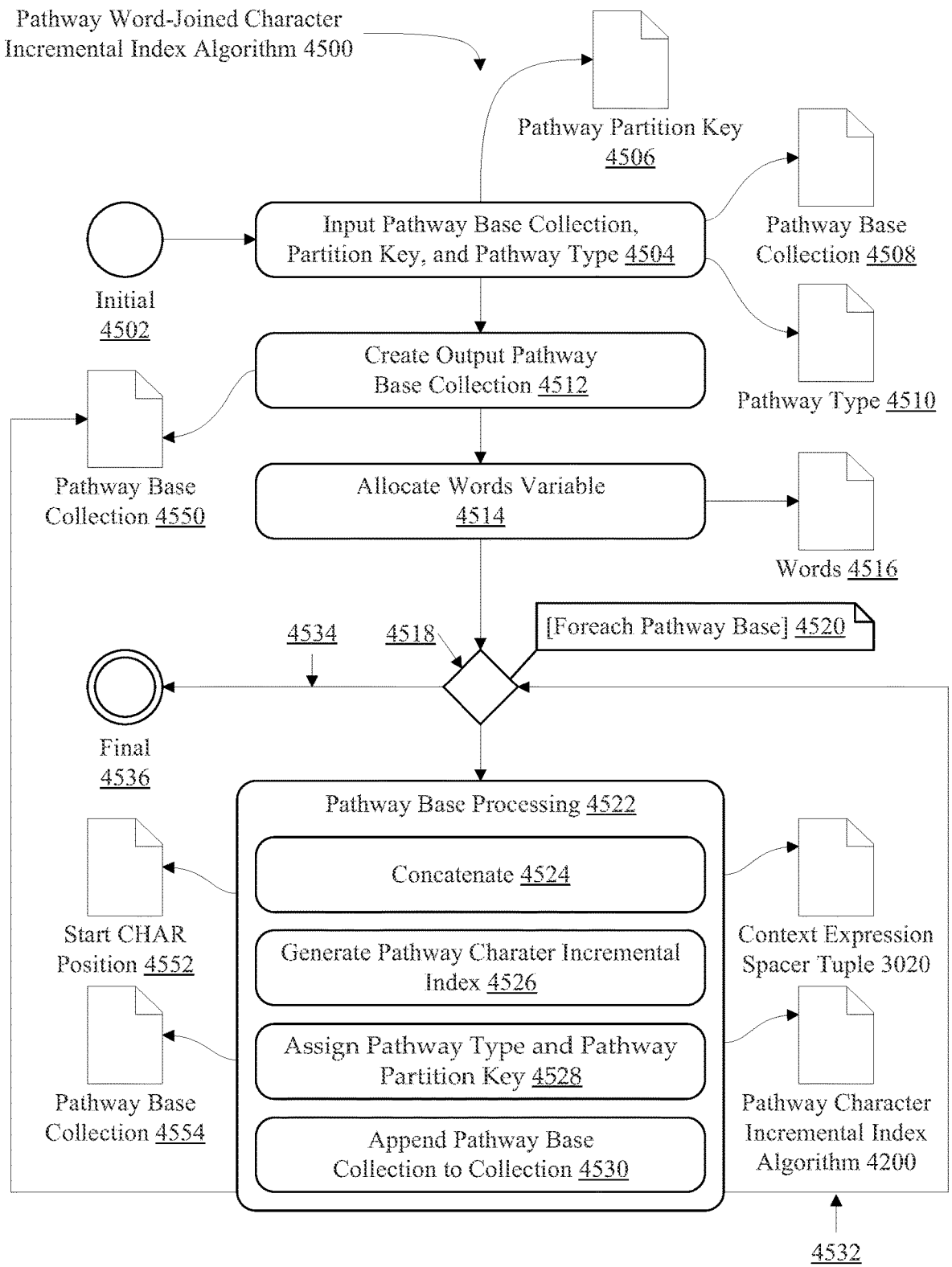
FIG. 45 shows an exemplary Pathway Word-Joined Character Incremental Index Algorithm.

FIG. 45 illustrates Pathway Word-Joined Character Incremental Index Algorithm 4500. The algorithm starts with Initial 4502 which is connected to Input Pathway Base Collection, Partition Key, and Pathway Type 4504. Input Pathway Base Collection, Partition Key, and Pathway Type 4504 is connected to Pathway Partition Key 4506, Pathway Base Collection 4508, Pathway Type 4510, and Create Output Pathway Base Collection 4512. Create Output Pathway Base Collection 4512 is connected to Pathway Base Collection 4550 and Allocate Words Variable 4514. Allocate Words Variable 4514 is connected to Words 4516 and Decision 4518. Decision 4518 is connected to Final 4536 via Line Segment 4534, note [Foreach Pathway Base] 4520 and Pathway Base Processing 4522. Pathway Base Processing 4522 contains Concatenate 4524, Generate Pathway Character Incremental Index 4526, Assign Pathway Type and Pathway Partition Key 4528, and Append Pathway Base Collection to Collection 4530. Pathway Base Processing 4522 is connected to Context Expression Spacer Tuple 3020, Pathway Character Incremental Index Algorithm 4200, Pathway Base Collection 4550, Start CHAR Position 4552, Pathway Base Collection 4554, and Decision 4518 via Line Segment 4532.

Pathway Word-Joined Character Incremental Index Algorithm 4500 generates word-joined character incremental context indexes for pathways and returns Pathway Base Collection 4550. Algorithm control flow starts with Initial 4502 and proceeds to Input Pathway Base Collection, Partition Key, and Pathway Type 4504 which inputs Pathway Base Collection 4508 (see, Pathway Base Collection 3840 in FIG. 38), Pathway Partition Key 4506 (see, Pathway Partition Key 3804 in FIG. 38) and Pathway Type 4510 (see, Pathway Type 3842 in FIG. 38). Pathway Partition Key 4506 is a nullable value type. Control proceeds to Create Output Pathway Base Collection 4512 which creates Pathway Base Collection 4550 and then proceeds to Allocate Words Variable 4514 which allocates the Words 4516 variable as an empty string. At Decision 4518, control proceeds to a for each loop, illustrated by the note [Foreach Pathway Base] 4520, where each pathway base in Pathway Base Collection 4508 undergoes processing in Pathway Base Processing 4522. Following Pathway Base Processing 4522, control passes to Decision 4518, illustrated by Line Segment 4532, until the iteration of the for each loop concludes at Decision 4518 which terminates the algorithm at Final 4536, illustrated by Line Segment 4534.

Concatenate 4524 is used by Pathway Base Processing 4522 to concatenate Words 4516, Context Expression Spacer Tuple 3020, and the pathway text of the next pathway base item—relative to the current item in the iteration—in Pathway Base Collection 4508. The resulting concatenated string is assigned to Words 4516, and the integer of the character position of the first character of the pathway text in the concatenated string is assigned to Start CHAR Position 4552.

Generate Pathway Character Incremental Index 4526 is used by Pathway Base Processing 4522 to input Start CHAR Position 4552 and Words 4516 into Pathway Character Incremental Index Algorithm 4200, which returns a pathway base collection (see, Pathway Base Collection 4250 in FIG. 42). The resulting pathway base collection is assigned to Pathway Base Collection 4554.

Assign Pathway Type and Pathway Partition Key 4528 is used by Pathway Base Processing 4522 first, to assign Pathway Type 4510 to the pathway type member in Pathway Base Collection 4554, and second, to iterate through each pathway base item in Pathway Base Collection 4554 wherein, if Pathway Partition Key 4506 is not null, it is assigned to the pathway base item's pathway partition key member, else if Pathway Partition Key 4506 is null, then the pathway partition key of the pathway base item in the current iteration of Pathway Base Collection 4508 is assigned to the pathway base item's pathway partition key member.

Append Pathway Base Collection to Collection 4530 is used by Pathway Base Processing 4522 to add the pathway base items in Pathway Base Collection 4554 to Pathway Base Collection 4550.

Pathway Base Processing 4522 provides the following functionality for each pathway base item (see, Pathway Base 3800 in FIG. 38) in Pathway Base Collection 2308:

If the current iteration of Pathway Base Collection 4508 is the last iteration, processing proceeds to Decision 4518.

If Words 4516 is equal to an empty string, Pathway Base Processing 4522 assigns the pathway text (see, Pathway Text 3806 in FIG. 38) of the current pathway base item in the iteration of Pathway Base Collection 4508 to Words 4516.

Pathway Base Processing 4522 processes Concatenate 4524, Generate Pathway Character Incremental Index 4526, Assign Pathway Type and Pathway Partition Key 4528, and Append Pathway Base Collection to Collection 4530 in successive order.

Alternative embodiments of Pathway Word-Joined Character Incremental Index Algorithm 4500 provide method overloads to take parameters of settings for Context Identifier Algorithm 200 (e.g., Culture and Case Settings 213 and Sort Settings 222 in FIG. 2) and settings for Context Expression Spacer Tuple 3020 (e.g., Word Divider 3002 and Delimiter 3004 in FIG. 30).

An exemplary enablement is a system that enables word-joined character incremental index generation wherein each word is joined iteratively with each character of the next word; each iteration generates a unique index as a location in the word-joined character aggregate; the unique index associated with a string representation of the word-joined character iterative aggregate; the unique index associated with the previous iteration's unique index as a partition key or a provided partition key.

Another exemplary enablement is a system that enables a word-joined character incremental index for context expression prediction.

Another exemplary enablement is a system that enables word-joined character incremental index generation utilizing context identifiers.

Another exemplary enablement is a system that enables word-joined character incremental index generation from context expressions.

Another exemplary enablement is a system that enables word-joined character incremental index generation from context expression prefixes.

Another exemplary enablement is a system that enables word-joined character incremental index generation from attributive context in context expressions.

Another exemplary enablement is a system that enables word-joined character incremental index generation from actionable attributive context in context expressions.

Another exemplary enablement is a system that enables word-joined character incremental index generation from taxonomy attributive context in context expressions.

Another exemplary enablement is a system that enables word-joined character incremental index generation from temporality attributive context in context expressions.

Another exemplary enablement is a system that enables word-joined character incremental index generation from locality attributive context in context expressions.

Another exemplary enablement is a system that enables word-joined character incremental index generation utilizing context identifiers for pathway partition key generation.

Another exemplary enablement is a system that enables word-joined character incremental index generation from context expressions for pathway partition key generation.

Another exemplary enablement is a system that enables word-joined character incremental index generation from context expression prefixes for pathway partition key generation.

Another exemplary enablement is a system that enables word-joined character incremental index generation from attributive context in context expressions for pathway partition key generation.

Another exemplary enablement is a system that enables word-joined character incremental index generation from actionable attributive context in context expressions for pathway partition key generation.

Another exemplary enablement is a system that enables word-joined character incremental index generation from taxonomy attributive context in context expressions for pathway partition key generation.

Another exemplary enablement is a system that enables word-joined character incremental index generation from temporality attributive context in context expressions for pathway partition key generation.

Another exemplary enablement is a system that enables word-joined character incremental index generation from locality attributive context in context expressions for pathway partition key generation.

Another exemplary enablement is a system that enables word-joined character incremental index generation utilizing context identifiers for pathway partition text generation.

Another exemplary enablement is a system that enables word-joined character incremental index generation from context expressions for pathway partition text generation.

Another exemplary enablement is a system that enables word-joined character incremental index generation from context expression prefixes for pathway partition text generation.

Another exemplary enablement is a system that enables word-joined character incremental index generation from attributive context in context expressions for pathway partition text generation.

Another exemplary enablement is a system that enables word-joined character incremental index generation from actionable attributive context in context expressions for pathway partition text generation.

Another exemplary enablement is a system that enables word-joined character incremental index generation from taxonomy attributive context in context expressions for pathway partition text generation.

Another exemplary enablement is a system that enables word-joined character incremental index generation from temporality attributive context in context expressions for pathway partition text generation.

Another exemplary enablement is a system that enables word-joined character incremental index generation from locality attributive context in context expressions for pathway partition text generation.

Another exemplary enablement is a system that enables word-joined character incremental index generation utilizing emoji.

Another exemplary enablement is a system that enables word-joined character incremental index generation utilizing emoji for pathway partition key generation.

Another exemplary enablement is a system that enables word-joined character incremental index generation utilizing emoji for pathway partition text generation; pathway partition text containing emoji shortcodes.

Pathway Systems 2612 in FIG. 26 encapsulates and utilizes pathways as illustrated in FIGS. 34 through 45 and the specifications that support the figures. In another embodiment, Lookup App(s) 2604-1 through Lookup App(s) 2604-N in FIG. 26 encapsulate and utilize pathways.

An exemplary enablement is a system that makes pathways available through an Application Programming Interface (API).

Another exemplary enablement is a system that makes pathways available through a Software Development Kit (SDK).

FIG. 46 illustrates Lookup Taxonomy 4600 and Lookup Taxonomy Collection 4640. Lookup Taxonomy 4600 is composed of Lookup Taxonomy Data 4602, Lookup Taxonomy Id 4604, and Lookup Taxonomy Type 4606. Lookup Taxonomy Collection 4640 contains Lookup Taxonomy 4600.

Lookup Taxonomy 4600 illustrates the taxonomy for a lookup. Lookup Taxonomy Data 4602 illustrates the data for taxonomy attributive context for one or more context expressions for Lookup Taxonomy 4600. Lookup Taxonomy Id 4604 illustrates a unique taxonomy identifier for Lookup Taxonomy 4600. Lookup Taxonomy Type 4606 illustrates the taxonomy type for Lookup Taxonomy 4600 (see, Taxonomy Enumeration 3700 in FIG. 37). A collection is illustrated by Lookup Taxonomy Collection 4640.

FIG. 47 illustrates Lookup Header 4700 which is composed of Context Expression Prefix Dictionary 2818, Context Expression Collections 2850, Lookup Header Copyright 4704, Lookup Header Temporality 4706, Lookup Header Temporality Id 4708, Lookup Header Description 4710, Lookup Header Expiration 4712, Lookup Header Inception 4714, Lookup Header Id 4716, Lookup Header Locality 4718, Lookup Header Locality Id 4720, Lookup Header Name 4722, Lookup Taxonomy Collection 4640, Lookup Header Title 4724, and Pathway Collections 3950.

Context Expression Prefix Dictionary 2818 illustrates a dictionary of one or more prefixes for Lookup Header 4700. Context Expression Collections 2850 illustrates a collection of context expressions for Lookup Header 4700 (see, Context Expression Collections 2850 in FIG. 28). Lookup Header Copyright 4704 illustrates a copyright for Lookup Header 4700. Lookup Header Temporality 4706 illustrates a temporality for Lookup Header 4700. Lookup Temporality Id 4708 illustrates a unique temporality identifier for Lookup Header 4700. Lookup Header Description 4710 illustrates a description for Lookup Header 4700. Lookup Header Expiration 4712 illustrates an expiration for Lookup Header 4700. Lookup Header Inception 4714 illustrates an inception for Lookup Header 4700. Lookup Header Id 4716 illustrates a unique identifier for Lookup Header 4700. Lookup Header Locality 4718 illustrates a locality for Lookup Header 4700. Lookup Header Locality Id 4720 illustrates a unique locality identifier for Lookup Header 4700. Lookup Header Name 4722 illustrates a name for Lookup Header 4700. Lookup Taxonomy Collection 4640 illustrates a lookup taxonomy collection for Lookup Header 4700 (see, Lookup Taxonomy Collection 4640 in FIG. 46). Lookup Header Title 4724 illustrates a title for Lookup Header 4700. Pathway Collections 3950 illustrates a collection of pathways for Lookup header 4700 (see, Pathway Collections 3950 in FIG. 39).

An exemplary enablement is a system that provides one or more prefixes for a lookup header.

Another exemplary enablement is a system that provides one or more context expressions in a lookup header.

Another exemplary enablement is a system that provides a copyright in a lookup header.

Another exemplary enablement is a system that provides a temporality in a lookup header.

Another exemplary enablement is a system that provides a unique temporality identifier in a lookup header.

Another exemplary enablement is a system that provides a description in a lookup header.

Another exemplary enablement is a system that provides an expiration in a lookup header.

Another exemplary enablement is a system that provides an inception in a lookup header.

Another exemplary enablement is a system that provides a unique identifier in a lookup header.

Another exemplary enablement is a system that provides a locality in a lookup header.

Another exemplary enablement is a system that provides a unique locality identifier in a lookup header.

Another exemplary enablement is a system that provides a name in a lookup header.

Another exemplary enablement is a system that provides one or more taxonomies in a lookup header.

Another exemplary enablement is a system that provides a title in a lookup header.

Another exemplary enablement is a system that provides a one or more pathways for a lookup header.

Another exemplary enablement is a system that utilizes attributive context for a context expression in a lookup header.

Another exemplary enablement is a system that utilizes a lookup header to enable the visual, audio, or tactile output of one or more context expressions.

Another exemplary enablement is a system that utilizes a lookup header to enable the visual, audio, or tactile conveyance of attributive context for a context expression.

Figure 48:
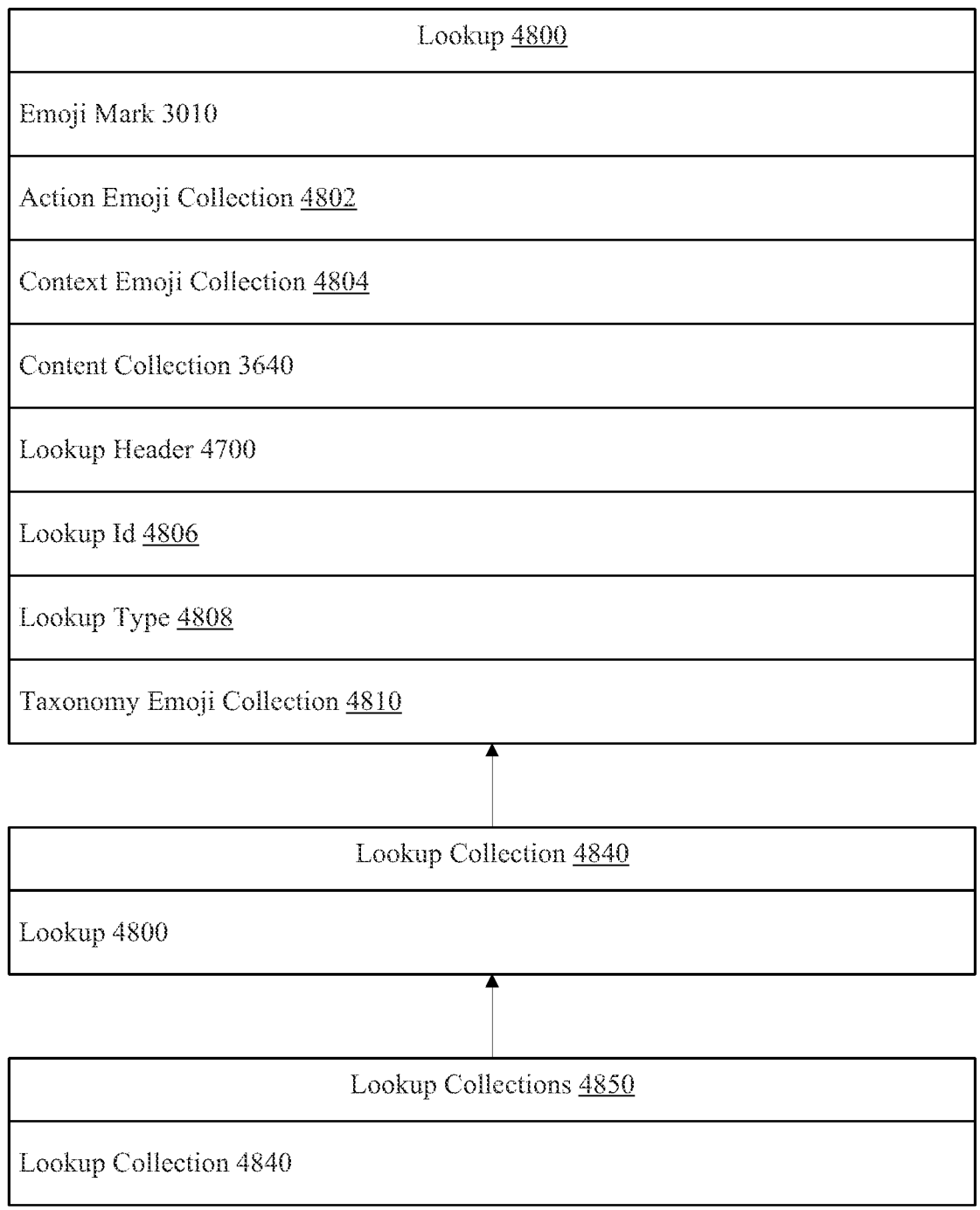
FIG. 48 shows an exemplary Lookup.

FIG. 48 illustrates Lookup 4800, Lookup Collection 4840, and Lookup Collections 4850. Lookup 4800 is composed of Emoji Mark 3010, Action Emoji Collection 4802, Context Emoji Collection 4804, Content Collection 3640, Lookup Header 4700, Lookup Id 4806, Lookup Type 4808, and Taxonomy Emoji Collection 4810. Lookup Collection 4840 contains Lookup 4800, and Lookup Collections 4850 contains Lookup Collection 4840.

A "lookup" is defined as the context expressions and pathways that comprise knowledge creation, communication, discovery, and acquisition. When the phrase "lookup" is used it refers to the lookup definition specified here in addition to Lookup 4800, its constituent parts, and any derivatives thereof.

Emoji Mark 3010 illustrates an emoji mark for Lookup 4800. Action Emoji Collection 4802 illustrates a collection of Action Emoji 3008 in FIG. 30 for Lookup 4800. Context Emoji Collection 4804 illustrates a collection of Context Emoji 3006 in FIG. 30 for Lookup 4800. Content Collection 3640 illustrates the collection of Content 3600 in FIG. 36 for Lookup 4800. Lookup Header 4700 illustrates the lookup header for Lookup 4800. Lookup Id 4806 illustrates a unique identifier for Lookup 4800. Lookup Type 4808 is reserved for a lookup enumeration for Lookup 4800. Taxonomy Emoji Collection 4810 illustrates a collection of Taxonomy Emoji 3012 in FIG. 30 for Lookup 4800. Collections are illustrated by Lookup Collection 4840 and Lookup Collections 4850.

An exemplary enablement is a system that enables the utilization of an emoji mark in a lookup.

Another exemplary enablement is a system that enables the utilization of an action emoji in a lookup.

Another exemplary enablement is a system that enables the utilization of a context emoji in a lookup.

Another exemplary enablement is a system that enables the utilization of a taxonomy emoji in a lookup.

Another exemplary enablement is a system that enables the use of an emoji mark within the content of a lookup.

Another exemplary enablement is a system that enables the use of one or more action emoji or any of its derived types within the content of a lookup.

Another exemplary enablement is a system that enables the use of one or more context emoji or any of its derived types within the content of a lookup.

Another exemplary enablement is a system that enables the use of one or more taxonomy emoji or any of its derived types within the content of a lookup.

Another exemplary enablement is a system that enables lookups which may be user communicated by sharing, sending, posting, and publishing.

Another exemplary enablement is a system that enables lookups which may be user defined, owned, and controlled.

Another exemplary enablement is a system that utilizes a lookup to enable the visual, audio, or tactile output of one or more context expressions.

Another exemplary enablement is a system that utilizes a lookup to enable the visual, audio, or tactile conveyance of attributive context for a context expression.

Figure 49:
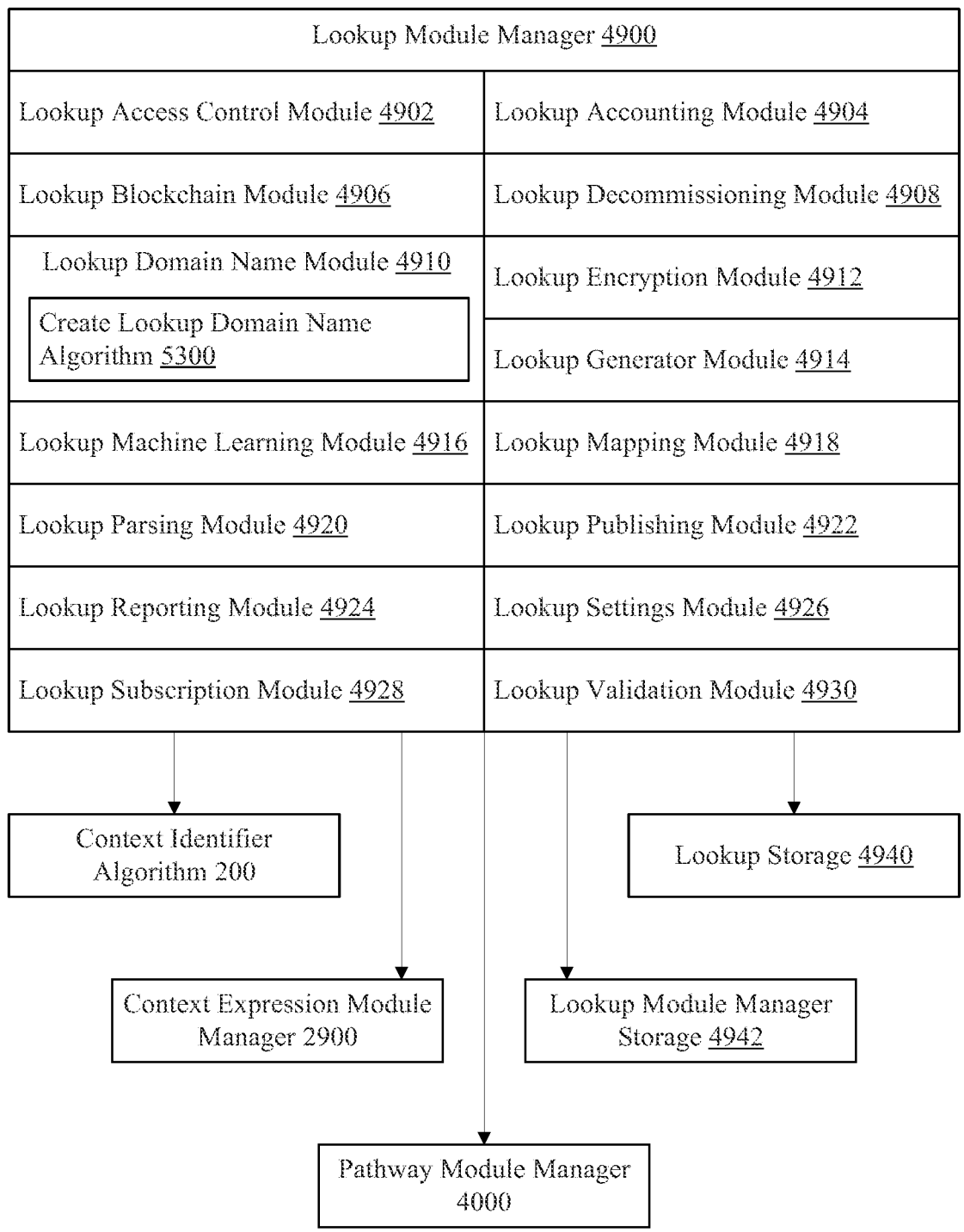
FIG. 49 shows an exemplary Lookup Module Manager.

FIG. 49 illustrates Lookup Module Manager 4900 which is composed of Lookup Access Control Module 4902, Lookup Accounting Module 4904, Lookup Blockchain Module 4906, Lookup Decommissioning Module 4908, Lookup Domain Name Module 4910, Lookup Encryption Module 4912, Lookup Generator Module 4914, Lookup Machine Learning Module 4916, Lookup Mapping Module 4918, Lookup Parsing Module 4920, Lookup Publishing Module 4922, Lookup Reporting Module 4924, Lookup Settings Module 4926, Lookup Subscription Module 4928, and Lookup Validation Module 4930. Lookup Domain Name Module 4910 contains Create Lookup Domain Name Algorithm 5300. Lookup Module Manager 4900 utilizes Context Identifier Algorithm 200, Context Expression Module Manager 2900, Pathway Module Manager 4000, Lookup Storage 4940, and Lookup Module Manager Storage 4942.

Lookup Module Manager 4900 illustrates the functionality and logic to manage lookups, modules, and algorithms. It illustrates modular functionality to generate, validate, parse, encrypt, decrypt, decommission, and map lookups. It exemplifies the modular functionality to create, read, update, and delete lookup data. It also illustrates modular functionality for lookup integration with blockchain, machine learning, access control, accounting, publishing, subscription, and reporting systems. Finally, it exemplifies that modules also have the functionality to manage lookups, modules, and algorithm settings.

Lookup Access Control Module 4902 illustrates functionality and logic for lookup integration with an access control system. It exemplifies functionality to create, read, update, and delete lookup access control data as well as the logic for lookup access control management.

Lookup Accounting Module 4904 illustrates functionality and logic for lookup integration with an accounting system. It exemplifies functionality to create, read, update, and delete lookup accounting data as well as the logic for lookup accounting management.

Lookup Blockchain Module 4906 illustrates functionality and logic for lookup integration with blockchain. It exemplifies functionality to create, read, update, and delete lookup blockchain data as well as the logic for lookup blockchain management.

Lookup Decommissioning Module 4908 exemplifies functionality and logic to create, read, update, and delete lookup decommissioning data as well as the logic for lookup decommissioning management.

Lookup Domain Name Module 4910 illustrates functionality and logic to generate lookup domain names (see, Lookup Domain Name 5200 in FIG. 52). It exemplifies functionality to create, read, update, and delete lookup domain name data as well as the logic for lookup domain name generation management. It illustrates lookup domain name generation integration functionality for domain name registration and domain name systems. Lookup Domain Name Module 4910 utilizes Create Lookup Domain Name Algorithm 5300 (see, FIG. 53) to create lookup domain names.

Lookup Encryption Module 4912 exemplifies functionality and logic to manage the encryption and decryption of lookup data as well as the logic for lookup encryption management.

Lookup Generator Module 4914 illustrates functionality and logic to generate lookups. It exemplifies functionality to create, read, update, and delete lookup data as well as the logic for lookup generation management. It illustrates lookup generation integration functionality for blockchain and machine learning. Lookup Generator Module 4914 also contains all the functionality and logic to generate and integrate emoji (see, Emoji 302 in FIG. 3) into a lookup. It exemplifies functionality to create, read, update, and delete emoji data as part of a lookup as well as the logic for emoji generation and integration management as part of a lookup.

Lookup Machine Learning Module 4916 illustrates functionality and logic for lookup integration with machine learning. It exemplifies functionality to create, read, update, and delete lookup machine learning data as well as the logic for lookup machine learning management.

Lookup Mapping Module 4918 illustrates mapping functionality and logic for working with lookups.

Lookup Parsing Module 4920 illustrates parsing functionality and logic for working with lookups. Furthermore, Lookup Parsing Module 4920 illustrates functionality for parsing query and programming language in lookups.

Lookup Publishing Module 4922 illustrates functionality and logic for lookup integration with a publishing system. It exemplifies functionality to create, read, update, and delete lookup publishing data as well as the logic for lookup publishing management.

Lookup Reporting Module 4924 illustrates functionality and logic for lookup integration with a reporting system. It exemplifies functionality to create, read, update, and delete lookup reporting data as well as the logic for lookup reporting management.

Lookup Settings Module 4926 exemplifies functionality and logic to create, read, update, and delete lookup settings data as well as the logic for lookup settings management.

Lookup Subscription Module 4928 illustrates functionality and logic for lookup integration with a subscription system. It exemplifies functionality to create, read, update, and delete lookup subscription data as well as the logic for lookup subscription management.

Lookup Validation Module 4930 illustrates validation functionality and logic for working with lookups. Furthermore, Lookup Validation Module 4930 illustrates functionality for validating the generation of lookups.

Context Identifier Algorithm 200 illustrates the Context Identifier Algorithm 200 in FIG. 2. Context Expression Module Manager 2900 illustrates Context Expression Module Manager 2900 in FIG. 29. Pathway Module Manager 4000 illustrates Pathway Module Manager 4000 in FIG. 40. Lookup Module Manager Storage 4942 and Lookup Storage 4940 illustrate data storage systems such as a database. Lookup Module Manager 4900, its constituent parts, and derivatives thereof, may access and utilize Context Identifier Algorithm 200, Context Expression Module Manager 2900, Pathway Module Manager 4000, Lookup Storage 4940 and Lookup Module Manager Storage 4942.

An exemplary enablement is a system that utilizes blockchain for permanent storage of lookups and all of their versions to provide a system of record. For example, content on the internet today is susceptible to memory holing[58], deliberate or not. While there are internet archives such as the Internet Archive (see, archive.org), there are known issues (e.g., videos removed from YouTube), limitations (e.g., Internet content may change significantly between indexing), explicate government censorship, and complicit revisionism (e.g., labeling already-deleted articles about COVID-19, as 'disinformation'[59]) that diminish their capacity to document important changes happening in our health, geopolitics, economy, etc. Historically, for centuries, newspapers have served as a public record. However, with the demise of traditional publishing, we've lost that capacity. This enablement restores the societal benefit of a permanent and public system of record.

[58] "Memory Hole." Wikipedia, the Free Encyclopedia, Wikimedia Foundation, Inc, 1 Sep. 2004, en.wikipedia.org/wiki/Memory_hole. Accessed 21 May 2020.
[59] "What Critical Thinking? Wayback Machine is Now Complicit in Big Tech Censorship." RT International, 19 May 2020, www.rt.com/op-ed/489118-wayback-machine-big-tech-censorship/.

Another exemplary benefit is a system that enables users to control access to and discovery of content through lookups. For example, user's regain control of content distribution through lookups which enable them cut out the platform operators who engage in shadow banning,[60] ensuring that the content that users share is seen by users with whom they share.

[60] "Shadow Banning." Wikipedia, the Free Encyclopedia, Wikimedia Foundation, Inc, 17 Dec. 2011, en.wikipedia.org/wiki/Shadow_banning. Accessed 21 May 2020.

Another exemplary enablement is a system that utilizes machine learning and streaming analytics to generate lookup use ranking by context expression. For example, locality and temporality contexts may be used to generate ranking for users in their location; moreover, temporality contexts may be used to provide a narrow or broad ranking in terms of time and date. Considering pretext, action and taxonomy attributive contexts in context expressions provide unique capabilities for complex analytics for ranking.

Another exemplary enablement is a system that utilizes machine learning and streaming analytics to generate lookup use ranking by context expression for prediction. For example, users benefit from predictive lookup use ranking by context expression through user interface input mask and dropdown suggestions in real-time, by locality, by action, taxonomy, or any context that has been crowd sourced.

Another exemplary enablement is a system that makes available lookup generation, management and utilization through an Application Programming Interface (API).

Another exemplary enablement is a system that makes available lookup generation, management and utilization through a Software Development Kit (SDK).

Figure 50:
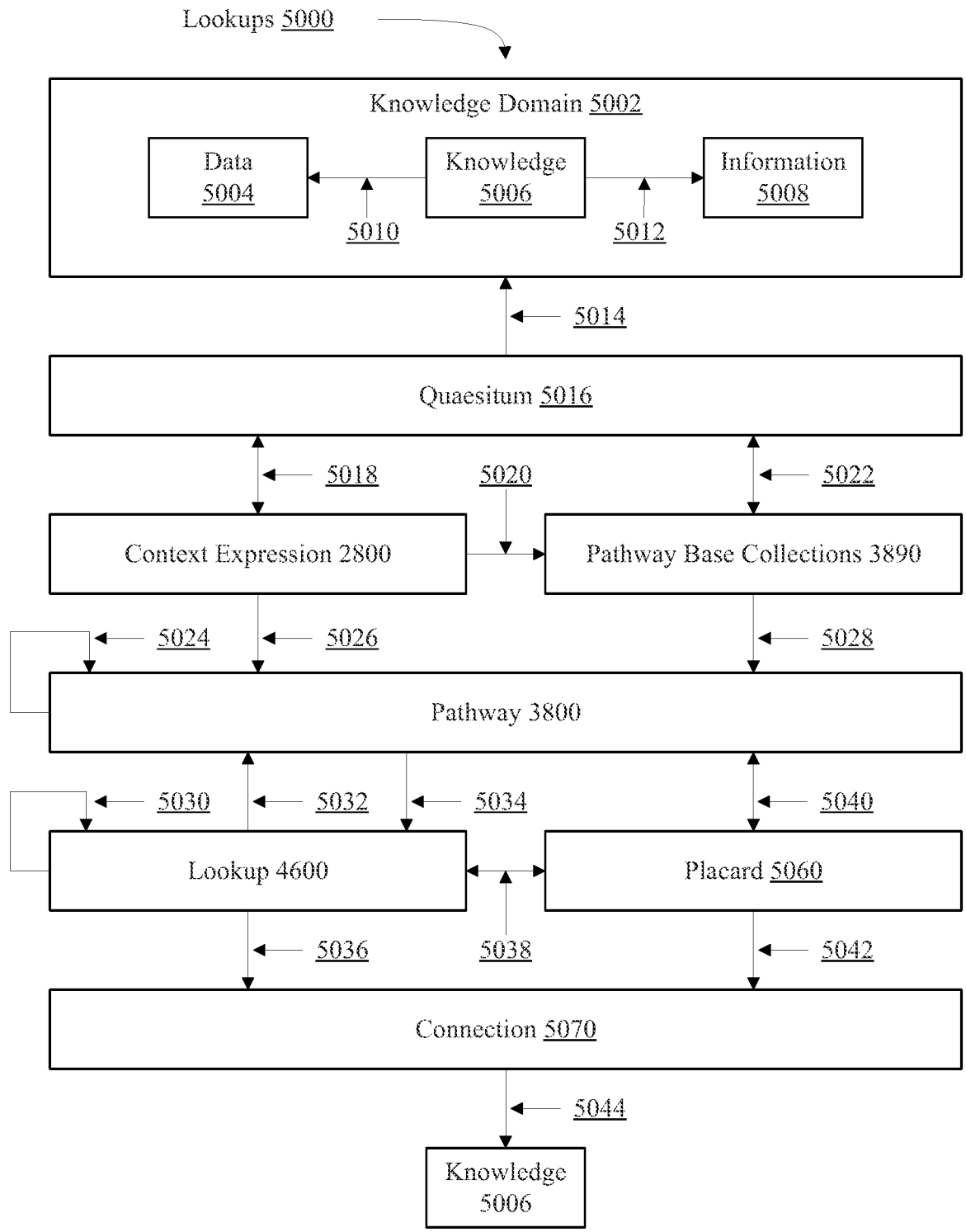
FIG. 50 shows an exemplary Lookups.

FIG. 50 illustrates Lookups 5000 which is composed of Knowledge Domain 5002. Knowledge Domain 5002 contains Data 5004, Knowledge 5006, and Information 5008. Knowledge 5006 connects to Data 5004 at Line Segment 5010. Knowledge 5006 connects to Information 5008 at Line Segment 5012. Quaesitum 5016 is connected to Knowledge Domain 5002 at Line Segment 5014. Quaesitum 5016 is connected to Context Expression 2800 at Line Segment 5018. Context Expression 2800 is connected to Pathway Base Collections 3890 at Line Segment 5020. Quaesitum 5016 is connected to Pathway Base Collections 3890 at Line Segment 5022. Pathway 3800 is recursively connected to Pathway 3800 at Line Segment 5024. Context Expression 2800 is connected to Pathway 3800 at Line Segment 5026. Pathway Base Collections 3890 is connected to Pathway 3800 at Line Segment 5028. Lookup 4600 is recursively connected to Lookup 4600 at Line Segment 5030. Lookup 4600 is connected to Pathway 3800 at Line Segment 5032. Pathway 3800 is connected to Lookup 4600 at Line Segment 5034. Lookup 4600 is connected to Connection 5070 at Line Segment 5036. Lookup 4600 is connected to Placard 5060 at Line Segment 5038. Placard 5060 is connected to Pathway 3800 at Line Segment 5040. Placard 5060 is connected to Connection 5070 at Line Segment 5042. Connection 5070 is connected to Knowledge 5006 at Line Segment 5044.

Lookups 5000 illustrates Knowledge Domain 5002. A "knowledge domain" is defined as a domain consisting of data[61], information[62], and knowledge[63]. It represents that "there are known knowns. These are things that we know that we know. There are known unknowns. That is to say, there are things that we know we don't know. But there are also unknown unknowns. There are things we don't know we don't know."[64] Knowledge 5006, or "knowledge," is used to represent Knowledge Domain 5002 as well as Data 5004, or "data," as illustrated by Line Segment 5010 and Information 5008, or "information," as illustrated by Line Segment 5012.

[61] "data, n." OED Online, Oxford University Press, December 2019, www.oed.com/view/Entry/296948. Accessed 8 Feb. 2020.
[62] "information, n." OED Online, Oxford University Press, December 2019, www.oed.com/view/Entry/95568. Accessed 8 Feb. 2020.
[63] "knowledge, n." OED Online, Oxford University Press, March 2020, www.oed.com/view/Entry/104170. Accessed 19 May 2020.
[64] "Defense.gov Transcript: DoD News Briefing—Secretary Rumsfeld and Gen. Myers." United States Department of Defense (defense.gov), archive.defense.gov/Transcripts/Transcript.aspx?TranscriptID=2636.

Quaesitum 5016 illustrates "quaesitum" as defined in the OED, "that which is sought; the answer to a problem."[65] It is also defined in Latin as that which is "sought out, looked for."[66] Quaesitum 5016 connects to Knowledge Domain 5002 at Line Segment 5014 illustrating knowledge which is sought out, knowledge which is looked for, or knowledge as the answer to a problem. Context Expression 2800 illustrates context expressions. Line Segment 5018 illustrates that context expressions can be derived out of quaesitum or that context expressions may be attributive context for a quaesitum subject. A "quaesitum subject" is defined as that which forms or is chosen as the matter being sought out, looked for, or answering a problem. Pathway Base Collections 3890 illustrates a collection of Pathway Base Collection 3840 in FIG. 38; each Pathway Collection 3840 is a collection of Pathway Base 3800 in FIG. 38, with each pathway derived out of a context expression. This is illustrated by Line Segment 5020 connecting Pathway Base Collections 3890 and Context Expression 2800. Each pathway's context expression, as stated above, can be derived out of quaesitum or that context expression may be attributive context for a quaesitum subject. This is illustrated by Line Segment 5022.

[65] "quaesitum, n." OED Online, Oxford University Press, December 2019, www.oed.com/view/Entry/155792. Accessed 10 Feb. 2020.
[66] William Whitaker's Words, archives.nd.edu/cgi-bin/wordz.pl?keyword=quaesitum.

Pathway 3800 illustrates pathways as well as their relationship to Context Expression 2800 as illustrated by Line Segment 5026 and Line Segment 5028. Pathway 3800 also illustrates their inclusion in Pathway Base Collections 3890 as illustrated by Line Segment 5028. Line Segment 5024 illustrates that a pathway may reference one or more pathways. Lookup 4600 illustrates a lookup. Lookup 4600 connects to Pathway 3800 at Line Segment 5032 illustrating that a lookup may have one or more pathways. Lookup 4600 connects to Pathway 3800 at Line Segment 5034 illustrating that a pathway may have one or more lookups. Line Segment 5030 illustrates that a lookup may reference one or more lookups. Lookup 4600 connects to Connection 5070 via Line Segment 5036, and Connection 5070 connects to Knowledge 5006 via Line Segment 5044, illustrating a lookup's connection. Connection 5070 illustrates "connection" which is defined as the creating, communicating, discovering, and acquiring of quaesitum.

Placard 5060 illustrates "placard" which is defined as the visual, audio, or tactile representation of the data, information, or knowledge that is publicly or privately displayed as a lookup. Pathway 3800 connects to Placard 5060 via Line Segment 5040 illustrating that a pathway may utilize one or more placards and a placard may reference one or more pathways. Lookup 4600 connects to Placard 5060 via Line Segment 5038 illustrating that a lookup may utilize one or more placards and a placard may reference one or more lookups. Placard 5060 connects to Connection 5070 via Line Segment 5042, and Connection 5070 connects to Knowledge 5006 via Line Segment 5044, illustrating a placard's connection.

Lookups 5000 illustrates a system that allows users to create, communicate, discover, and acquire an infinite amount of data, information and knowledge—starting with Quaesitum 5016 and resulting in Connection 5038. It aggregates and makes available every single lookup that is created about a particular quaesitum subject, so that those who consume the lookups see the data, information, and knowledge as it actually is, without any algorithmic manipulation or social engineering. Users of the system are able to create an unlimited number of lookups as well as consume an unlimited number of lookups, which allows for incredibly rich, up to date, dynamic, crowd sourced knowledge. Lookups 5000 also represents a connection discovery platform, enabling users to create meaningful connections (e.g. individual to individual, or business, or government, etc.) in new ways that have not been available before.

An exemplary enablement is a system that enables the creation and communication of data, information, and knowledge (i.e. users create lookups visually, audible, or tactilely).

Another exemplary enablement is a system that enables the discovery and acquisition of data, information, and knowledge (i.e. users consume lookups visually, audibly, or tactilely).

Another exemplary enablement is a system that enables users, such as, but not limited to, individuals, businesses, non-profits, and government entities, to be found, whereby a user creates one or more context expressions and their associated pathways which enables other users to discover their lookups. The following examples are five lookups that were created by a single individual user whereby each context expression describes something unique about the individual.

Community Affiliation Lookup Example #1:

"Community: Yale University|Name: William Thomson|Attended: 1985-1989"

In this example, the user is describing their affiliation to a community. The community could be a workplace, school, neighborhood, etc. that the user specifies in the context expression, along with the name that people knew them by in that community. It could also include a date or range of dates, indicating when they were a part of that community.

Name and Location Lookup Example #2:
"Name: William Thomson|City: New Haven| When: 1985-1991"
In this example, the user is providing their name and a city. It may also include a date or range of dates, indicating when they were at that location.

Name and Location Lookup Example #3:
"Name: William Thomson|Street: Mansfield Street| When: 1989-1991"
In this example, the user is providing their name and a street. It may also include a date or range of dates, indicating when they were at that location.

Pseudonym and Location Lookup Example #4:
"Nickname: Will|Where: Stiles| When: 1985-1989"
In this example, the user is providing the nickname people knew them by at a college for a specified number of years.

In each of these examples, the user gets to choose what they want people to see (i.e. opt-in), and the system creates individual pathways, including for each year, plus the range of years inputted.

Platform Affiliation Lookup Example #5:
"Twitter: @willyboy"
In this example, the user is providing their handle on one of the social media platforms they use. Other users will be able to use lookups to access the user's information on that platform plus anything related to what's been said using that handle. In this instance, there is no opt-in. The context expression and its associated pathways and lookups are public.

Platform Affiliation Lookup Example #6:
":fire::earth::water:air:"
In this example, the user opts to provide an emoji mark as a means to be found privately.

An exemplary enablement is a system that enables lookups which may be opt-in or opt-out.

Another exemplary enablement is a system that enables lookups which may be private or public.

Another exemplary enablement is a system that enables users to create context expressions and their associated pathways and lookups wherein the content resides outside of the system. For example, our user William Thomson sees a blog piece on Zero Hedge that points out how Twitter is the impetus for cancel culture and deplatforming as well as the negative effect Twitter has had on people by stealing their livelihoods. He creates a context expression and associated pathway and lookup that contains the link to the blog piece for other users to discover. Our user William Thomson then takes his own blog piece that he wrote about how he was personally doxed by Twitter users and lost his job based on incorrect information and creates a context expression and associated pathway and lookup which contains his blog piece. He also creates context expressions and associated pathways and lookups using "#Deplatforming", "#Cancel Culture", "#I've been doxed", "#Thief" "@jack" for users to discover more data, information, and knowledge, with no limits imposed on his freedom of speech.

Another exemplary enablement is a system whereby lookups enable the physical separation of hosting content and content location services while providing users unified ownership and control over their pathways to connect others to content.

Another exemplary enablement is a system that enables lookups which provide incredibly accurate and current data, information, and knowledge since users can update lookups in real-time and make those changes available in real-time.

Another exemplary enablement is a system that enables pathway clustering for speed and efficiency, whereby only exact match lookups are served up in response to quaesitum.

Another exemplary enablement is a system that provides an extensibility, such that it can be integrated with traditional subjecting systems and search engines.

Another exemplary enablement is a system that enables crowd sourced pathways to subjects pointed to by traditional subjecting systems and search engines.

Another exemplary enablement is a system that enables lookups which may capture crowd sourced context and crowd sourced context mapping. Oftentimes, things like misspellings, languages, words, colloquialisms, idioms, phrases, abbreviations, acronyms as well as location and the passage of time make it difficult to find data, information, and knowledge on the internet. Traditional subjecting systems use singular and rigid taxonomies that don't have the capacity to capture crowd sourced context attribution. Search engine algorithms may infer context attribution, but they are biased, flawed, and intentionally manipulated for profit or social engineering. The present disclosure highlights and enables the multi-dimensional nature of knowledge, whereby crowd sourcing gives voice to all different cultures, experiences, moments in time, regional differences, capacities to understand, points of view, etc. Learning is further amplified because every single distinction of data, information, and knowledge can be captured and communicated without limits. For example, consider the index of a book. While an author, editor, etc. may accurately present certain aspects of the book to be indexed, they are doing it from the perspective of understanding having originated the content for the subject. Given the natural proclivity for bias, error, etc. it's not possible for them to create a comprehensive, all knowing index from a universe of possible perspectives about the subject (i.e. indexes are imperfect). Lookups 5000 enables a crowd sourced perspective, understanding, and insight to create many, many pathways as lookups to the subject, providing a crowd sourced index vis a vie crowd sourced context and crowd sourced context mapping.

Another exemplary enablement is a system that provides for a crowd sourced epistemology, that is, it provides processes for investigating the origin of knowledge and documents the historical development of its form and meaning.

Another exemplary enablement is a system that enables crowd sourced distinctions or accurately observed differences of knowledge.

Another exemplary enablement is a system that enables context expressions and their associated pathways and lookups to capture commonly accepted contexts or conventions as well as uncommonly accepted context or conventions.

Another exemplary enablement is a system that eliminates ambiguity through lookups as well as their associated one or more context expressions and one or more pathways.

Another exemplary enablement is a system where multiple pathways are defined by users using formal classification systems (e.g. subject headings) as well as informal user derived classification systems (e.g. folksonomy).

Another exemplary enablement is a system that enables lookups which may capture local colloquialisms and local idioms.

Another exemplary enablement is a system that enables the modeling of human colloquial inquiry.

Another exemplary enablement is a system that enables lookups which may capture shared personal and social experiences in a community (e.g. how one thinks, learns, seeks out knowledge, based on specific experiences in life). For example, consider how human beings interact and talk when they discover connections with one another. When they find out someone went to the same school or worked at the same place, the conversation goes, "Oh really, I went there, worked there at this time. What about you? Do you know so and so? Yes, I know so and so." Lookups are a way for us to do this digitally. It is not just about discovering data, information, and knowledge; it is also about discovering connections with the individual, business, government, etc. behind the data, information, and knowledge.

Another exemplary enablement is a system that enables lookups which may create economic connections (i.e. increased opportunities for commerce). For example, if a user looks up "Boise Café," they do not see a million results in a search engine. They only see (or hear, or touch) the 10 or 15 cafés in Boise that have created context expressions and their associated pathways and lookups that are specific to "Boise Café." The café owner is happy, and the customer is happy, because they made a quick and easy connection via lookups that resulted in a hot cup of coffee exchanging hands for money.

Another exemplary enablement is a system that enables lookups which may be secured through authentication and authorization.

Another exemplary enablement is a system that enables secret lookups through the inclusion of a passcode in a context expression.

Another exemplary enablement is a system that enables lookups which may be monetized or tokenized by means such as, but not limited to, subscriptions, paywalls, and microtransactions (e.g. broker curated lookup content for profit).

Another exemplary enablement is a system that enables users to follow the curated lookup content of another user.

Another exemplary enablement is a system that enables lookups which may be ephemeral or permanent.

Another exemplary enablement is a system that enables lookups which may have an expiration DateTime whereby users may attribute an expiration date or the system may provide a default expiration date.

Another exemplary enablement is a system that enables lookups which may have a specific DateTime, collection of DateTimes, DateTime range and/or DateTime interval which provides temporality context.

Another exemplary enablement is a system that enables lookups which may have a specific or broad locality (such as, but not limited to, street address, city, state, country, geolocation) which provides locality context.

Another exemplary enablement is system that enables lookup context to enable pertinent and concise connections to quaesitum.

Another exemplary enablement is a system that enables actionable context to enable pertinent and concise connections to quaesitum.

Another exemplary enablement is a system that enables taxonomy context to enable pertinent and concise connections to quaesitum.

Another exemplary enablement is a system that enables locality context to enable pertinent and concise connections to quaesitum.

Another exemplary enablement is a system that enables temporality context to enable pertinent and concise connections to quaesitum.

Another exemplary enablement is a system that enables prefix context to enable pertinent and concise connections to quaesitum.

Another exemplary enablement is a system that enables lookups which allow for message routing and queues.

Another exemplary enablement is a system that enables lookups which allow for actionable single purpose events or processes such as lookups as POST, PUT and DELETE.

Another exemplary enablement is a system that enables lookups which allow for query and execution processing.

Another exemplary enablement is a system that enables lookups which allow for processing through API.

Another exemplary enablement is a system that enables lookups which allow for loose coupling between pathways and resources.

Lookup Systems 2614 in FIG. 26 encapsulates and utilizes lookups as illustrated in FIGS. 46 through 50 and the specifications that support the figures.

An exemplary enablement is a system that makes lookups available through an Application Programming Interface (API).

Another exemplary enablement is a system that makes lookups available through a Software Development Kit (SDK).

Figure 51:
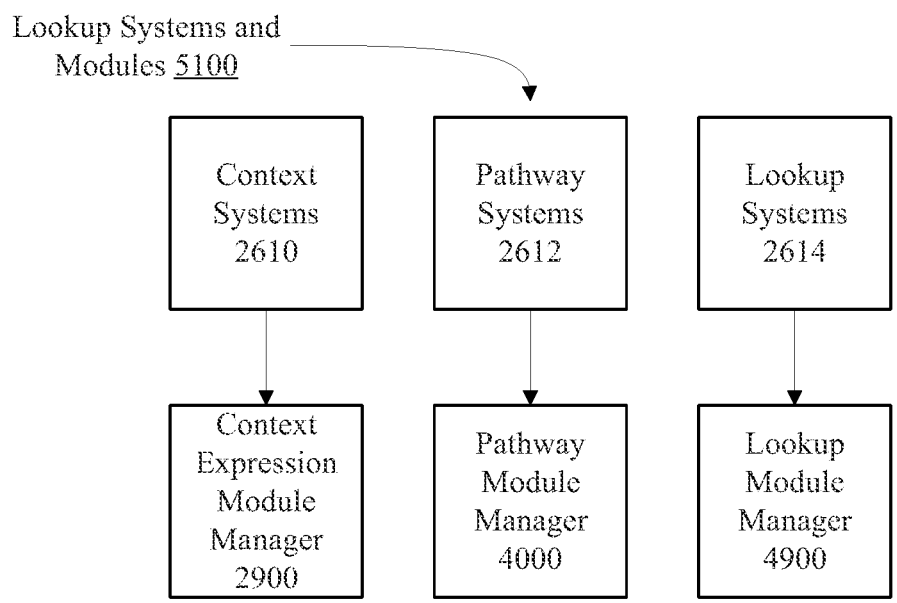
FIG. 51 shows exemplary Lookup Systems and Modules.

FIG. 51 illustrates Context Systems 2610 which connects to Context Expression Module Manager 2900, Pathway Systems 2612 which connects to Pathway Module Manager 4000, and Lookup Systems 2614 which connects to Lookup Module Manager 4900.

Lookup Systems and Modules 5100 illustrates Context Systems 2610 and its relationship to Context Expression Module Manager 2900, Pathway Systems 2612 and its relationship to Pathway Module Manager 4000, and Lookup Systems 2614 and its relationship to Lookup Module Manager 4900.

FIG. 52 illustrates Lookup Domain Name 5200 which is comprised of Domain Name 5202, Has Locality 5204, Has Taxonomy 5206, Has Temporality 5208, Locality Context Index 5210, Pathway Index 5212, Taxonomy Context Index 5214, and Temporality Context Index 5216.

Lookup Domain Name 5200 illustrates the lookup domain name composition. Domain Name 5202 illustrates the domain name for Lookup Domain Name 5200. Has Locality 5204 illustrates a Boolean indicating whether or not Lookup Domain Name 5200 has a locality. Has Taxonomy 5206 illustrates a Boolean indicating whether or not Lookup Domain Name 5200 has a taxonomy. Has Temporality 5208 illustrates a Boolean indicating whether or not Lookup Domain Name 5200 has a temporality. Locality Context Index 5210 illustrates a locality context index for Lookup Domain Name 5200. Pathway Index 5212 illustrates a pathway index for Lookup Domain Name 5200. Taxonomy Context Index 5214 illustrates a taxonomy context index for Lookup Domain Name 5200. Temporality Context Index 5216 illustrates a temporality context index for Lookup Domain Name 5200.

Figure 53:
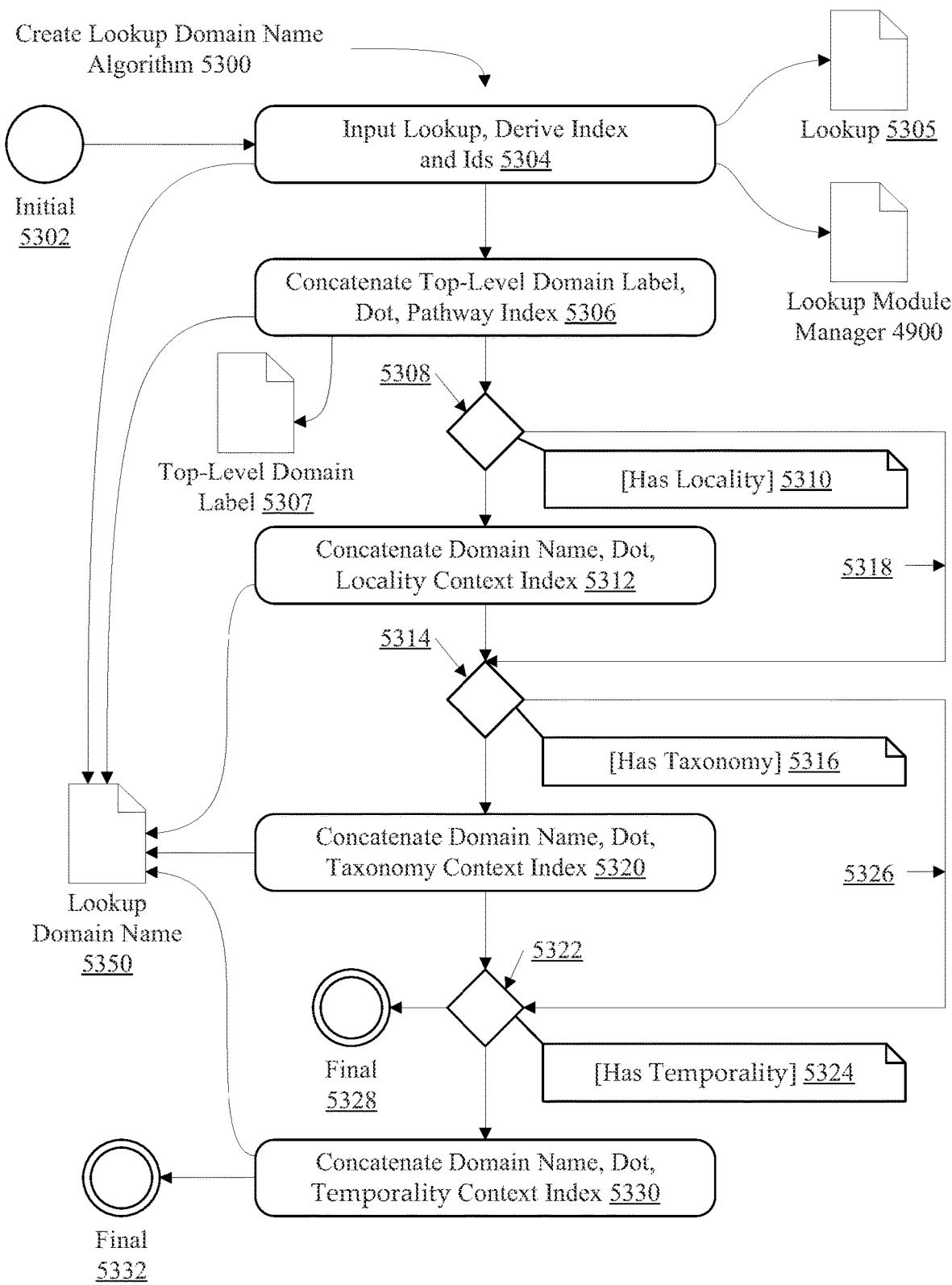
FIG. 53 shows an exemplary Create Lookup Domain Name Algorithm.

FIG. 53 illustrates Create Lookup Domain Name Algorithm 5300. The algorithm starts with Initial 5302 which is connected to Input Lookup, Derive Index and Ids 5304. Input Lookup, Derive Index and Ids 5304 is connected to Lookup 5305, Lookup Module Manager 4900, Lookup Domain Name 5350, and Concatenate Top-Level Domain Label, Dot, Pathway Index 5306. Concatenate Top-Level Domain Label, Dot, Pathway Index 5306 is connected to Lookup Domain Name 5350, Top-Level Domain Label 5307, and Decision 5308. Decision 5308 is connected to note [Has Locality] 5310, which illustrates Boolean criteria.

If Has Locality is true, control proceeds to Concatenate Domain Name, Dot, Locality Context Index 5312 which is connected to Lookup Domain Name 5350 and Decision 5314. If Has Locality is false, control proceeds to Decision 5314 via Line Segment 5318. Decision 5314 is connected to note [Has Taxonomy] 5316, which illustrates Boolean criteria. If Has Taxonomy is true, control proceeds to Concatenate Domain Name, Dot, Taxonomy Context Index 5320 which is connected to Lookup Domain Name 5350 and Decision 5322. If Has Taxonomy is false, control proceeds to Decision 5322 via Line Segment 5326. Decision 5322 is connected to note [Has Temporality] 5324, which illustrates Boolean criteria. If Has Temporality is true, control proceeds to Concatenate Domain Name, Dot, Temporality Context Index 5330 which is connected to Lookup Domain Name 5350 and Final 5332, illustrating the end of the algorithm. If Has Temporality is false, control proceeds to Final 5328, illustrating the end of the algorithm.

Create Lookup Domain Name Algorithm 5300 illustrates the creation of Lookup Domain Name 5350 using context intelligence. The algorithm starts at Initial 5302. Input Lookup, Derive Index and Ids 5304 inputs a lookup illustrated by Lookup 5305. Input Lookup, Derived Index and Ids 5304 creates a new instance of Lookup Domain Name 5350 and determines Boolean values for Has Locality 5204, Has Taxonomy 5206, and Has Temporality 5208 (see, FIG. 52 respectively) from Lookup 5305. The Boolean values are assigned to the respective members in Lookup Domain Name 5350. Input Lookup, Derive Index and Ids 5304 utilizes Lookup Module Manager 4900 to generate Pathway Index 5212 in FIG. 52. If Has Locality 5204 in FIG. 52 is true, then Input Lookup, Derive Index and Ids 5304 utilizes Lookup Module Manager 4900 to generate Locality Context Index 5210 in FIG. 52. If Has Taxonomy 5206 in FIG. 52 is true, then Input Lookup, Derive Index and Ids 5304 utilizes Lookup Module Manager 4900 to generate Taxonomy Context Index 5214 in FIG. 52. If Has Temporality 5208 in FIG. 52 is true, then Input Lookup, Derive Index and Ids 5304 utilizes Lookup Module Manager 4900 to generate Temporality Context Index 5216 in FIG. 52. Locality Context Index 5210, Taxonomy Context Index 5214, and Temporality Context Index 5216 are assigned to their respective members in Lookup Domain Name 5350. Top-Level Domain Label 5307 may be a setting or provided as a parameter in the call to Create Lookup Domain Name Algorithm 5300. It contains a top-level domain label. Concatenate Top-Level Domain Label, Dot, and Pathway Index 5306 concatenates Top-Level Domain Label 5307, dot[67], Pathway Index 5212 (see, FIG. 52) in Lookup Domain Name 5350. The concatenated value is assigned to Domain Name 5202 (see, FIG. 52) in Lookup Domain Name 5350. Decision 5308 determines if Has Locality 5204 in Lookup Domain Name 5350 is true. If true, Concatenate Domain Name, Dot, Locality Context Index 5312 concatenates Domain Name 5202, dot, Locality Context Index 5210. The concatenated value is assigned to Domain Name 5202, and control proceeds to Decision 5314. If Has Locality 5204 is false, control proceeds to Decision 5314, as illustrated by Line Segment 5318. Decision 5314 determines if Has Taxonomy 5206 in Lookup Domain Name 5350 is true. If true, Concatenate Domain Name, Dot, Taxonomy Context Index 5320 concatenates Domain Name 5202, dot, Taxonomy Context Index 5214. The concatenated value is assigned to Domain Name 5202, and control proceeds to Decision 5322. If Has Taxonomy 5206 is false, control proceeds to Decision 5322, as illustrated by Line Segment 5326. Decision 5322 determines if Has Temporality 5208 in Lookup Domain Name 5350 is true. If Has Temporality 5208 is false, the algorithm concludes at Final 5328, returning Lookup Domain Name 5350. If true, Concatenate Domain Name, Dot, Temporality Context Index 5330 concatenates Domain Name 5202, dot, Temporality Context Index 5216. The concatenated value is assigned to Domain Name 5202, and the algorithm concludes at Final 5332, returning Lookup Domain Name 5350.

[67] Peter. "ASCII Code. , Dot, Full Stop." The Complete Table of ASCII Characters, Codes, Symbols and Signs, American Standard Code for Information Interchange, theasciicode.com.ar/ascii-printable-characters/dot-full-stop-ascii-code-46.html.

Alternative embodiments of Create Lookup Domain Name Algorithm 5300 provide method overloads to take parameters of settings for Context Identifier Algorithm 200 (e.g., Culture and Case Settings 213 and Sort Settings 222 in FIG. 2) and Top-Level Domain Label 5307.

In some embodiments, Locality Context Index 5210 is the equivalent of Lookup Header Locality Id 4720 in FIG. 47, and Temporality Context Index 5216 is the equivalent of Lookup Header Temporality Id 4708 in FIG. 47. Both Ids may be found in Lookup Header 4700 in Lookup 4800 in FIG. 48.

Create Lookup Domain Name Algorithm 5300 illustrates context intelligence use for deriving machine readable domain names which may be used to replace human readable domain names, creating an abstraction whereby humans utilize context expressions to create domain names without the underlying technical syntactical requirements of the current domain name system paradigm. Furthermore, the context intelligence domain name abstraction enables domain names to be created with attributive context. Locality Context Index 5210 and Lookup Domain Name 5200 illustrate how an attributive context of locality may be used to tie a domain name to a specific locality. Therefore, the domain name can be utilized in many localities. This reflects, for example, how similar business names can be found across multiple locations. Using a locality as an attributive context for the business named "AAA Plumbing" in a context expression enables the same domain name to be used in micro locations such as a neighborhood or town; moreover, well known brands may utilize regional or national locality attributive context.

An exemplary enablement is a system that enables the generation of context intelligent domain names based on context expressions.

Another exemplary enablement is a system that enables the generation of context intelligent domain names based on attributive context for a context expression.

Another exemplary enablement is a system that enables the generation of context intelligent domain names that may be used more than once.

Figure 54:
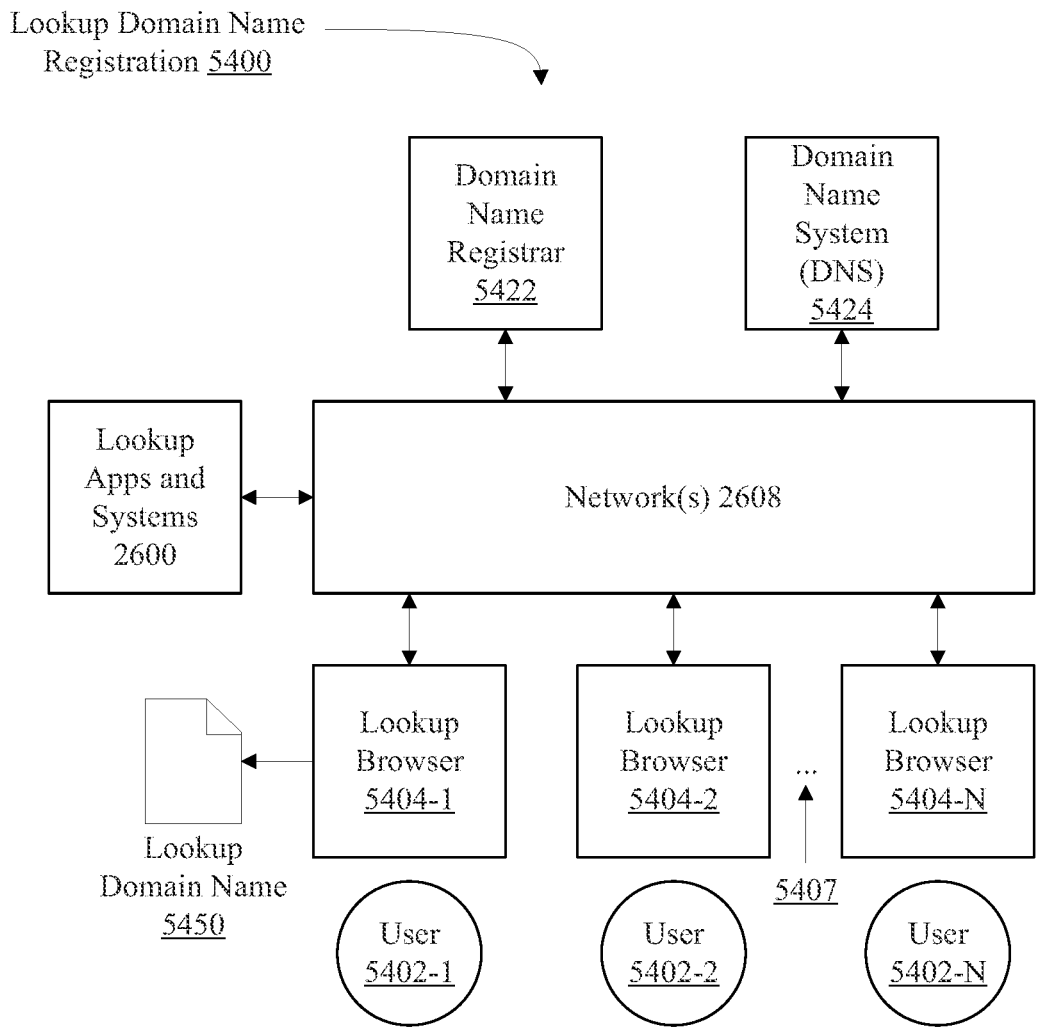
FIG. 54 shows an exemplary Lookup Domain Name Registration.

FIG. 54 illustrates Lookup Domain Name Registration 5400 where User 5402-1 has Lookup Browser 5404-1 which connects via Network(s) 2608 to Lookup Apps and Systems 2600, Domain Name Registrar 5422, and Domain Name System (DNS) 5424. Domain Name Registrar 5422 is connected to Domain Name System (DNS) 5424 via Network(s) 2608. User 5402-2 has Lookup Browser 5404-2, and User 5402-N has Lookup Browser 5404-N. The ellipse at 5407 between Lookup Browser 5404-2 and Lookup Browser 5404-N illustrates that there are N number of lookup browsers for every user on the network. Every browser connects via Networks(s) 2608 to Lookup Apps and Systems 2600, Domain Name Registrar 5422, and Domain Name System (DNS) 5424. Lookup Browser 5404-1 generates Lookup Domain Name 5450 (see, Lookup Domain Name 5200 in FIG. 52). Network(s) 2608 also provides access to Social Media Systems 2620 and Blockchain 2622 in FIG. 26.

Lookup Domain Name Registration 5400 illustrates the lookup domain name systems architecture for creating context intelligent domain names. Lookup Apps and Systems 2600 illustrates the utilization of the context intelligent domain name systems (e.g., Context Systems 2610, Pathway Systems 2612, and Lookup Systems 2614) by Lookup Browser 5404-1, Lookup Browser 5404-1, through Lookup Browser 5404-N (see, Lookup Browser 5600 in FIG. 56) to create and manage context intelligent domain names. For example, User 5402-1 utilizes Lookup Browser 5404-1 to create Lookup Domain Name 5450 through Lookup Module Manager 4900 and Create Lookup Domain Algorithm 5300 (see, FIG. 53 respectively) in Lookup Systems 2614 illustrated by Lookup Apps and Systems 2600 and accessible through Network(s) 2608.

Lookup Domain Name 5450 registration and utilization follows industry standards to register and utilize domain names as illustrated by Domain Name Registrar 5422 and Domain Name System (DNS) 5424 accessible through Network(s) 2608. Domain management of and association with underlying internet protocol follows industry standards; however, users utilize context expressions and a context intelligent domain name systems abstraction layer to interface with internet websites and lookups.

An exemplary enablement is a system that creates a lookup domain name systems architecture that provides a context intelligent domain name systems abstraction layer.

Another exemplary enablement is a system that utilizes a context intelligent domain name systems abstraction layer which enables users to create, utilize, and manage context intelligent domain names based on a context expression.

Another exemplary enablement is a system that utilizes a context intelligent domain name systems abstraction layer which enables users to create, utilize, and manage context intelligent domain names based on attributive context for a context expression.

Figure 55:
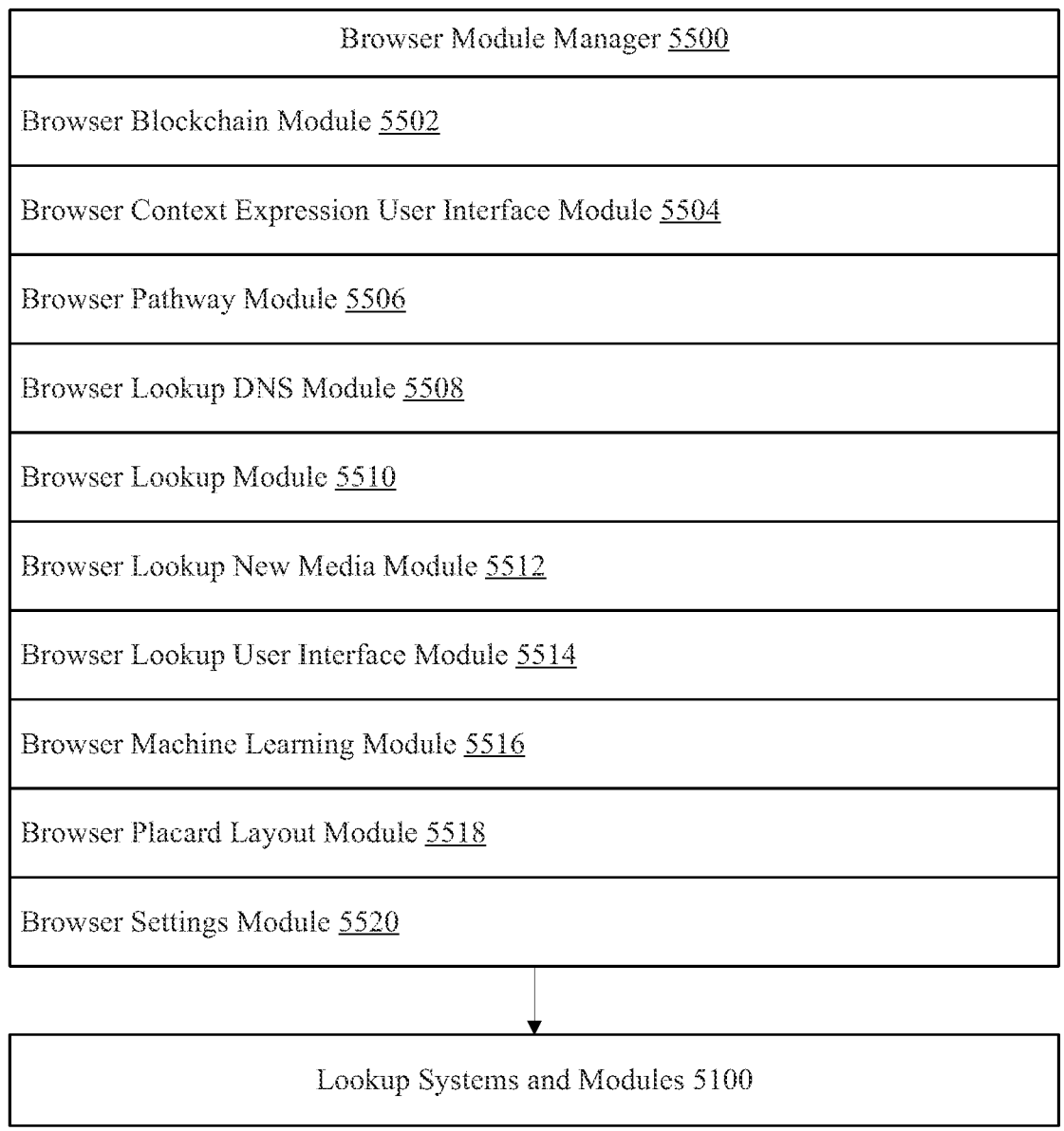
FIG. 55 shows an exemplary Browser Module Manager.

FIG. 55 illustrates Browser Module Manager 5500 which contains Browser Blockchain Module 5502, Browser Context Expression User Interface Module 5504, Browser Pathway Module 5506, Browser Lookup DNS Module 5508, Browser Lookup Module 5510, Browser Lookup New Media Module 5512, Browser Lookup User Interface Module 5514, Browser Machine Learning Module 5516, Browser Placard Layout Module 5518, and Browser Settings Module 5520. Browser Module Manager 5500 is connected to Lookup Systems and Modules 5100.

Browser Module Manager 5500 illustrates the functionality and logic to manage browser modules and algorithms. Browser Module Manager 5500 and its modules utilize Lookup Systems and Modules 5100 to create, utilize, and manage context expressions, pathways, and lookups.

Browser Blockchain Module 5502 illustrates functionality and logic for context expression, pathway, and lookup integration with blockchain. Browser Context Expression User Interface Module 5504 illustrates functionality and logic to create, utilize, and manage context expressions, pathways, and lookups in a user interface. Browser Pathway Module 5506 illustrates pathway creation, utilization, and management functionality and logic for pathways. Browser Lookup DNS Module 5508 illustrates Lookup Domain Name 5450 (see FIG. 5754) creation, utilization, and management functionality and logic for lookup domain names. Browser Lookup Module 5510 illustrates lookup creation, utilization, and management functionality and logic for lookups. Browser Lookup New Media Module 5512 illustrates a reserved module whose functionality brings traditional media forward into Internet 2.0 as new media. Browser Lookup User Interface Module 5514 illustrates user interface specific functionality and logic to support Browser Manager Module 5500. Browser Machine Learning Module 5516 illustrates functionality and logic for context expression, pathway, and lookup integration with machine learning. Browser Placard Layout Module 5518 illustrates user interface layout functionality and logic for working with placards and placard integration with context expressions, pathways, and lookups. Browser Settings Module 5520 exemplifies functionality and logic to create, utilize and manage context expression, pathway, and lookup settings.

Figure 56:
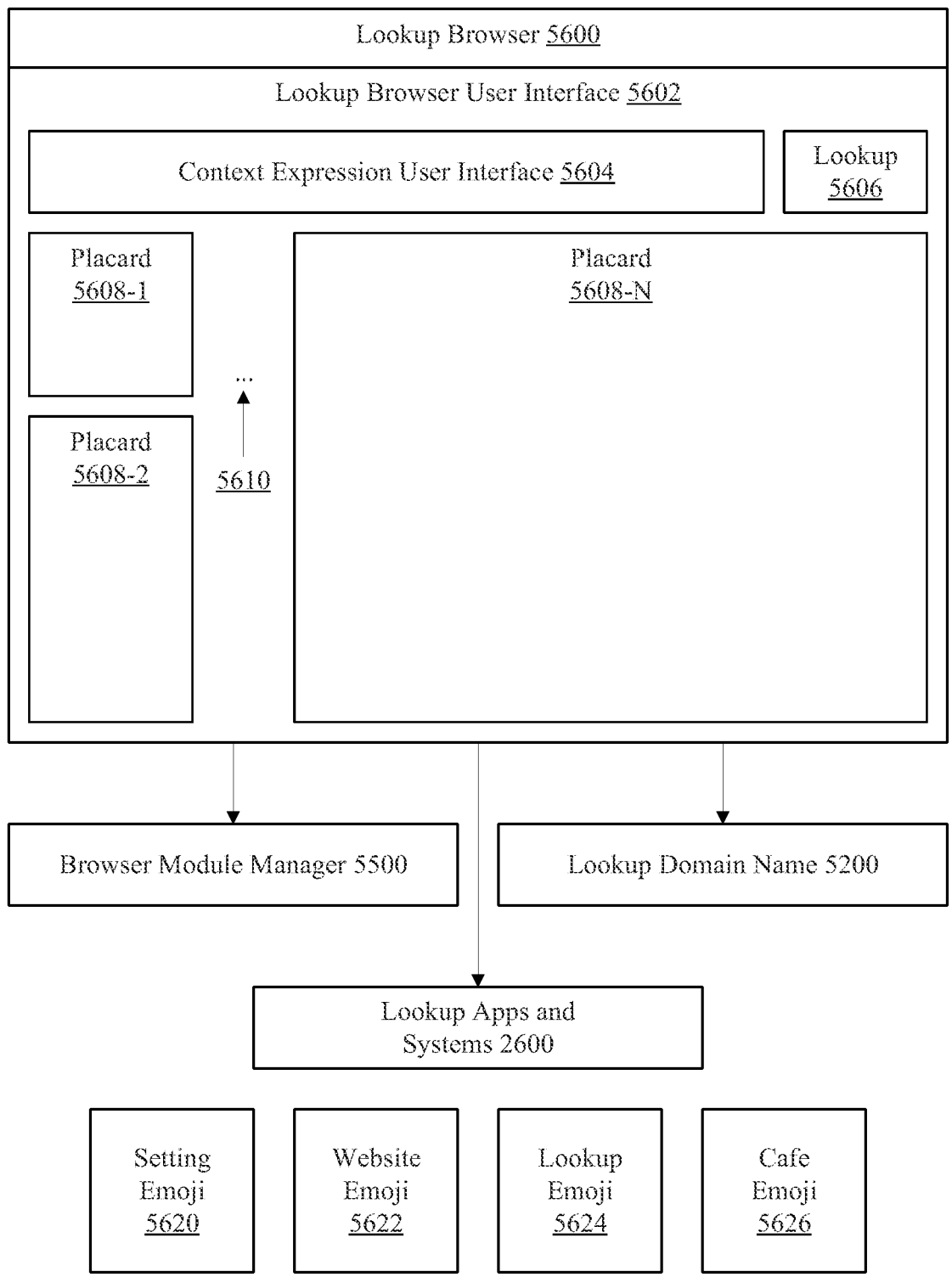
FIG. 56 shows an exemplary Lookup Browser.

FIG. 56 illustrates Lookup Browser 5600 which is comprised of Lookup Browser User Interface 5602. Lookup Browser User Interface 5602 contains Context Expression User Interface 5604, Lookup 5606, Placard 5608-1, Placard 5608-2, and Placard 5608-N. The ellipse at 5610 illustrates that there are N number of placards in Lookup Browser User Interface 5602. Lookup Browser 5600 connects to Browser Module Manager 5500, Lookup Apps and Systems 2600, and Lookup Domain Name 5200. Lookup Browser 5600 also contains Settings Emoji 5620, Website Emoji 5622, Lookup Emoji 5624, and Cafe Emoji 5626. Settings Emoji 5260 is a settings emoji and is represented by the emoji shortcode ":settings:", Website Emoji 5622 is a website emoji and is represented by the emoji shortcode ":website:", Lookup Emoji 5624 is a lookup emoji and is represented by the emoji shortcode ":lookup:" Cafe Emoji 5626 illustrates a cafe emoji and is represented by the emoji shortcode ":cafe:".

Lookup Browser 5600 illustrates a new approach to internet browsing by utilizing context expressions, pathways, lookups, and lookup domain names. Lookup Browser 5600 is the user interface that utilizes a context intelligent abstraction layer to interface between context expressions, pathways, lookups, and lookup domain names and the internet as it stands today—hereto referred to as "Internet 1.0." Beyond the backward compatibility with Internet 1.0, Lookup Browser 5600 ushers in a new paradigm for knowledge creation, communication, discovery, and acquisition through context expressions, pathways, lookups, and lookup domain names called Internet 2.0.

An exemplary enablement is a system that enables a browser to create, utilize, and manage context expressions.

Another exemplary enablement is a system that enables a browser to create, utilize, and manage pathways.

Another exemplary enablement is a system that enables a browser to create, utilize, and manage lookups.

Another exemplary enablement is a system that enables a browser to create, utilize, and manage lookup domain names.

Another exemplary enablement is a system that enables a browser to create, utilize, and manage placards.

Lookup Browser User Interface 5602 illustrates the classic interface of an internet browser containing Context Expression User Interface 5604, Lookup 5606, as well as Placard 5608-1, Placard 5608-2, and Placard 5608-N. Context Expression User Interface 5604 illustrates a lookup input for user data entry (e.g., in HTML5, <input type="text" id="lookup" name="lookup">). Lookup 5606 illustrates a button to initiate a lookup (e.g., in HTML5, <input type="submit" value="Submit">). Placard 5608-1, Placard 5608-2, and Placard 5608-N illustrate content results from a lookup.

Lookup Browser User Interface 5602 connects to Browser Module Manager 5500, Lookup Domain Name 5200, and Lookup Apps and System 2600 to illustrate the browser connection to and utilization of each the respective elements.

Users create lookups by defining context expressions and pathways, and users enter context expressions to find lookups. Context Expression User Interface 5604 illustrates lookup composition and results through placards. Prefixes enable browser specific processing for lookups. For example, consider the Context Expression Tuple 3340 (see, FIG. 33), ":settings: :locality::new_haven:" illustrates Settings Emoji 5620 plus Locality Emoji 3209 and New Haven Emoji 3205 in FIG. 32. The Settings Emoji 5620 prefix is used by Lookup Browser User Interface 5602 to work with browser settings to set the location to New Haven.

An exemplary enablement is a system that utilizes context expressions to configure a browser.

Prefixes in context expressions enable contextual disambiguation. For example, consider a context expression in Context Expression User Interface 5604 which contains either a Website Emoji 5622 or Lookup Emoji 5624 prefix. The following examples illustrate contextual disambiguation for lookups utilizing Context Expression Tuple 3390 (see, FIG. 33):

Contextual Disambiguation Example 1:
":website: @Pepe's Pizza"

Contextual Disambiguation Example 2:
":lookup: @Pepe's Pizza"

Each prefix in their respective context expression derives unique pathways. In Contextual Disambiguation Example 1, Lookup Browser 5600 will display the Pepe's Pizza website content for the context expression with the Website Emoji 5622 prefix. In Contextual Disambiguation Example 2, Lookup Browser 5600 will display Business Listing Summary Placard 5800 (see, FIG. 58) for Pepe's Pizza.

An exemplary enablement is a system that utilizes context expression prefixes to enable contextual disambiguation for lookups.

Internet 2.0 lookups may offer exact match results, where users focus on concise and pertinent results from context expressions and pathways. The following example illustrates an exact match lookup utilizing Context Expression Tuple 1190:

Exact Match Example 1:
"#New Haven Pizza"

In Exact Match Example 1, Lookup Browser 5600 will display results for the example context expression and pathway associated content.

An exemplary enablement is a system that enables exact match results for lookups.

Each lookup result displays rich contextual information to inform the end user. Context emoji, action emoji, taxonomy emoji, and emoji mark may be available for enriching content display as well as lookup header information such as prefix, context expression, temporality, locality, inception, and expiration.

An exemplary enablement is a system that utilizes context emoji, action emoji, taxonomy emoji, and emoji mark for content display.

Another exemplary enablement is a system that utilizes prefix, context expression, temporality, locality, inception, and expiration information for content display.

FIG. 57 illustrates Business Listing Placard 5700 which contains Business Address 5702, Business App Collection 5704, Business Attribution 5706, Business Calendar Collection 5708, Business Contact Collection 5710, Business Coupon Collection 5712, Business Description 5714, Business Hours 5716, Business Logo 5718, Business Name 5720, Business Offering Collection 5722, Business Id 5724, Business Profile Picture Collection 5726, and Business Specials Collection 5728.

Business Listing Placard 5700 illustrates a placard providing specifics for a business listing. Business Address 5702 illustrates a business address placard. Business App Collection 5704 illustrates a business app collection placard. Business Attribution 5706 illustrates a business attribution placard. Business Calendar Collection 5708 illustrates a business calendar collection placard. Business Contact Collection 5710 illustrates a business contact collection placard. Business Coupon Collection 5712 illustrates a business coupon collection placard. Business Description 5714 illustrates a business description placard. Business Hours 5716 illustrates a business hours placard. Business Logo 5718 illustrates a business logo placard. Business Name 5720 illustrates a business name placard. Business Offering Collection 5722 illustrates a business offering collection placard. Business Id 5724 illustrates a business identification placard. Business Profile Picture Collection 5726 illustrates a business profile picture collection placard. Business Specials Collection 5728 illustrates a business specials collection placard.

FIG. 58 illustrates Business Listing Summary Placard 5800 which contains Business Address 5702, Business Attribution 5706, Business Contact Collection 5710, Business Description 5714, Business Name 5720, and Business Id 5724.

Business Listing Summary Placard 5800 illustrates a placard providing a summary for a business listing. Business Address 5702 illustrates a business address placard. Business Attribution 5706 illustrates a business attribution placard. Business Contact Collection 5710 illustrates a business contact collection placard. Business Description 5714 illustrates a business description placard. Business Name 5720 illustrates a business name placard. Business Id 5724 illustrates a business identification placard.

FIG. 59 illustrates Business Placards 5900 which contains Business About Us Placard 5902, Business Appointment Placard 5904, Business Blog Placard 5906, Business Call to Action Placard 5908, Business Careers Placard 5910, Business Cart Placard 5912, Business Checkout Placard 5914, Business Confirmation Placard 5916, Business Contact Us Placard 5918, Business Delivery Placard 5920, Business Event Placard 5922, Business Feature Placard 5924, Business Feedback Placard 5926, Business Form Placard 5928, Business Gallery Placard 5930, and Business Inventory Placard 5932.

Business Placards 5900 illustrates different business placards. Business About Us Placard 5902 illustrates a business about us placard. Business Appointment Placard 5904 illustrates a business appointment placard. Business Blog Placard 5906 illustrates a business blog placard. Business Call to Action Placard 5908 illustrates a business call to action placard. Business Careers Placard 5910 illustrates a business careers placard. Business Cart Placard 5912 illustrates a business cart placard. Business Checkout Placard 5914 illustrates a business checkout placard. Business Confirmation Placard 5916 illustrates a business confirmation placard. Business Contact Us Placard 5918 illustrates a business contact us placard. Business Delivery Placard 5920 illustrates a business delivery placard. Business Event Placard 5922 illustrates a business event placard. Business Feature Placard 5924 illustrates a business feature placard. Business Feedback Placard 5926 illustrates a business feedback placard. Business Form Placard 5928 illustrates a business form placard. Business Gallery Placard 5930 illustrates a business gallery placard. Business Inventory Placard 5932 illustrates a business inventory placard.

FIG. 60 illustrates Business Placards 6000 which contains Business Map Placard 6002, Business Menu Placard 6004, Business My Account Placard 6006, Business Order Placard 6008, Business Portfolio Placard 6010, Business Purchase Placard 6012, Business Q & A Placard 6014, Business Reservation Placard 6016, Business Scheduling Placard 6018, Business Shop Placard 6020, Business Store Locator Placard 6022, Business Team Placard 6024, Business Terms and Conditions Placard 6026, Business Testimonials Placard 6028, Business Timeline Placard 6030, and Business Tracking Placard 6032.

Business Placards 6000 illustrates different business placards. Business Map Placard 6002 illustrates a business map placard. Business Menu Placard 6004 illustrates a business menu placard. Business My Account Placard 6006 illustrates a business my account placard. Business Order Placard 6008 illustrates a business order placard. Business Portfolio Placard 6010 illustrates a business portfolio placard. Business Purchase Placard 6012 illustrates a business purchase placard. Business Q & A Placard 6014 illustrates a business Q & A placard. Business Reservation Placard 6016 illustrates a business reservation placard. Business Scheduling Placard 6018 illustrates a business scheduling placard. Business Shop Placard 6020 illustrates a business shop placard. Business Store Locator Placard 6022 illustrates a business store locator placard. Business Team Placard 6024 illustrates a business team placard. Business Terms and Conditions Placard 6026 illustrates a business terms and conditions placard. Business Testimonials Placard 6028 illustrates a business testimonials placard. Business Timeline Placard 6030 illustrates a business timeline placard. Business Tracking Placard 6032 illustrates a business tracking placard.

Figure 61:
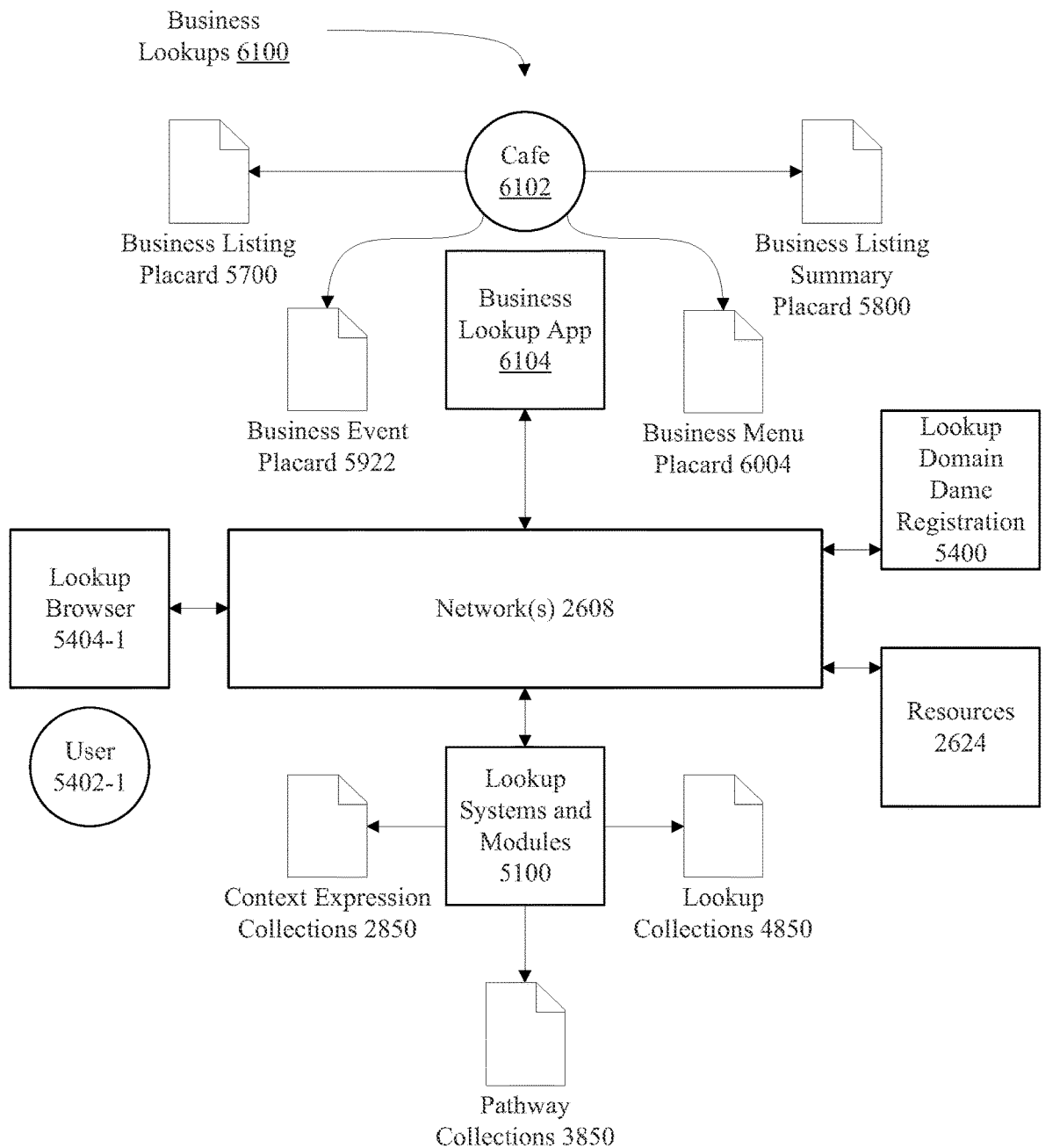
FIG. 61 shows an exemplary Business Lookups.

FIG. 61 illustrates Business Lookups 6100 which is comprised of Cafe 6102. Cafe 6102 is connected to Business Listing Placard 5700, Business Event Placard 5922, Business Menu Placard 6004, and Business Listing Summary Placard 5800. Network(s) 2608 is connected to Business Lookup App 6104, Lookup Browser 5404-1, Lookup Systems and Modules 5100, Resources 2624, and Lookup Domain Name Registration 5400. Lookup Systems and Modules 5100 is connected to Context Expression Collections 2850, Pathway Base Collections 3890, and Lookup Collections 4850. Cafe 6102 utilizes Business Lookup App 6104. User 5402-1 utilizes Lookup Browser 5404-1. Business Lookups 6100 also contains Help Wanted Placard 6120, Share Placard 6122, Share Authorization Placard 6124, Share Editor Placard 6126, Broadcast Share Placard 6128, and Merge Share Placard 6130.

A "placard" is defined as an internet component that may integrate context expressions, pathways, lookups, and lookup domain names in whole or in part; they encapsulate common personal, business, non-profit, and government use case functionality while enabling end users the ability to control content and style as well as add custom functionality. When the phrase "placard" is used, it refers to the placard definition specified here in addition to Placard 5060 (see, FIG. 50), Placards 5608-1, Placards 5608-2, and Placards 5608-N (see, FIG. 56 respectively), Business Listing Placard 5700 (see, FIG. 57), Business Listing Summary Placard 5800 (see, FIG. 58), Business Placards 5900 (see, FIG. 59), Business Placards 6000 (see, FIG. 60), and their constituent parts and any derivatives thereof. Other examples of placards include, but are not limited to, status (e.g., flight status, table status), resume, classified (e.g., for sale, housing, help wanted, services), happening, mention, share, broadcast share, merge share, share authorization, and share editor.

An exemplary enablement is a system that utilizes placards for static content creation, lookup, and display.

An exemplary enablement is a system that utilizes placards for dynamic content creation, lookup, display, and processing.

Business Lookups 6100 illustrates Cafe 6102, a cafe business which utilizes Business Lookup App 6104. Business Lookup App 6104 connects to Lookup Systems and Modules 5100 through Network(s) 2608 to utilize Context Expressions Collections 2850, Pathway Base Collections 3890, and Lookup Collections 4850. To illustrate, Cafe 6102 utilizes Business Lookup App 6104 to create Lookup Domain Name 5200 (see, FIG. 52) for the cafe business "Willoughby's Coffee & Tea". User 5402-1 utilizes Lookup Browser 5404-1 to browse Lookup Domain Name 5200 for Cafe 6102 using the context expression: ":website:@Willoughby's Coffee & Tea". Cafe 6102 utilizes Business Lookup App 6104 to creates two more Lookup Domain Name 5200 for the cafe business using their local colloquialism and locality: ":website:@Willoughby's:location::new_haven:" and ":website:@Willoughby's:location::brandford:". User 5402-1 utilizes Lookup Browser 5404-1 to browse Lookup Domain Name 5200 for Cafe 6102 using the context expression: ":website:@Willoughby's". The lookup result for the user will depend on the locality that is set in their lookup browser.

An exemplary enablement is a system that utilizes local colloquialisms for lookup domain names.

Another exemplary enablement is a system that utilizes locality for lookup domain names.

In another embodiment, Lookup Browser 5404-1 is able to set the browser's location automatically (e.g., HTML5 Geolocation API).

Cafe 6102 is connected to Business Listing Placard 5700, Business Event Placard 5922, Business Menu Placard 6004, and Business Listing Summary Placard 5800. Cafe 6102 utilizes Business Lookup App 6104 to create business placards resulting in one or more Lookup 4800 (see, FIG. 48) being created for each placard. Resources 2624 illustrates business placard content for Lookup 4800 through Network(s) 2608. As an example, Cafe 6102 utilizes Business Lookup App 6104 to create Business Menu Placard 6004 resulting in one or more Lookup 4800 being created for each menu item. To illustrate, the "Willoughby's House Blend" cafe menu item uses the context expression: ":restaurant::cafe::menu_item:Willoughby's House Blend:locality::new_haven:" User 5402-1 utilizes Lookup Browser 5404-1 to set their default location using the context expression: ":settings: :locality::new_haven:", and places a takeout order of the menu item with the context expression: ":cafe:: takeout: #Willoughby's House Blend".

Help Wanted Placard 6120 illustrates a help wanted placard which may be used to post a help wanted lookup. In this example, Cafe 6102 utilizes Business Lookup App 6104 to create Help Wanted Placard 6120 resulting in one or more Lookup 4800 being created for the help wanted post. To illustrate, the "Roaster Level I" help wanted posting uses the context expression: ":classified::help_wanted: :title:Roaster Level I:locality::new_haven:" User 5402-1 utilizes Lookup Browser 5404-1 to browse the help wanted classified lookups using any of the following context expressions: "#Classifieds #Roaster Level I", "#Classifieds #Help Wanted

Roaster Level I" or "#Help Wanted #Roaster Level I". Lookup Browser 5404-1 then displays help wanted placard results.

An exemplary enablement is a system that utilizes placards for lookup generation.

Another exemplary enablement is a system that utilizes placards to automatically generate synonymous pathways from a single context expression.

Share Placard 6122 illustrates a share placard which may be used to create a share lookup. In this example, Cafe 6102 utilizes Business Lookup App 6104 to create Share Placard 6122 resulting in one or more Lookup 4800 being creating for the share post. To illustrate, the "Willoughby's East Rock Blend" share uses the context expression: ":share: :title: Willoughby's East Rock Blend:" User 5402-1 utilizes Lookup Browser 5404-1 to browse their received share lookups using any of the following context expressions: "#New Shares", "#Shares", "#Willoughby's East Rock Blend", or "#East Rock Blend". Lookup Browser 5404-1 then displays share placard lookup results.

An exemplary enablement is a system that utilizes share placards to send and receive share lookups.

Another exemplary enablement is a system that utilizes share placards to automatically generate synonymous share pathways from a single context expression.

Share Authorization Placard 6124 illustrates a share authorization placard which may be used to configure share lookup authorization. Cafe 6102 utilizes Business Lookup App 6104 to set share authorization utilizing Share Authorization Placard 6124. To illustrate, setting authorization for the "Willoughby's East Rock Blend" share, Cafe 6102 uses the context expression: ":set::share::authorization::public: :title:Willoughby's East Rock Blend:" Share Authorization Placard 6124 uses this context expression to set the Willoughby's East Rock Blend share authorization to public thereby granting the general public access to the share. In yet another example, Cafe 6102 utilizes Business Lookup App 6104 to create a private share for an employee that contains personal identifiable information (PII) with the context expression: ":share: :title:Roaster Level II Promotion". Share Authorization Placard 6124 is utilized to create a reauthorization for the share with the following context expression: ":set::share::authorization::reauthorization: :title:Roaster Level II Promotion:". The reauthorization causes the system to reauthorize the user before granting the user access to the share.

An exemplary enablement is a system that utilizes share authorization placards to configure share authorization.

Another exemplary enablement is a system that utilizes reauthorization to require the system to reauthorize a user before allowing access.

Share Editor Placard 6126 illustrates a share editor placard which may be used to perform editorial functions for share lookups. Cafe 6102 utilizes Business Lookup App 6104 to enable editorial functions for shares utilizing Share Editor Placard 6126. Share Editor Placard 6126 may be used to set share attributes (e.g., read only, comment, comment with editorial review, download, reshare, encrypt). The share attribute comment with editorial review enables Cafe 6102 to review comments for approval, deletion, markup, correction, etc. Broadcast Share Placard 6128 illustrates a broadcast share placard which may be used to broadcast share lookups. Cafe 6102 utilizes Business Lookup App 6104 to create broadcast shares utilizing Broadcast Share Placard 6128. Merge Share Placard 6130 illustrates a merge share placard which may be used to merge share lookups. Cafe 6102 utilizes Business Lookup App 6104 to create merge shares utilizing Merge Share Placard 6130. A merge share enables all authorized users to contribute content individually and share the total combined content collectively.

In an alternative embodiment, context expressions may be generated by a user interface context expression designer.

Figure 62:
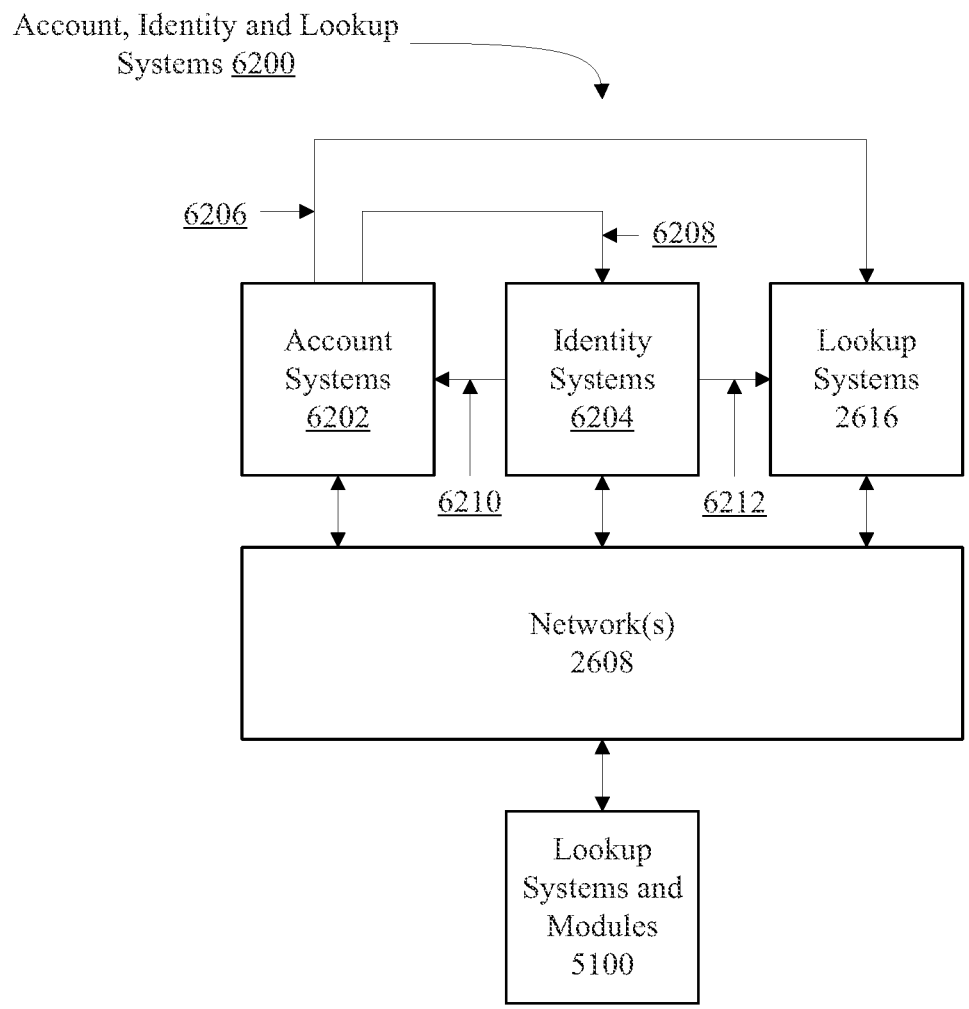
FIG. 62 shows an exemplary Account, Identity, and Lookup Systems.

FIG. 62 illustrates Account, Identity and Lookup Systems 6200 which is comprised of Network(s) 2608. Network(s) 2608 is connected to Account Systems 6202, Identity Systems 6204, Lookup Systems 2616, and Lookup Systems and Modules 5100.

Account, Identity and Lookup Systems 6200 illustrates a systems architecture for Account Systems 6202, Identity Systems 6204, and Lookup Systems 2616. Lookup Systems and Modules 5100 is available to all systems through Network(s) 2608. Account Systems 6202 illustrates systems for accounting. Identity Systems 6204 illustrates a system for creating and maintaining user credentials and claims. Lookup System 2616 illustrates, in this use case, user listing information lookups.

Account Systems 6202 is connected to Identity Systems 6204 via Line Segment 6208 and to Lookup Systems 2616 via Line Segment 4006; these connections illustrate that Account Systems 6202 utilizes a Context Identifier 228 (see, FIG. 2) for each of the users in Identity Systems 6204 and Lookup Systems 2616 respectively. The use of Context Identifier Algorithm 200 (see, FIG. 2) to create a Context Identifier 228 for users of each system enables better security than using a hash (e.g., SHA1) of a user's name or system identifier. Each system defines a set of KVP that is unknown outside the system, to create context items (see, Context Item Dictionary 2720 in FIG. 27) as input for Context identifier Algorithm 200 to derive a Context Identifier 228 for a user which can then be shared with another system.

An exemplary enablement is a system that utilizes context identifiers to generate user identifier references for external systems.

While Account Systems 6202 has a reference to the users in Identity Systems 2604 and Lookup System 2616, the reference does not contain usable information that can be used for hacking. This capability is very important for Identity Systems 6204 which is responsible user credentials and claims. As illustrated, Identity Systems 6204 is connected to Account Systems 6202 via Line Segment 6210 and to Lookup Systems 2616 via Line Segment 6212. However, Identity Systems 6204 does not retain a hard or slightly obscured user identity from the other systems; it retains a context identifier only, making it very difficult to leverage user information from other systems.

Lookup Systems 2616 may contain lookups to user listing information such as contact details (e.g., street address, phone numbers, email address, etc.). However, Lookup Systems 2616 does not hold references to Identity Systems 6204 and Account Systems 6202. The separation of user identity from user contact details reduces attack surface areas for all systems involved. This separation or decoupling is further illustrated by one-way connections utilizing context identifiers between Identity Systems 6204 and Account Systems 6202 to Lookup Systems 2616.

An exemplary enablement is a system architecture that enables separation of concerns for user credentialing, accounting, and directory information.

What is claimed is:

1. A method, comprising:
   identifying one or more key-value string pairs;
   identifying culture and case settings for a particular user of a user verification system;

for each one of the one or more key-value string pairs, case folding and normalization computation of a key string and a value string in the key-value string pair among the one or more key-value string pairs utilizing the culture and case settings;

sorting settings according to sort settings;

sorting of the key-value pairs utilizing the sort settings;

computation of a Merkle Root of the one or more key-value string pairs;

conversion of the Merkle Root to a hexadecimal;

returning, to a user verification system, the hexadecimal as a context identifier wherein the context identifier is a consistent identifier that represents, and is associated with information, data, and knowledge provided by the user as user identifying attributes in the user verification system;

presenting, to the user, one or more user verifying questions which are based on the user having knowledge of information, data, and knowledge of the context of the user's previous activity within the user verification system, determining, that answers to the one or more user verifying questions received from the user are consistent with the context identifier returned to the user verification system; and verifying the user to the user verification system with the context identifier, in response to a request to access the user verification system by the user.

2. The method of claim 1, further comprising:

configuring the identified culture and case settings by default settings or, configuring the identified culture and case settings by a system external to a system identifying the culture and case settings, or configuring the identified culture and case settings by optional parameters passed to the system identifying the culture and case settings.

3. The method of claim 1, further comprising:

configuring the sort settings by default settings or, configuring the sort settings by a system external to a system configuring the sort settings or, configuring the sort settings by optional parameters passed to the system identifying the culture and case settings.

4. The method of claim 1, further comprising:

verifying, to a system, a user based on the generated context identifier.

5. A method, comprising:

identifying one or more key-value string pairs;

identifying culture and case settings for a particular user of the user verification system;

for each one of the one or more key-value string pairs, case folding and normalization computation of a value string in the key-value string pair among the one or more key-value string pairs utilizing the culture and case settings;

sorting settings;

sorting of the one or more key-value string pairs utilizing the sort settings;

computation of a Merkle Root of the one or more key-value string pairs;

conversion of the Merkle Root to a hexadecimal; and returning, to a user verification system, the hexadecimal as a context identifier, wherein the context identifier is a consistent identifier that represents, and is associated with information, data, and knowledge provided by the user as user identifying attributes in the user verification system;

presenting, to the user, one or more user verifying questions which are based on the user having knowledge of information, data, and knowledge of the context of the user's previous activity within the user verification system, determining, that answers to the one or more user verifying questions received from the user are consistent with the context identifier returned to the user verification system; and verifying the user to the user verification system with the context identifier, in response to a request to access the user verification system by the user.

6. The method of claim 5, further comprising:

configuring the identified culture and case settings by default settings or, configuring the identified culture and case settings by a system external to a system identifying the culture and case settings, configuring the identified culture and case settings by optional parameters passed to the system identifying the culture and case settings.

7. The method of claim 5, further comprising:

configuring the sort settings by default settings or, configuring the sort settings by a system external to a system configuring the sort settings or, configuring the sort settings by optional parameters passed to the system identifying the culture and case settings.

8. A method, comprising:

identifying one or more key-value string pairs;

identifying culture and case settings for a particular user of a user verification system;

for each one of the one or more key-value string pairs, case folding and normalization computation of a value string in the key-value string pair among the one or more key-value string pairs utilizing the culture and case settings;

hashing of the value string of the one or more key-value string pair;

conversion of the hash to a hash hexadecimal;

assigning the hash hexadecimal to a key string of the one or more key-value string pairs;

sorting settings;

sorting of the key-value pairs utilizing the sort settings;

computation of a Merkle Root of the key-value pairs;

conversion of the Merkle Root to a hexadecimal; and returning, to a user verification system, the hexadecimal as a context identifier, wherein the context identifier is a consistent identifier that represents, and is associated with information, data, and knowledge provided by a user as user identifying attributes in the user verification system;

presenting, to the user, one or more user verifying questions which are based on the user having knowledge of information, data, and knowledge of the context of the user's previous activity within the user verification system, determining, that answers to the one or more user verifying questions received from the user are consistent with the context identifier returned to the user verification system; and verifying the user to the user verification system with the context identifier, in response to a request to access the user verification system by the user.

9. The method of claim 8, further comprising:
configuring the identified culture and case settings by default settings or,
configuring the identified culture and case settings by a system external to a system identifying the culture and case settings,
configuring the identified culture and case settings by optional parameters passed to the system identifying the culture and case settings.

10. The method of claim 8, further comprising:
configuring the sort settings by default settings or,
configuring the sort settings by a system external to a system configuring the sort settings or,
configuring the sort settings by optional parameters passed to the system identifying the culture and case settings.

* * * * *